United States Patent
Uno et al.

(10) Patent No.: US 10,340,699 B2
(45) Date of Patent: Jul. 2, 2019

(54) SOLAR CELL ADJUSTMENT SYSTEM, RELATED METHOD, AND MINIMUM CURRENT DETECTION AND CONTROL SYSTEM

(71) Applicant: Japan Aerospace Exploration Agency, Tokyo (JP)

(72) Inventors: Masatoshi Uno, Hitachi (JP); Akio Kukita, Kamakura (JP)

(73) Assignee: Japan Aerospace Exploration Agency, Tokyo (JP)

( * ) Notice: Subject to any disclaimer, the term of this patent is extended or adjusted under 35 U.S.C. 154(b) by 614 days.

(21) Appl. No.: 14/917,449

(22) PCT Filed: Sep. 11, 2014

(86) PCT No.: PCT/JP2014/074072
§ 371 (c)(1),
(2) Date: Jun. 22, 2016

(87) PCT Pub. No.: WO2015/037663
PCT Pub. Date: Mar. 19, 2015

(65) Prior Publication Data
US 2016/0294189 A1    Oct. 6, 2016

(30) Foreign Application Priority Data

Sep. 11, 2013  (JP) .................................. 2013-188658
Oct. 9, 2013   (JP) .................................. 2013-212217

(51) Int. Cl.
G05F 1/67   (2006.01)
H02J 3/38   (2006.01)
(Continued)

(52) U.S. Cl.
CPC ................ *H02J 3/383* (2013.01); *G05F 1/67* (2013.01); *H02J 3/385* (2013.01); *H02S 40/32* (2014.12);
(Continued)

(58) Field of Classification Search
None
See application file for complete search history.

(56) References Cited

U.S. PATENT DOCUMENTS 6,205,036 B1    3/2001  Anzawa
9,785,172 B2 *  10/2017 Agarwal ................. H02M 3/07
(Continued)

FOREIGN PATENT DOCUMENTS

JP    2001-286072 A    10/2001
JP    2003-333762 A    11/2003
(Continued)

OTHER PUBLICATIONS

Toshihisa Shimizu et al.; "A Novel High-Performance Utility-Interactive Photovoltaic Inverter System"; IEEE Transactions on Power Electronics; Mar. 2003; pp. 704-711; vol. 18; No. 2.
(Continued)

*Primary Examiner* — Jared Fureman
*Assistant Examiner* — James P Evans
(74) *Attorney, Agent, or Firm* — Studebaker & Brackett PC

(57) ABSTRACT

[Problem] It is intended to provide a system, a related method and a minimum current detection and control system for, even when partial shading occurs in a string composed of a series connection of a plurality of solar cell modules, maintaining an output current of the whole.

[Solution] By inputting an output voltage of the string into an inverter to convert the output voltage into an AC voltage and applying the AC voltage to the string via a multi-stage
(Continued)

voltage multiplier rectification circuit, a compensation current is supplied to a shaded module on a priority basis to maintain an output current of the whole string while lowering an operating voltage of the shaded module by impedance generated on a pathway of the compensation current. Further provided are a system and the like constructed by multistage-connecting an output-side circuit section of one of various types of converters to the solar cell modules, and configured to supply a compensation current from the converter section to the shaded module on a priority basis.

10 Claims, 90 Drawing Sheets

(51) Int. Cl.
  *H02S 50/10* (2014.01)
  *H02S 40/32* (2014.01)
  *H02S 40/36* (2014.01)
(52) U.S. Cl.
  CPC .............. *H02S 40/36* (2014.12); *H02S 50/10* (2014.12); *Y02E 10/58* (2013.01)

(56) References Cited

U.S. PATENT DOCUMENTS

| | | | |
|---|---|---|---|
| 2009/0034304 A1* | 2/2009 | Engel .................. | H02M 3/158 363/71 |
| 2009/0273321 A1* | 11/2009 | Gotzenberger ....... | H02J 7/0018 320/166 |
| 2012/0199172 A1* | 8/2012 | Avrutsky ............. | H03K 17/082 136/244 |
| 2012/0286578 A1* | 11/2012 | Uno .................... | H02J 7/0014 307/77 |
| 2013/0155739 A1* | 6/2013 | Itako ................... | G05F 1/67 363/95 |

FOREIGN PATENT DOCUMENTS

| | | |
|---|---|---|
| JP | 2004-047585 A | 2/2004 |
| JP | 2011-228598 A | 11/2011 |
| JP | 2012-028435 A | 2/2012 |
| JP | 2012-186881 A | 9/2012 |
| JP | 2013-105318 A | 5/2013 |

OTHER PUBLICATIONS

Toshihisa Shimizu et al.; "Generation Control Circuit for Photovoltaic Modules"; IEEE Transactions on Power Electronics; May 2001; pp. 293-300; vol. 16; No. 3.
Shibin Qin et al.; "Sub-Module Differential Power Processing for Photovoltaic Applications"; IEEE; 2013; pp. 101-108.
Jason T. Stauth et al.; "Resonant Switched-Capacitor Converters for Sub-module Distributed Photovoltaic Power Management"; IEEE Transactions on Power Electronics; Mar. 2013; pp. 1189-1198; vol. 28; No. 3.
Masatoshi Uno et al.; "Double-Switch Series-Resonant Cell-Voltage Equalizer Using a Voltage Multiplier for Series-Connected Energy Storage Cells"; IEEJ Transactions on Industry Applications; Apr. 2013; pp. 475-483; vol. 133; No. 4.
International Search Report issued in PCT/JP2014/074072; dated Dec. 16, 2014.
Written Opinion issued in PCT/JP2014/074072; dated Dec. 16, 2014.

* cited by examiner

SOLAR CELL ADJUSTMENT SYSTEM, RELATED METHOD, AND MINIMUM CURRENT DETECTION AND CONTROL SYSTEM

TECHNICAL FIELD

The present relates to a partial shading compensation device for, when partial shading occurs in a string composed of a series connection of a plurality of solar cell modules (solar cell module string), equalizing electrical characteristics of the solar cell modules in a pseudo manner.

BACKGROUND ART

A solar cell is designed to convert light energy into electric power by means of a photovoltaic effect, and typically has a structure in which a p-type semiconductor and an n-type semiconductor are joined together, and an electrode and others are attached thereto.

An operating characteristic of a solar cell changes in response to changes in insolation condition or temperature, and a relationship between a voltage applied to a solar cell and a current flowing through the solar cell and a relationship between the applied voltage and an electric power generated from the solar cell are generally represented by operating characteristic curves depicted in FIG. 1.

As shown by the operating characteristics in FIG. 1, a solar cell is capable of generating a maximum electric power at a certain voltage. Thus, from a viewpoint of maximally utilizing solar energy in a solar power generation system using a solar cell, a solar cell module needs to be adjusted to operate at a maximum power point (MPP) by using a power conditioner or the like.

In the case where a plurality of solar cell modules are used in the form of a string constructed by connecting them in series, the solar cell modules can be partially shaded (shadowed) (this shading (shadowing) will hereinafter be referred to as "partial shading"), and this causes a variation in characteristics of the solar cell modules, thereby leading to a risk that the shaded solar cell module (hereinafter referred to as "shaded module") is inversely biased.

Generally, with a view to preventing the inverse bias, the string is often used in a state in which a bypass diode is connected in parallel to each of the solar cell modules forming the string. In this case, however, it is known that, during occurrence of partial shading, the bypass diode connected to a shaded module is brought into conduction, and thereby the shaded module becomes unable to generate electric power, resulting in significant reduction of utilizable electric power.

Moreover, depending on an occurrence state of partial shading, a plurality of MPPs (points B and C in FIG. 2) appear on an operating characteristic curve of the whole string, and thereby a power conditioner is likely to adjust the string to operate at a non-optimal point (point C in FIG. 2) different from the true MPP (point B in FIG. 2).

CITATION LIST

Patent Document

Patent Document 1: JP 2012-028435A
Patent Document 2: JP 2004-047585A
Patent Document 3: JP 2013-105318A
Patent Document 4: JP 2011-228598A
Patent Document 5: JP 2012-186881A

Non-Patent Document

Non-Patent Document 1: T. Shimizu, O, Hashimoto, and G. Kimura, "A novel high-performance utility-interactive photovoltaic inverter system", IEEE Trans. Power Electron., Vol. 18, No. 2, pp. 704-711, March 2003.

Non-Patent Document 2: T. Shimizu, M. Hirakata, T. Kamezawa, and H. Watanabe, "Generation control circuit for photovoltaic modules", IEEE Trans. Power Electron., Vol. 16, No. 3, pp. 293-300, May 2001.

Non-Patent Document 3: S. Qin and R. C. N. Pilawa-Podgurski, "Sub-module differential power processing for photovoltaic applications", IEEE Applied Power Electron. Conf. Expo., pp. 101-108, 2013.

Non-Patent Document 4: J. T. Stauth, M. D. Seeman, and K. Kesarwani, "Resonant switched-capacitor converters for sub-module distributed photovoltaic power management", IEEE Trans. Power Electron., Vol. 28, No. 3, pp. 1189-1198, March 2013.

Non-Patent Document 5: Uno, Kukita, "Double-Switch Series-Resonant Cell Voltage Equalizer Using Voltage Multiplier for Series-Connected Energy Storage Cells", IEEJ Transactions on Industry Applications, The Institute of Electrical Engineers of Japan, April 2013, Vol. 133, No. 4, pp. 475-483

SUMMARY OF INVENTION

Technical Problem

As means to reduce the above negative effects due to partial shading, for example, individual control for each solar cell module by using a micro-converter/inverter, and control with an added true MPP search algorithm using operating point scanning are under development.

However, the micro-converter/inverter-based control scheme requires providing one power converter for each solar cell module, so that it is apt to lead to high cost. On the other hand, the MPP search algorithm using operating point scanning still has big problems such as complexity in control, deterioration in responsiveness and decrease in power extraction rate.

Although a large number of other solutions have been proposed, they require calculation based on huge volumes of data, and an information detection system, and therefore an increase in cost can be expected.

There have been proposed various partial shading compensation devices for preventing characteristic degradation due to partial shading.

The partial shading compensation device is configured to transmit electric power from a solar cell module which is not shaded (hereinafter referred to as "insolated module") to a shaded module, to thereby allow electrical characteristics of all of the solar cell modules to be equalized in a pseudo manner, so that, even during occurrence of partial shading, each solar cell module can be adjusted to operate at the MPP, by using a normal power conditioner, without using the micro-inverter, the MPP search algorithm or the like.

As the partial shading compensation device, for example, a type using a bi-directional buck-boost converter as depicted in FIGS. 3a and 3b, and a type using a switched-capacitor converter as illustrated in FIG. 4 have been proposed.

While a circuit condition of each of the above types of partial shading compensation devices is fundamentally the same as that of a voltage equalization circuit for series-connected electricity storage cells, it is preferable that characteristics of the partial shading compensation device are slightly different from characteristics of the voltage equalization circuit for series-connected electricity storage cells.

Each of the above types of partial shading compensation devices requires a plurality of switches, and thereby a circuit configuration thereof is apt to become exponentially complicated along with an increase in the number of series-connected solar cell modules. Moreover, the electric power transmission is limited to between adjacent solar cell modules, thereby leading to a problem that, in a situation where there are a large number of series-connections of solar cell modules, an energy loss becomes larger in the course of power transmission via a plurality of solar cell modules.

In many cases, a solar power generation system is required to guarantee a long-term operation for ten or more years and thus ensuring of reliability is important.

Further, in a situation where current ripples are superimposed on a solar cell module, generally, an operating point of the solar cell module periodically deviates from the MPP.

Circuit simplification is effective in enhancing reliability, and a reduction of ripple current is essential for stabilization of MPP operation.

In view of the above background, the partial shading compensation device is desirably constructed as a type having a simple circuit configuration and capable of outputting a low ripple current.

FIG. 5 depicts a representative example of electrical characteristics of each of an insolated module and a shaded module.

Generally, a voltage of a solar cell module at the MPP depends on an irradiation intensity of solar light, wherein the MPP voltage (voltage at the MPP) $V_{MP}$ becomes lower as the intensity becomes weaker.

When partial shading occurs, the MPP voltage $V_{MP}$ is somewhat lowered as compared to when no partial shading occurs, as depicted in FIG. 5.

Thus, from a viewpoint of maximally utilizing electric power generatable by all of a plurality of series-connected solar cell modules during occurrence of partial shading, it is desirable to adjust the shaded module to operate at a lower voltage than that for the insolated module, as indicated by the broken line A in FIG. 5.

However, the conventional voltage equalization circuit for series-connected electricity storage cells operates to adjust voltages of all of the electricity storage cells to become equal to each other. Thus, if this circuit is directly used as a partial shading compensation device, voltages of all of the solar cell modules are equalized as indicated by the broken line B in FIG. 5.

Therefore, there is a possibility of becoming unable to maximally utilize electric power of the solar cell modules.

In the state in which the voltages of the solar cell modules are equalized, the insolated module can operate at the maximum power point, whereas the shaded module operates at a point away from the maximum power point, so that it is impossible to effectively utilize electric power of the shaded module.

Solution to Technical Problem

In view of the above technical problems, the present invention provides a solar cell adjustment system which comprises: a multi-stage voltage multiplier rectification circuit constructed such that two series-connected diodes are connected in parallel, respectively, to each of series-connected 1st to n-th (where n is an integer of two or more) capacitors, and an intermediate capacitor is connected to each intermediate point of respective two series-connected diodes; a solar cell module string constructed by series-connecting 1st to n-th solar cell modules each defined as a k-th (where k=1, 2, - - - , n) solar cell module connected in parallel to a k-th one of the capacitors; and an inverter comprising a capacitive element and an inductive element, wherein the inverter is configured to receive an input of a summed voltage of voltages applied, respectively, to the 1st to n-th solar cell modules, convert the input summed voltage into an AC (Alternating Current) voltage, and output the AC voltage to the multi-stage voltage multiplier rectification circuit (which is a first aspect of the present invention).

The solar cell adjustment system according to the first aspect of the present invention makes it possible to supply a compensation current to a shaded module among the solar cell modules forming the string, and adjust the shaded module to operate at an operating voltage lower than that for an insolated module.

Specifically, as will be described in detail in connection with aftermentioned embodiments, impedance generated by the capacitive and inductive elements comprised in the inverter, the intermediate capacitors comprised in the multi-stage voltage multiplier rectifier circuit, and a resistance occurring in each current pathways causes a voltage drop in a shaded module into which a current flows from multi-stage voltage multiplier rectification circuit on a priority basis.

This voltage drop can be expressed using an equivalent output resistance Rout, as mentioned later.

As previously mentioned, the MPP voltage $V_{MP}$ of a shaded module is lower than the MPP voltage $V_{MP}$ of an insolated module (on the assumption that an operation environment other than insolation (e.g., temperature) and a structure of the solar cell module are the same).

Thus, the solar cell adjustment system according to the present invention may be activated in a situation where the insolated module in the string is adjusted to operate around the MPP by using a power conditioner, a DC-DC converter, a load or the like.

In this case, an operating voltage of the shaded module can also be adjusted toward the MPP voltage $V_{MP}$.

Preferably, the inverter comprises a device for changing a frequency of the AC voltage.

As will be described in detail in connection with the aftermentioned embodiments, the impedance depends on a frequency of the AC voltage output from the inverter. Thus, if the frequency can be changed, the operating voltage of the shaded module can also be changed.

This makes it possible to allow an operating point of the shaded module to come closer to the MPP.

Although it is conceivable to employ a switch as the device for changing the frequency of the AC voltage, the device is not limited thereto, but any other suitable device may be employed.

The inverter may comprise (1) an input circuit comprising a switch, wherein the input circuit is configured to receive the input of the summed voltage of voltages applied, respectively, to the 1st to n-th solar cell modules, and output a voltage depending on a switched state of the switch, and (2) a resonant circuit comprising a capacitive element and an inductive element, wherein the resonant circuit is configured to convert the voltage output from the input circuit, into an AC voltage, and output the AC voltage to the multi-stage voltage multiplier rectification circuit.

This is one example of the system according to the system of the present invention, in which a switch is employed as the device for changing the frequency of the AC voltage.

The system according to the first aspect of the present invention may be constructed by using such an inverter. In this case, an AC voltage can be output from the inverter, for example, in such a manner that a rectangular wave-shaped voltage according to a switching frequency is generated through the input circuit, and further subjected to conversion through the resonant circuit to thereby output a sinusoidal wave-shaped AC voltage.

The above inverter can be configured so that the resonant circuit transforms the AC voltage by a transformer and then output the transformed AC voltage to the multi-stage voltage multiplier circuit rectification.

It is considered that the aforementioned voltage drop in a shaded module due to impedance depends on a magnitude of current flowing into the shaded module. This means that, if the magnitude of the current can be changed by transforming the AC voltage by the transformer and outputting the transformed AC voltage to the multi-stage voltage multiplier rectifier circuit, the voltage drop in the shaded module can also be changed.

(1) The input circuit may be constructed such that two flywheel diodes are connected in parallel, respectively, to series-connected first and second switches, and configured to select one of the first and second switches as a switch to be turned on, over time, and thereby, when a DC (Direct Current) voltage is input between both end of the series-connected first and second switches, output a rectangular wave-shaped voltage between a first terminal located at an intermediate point of the first and second switches, and a second terminal located at one of opposite ends of the second switch on a side different from the first terminal, and (2) the resonant circuit may comprise an inductor and an in-resonant circuit capacitor which are series-connected between the first terminal and a third terminal, wherein the resonant circuit may be configured to, in response to receiving an input of the rectangular wave-shaped voltage from the input circuit, output an AC voltage to a point between the third terminal and a fourth terminal connected to the second terminal, and after transforming the AC voltage by the transformer, output the transformed AC voltage to the multi-stage voltage multiplier rectification circuit.

This is a configuration corresponding to a typical example of the present invention shown in FIG. 8.

The present invention also provides a solar cell adjustment system which comprises: a solar cell module string constructed by series-connecting 1st to n-th (where n is an integer of two or more) solar cell modules; a first multi-stage voltage multiplier rectification circuit comprising 1st to n-th capacitors each defined as a k-th (k=1, 2, - - - , n) capacitor connected in parallel to a k-th one of the solar cell modules, 1st to n-th diode pairs each composed of two series-connected diodes and each defined as a k-th (k=1, 2, - - - , n) diode pair connected in parallel to a k-th one of the capacitors, and 1st to n-th intermediate capacitors each connected to an intermediate point of the two series-connected diodes in each of the 1st to n-th diode pairs; a second multi-stage voltage multiplier rectification circuit comprising (n+1)-th to 2n-th capacitors each defined as an (n+k)-th (k=1, 2, - - - , n) capacitor connected in parallel to a k-th one of the solar cell modules, (n+1)-th to 2n-th diode pairs each composed of two series-connected diodes and each defined as an (n+k)-th diode pair connected in parallel to an (n+k)-th one of the capacitors, and (n+1)-th to 2n-th intermediate capacitors each connected to an intermediate point of the two series-connected diodes in each of the (n+1)-th to 2n-th diode pairs; an inverter comprising a capacitive element and an inductive element, wherein the inverter is configured to receive an input of a summed voltage of voltages applied, respectively, to the 1st to n-th solar cell modules, and, after converting the input summed voltage into an AC voltage and transforming the AC voltage by a transformer, output the transformed AC voltage, wherein one end of a secondary winding of the transformer is connected to the first multi-stage voltage multiplier rectification circuit, and the other end of the secondary winding is connected to the second multi-stage voltage multiplier rectification circuit (which is a second aspect of the present invention).

Such the solar cell adjustment system also makes it possible to supply a compensation current to a shaded module among the solar cell modules forming the string, and adjust the shaded module to operate at an operating voltage lower than that for an insolated module.

For example, the solar cell adjustment system according to the second aspect of the present invention may be constructed as depicted in FIG. 26. In this case, as will be described in detail in connection with the aftermentioned embodiments, it becomes possible to reduce a ripple current possibly flowing through the solar cell modules.

Preferably, in the second aspect of the present invention, the inverter comprises a means for changing a frequency of the AC voltage.

If the frequency can be changed, a magnitude of impedance causing the voltage drop in a shaded module can be changed, and thus the operating voltage of the shaded module can also be changed.

Although it is conceivable to employ a switch as the means for changing the frequency of the AC voltage, the means is not limited thereto, but any other suitable means may be employed.

In the second aspect of the present invention, the inverter may comprise (1) an input circuit comprising a switch, wherein the input circuit may be configured to receive the input of the summed voltage of voltages applied, respectively, to the 1st to n-th solar cell modules, and output a voltage depending on a switched state of the switch, and (2) a resonant circuit comprising a capacitive element and an inductive element, the resonant circuit may be configured to convert the voltage output from the input circuit, into an AC voltage, and, after transforming the AC voltage by a transformer, output the transformed AC voltage.

This is one example of the system according to the second aspect of the present invention, in which a switch is employed as the means for changing the frequency of the AC voltage.

In the second aspect of the present invention, (1) the input circuit may be constructed such that two flywheel diodes are connected in parallel, respectively, to series-connected first and second switches, and configured to alternately select one of the first and second switches as a switch to be turned on, over time, and thereby, when a DC voltage is input between opposite end of the series-connected first and second switches, output a rectangular wave-shaped voltage between a first terminal located at an intermediate point of the first and second switches, and a second terminal located at one of opposite ends of the second switch on a side different from that of the first terminal, and (2) the resonant circuit may comprise an inductor and an in-resonant circuit capacitor which are series-connected between the first terminal and a third terminal, wherein the resonant circuit may be configured to, in response to receiving an input of the rectangular wave-shaped voltage from the input circuit, output an AC voltage between the third terminal and a fourth terminal connected to the second terminal, and then, after transforming the AC voltage by the transformer, output the transformed AC voltage.

The present invention further provides a method for use with the solar cell adjustment system comprising the means for changing the frequency of the AC voltage, according to the first or second aspect of the present invention, to control an operating state of the solar cell module string.

The method comprises the steps of: measuring an output electric power from the solar cell module string; changing a frequency of an AC voltage to be output from the inverter; after the change of the frequency, measuring an output electric power from the solar cell module string; in a situation where the output electric power measured after the change of the frequency is greater than the output electric power measured before the change of the frequency, when the change has been raising of the frequency, further raising the frequency, and, when the change has been lowering of the frequency, further lowering the frequency; and in a situation where the output electric power measured after the change of the frequency is less than the output electric power measured before the change of the frequency, when the change has been raising of the frequency, lowering the frequency, and, when the change has been lowering of the frequency, raising the frequency, wherein the measurement of the output electric power from the solar cell module string and the change of the frequency of the AC voltage output from the inverter are repeated to thereby control the operating state of the solar cell module string (which is a third aspect of the present invention).

This method is usable to control the operating state of the solar cell module string. In this case, it becomes possible to adjust the frequency of the AC voltage to be output from the inverter while adjusting an insolated module in the string to operate around the MPP by using a power conditioner, a DC-DC converter, a load or the like, thereby adjusting a shaded module to operate around the MPP.

That is, it becomes possible to adjust the insolated module and the shaded module toward respective different MPP voltages $V_{MP}$.

The present invention further provides a solar cell adjustment system which comprises: series-connected 1st to n-th (where n is an integer of two or more) solar cell modules; an input circuit configured to receive an input of a summed voltage of voltages applied, respectively, to the 1st to n-th solar cell modules; and an output circuit configured to, in a steady state, output an output voltage produced by converting the summed voltage according to an on-off time ratio of a switch, to one or more of the 1st to n-th solar cell modules having a lowest voltage, and output a current to the one or more solar cell modules having the lowest voltage on a priority basis (which is a fourth aspect of the present invention).

The inventor of the present invention has invented a single-switch equalization circuit in which a buck-boost converter is multistage-connected for series-connected electricity storage cells (Patent Document 5).

This circuit is a single-switch type, i.e., a type operable using one switch and configurable using only passive elements, except the switch, so that it is possible to provide a significantly simplified circuit configuration, as compared to various types of conventional cell voltage equalization circuits.

The present inventor found that, by applying this type of circuit to a solar cell string, it becomes possible to supply a compensation current from an insolated module to a shaded module so as to allow the string to operate at a high output, i.e., the circuit functions as a partial shading compensation device.

In the fourth aspect of the present invention, the input circuit may comprises: (i) an input capacitor configured to receive an input of the summed voltage; (ii) an inductor connected in series to the input capacitor; and (iii) the switch, wherein the switch is connected between the input capacitor and the inductor, and the output circuit comprises: (iv) 1st to n-th diode-inductor circuits each composed of a diode and an inductor connected to an anode of the diode, and connected in parallel, respectively, to the 1st to n-th solar cell modules, wherein the 1st to n-th diode-inductor circuits are series-connected together in such a manner as to be kept from blocking a current having a polarity directed from the inductor toward the diode in each of the 1st to n-th diode-inductor circuits; and (v) 1st to n-th capacitors each connected between an intermediate point of the diode and the indictor in each of the 1st to n-th diode-inductor circuits, and an intermediate point of the inductor and the switch in the input circuit.

This is an example of the solar cell adjustment system according to the present invention, as shown in FIG. 41, wherein the system is constructed by multistage-connecting an output-side circuit section of a SEPIC converter to 1st to n-th solar cell modules Alternatively, in the fourth aspect of the present invention, the input circuit may comprise: (i) an input capacitor configured to receive an input of the summed voltage; (ii) the switch, wherein the switch is connected in series to the input capacitor; and (iii) an inductor connected between the input capacitor and the switch, and the output circuit may comprise: (iv) 1st to n-th diode-inductor circuits each composed of a diode and an inductor connected to a cathode of the diode, and connected in parallel, respectively, to the 1st to n-th solar cell modules, wherein the 1st to n-th diode-inductor circuits are series-connected together in such a manner as to be kept from blocking a current having a polarity directed from the diode toward the inductor in each of 1st to n-th the diode-inductor circuits; and (v) 1st to n-th capacitors each connected between an intermediate point of the diode and the indictor in each of the 1st to n-th diode-inductor circuits, and an intermediate point of the switch and the inductor in the input circuit. This is an example of the solar cell adjustment system according to the present invention, as shown in FIG. 42, wherein the system is constructed by multistage-connecting an output-side circuit section of a Zeta converter to 1st to n-th solar cell modules.

Alternatively, in the fourth aspect of the present invention, the input circuit may be constructed by connecting (i) a first closed circuit comprising an input capacitor and an inductor and (ii) a second closed circuit comprising an energy transmission capacitor and a primary winding, together via the switch, and the output circuit may comprise:

(iii) 1st to n-th diode-inductor circuits each composed of a diode and an inductor connected to a cathode of the diode, and connected in parallel, respectively, to the 1st to n-th solar cell modules, wherein the 1st to n-th diode-inductor circuits are series-connected together in such a manner as to be kept from blocking a current having a polarity directed from the diode toward the inductor in each of the 1st to n-th diode-inductor circuits; (iv) a secondary winding having one end connected to an anode of the diode in the 1st diode-inductor circuit; and (v) 1st to n-th capacitors each connected between an intermediate point of the diode and the indictor in each of the 1st to n-th diode-inductor circuits, and the other end of the secondary winding, wherein the output circuit is configured to reverse a polarity of a voltage to be applied to the primary winding, and apply the resulting voltage to the secondary winding.

This is an example of the solar cell adjustment system according to the present invention, as shown in FIG. 43, wherein the system is constructed based on a Cuk converter.

The Cuk converter is a "polarity-reversing converter" in which polarities of input and output signals are reversed, and therefore this system is configured to reverse the voltage polarity between the first and second windings, as mentioned above.

Preferably, the solar cell adjustment system according to the fourth aspect of the present invention comprises: (i) a minimum compensation current detector configured to detect a minimum compensation current among compensation currents flowing, respectively, into the 1st to n-th solar cell modules via the output circuit; (ii) a comparator configured to compare the minimum compensation current to a reference current; and (iii) a time ratio control means configured to control a time ratio of the switch based on a result of the comparison.

As previously mentioned, by applying the equalization circuit invented by the present inventor as a type operable using one switch, to a solar cell string, it becomes to supply a compensation current from an insolated module to a shaded module so as to allow the string to operate at a high output.

However, this type of cell voltage equalization circuit operates to automatically equalize voltages in all cells, in principle. Thus, in the case where this type of cell voltage equalization circuit is utilized as a partial shading compensation device, if aftermentioned control is not adequately performed, a compensation current is supplied to not only a shaded module but also an insolated module, i.e., excessively supplied, thereby possibly leading to a risk that unwanted electric power loss occurs in the partial shading compensation device.

Therefore, from a viewpoint of effectively utilizing electric power generated from the solar cell modules, it is desirable to use a partial shading compensation device together with an adequate control scheme.

In this regard, the above configuration capable of: detecting the minimum compensation current; comparing the detected minimum compensation current to a reference current; and controlling the time ratio of the switch based on a result of the comparison can be used to suppress the occurrence of such a loss.

The minimum compensation current detector may comprise: (i) a pull-up resistor connected between a power supply and the comparator; (ii) 1st to n-th compensation current sensors configured to detect compensation currents flowing, respectively, into the 1st to n-th solar cell modules; and (iii) 1st to n-th in-detector diodes each connected between the pull-up resistor and a respective one of the 1st to n-th compensation current sensors in such a manner as to be kept from blocking a current flowing from the pull-up resistor to the compensation current sensor, wherein the minimum compensation current detector is configured such that, when a specific one of the 1st to n-th compensation current sensors detects the minimum compensation current, one of the in-detector diodes connected to the specific compensation current sensor is brought into conduction to allow a voltage corresponding to the minimum compensation current to be input into the comparator.

This is one example of a system configuration in which an analog circuit is used to detect the minimum compensation current.

Instead of the configuration using the analog circuit, the same function can be obtained, for example, by a system configuration capable of: converting a signal output from each of the 1st to n-th compensation current sensors as a signal indicative of a current detection value, into digital signal through an A/D converter; inputting the digital signal into a comparator; comparing, by a comparator, the current detection values of the 1st to n-th compensation current sensors to each other to identify the minimum compensation current; and further comparing, by a comparator, the identified minimum compensation current to a reference current (In this case, the "minimum compensation current detector" is composed of the 1st to n-th compensation current sensors, the A/D converter and the comparator.

The comparator for comparing the identified minimum compensation current to the reference current and the comparator for comparing the current detection values of the 1st to n-th compensation current sensors to each other may be the same component or may be separate components.).

The present invention further provides a solar cell adjustment system which comprises series-connected 1st to n-th (where n is an integer of two or more) solar cell modules, a first output circuit, a second output circuit and an inverter, wherein: the first output circuit comprises: 1st to n-th diode-inductor circuits each composed of a diode and an inductor connected to an anode of the diode, and connected in parallel, respectively, to the 1st to n-th solar cell modules, wherein the 1st to n-th diode-inductor circuits are series-connected together in such a manner as to be kept from blocking a current having a polarity directed from the inductor toward the diode in each of the 1st to n-th diode-inductor circuits; and 1st to n-th capacitors each connected to an intermediate point of the diode and the inductor in a respective one of the 1st to n-th diode-inductor circuits; the second output circuit comprises: (n+1)-th to 2n-th diode-inductor circuits each composed of a diode and an inductor connected to an anode of the diode, and connected in parallel, respectively, to the 1st to n-th solar cell modules, wherein the (n+1)-th to 2n-th diode-inductor circuits are series-connected together in such a manner as to be kept from blocking a current having a polarity directed from the inductor toward the diode in each of the (n+1)-th to 2n-th diode-inductor circuits; and (n+1)-th to 2n-th capacitors each connected to an intermediate point of the diode and the inductor in a respective one of the (n+1)-th to 2n-th diode-inductor circuits; and the inverter comprises a capacitive element and an inductive element, wherein the inverter is configured to receive an input of a summed voltage of voltages applied, respectively, to the 1st to n-th solar cell modules, and, after converting the input summed voltage into an AC voltage and transforming the AC voltage by a transformer, output the transformed AC voltage, and wherein one end of a secondary winding of the transformer is connected to the first output circuit, and the other end of the secondary winding is connected to the second output circuit (which is a fifth aspect of the present invention, corresponding to a common cathode configuration depicted in FIGS. 54 and 59).

In the above cell voltage equalization circuit, a relatively large ripple current is apt to flow, depending on a connection position of cells.

As mentioned above, generally, the operating point of a solar cell largely depends on a current, and, in a situation where a large ripple current is superimposed, the operating voltage is apt to become unstable. Thus, an electric power converter (power conditioner or the like) for use in a solar cell is preferably a type having a low ripple current property.

Therefore, in the case where the cell voltage equalization circuit is applied to a partial shading compensation device, it is desirable to modify the circuit to have a low ripple current property.

As will be described in detail in connection with the aftermentioned embodiments, the use of the solar cell adjustment system according to the fifth aspect of the present invention makes it possible to reduce a ripple current passably flowing through the solar cell modules.

According to one sub-aspect of the fifth aspect of the present invention, there is provided a solar cell adjustment system which comprises series-connected 1st to n-th (where n is an integer of two or more) solar cell modules, a first output circuit, a second output circuit and an inverter, wherein: the first output circuit comprises: 1st to n-th diode-inductor circuits each composed of a diode and an inductor connected to a cathode of the diode, and connected in parallel, respectively, to the 1st to n-th solar cell modules, wherein the 1st to n-th diode-inductor circuits are series-connected together in such a manner as to be kept from blocking a current having a polarity directed from the diode toward the inductor in each of the 1st to n-th diode-inductor circuits; and 1st to n-th capacitors each connected to an intermediate point of the diode and the inductor in a respective one of the 1st to n-th diode-inductor circuits; the second output circuit comprises: (n+1)-th to 2n-th diode-inductor circuits each composed of a diode and an inductor connected to a cathode of the diode, and connected in parallel, respectively, to the 1st to n-th solar cell modules, wherein the (n+1)-th to 2n-th diode-inductor circuits are series-connected together in such a manner as to be kept from blocking a current having a polarity directed from the diode toward the inductor in each of the (n+1)-th to 2n-th diode-inductor circuits; and (n+1)-th to 2n-th capacitors each connected to an intermediate point of the diode and the inductor in a respective one of the (n+1)-th to 2n-th diode-inductor circuits; and the inverter comprises a capacitive element and an inductive element, wherein the inverter is configured to receive an input of a summed voltage of voltages applied, respectively, to the 1st to n-th solar cell modules, and after converting the input summed voltage into an AC voltage and transforming the AC voltage by a transformer, output the transformed AC voltage, and wherein one end of a secondary winding of the transformer is connected to the first output circuit, and the other end of the secondary winding is connected to the second output circuit (corresponding to a common anode configuration depicted in FIGS. 57 and 60).

As will be described in connection with the aftermentioned embodiments, even when the order of arrangement of the diode and the inductor in each of the diode-inductor circuits is reversed, the system according to the fifth aspect of the present invention can operate by the same principle.

In the fifth aspect of the present invention, the inverter may comprise: a switch string constructed by series-connecting a first switch and a second switch; and a capacitor string constructed by series-connecting two in-inverter capacitors, and connected in parallel to the switch string, wherein a primary winding of the transformer is connected between an intermediate point of the two switches in the switch string and an intermediate point of the two in-inverter capacitors in the capacitor string, to thereby construct the inverter as a half-bridge inverter, and wherein the inverter is configured to transform a voltage applied to the primary winding and apply the transformed voltage to the second winding.

Alternatively, in the fifth aspect of the present invention, the inverter may comprise: a first switch string constructed by series-connecting a first switch and a second switch; and a second switch string constructed by series-connecting a third switch and a fourth switch, and connected in parallel to the first switch string, wherein a primary winding of the transformer is connected between an intermediate point of the first and second switches and an intermediate point of the third and fourth switches, to thereby construct the inverter as a full-bridge inverter, and wherein the inverter is configured to transform a voltage applied to the primary winding and apply the transformed voltage to the second winding.

Preferably, the solar cell adjustment system according to the fifth aspect of the present invention comprises: (i) a minimum compensation current detector configured to detect a minimum compensation current among compensation currents flowing, respectively, into the 1st to n-th solar cell modules via the first and second output circuits; (ii) a comparator configured to compare the minimum compensation current to a reference current; and (iii) a current control means configured to control an output current of the inverter based on a result of the comparison.

In the fifth aspect of the present invention, a configuration capable of controlling an output current of the inverter, for example, by: detecting the minimum compensation current; comparing the detected minimum compensation current to a reference current; and controlling the time ratio of the switch comprised in the inverter, based on a result of the comparison can be used. In this case, it becomes possible to avoid an unwanted electric power loss due to excessive supply of the compensation current, as with the fourth aspect of the present invention.

In the fifth aspect of the present invention, the minimum compensation current detector may comprise: (i) a pull-up resistor connected between a power supply and the comparator; (ii) 1st to n-th compensation current sensors configured to detect compensation currents flowing, respectively, into the 1st to n-th solar cell modules; and (iii) 1st to n-th in-detector diodes each connected between the pull-up resistor and a respective one of the 1st to n-th compensation current sensors in such a manner as to be kept from blocking a current flowing from the pull-up resistor to the compensation current sensor, wherein the minimum compensation current detector is configured such that, when a specific one of the 1st to n-th compensation current sensors detects the minimum compensation current, one of the in-detector diodes connected to the specific compensation current sensor is brought into conduction to allow a voltage corresponding to the minimum compensation current to be input into the comparator.

As previously mentioned, instead of the configuration using the above analog circuit, the minimum compensation current detector may be composed of, for example, 1st to n-th compensation current sensors, an A/D converter and a comparator.

The present invention further provides a minimum current detection system which comprises: a pull-up resistor connected to a power supply; 1st to n-th current sensors configured to detect currents flowing, respectively, through 1st to n-th (where n is an integer of two or more) circuit elements; 1st to n-th diodes each connected between the pull-up resistor and a respective one of the 1st to n-th current sensors in such a manner as to be kept from blocking a current flowing from the pull-up resistor to the current sensor; and a comparator connected to the pull-up resistor, wherein the minimum current detection system is configured such that, when a specific one of the 1st to n-th current sensors detects a minimum current, one of the diodes connected to the specific current sensor is brought into conduction to allow a voltage corresponding to the minimum current to be input into the comparator so as to cause the comparator to compare the minimum current to a reference current (which is a sixth aspect of the present invention).

This minimum current detection system can be used with not only the aforementioned solar cell modules but also a plurality of circuit elements of any other type to detect a minimum current among currents flowing, respectively, through the circuit elements, and compare the minimum current to a reference current.

This makes it possible to check whether a current flowing through any circuit element other than a target circuit element is equal to or less than the reference current.

According to one sub-aspect of the sixth aspect of the present invention, there is provided a minimum current control system which comprises: a pull-up resistor connected to a power supply; 1st to n-th current sensors configured to detect currents flowing, respectively, through 1st to n-th (where n is an integer of two or more) circuit elements; 1st to n-th diodes each connected between the pull-up resistor and a respective one of the 1st to n-th current sensors in such a manner as to be kept from blocking a current flowing from the pull-up resistor to the current sensor; a comparator connected to the pull-up resistor; and a current control means configured to control a current to be supplied to each of the 1st to n-th circuit elements, wherein the minimum current control system is configured such that, when a specific one of the 1st to n-th current sensors detects a minimum current, one of the diodes connected to the specific current sensor is brought into conduction to allow a voltage corresponding to the minimum current to be input into the comparator so as to cause the comparator to compare the minimum current to a reference current, and then the current control means operates to control a current to be supplied to each of the 1st to n-th circuit elements, based on a result of the comparison.

That is, this system has a configuration in which the system for detecting a minimum current among currents flowing, respectively, through a plurality of current elements, and comparing the minimum current to a reference current is additionally provided with means to control a current to be allowed to flow through the circuit elements, based on a result of the comparison.

As one example, in the case where this minimum current control system is applied to a system configured to apply an output voltage of a converter which changes according to a time ratio of a switch, to a plurality of circuit elements (of any type, such as solar cell modules, electricity storage cells, resistors, or inductors) (i.e., a system in which a current flowing through each of the circuit elements changes according to the time ratio), the current control means may be composed of a switch control circuit, wherein the switch control circuit is used to control the time ratio of the switch to thereby control a current to be allowed to flow through each of the circuit elements.

Effect of Invention

First to Third Aspects of Present Invention

The solar cell adjustment system according to each of the first to third aspects of the present invention makes it possible to, during occurrence of partial shading, relatively lower an operating voltage of a shaded module, as compared to that of a insolated module, and therefore adequately set an equivalent output resistance Rout, considering electrical characteristics of a solar cell during occurrence of partial shading to allow both the insolated module and the shaded module to operate around the MPP even during occurrence of partial shading.

That is, the solar cell adjustment system according to the present invention functions as a partial shading compensation device.

Further, the equivalent output resistance Rout may be adjusted by controlling a frequency of the partial shading compensation device depending on an occurrence state of partial shading. In this case, it is also possible to achieve the same object (to allow each module to operate around the MPP even during occurrence of partial shading).

In a typical embodiment, a main circuit of the partial shading compensation device has a two-switch type configuration operable using two switches and configurable using only passive elements, except the switches, so that it is possible to provide a significantly simplified circuit configuration, as compared to various types of conventional cell voltage equalization circuits.

Further, the multi-stage voltage multiplier rectification circuit constituting the partial shading compensation device may be constructed in a symmetrical configuration. In this case, it is possible to reduce a ripple current possibly flowing through the solar cell modules.

Fourth to Sixth Aspects of Present Invention

The solar cell adjustment system according to the present invention makes it possible to, during occurrence of partial shading, supply a compensation current from an insolated module to a shaded module to thereby allow the solar cell string to operate at a high output as a whole.

That is, the solar cell adjustment system according to the present invention functions as a partial shading compensation device.

In a typical embodiment, a main circuit of the partial shading compensation device of the present invention has a circuit configuration operable using a small number of switches (at least one) and configurable using only passive elements, except the switches, so that it is possible to provide a significantly simplified circuit configuration, as compared to various types of conventional cell voltage equalization circuits.

The use of the minimum current detection system and the minimum current control system according to the present invention make it possible to supply a compensation current from the partial shading compensation device to a shaded module, while minimizing a compensation current to be supplied to an insolated module, to thereby suppress an electric power loss which would otherwise occur in the partial shading compensation device to the minimum.

The minimum current detection system (minimum current control system) can be used with not only the solar cell modules but also circuit elements of any other type to detect (control) a current flowing through the circuit elements.

Further, an output section of the partial shading compensation device according to the present invention may be constructed in a multistage connected, current doubler-type configuration. In this case, it is possible to significantly reduce a ripple component in a current to be supplied to each of the solar cell modules.

DESCRIPTION OF EMBODIMENTS

[I] First to Third Aspects of Present Invention

With reference to the drawings, solar cell adjustment systems and a solar cell module string operating state control method, according to the first to third aspects of the present invention, will now be described.

However, it should be noted that configurations of the solar cell adjustment systems and the solar cell module string operating state control method according to the first to third aspects of the present invention are not limited to specific embodiments depicted in figures, but may be appropriately modified within the scope of the present invention hereinafter defined.

For example, although the following description will be made mainly on an assumption that each capacitor is a single energy storage element, it may be a module composed of any type of chargeable-dischargeable element, or a plurality of chargeable-dischargeable elements, or any device constructed using such a module.

The energy storage elements may be different from each other in terms of capacitance. Further, although the following embodiments will be described based on an example where a solar cell module string is composed of four solar cell modules, the number of solar cell modules is not limited to four, but the solar cell module string may be composed of any number of series-connected solar cell modules.

As regards each switch, any electronic switch or any mechanical switch may also be used, although the following description will be made on an assumption that each switch is a semiconductor switch such as MOSFET.

Concept of Solar Cell Adjustment System

Figure 6:
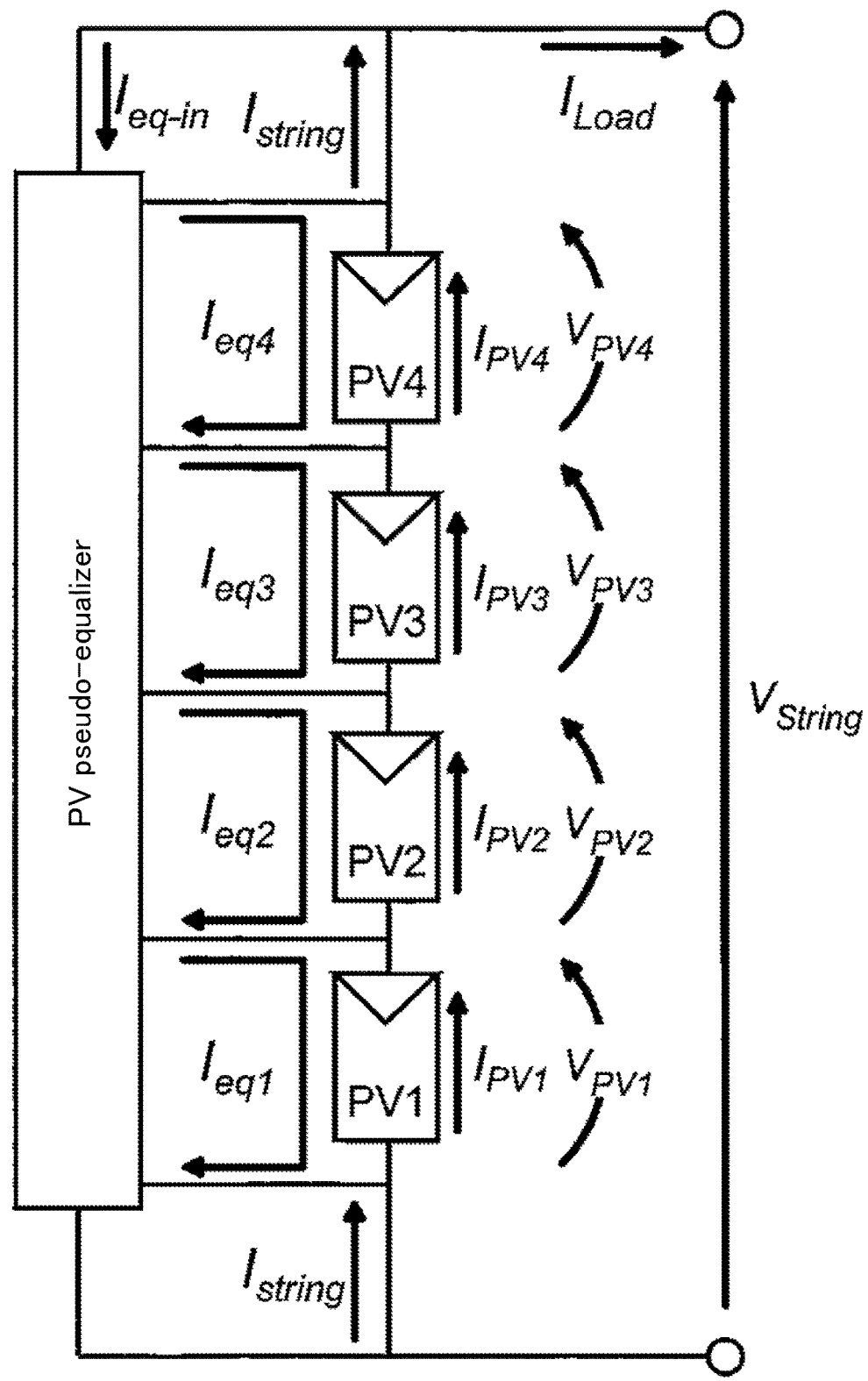
FIG. 6 is a conceptual diagram of a solar cell adjustment system according to the present invention.

FIG. 6 is a conceptual diagram of a solar cell adjustment system according to the present invention, wherein the system is constructed using four series-connected solar cell modules PV1 to PV4.

In FIG. 6, $V_{PV1}$ to $V_{PV4}$ denote, respectively, four voltages each applied to a respective one of the solar cell modules PV1 to PV4, and $I_{PV1}$ to $I_{PV4}$ denote, respectively, four currents each output from a respective one of the solar cell modules PV1 to PV4. $I_{eq1}$ to $I_{eq4}$ denote, respectively, four currents each supplied from a PV pseudo-equalizer to a respective one of the solar cell modules PV1 to PV4.

$I_{string}$ denotes a current flowing through an entire solar cell module string composed of the solar cell modules PV1 to PV4. This current contributes to a load current $I_{Load}$ which is output to a load (not depicted) connected to the solar cell module string, and an input current $I_{eq-in}$ to the PV pseudo-equalizer.

$V_{string}$ denotes a voltage applied across opposite ends of the solar cell module string.

The PV pseudo-equalizer is applied with $V_{string}$, i.e., a summed voltage of $V_{PV1}$ to $V_{PV4}$, as input voltage, and supplied with the input current $I_{eq-in}$ from the solar cell modules PV1 to PV4.

Because the solar cell modules are connected in series to each other, each of the solar cell modules PV1 to PV4 operates to supply a current having the same magnitude, i.e., $I_{string}$.

Figure 5:
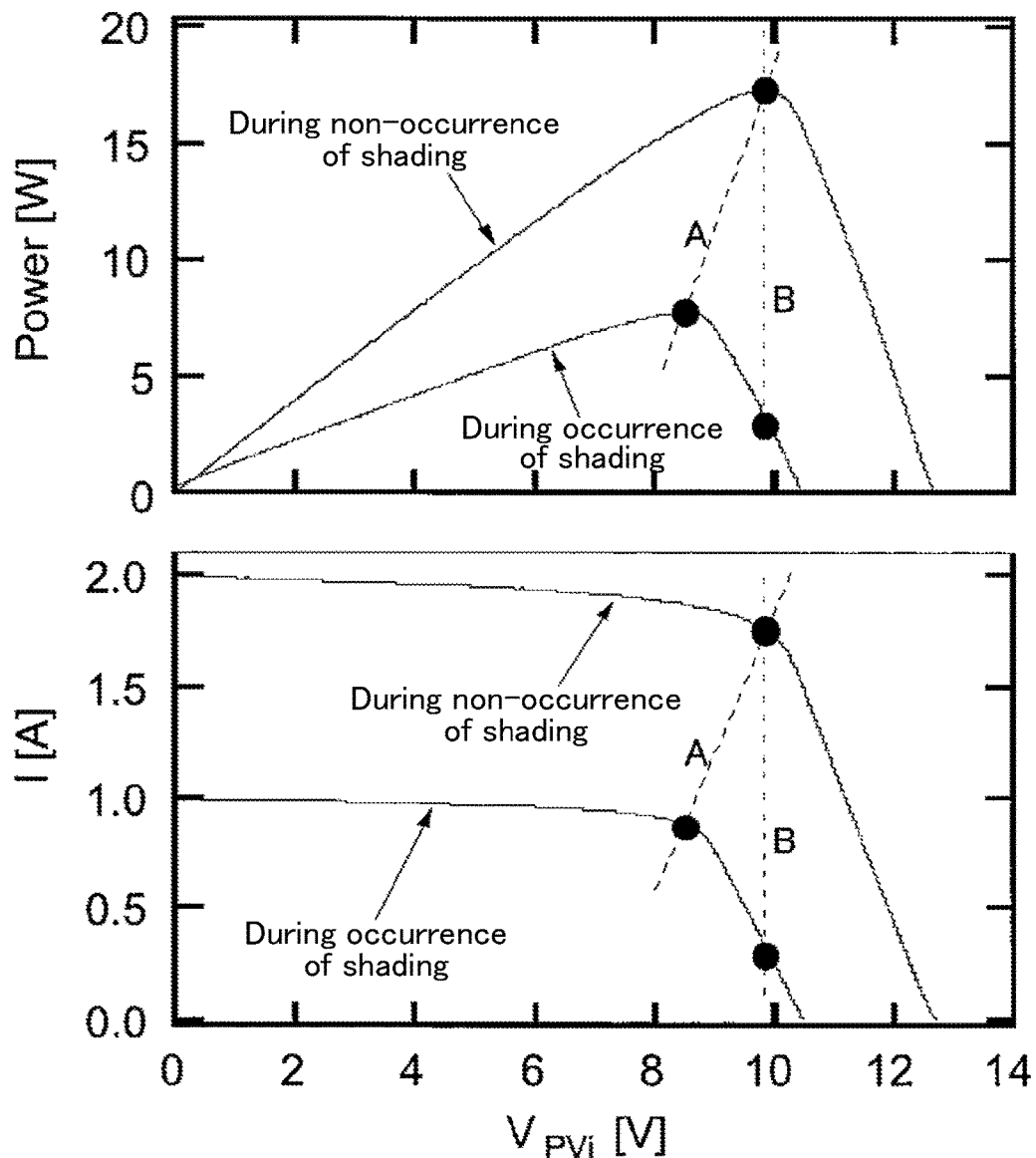
FIG. 5 is graphs depicting operating characteristics of each of an insolated module and a shaded module.

However, as depicted in FIG. 5, a supplyable current of a shaded module is less than that of an insolated module. Thus, in many cases, the shaded module becomes failing to supply a current corresponding to $I_{string}$.

Figure 7:
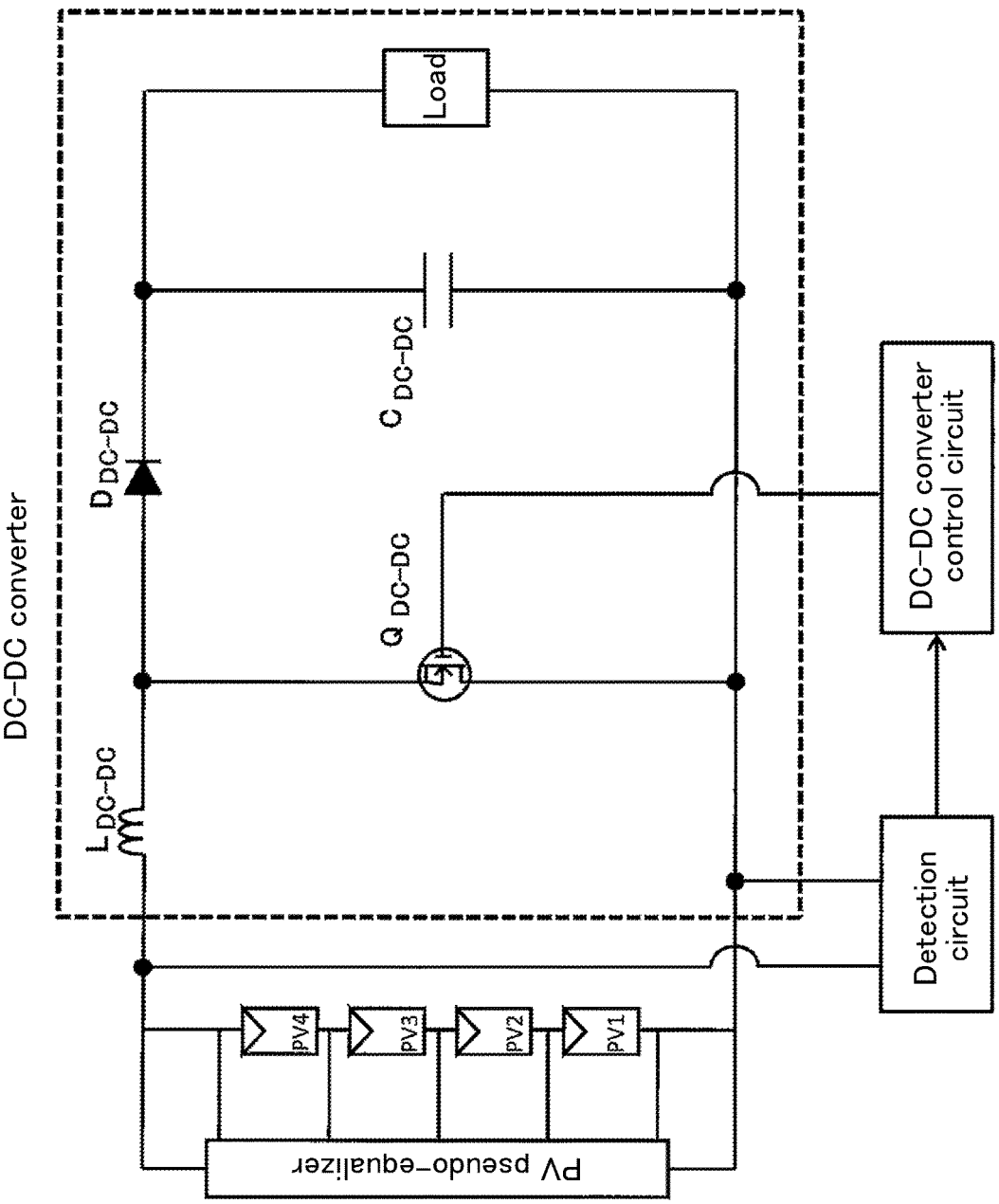
FIG. 7 is a circuit diagram of a configuration comprising a combination of the solar cell adjustment system according to the present invention and a DC-DC converter.

Examples of a usage mode of the solar cell adjustment system include a configuration in which a load is connected to the solar cell module string via a DC-DC converter, as depicted in FIG. 7.

The DC-DC converter depicted in FIG. 7 is a boost converter, wherein the following relationship (1) is satisfied between the output voltage $V_{string}$ from the solar cell module string and a load voltage $V_{Load}$.

$$\frac{V_{Load}}{V_{String}} = \frac{1}{1-D}, \quad (1)$$

where D denotes a time ratio (a ratio of an ON period to an entire switching cycle) of a switch $Q_{DC\text{-}DC}$.

For example, when using a constant-voltage load, $V_{Load}$ becomes constant. Thus, by using a DC-DC converter control circuit to control the time ratio D, while using a detection circuit to detect electric power generated from the solar cell module string or each of the solar cell modules, it is possible to control a voltage in each of the solar cell modules so as to obtain a maximum electric power.

From a standpoint of obtaining a maximum electric power from an insolated module, the voltage indicated by the broken line B in FIG. 5 should be applied thereto. In this case, however, a current flowing through the insolated module exceeds a maximum current flowable) through a shaded module.

Therefore, the current corresponding to the maximum electric power of the insolated module cannot flow through the shaded module, and it becomes unable to obtain the maximum electric power from the shaded module if there is not any current compensation device.

The solar cell adjustment system according to the present invention is configured to use the PV pseudo-equalizer to supply a compensation current $I_{eq}$ to a shaded module therefrom so as to allow the shaded module to supply a current corresponding to $I_{string}$ in a pseudo manner.

For example, in a situation where the solar cell module PV1 is shaded and thus fails to supply a current equivalent to a current to be supplied by the remaining insolated modules PV2 to PV4, a compensation current $I_{eq\text{-}1}$ is supplied from the PV pseudo-equalizer to the shaded module PV1.

Thus, the current $I_{PV1}$ supplied by the shaded module PV1 itself and the compensation current $I_{eq\text{-}1}$ flow through the shaded module PV1, and therefore it becomes possible to allow the solar cell module string to flow a current $I_{string}$ expressed as the following formula (2).

$$I_{PV1} + I_{eq1} = I_{String} \quad (2)$$

First Embodiment

Configuration of Solar Cell Adjustment System

Figure 8:
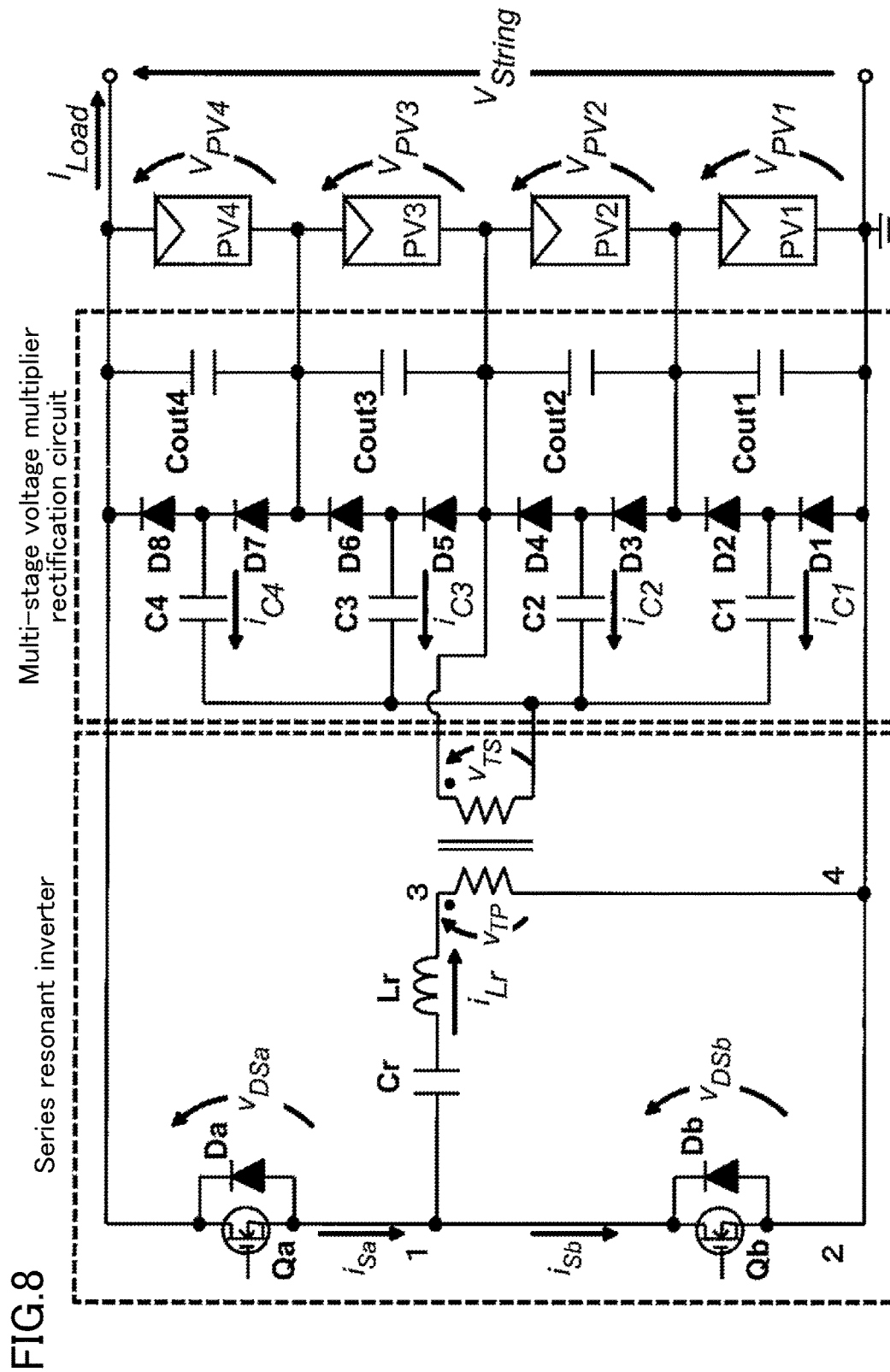
FIG. 8 is a circuit diagram of a solar cell adjustment system according to one embodiment of the present invention.

FIG. 8 depicts a solar cell adjustment system for four series-connected solar cell modules PV1 to PV4, according to a first embodiment of the present invention. A circuit configuration depicted in FIG. 8 is one example in which the PV pseudo-equalizer in FIGS. 6 and 7 is composed of a series resonant inverter and a multi-stage voltage multiplier rectification circuit.

Series Resonant Inverter

The series resonant inverter is constructed by: parallel-connecting two flywheel diodes Da and Db, respectively, to two series-connected switches Qa and Qb to form a half-bridge cell; serial-connecting a capacitor Cr and an inductor Lr to the half-bridge cell; and providing a transformer between them and the multi-stage voltage multiplier rectification circuit.

In FIG. 8, $i_{Sa}$ and $i_{Sb}$ denote, respectively, two currents each flowing through a respective one of the switches Qa and Qb, and $V_{DSa}$ and $V_{DSb}$ denote, respectively, two voltages each applied to a respective one of the switches Qa and Qb. $i_{Lr}$ denotes a current flowing through the inductor Lr, and $V_{TP}$ and $V_{TS}$ denote, respectively, a primary voltage and a secondary voltage of the transformer.

It should be noted that each of the numerals 1 to 4 indicated in the series resonant inverter in FIG. 8 corresponds to a terminal number assigned for convenience sake.

Multi-Stage Voltage Multiplier Rectification Circuit

The voltage multiplier circuit comprises: series-connected capacitors Cout1 to Cout4; diodes D1 to D8 composed by connecting two series-connected diodes in parallel to each of the capacitors; and intermediate capacitors C1 to C4 each connected to an intermediate point of a respective one of the two series-connected diodes.

In FIG. 8, $I_{C1}$ to $I_{C4}$ denote, respectively, four currents each flowing through a respective one of the intermediate capacitors C1 to C4.

It should be noted that the number of the series-connected capacitors is not limited to four, but may be any other number of two or more.

Operation of Solar Cell Adjustment System

The series resonant inverter is driven by the series-connected solar cell modules PV1 to PV4, to supply a sinusoidal wave-shaped AC current to the multi-stage voltage multiplier rectification circuit at a position of the secondary winding of the transformer.

On the other hand, the multi-stage voltage multiplier rectification circuit is driven by the sinusoidal wave-shaped AC current, to operate to distribute electric power to the module having the lowest voltage, among the series-connected solar cell modules, on a priority basis.

In the case where the series-connected solar cell modules are used, for example, with a load connected thereto as depicted in FIG. 7, a voltage in a shaded module generally becomes lower than that of the remaining insolated modules.

Thus, the use of the above partial shading compensation device makes it possible to distribute electric power from all of the modules (including the shaded module) to the shaded module to thereby compensate for a deficiency of electric power in the shaded module.

Details of the principle of the operation will be described below.

Operation of Solar Cell Adjustment System

Assume that a voltage is applied to the entire solar cell module string, for example, by connecting a load thereto via a DC-DC converter as depicted in FIG. 7, and only the solar cell module PV1 is shaded.

In the same manner as that for a conventional commonly-used resonant inverter, the series resonant inverter is alternately switched between a state in which only the switch Qa is turned on and a state in which only the switch Qb is turned on, at a switching frequency higher than a resonant frequency of the series circuit composed of the capacitor Cr and the inductor Lr and at a time ratio of 50% or less in each of the two switches.

Figure 9:
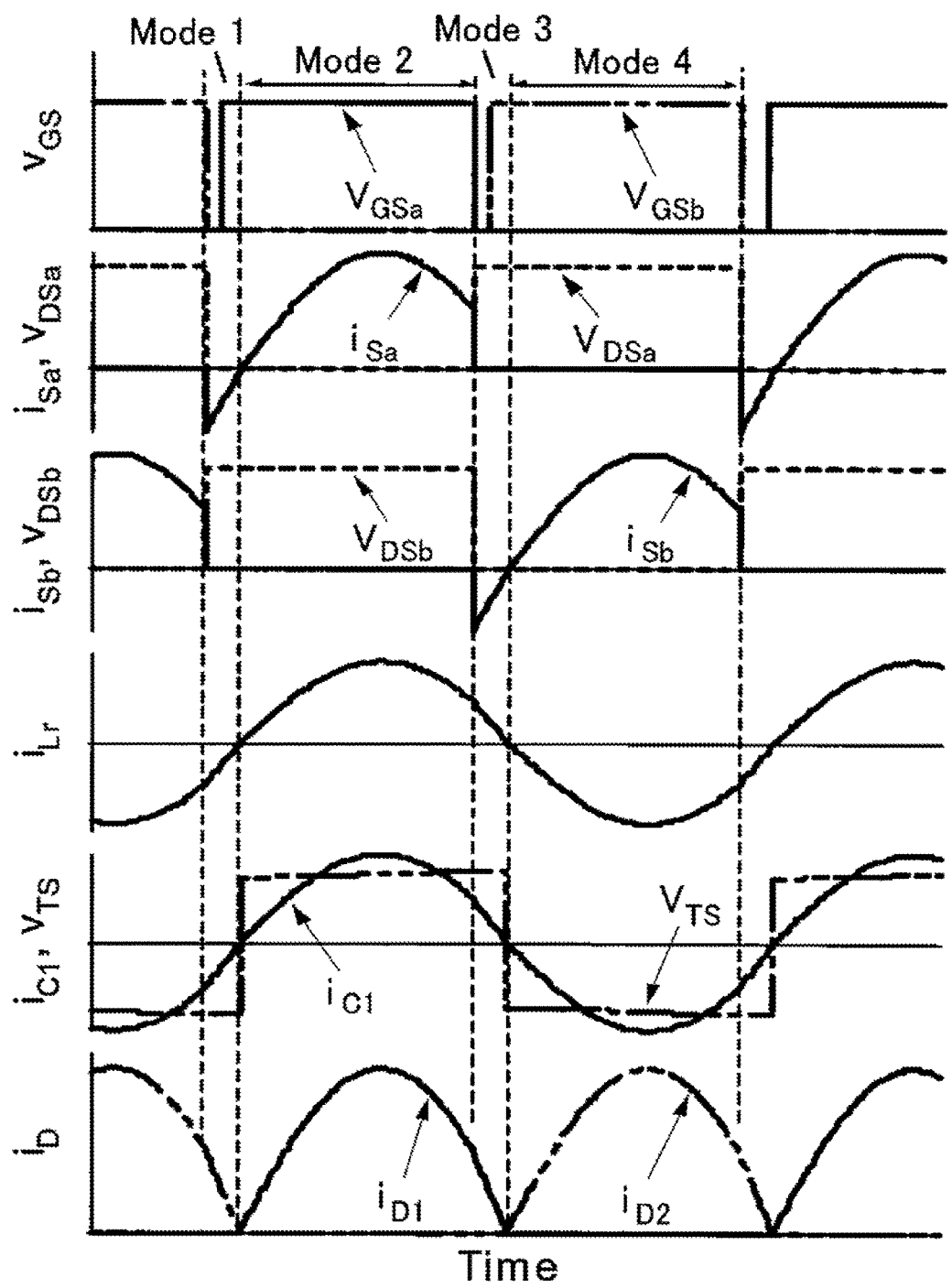
FIG. 9 is a waveform chart depicting temporal changes in current flowing through each element and voltage applied to each element, when the solar cell adjustment system in FIG. 8 is activated.
Figure 10A:
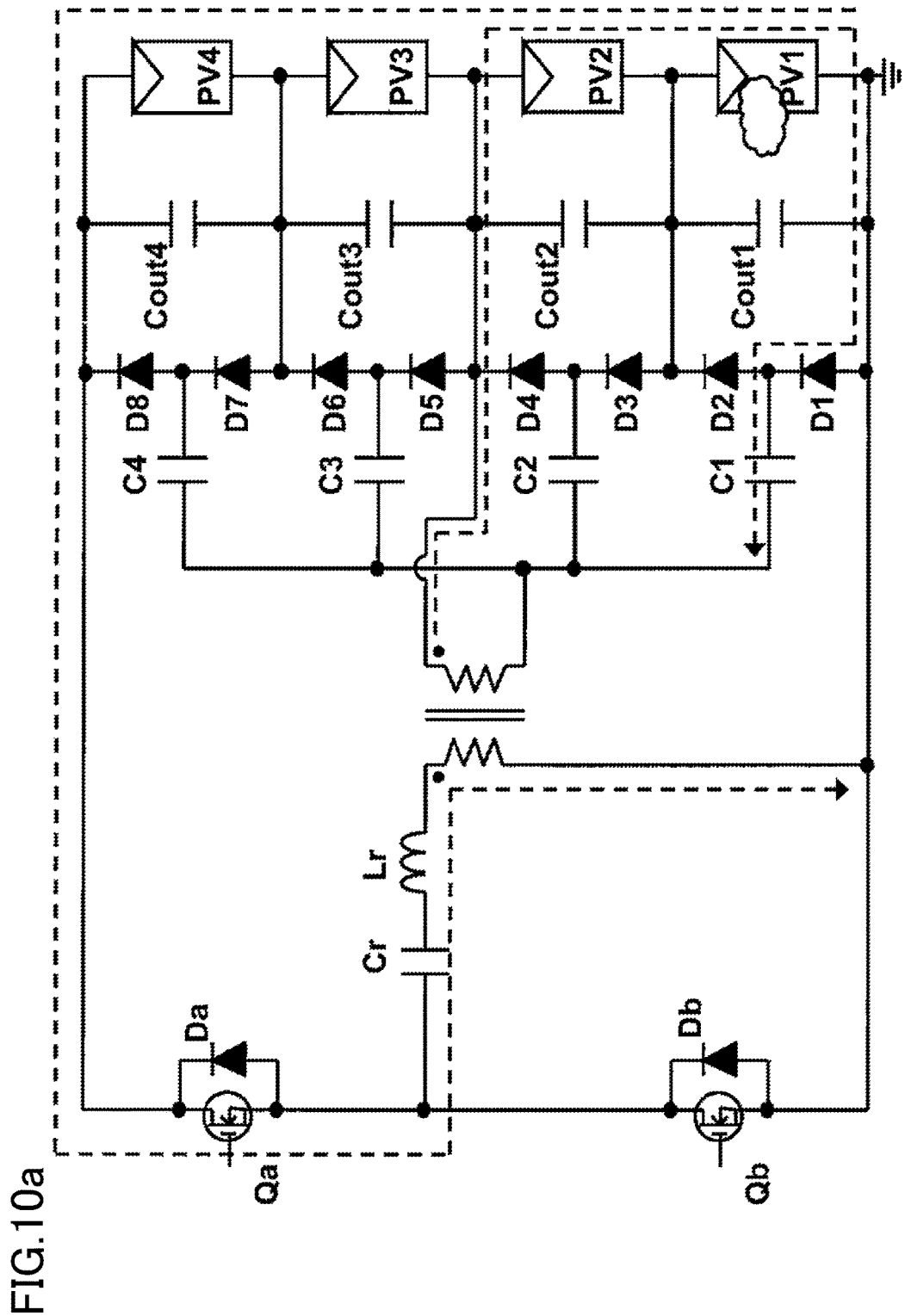
FIG. 10a is a diagram depicting a pathway of current flowing during a period of mode 2, when the solar cell adjustment system in FIG. 8 is activated in a situation where a solar cell module PV1 is shaded.
Figure 10B:
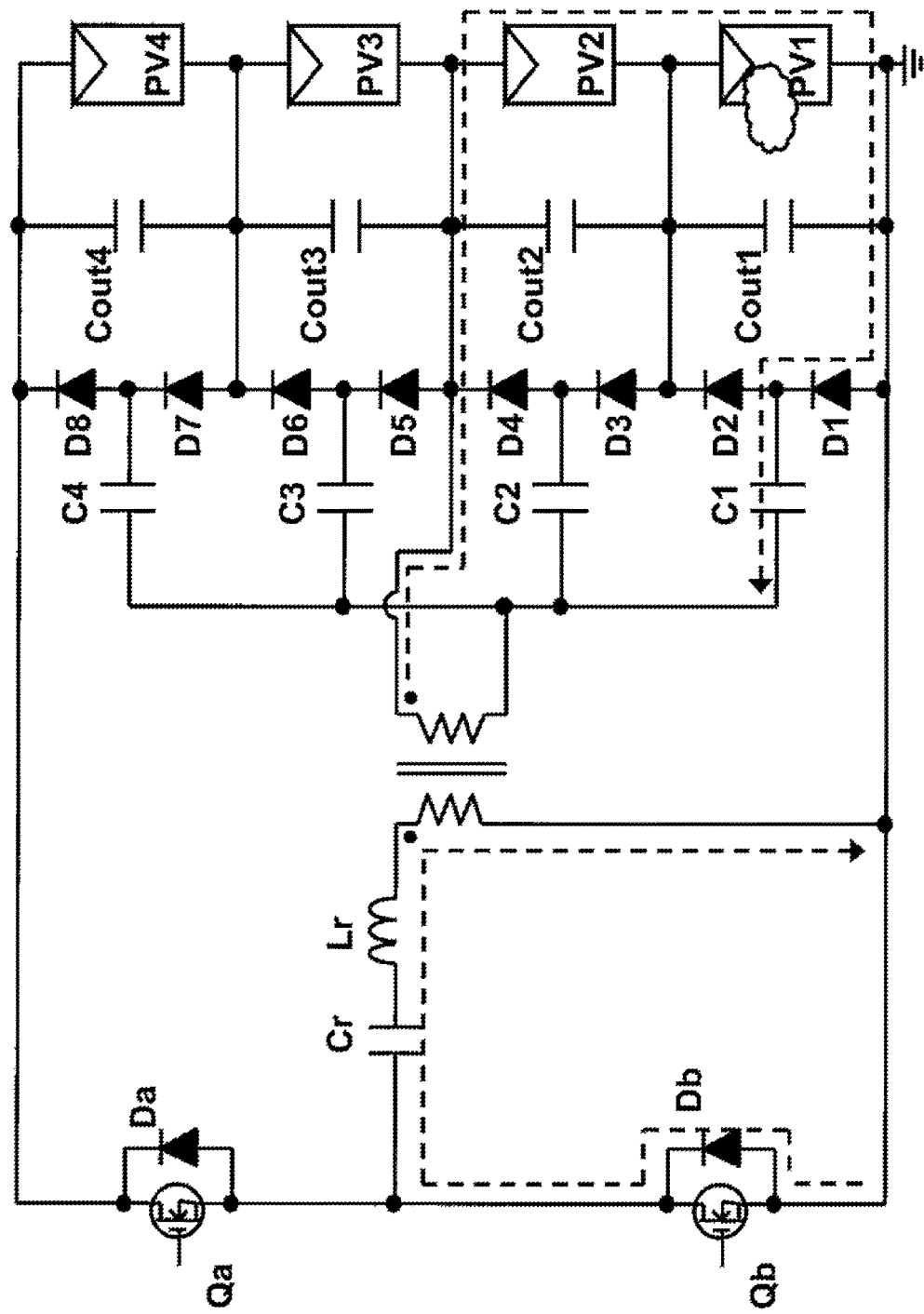
FIG. 10b is a diagram depicting a pathway of current flowing during a period of mode 3, when the solar cell adjustment system in FIG. 8 is activated in the situation where the solar cell module PV1 is shaded.

FIG. 9 depicts waveforms of a current flowing through each element and a voltage applied to each element when the solar cell adjustment system according to the first embodiment is activated, and FIGS. 10a to 10b depict, respectively, four types of pathways of current each flowing in the system during a respective one of periods of four modes (wherein the current flowing through each of the capacitors Cout1 to Cout4 is ignored because it functions as a smoothing capacitor).

In FIG. 9, $V_{GSa}$ and $V_{GSb}$ denote, respectively, gate voltages of the switches Qa and Qb, and $i_{D1}$ and $i_{D2}$ denote, respectively, currents flowing through the diodes D1 and D2.

For convenience sake, an operation in mode 2 will be described first (FIG. 10a).

During the period of the mode 2, as indicated by the graph of $V_{GS}$ in FIG. 9, the switch Qa is set in an ON state, and the switch Qb is set in an OFF state, so that a positive voltage (in FIG. 8, a voltage raising in a direction of the arrowed line indicative of $V_{DSb}$; see the graph of $V_{DSb}$ in FIG. 9) is output to the resonant circuit comprising the capacitor Cr and the inductor Lr.

Thus, a positive current (in FIG. 8, a current flowing in a direction of the arrowed line indicative of $i_{Lr}$; a current flowing from the solar cell modules PV1 to PV4 into the capacitor Cr and the inductor Lr via the switch Qa in the ON state) flows though the capacitor Cr and the inductor Lr.

According to a resonance phenomenon caused by the capacitor Cr and the inductor Lr, $i_{Lr}$ is changed to a sinusoidal wave-shaped waveform (see the graph of $i_{Lr}$ in FIG. 9).

An AC voltage is applied to the primary winding of the transformer, and, after being transformed, output as a secondary voltage to the multi-stage voltage multiplier rectification circuit (see the graph of $V_{TS}$ in FIG. 9).

A compensation current based on the secondary voltage flows into the shaded module PV1 (and the insolated module PV2 which is located on the pathway in this embodiment) on a priority basis.

Then, when the switch Qa is turned off, the current which has been flowed through the switch Qa in the mode 2 is commutated toward the flywheel diode Db, and the operation is shifted to mode 3 (FIG. 10b).

In the mode 3, although the voltage $V_{DSb}$ input into the resonance circuit becomes zero (see the graph of $V_{DSb}$ in FIG. 9), the current $i_{Lr}$ flowing through the inductor Lr is successively changed to a sinusoidal wave-shaped waveform by resonance (see the graph of $i_{Lr}$ in FIG. 9).

Just after shifting to the mode 3, the current $i_{Lr}$ flowing through the inductor Lr still has a positive polarity, because the switching is performed at a frequency greater than the resonant frequency.

The inductor Lr is an inductive element. Thus, the current $i_{Lr}$ is continued before and after shifting to the mode 3, whereas the current $i_{Sa}$ which has been equal to $i_{Lr}$ in the mode 2 becomes zero, simultaneously with the shifting to the mode 3 (see the graph of $i_{Sa}$ in FIG. 9).

In response to this, the current $i_{Sb}$ which has been zero in the mode 2 has a magnitude equal to $i_{Lr}$, simultaneously with the shifting to the mode 3 (a polarity of the current $i_{Sb}$ is defined as depicted in FIG. 8, and therefore, as regards positive and negative in terms polarity, the current $i_{Sb}$ and the current $i_{Lr}$ are in reverse relation; see the graphs of the currents $i_{Sb}$ and $i_{Lr}$ in FIG. 9).

A pathway of current flowing from the multi-stage voltage multiplier rectification circuit to the solar cell module string is the same as the pathway during the period of the mode 2.

In the period of the mode 3, the switch Qb is set to an ON state.

Figure 10C:
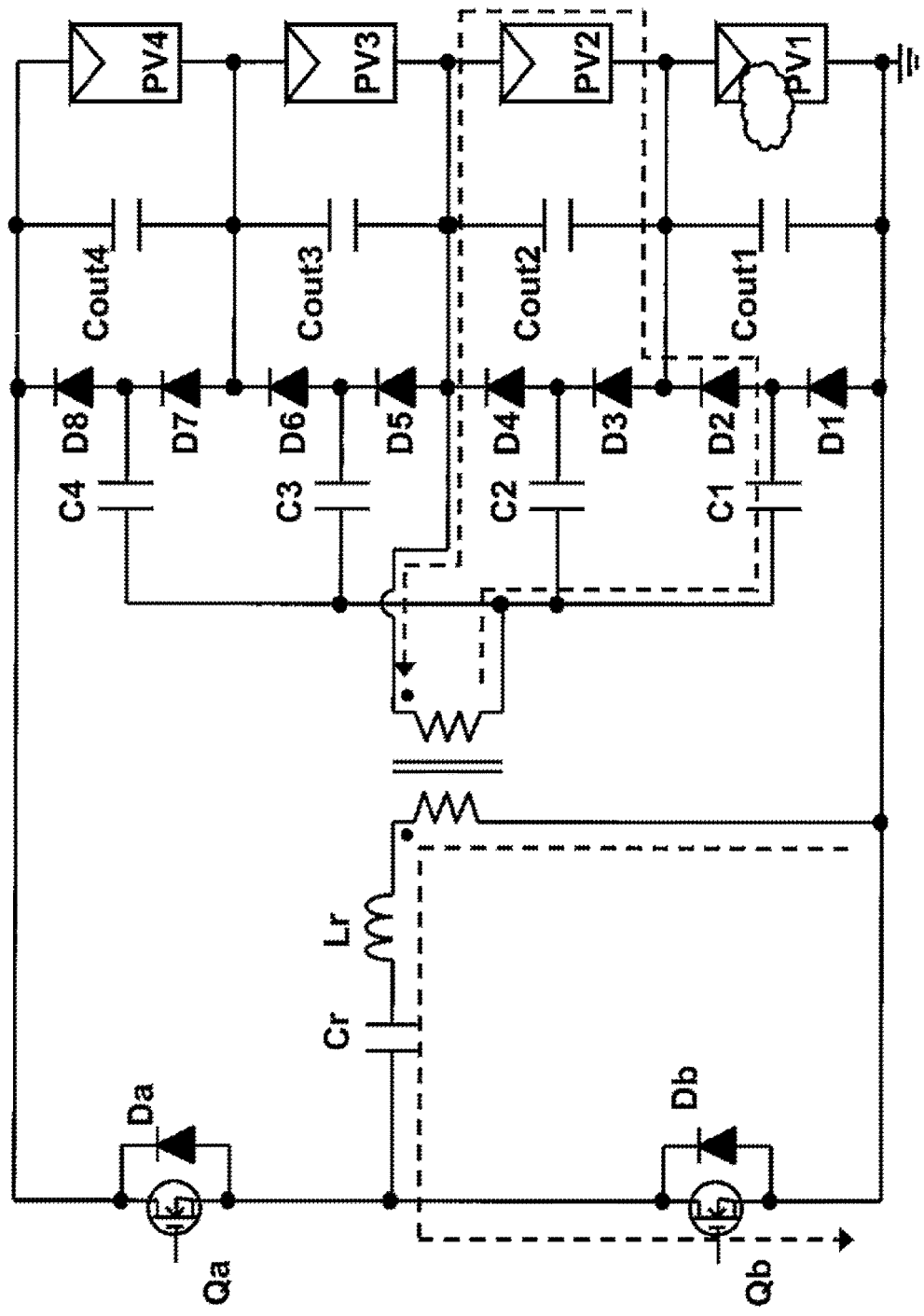
FIG. 10c is a diagram depicting a pathway of current flowing during a period of mode 4, when the solar cell adjustment system in FIG. 8 is activated in the situation where the solar cell module PV1 is shaded.

At a timing when the current $i_{Lr}$ in the inductor Lr changes to a negative polarity, the operation is shifted to mode 4 (FIG. 10c).

During a period of the mode 4, although the voltage $V_{DSb}$ input into the resonant circuit is zero (see the graph of $V_{DSb}$ in FIG. 9) as with during the period of the mode 3, the current $i_{Lr}$ flowing through the inductor Lr is successively transformed into the sinusoidal wave-shaped waveform (see the graph of $i_{Lr}$ in FIG. 9).

In the mode 4, the polarity of $I_{Lr}$ is reverse with respect to that in the modes 2, 3, and therefore a polarity of the AC voltage to be input to the multi-stage voltage multiplier rectification circuit is also reversed (see the graph of $V_{TS}$ in FIG. 9).

Along with this change, the pathway of current flowing through the multi-stage voltage multiplier rectification circuit and the solar cell module string is changed as depicted in FIG. 10c.

That is, the intermediate capacitor C1 is discharged via the diode D2, and the resulting discharge current flows through the insolated module PV2 in a direction opposite to that in the modes 2, 3.

Figure 10D:
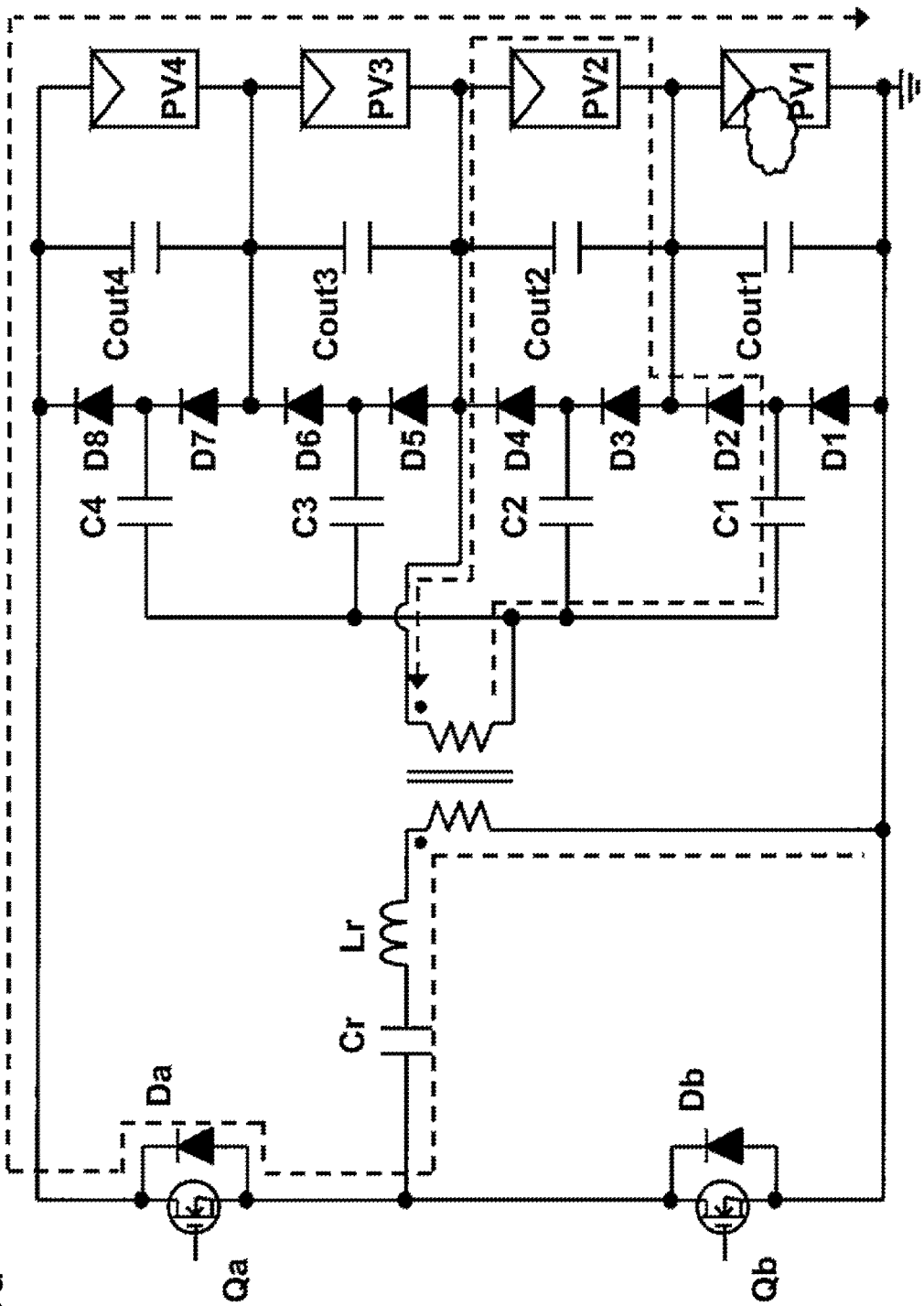
FIG. 10d is a diagram depicting a pathway of current flowing during a period of mode 1, when the solar cell adjustment system in FIG. 8 is activated in the situation where the solar cell module PV1 is shaded.

When the switch Qb is set to the OFF state, the current which has been flowing through the switch Qb in the mode 4 is commutated toward the flywheel diode Da, and the operation is shifted to mode 1 (FIG. 10d).

In the mode 1, an approximately constant positive voltage $V_{DSb}$ is output to the resonant circuit comprising the inductor Lr (see the graph of $V_{DSb}$ in FIG. 9).

Just after shifting to the mode 1, the current $i_{Lr}$ flowing through the inductor Lr still has a negative polarity because the switching is performed at a frequency greater than the resonant frequency. However, it gradually rises over time, in accordance with the above positive voltage $V_{DSb}$ and the resonance phenomenon.

The inductor Lr is an inductive element. Thus, the current $i_{Lr}$ is continued before and after shifting to the mode 1, whereas the current $i_{Sb}$ which has been equal to $i_{Lr}$ in the mode 4 becomes zero, simultaneously with the shifting to the mode 1 (see the graph of $i_{Sb}$ in FIG. 9).

In response to this, the current $i_{Sa}$ which has been zero in the mode 4 has a magnitude equal to $i_{Lr}$, simultaneously with the shifting to the mode 1 (see the graphs of the currents $i_{Sa}$ and $i_{Lr}$ in FIG. 9).

The pathway of current flowing from the multistage voltage multiplier rectification circuit to the solar cell module string is the same as the pathway during the period of the mode 4.

In the period of the mode 1, the switch Qa is set to the ON state.

At timing when the current $i_{Lr}$ in the inductor Lr changes to the positive polarity, the operation is shifted to the mode 2.

Subsequently, the above modes will be realized over time in the same manner as mentioned above.

As depicted in FIGS. 10a to 10d, an element through which a current flows in the multi-stage voltage multiplier rectification circuit in the situation where the solar cell module PV1 is shaded is composed of the intermediate capacitor C1 and the diode D1 or D2, which are paired with the solar cell module PV1.

Basically, the point that a current flows through only an element paired with a shaded module may also basically apply to a situation where any of the solar cell modules other than the solar cell module PV1 is shaded.

As is clear from FIGS. 10a to 10d, by bringing elements corresponding to a shaded module into conduction, a compensation current is supplied to the shaded module.

On the other hand, the current pathways depicted in FIGS. 10a to 10d show that a current also flows from the voltage multiplier circuit to the insolated module PV2 (for example, in the case where the solar cell module PV3 is a shaded module, such a current pathway is not formed, as mentioned later).

However, when the currents supplied from the voltage multiplier circuit to the insolated module PV2 in the modes 1 to 4 become zero when they are averaged (see the graph of $i_{C1}$ in FIG. 9). That is, a net compensation current does not flow to the insolated module PV2.

Nonetheless, this current is superimposed as a ripple current against the insolated module PV2, thereby possibly leading to a risk that an operating voltage of the insolated module PV2 fluctuates and becomes unstable, due to the ripple current.

A circuit configuration capable of reducing a ripple current will be described in connection with an aftermentioned second embodiment.

Theoretical Discussion about Operation of Solar Cell Adjustment System

A system comprising a combination of a series resonant inverter and a multi-stage voltage multiplier rectification circuit is also employed in an invention of the earlier application (JP 2012-046569), which was made by the present inventor (Also, see Non-Parent Document 5).

In the previous application, in a situation where there is a variation of cell voltages in an electricity storage cell string connected to a multi-stage voltage multiplier rectification circuit, the cell voltages are equalized by: inputting a summed cell voltage of the electricity storage cell string into a series resonant inverter; inputting an AC voltage generated by the inverter into the electricity storage cell string via a multi-stage voltage multiplier rectification circuit to thereby charge an electricity storage cell having a low voltage.

Compared to this, in the present invention, a solar cell module string is connected to a multi-stage voltage multiplier rectification circuit.

In a situation where there is a variation between voltages in a plurality of solar cell modules due to the presence of partial shading, a summed voltage of the voltages in the solar cell modules is input into an inverter, and an AC voltage generated by the inverter is input into the solar cell module string via the multi-stage voltage multiplier rectification circuit to thereby supply a compensation current to a shaded module having a low voltage on a priority basis.

Thus, the shaded module can discharge its own output current and the compensation current. This makes it possible to maintain a high output current of the entire solar cell module string.

That is, the compensation current supplied to the shaded module is discharged as an output current of the solar cell module string. This does not mean that the shaded module is "charged" by the compensation current so as to allow voltages of the solar cell modules to be equalized.

Thus, the compensation current is continuously flowing through the shaded module having a low voltage on a priority basis.

In this process, due to a capacitor, an inductor and a resistance existing in the inverter and the multi-stage voltage multiplier rectification circuit, an impedance is generated on a pathway of the compensation current and thereby a voltage drop occurs in the shaded module.

Based on the above mechanism, a voltage of the shaded module therein is maintained at a relatively low level as compared to a voltage of the insolated modules.

Further, a value of the impedance can be controlled to adjust a level of the voltage drop to thereby lead the shaded module toward around the MPP.

This point will be described in detail below.

Figure 11:
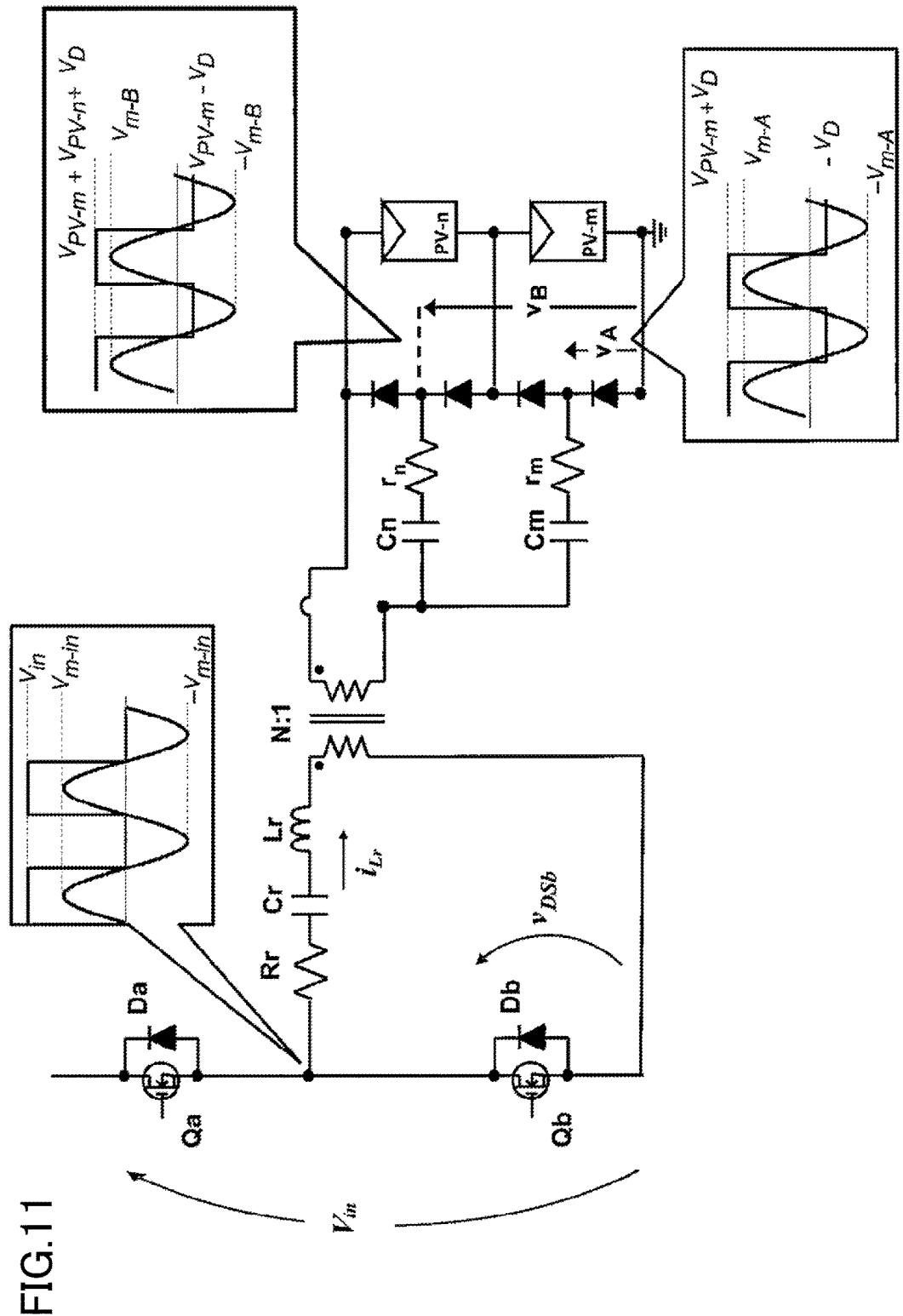
FIG. 11 is a diagram depicting rectangular wave-shaped voltage waveforms in various sites within the solar cell adjustment system in FIG. 8, in the situation where the solar cell module PV1 is shaded, and sinusoidal wave-shaped waveforms each obtained by first-order harmonic approximation based on a respective one of the rectangular wave-shaped voltage waveforms.

FIG. 11 depicts voltage waveforms in various sites related with the above operation, and corresponding sinusoidal wave-shaped approximate waveforms obtained by first-order harmonic approximation.

In FIG. 11, PV-m and PV-n in FIG. 11 correspond, respectively, to the shaded module V1 and the insolated module PV2 in this embodiment.

Further, Rr, $r_m$ and $r_n$ denote, respectively, resistance components occurring on respective current pathways.

It should be noted that the capacitors Cout1 and Cout 2 are omitted.

The input voltage $V_{DSb}$ to the series resonant circuit comprising the capacitor Cr and the inductor Lr is a rectangular wave-shaped voltage having an amplitude $V_{in}=V_{PV1}+V_{PV2}+V_{PV3}+V_{PV4}$, and therefore it can be approximated as a sinusoidal wave-shaped voltage, by using first-order harmonic approximation.

Here, the input voltage $V_{DSb}$ is approximated as sinusoidal wave-shaped voltage having an amplitude $V_{m-in}$, expressed as the following formula (3).

$$V_{m-in} = \frac{2}{\pi} V_{in} \qquad (3)$$

Potentials $V_A$ and $V_B$ at the intermediate point of the diodes D1 and D2 and the intermediate point of the diodes D3 and D4 with respect to the ground (FIG. 11) in FIG. 8 are, respectively, $(V_{PV-m}+V_D)$ and $(V_{PV-m}+V_{PV-m}+V_D)$ when an even number-th diode is brought into conduction (where $V_{PV-m}$ and $V_{PV-n}$ denote, respectively, voltages of the solar cell modules PV-m and PV-n, and $V_D$ denotes a forward voltage drop of each diode), or are, respectively, $-V_D$ and $(V_{PV-m}-V_D)$ when an odd number-th diode is brought into conduction).

That is, in the above operation, the potentials $V_A$ and $V_B$ are, respectively, a rectangular wave-shaped voltage having an amplitude of $V_{PV-m}+2V_D$ and a rectangular wave-shaped voltage having an amplitude of $V_{PV-n}+2V_D$.

Each of these voltages is also approximated as a sinusoidal wave-shaped voltage, by using first-order harmonic approximation, as with the input voltage $V_{DSb}$.

Here, the potentials $V_A$ and $V_B$ are approximated, respectively, as a sinusoidal wave-shaped voltage having an amplitude expressed as the following formula (4) and a sinusoidal wave-shaped voltage having an amplitude expressed as the following formula (5).

$$V_{m-A} = \frac{2}{\pi}(V_{PV-m} + 2V_D) \qquad (4)$$

$$V_{m-B} = \frac{2}{\pi}(V_{PV-n} + 2V_D) \qquad (5)$$

Figure 12:
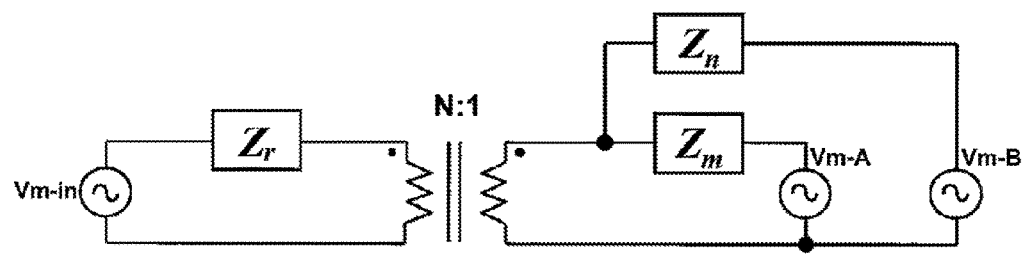
FIG. 12 is an AC equivalent circuit diagram of the circuit section depicted in FIG. 11, in the solar cell adjustment system in FIG. 8.

The solar cell adjustment system of the present invention can be substituted by an equivalent circuit depicted in FIG. 12, using virtual AC power supplies capable of generating sinusoidal wave-shaped voltages having respective amplitudes of $V_{m-in}$, $V_{m-A}$ and $V_{m-B}$ each obtained by first-order harmonic approximation as mentioned above. $V_{m-in}$, $V_{m-A}$ and $V_{m-B}$ in FIG. 12 correspond, respectively, to amplitudes of the AC voltages generated by the AC power supplies.

In FIG. 12, Zr, Zm and Zn denote, respectively, an impedance caused by the resistance Rr, the capacitor Cr and the inductor Lr, an impedance caused by the resistance $r_m$ and a capacitor Cm, and an impedance caused by the resistance $r_n$ and a capacitor Cn, wherein the impedances are expressed, respectively, as the following formulas (6) to (8).

$$Z_r = R_r + j\left\{\omega L_r - \left(\frac{1}{\omega C_r}\right)\right\} \qquad (6)$$

-continued $$Z_m = r_m - j\left(\frac{1}{\omega C_m}\right) \quad (7)$$

$$Z_n = r_n - j\left(\frac{1}{\omega C_n}\right), \quad (8)$$

wherein: j denotes an imaginary unit; Rr, $r_m$ and $r_n$ denote, respectively, magnitudes of the resistances designated by these reference signs; Cr, Cm and Cn denote, respectively, capacitances of the capacitors designated by these reference signs; Lr denotes an inductance of the inductor designated by this reference sign; and ω (omega) denotes an angular frequency of switching of each of the switches Qa and Qb.

As a prerequisite for allowing the solar cell adjustment system to operate (allowing the currents depicted in FIGS. 10a to 10d to flow at a value of 0 A or more), on an assumption that the impedance at each site depicted in FIG. 12 is zero, it is necessary to satisfy the following formulas (9) and (10).

$$V_{m\text{-}in} > NV_{m\text{-}A} \quad (9)$$

$$V_{m\text{-}in} > NV_{m\text{-}B} \quad (10)$$

wherein N denotes a turn ratio of the transformer (the number of turns in the primary winding: the number of turns in the secondary winding=N:1).

Based on the formulas (3) to (5) and the formulas (9) and (10), the following formulas (11) and (12) are obtained.

$$V_{in} > N(V_{PV\text{-}m} + 2V_D) \quad (11)$$

$$V_{in} > N(V_{PV\text{-}n} + 2V_D) \quad (12)$$

As presented by the formulas (3) to (5), $V_{m\text{-}in}$, $V_{m\text{-}A}$ and $V_{m\text{-}B}$ reflect, respectively, the input voltage Vin, a voltage $V_{PV\text{-}m}$ of the shaded module PV-m and a voltage $V_{PV\text{-}n}$ of the insolated module PV-n.

Thus, it is understandable that, in the equivalent circuit in FIG. 12, electric power supplied by the input voltage Vin is transmitted to the transformer via a series circuit (designated by Zr in FIG. 12) composed of the resistance Rr, the capacitor Cr and the inductor Lr, and then, on the secondary side of the transformer (on the side of the multi-stage voltage multiplier rectification circuit), distributed to the shaded module PV-m and the insolated module PV-n, respectively, via a series circuit (designated by Zm in FIG. 12) composed of the capacitor Cm and the resistance $r_m$, and a series circuit (designated by Zn in FIG. 12) composed of the capacitor Cn and the resistance $r_n$.

In FIG. 12, the virtual AC power supply configured for an amplitude of $V_{m\text{-}A}$ and the virtual AC power supply configured for an amplitude of $V_{m\text{-}B}$ are connected commonly to the secondary winding of the transformer, respectively, via the series circuit designated by Zm and the series circuit designated by Zn Thus, supposing that: the amplitudes $V_{m\text{-}A}$ and $V_{m\text{-}B}$ have the same magnitude; the corresponding virtual AC power supplies have the same phase; and the impedances Zm and Zn have the same value, it is apparent that current equally flows through the virtual AC power supply configured for an amplitude of $V_{m\text{-}A}$ and the virtual AC power supply configured for an amplitude of $V_{m\text{-}B}$.

Further, as presented by the formulas (4) and (5), the amplitudes of $V_{m\text{-}A}$ and $V_{m\text{-}B}$ reflect the voltages $V_{PV\text{-}m}$ and $V_{PV\text{-}n}$ of the two solar cell modules, respectively. Thus, it is apparent that, in a situation where a voltage difference occurs between the two solar cell modules, a current flows toward one of the solar cell modules having a lower voltage, on a priority basis.

In this example, the solar cell module PV-m is a shaded module. Generally, in a series-connected solar cell module string, an operating voltage of a shaded module becomes lower than that of the remaining insolated modules.

Thus, the use of the solar cell adjustment system according to this embodiment makes it possible to redistribute electric power from all of series-connected solar cell modules to a shaded module (i.e., a solar cell module having a relatively low voltage among the series-connected solar cell modules) to thereby compensate for a deficiency of electric power in the shaded module.

Further, as presented by the formulas (6) to (8), an impedance at each site depends on a switching frequency of the switches Qa and Qb.

Thus, it is considered that, when the solar cell adjustment system according to this embodiment is driven at a fixed frequency, along with an increase in compensation current $I_{eqm}$ flowing into the shaded module PV-m, a voltage drop occurs due the impedance Zm, and thus the voltage $V_{PV\text{-}m}$ of the shaded module PV-m is lowered.

In other words, it is deemed that, when a compensation current is supplied to the shaded module by the solar cell adjustment system according to the present invention, a resistance causing a voltage drop in the shaded module is generated in the circuit (this resistance will hereinafter be referred to as "equivalent output resistance Rout").

The equivalent output resistance Rout can be utilized to relatively lower a voltage across the shaded module as compared to that across the insolated module, i.e., to lead an operating state of the shaded module toward around an MPP during occurrence of partial shading, while maintaining a voltage across the insolated module at a relatively high level.

Figure 13:
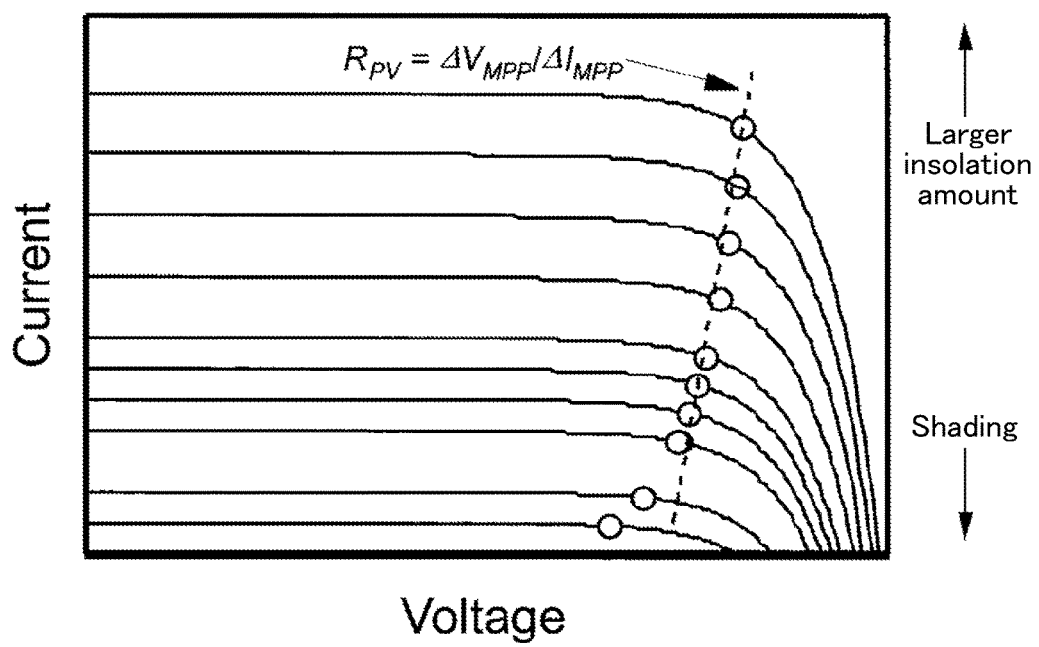
FIG. 13 is a graph depicting one example of a characteristic of a solar cell module during fluctuation in amount of insolation.

Generally, $V_{MP}$ of a solar cell module largely depends on an amount of insolation, and typically an operating characteristic changes according to the amount of insolation, as depicted in FIG. 13.

In a region having a relatively large amount of insolation, a locus of $V_{MP}$ can be approximated by a straight line as indicated by the broken line in FIG. 13.

The gradient of this straight line is defined as follows:

$$R_{PV} = \frac{\Delta V_{MP}}{\Delta I_{MP}} = \frac{V_{MP} - V_{MP\text{-}shaded}}{I_{MP} - I_{MP\text{-}shaded}}, \quad (13)$$

where $V_{MP}$ and $I_{MP}$ denote, respectively, a voltage and a current across the insolated module at an MPP, and $V_{MP\text{-}shaded}$ and $I_{MP\text{-}shaded}$ denote, respectively, a voltage and a current at an MPP under a certain amount of insolation which is less than an amount of the above insolation.

As described with reference to FIG. 6, during the use of the solar cell adjustment system according to the present invention, a compensation current $I_{eq}$ is supplied to a shaded module to allow all of the modules to output the same current $I_{string}$, in a pseudo manner.

That is, when the insolated module and the shaded module operate, respectively, at voltages of $V_{MP}$ and $V_{MP\text{-}shaded}$, and produce, respectively, currents of $I_{MP}$ and $I_{MP\text{-}shaded}$, the compensation current $I_{eq}$ corresponds to Δ (DELTA)$I_{MP}$ in the formula (13).

As one example, assume a situation where one of four series-connected solar cell modules is shaded as in this embodiment.

In this situation, the compensation current $I_{eq}$ is supplied to the shaded module. Supposing that a reduction in output voltage along with an increase of $I_{eq}$ can be expressed in the form of $I_{eq} \times$(multiplied by) Rout, the following formula (14) can be obtained from the formulas (11) and (12):

$$V_{in}=3V_{MP}+V_{MP\text{-}shaded}>N\times(V_{MP\text{-}shaded}+2V_D+I_{eq}R_{out}) \quad (14)$$

The formula (14) works out even at a time when no compensation current flows ($I_{eq}=0$) or at a time when an amount of compensation current is excessively small, resulting in insufficient compensation.

In a situation where the compensation current flows in an sufficient amount, the following formula (15) is established based on proportionality in voltage:

$$V_{in}=3V_{MP}+V_{MP\text{-}shaded}=N\times(V_{MP\text{-}shaded}+2V_D+I_{eq}R_{out}) \quad (15)$$

Assuming that $I_{eq}=\Delta$ (DELTA) $I_{MP}$ in the formula (15), the following formula (16) is obtained by using the formula (13):

$$R_{out} = \frac{(4-N)V_{MP} + \Delta I_{MP}R_{PV}(N-1) - 2NV_D}{N\Delta I_{MP}} \quad (16)$$

In the case where the equivalent output resistance Rout of the solar cell adjustment system satisfies the formula (16), it becomes possible to cause not only the insolated module but also the shaded module to operate around an MPP voltage.
Experimental Test about Operation of Solar Cell Adjustment System The solar cell adjustment system having the circuit configuration in FIG. 8, according to the present invention, was subjected to an experimental test in the following manner.
(Measurement of Equivalent Output Resistance Rout)

First of all, the solar cell adjustment system having the circuit configuration in FIG. 8 was constructed.

In this system, the capacitance of each of the intermediate capacitors C1 to C4 was 33 μF (micro F), and the capacitance of each of the smoothing capacitors Cout1 to Cout4 was 66 μF (micro F). Each of the diodes D1 to D8 was a Schottky diode having a forward voltage drop $V_D$ of 0.43 V. The capacitance of the capacitor Cr was 220 nF, and the inductance of the inductor Lr was 18.6 μH (micro H). In the transformer, the number of turns in the primary winding was 23, and the number of turns in the secondary winding was 6 (turn ratio N=23/6).

Then, the solar cell modules PV1 to PV4 were removed, and an external DC power supply was connected to an input section (opposite ends of the group of switches Qa and Qb) of the series resonant inverter. Further, a variable resistor Rout 1 was connected to only the capacitor Cout 1 to form a state in which only the solar cell module PV1 is shaded, in a pseudo manner (FIG. 14).

Figure 14:
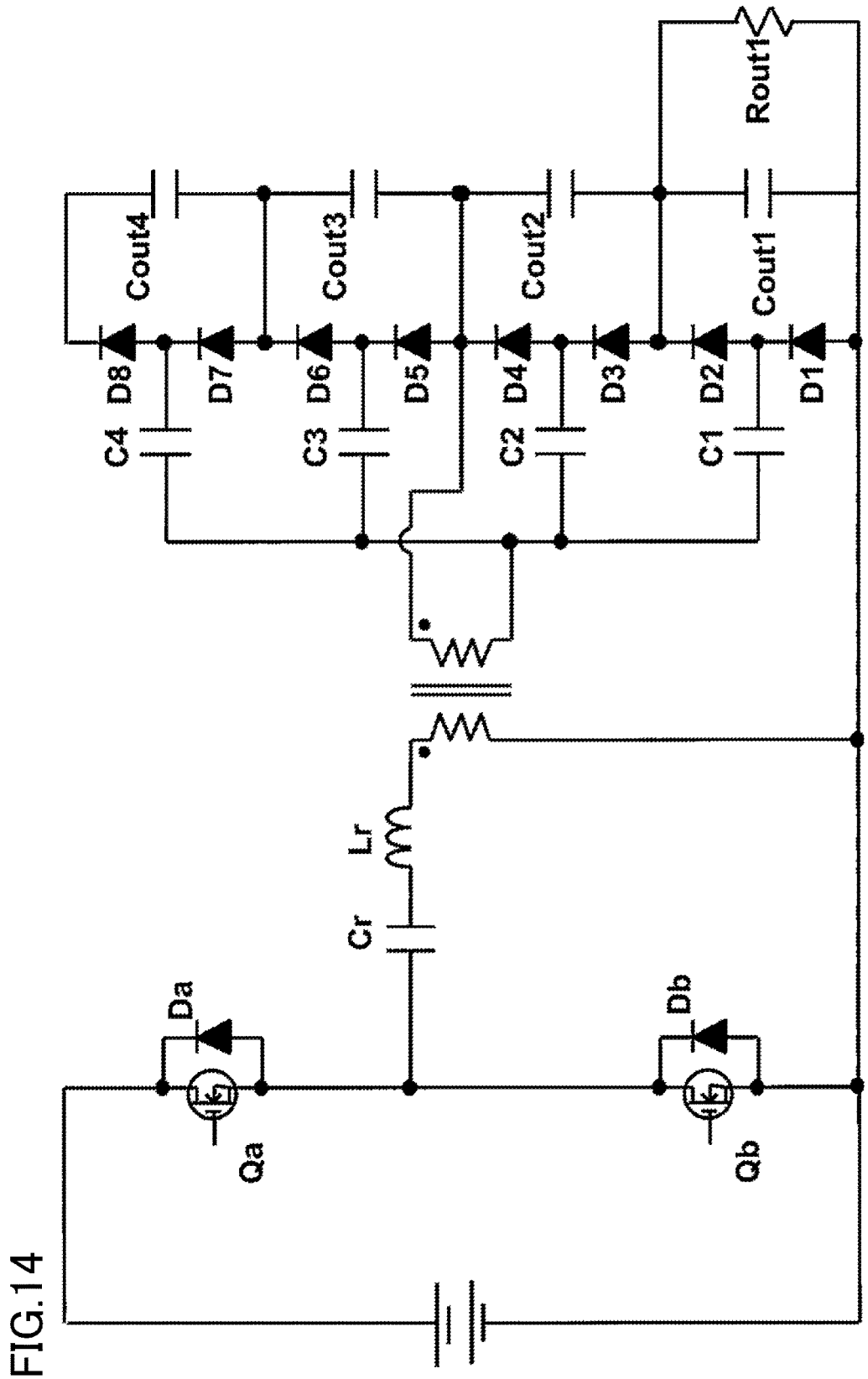
FIG. 14 is a diagram of a circuit configuration used in tests to artificially produce a state in which only the solar cell module PV1 is shaded.

The system in FIG. 14 was driven by alternately switching, at a fixed frequency, between a state in which only the switch Qa is turned on and a state in which only the switch Qb is turned on.

Further, the system was driven while a resistance value of the variable resistor was variously changed. In this state, a current flowing through the variable resistor was measured as a compensation current, and concurrently a voltage across the capacitor Count 1 (representing $V_{PV1}$ in a pseudo manner) was measured. Then, a correlation of the measured current and voltage values was approximated by a straight line.

An equivalent output resistance Rout at a specific frequency was calculated as a ratio of a change in the current value and a change in the voltage value (gradient of the approximate curve).

At each of a variety of fixed frequencies (85 kHz, 93.5 kHz, 102 kHz, 110.5 kHz), an equivalent output resistance Rout was calculated in the above manner, and an output power (electric power for the variable resistor Rout 1) changing according to the pseudo voltage $V_{PV1}$, and a power conversion efficiency (a ratio of electric power input from the external DC power supply and electric power consumed by the variable resistor Rout1), were measured.

Figure 15:
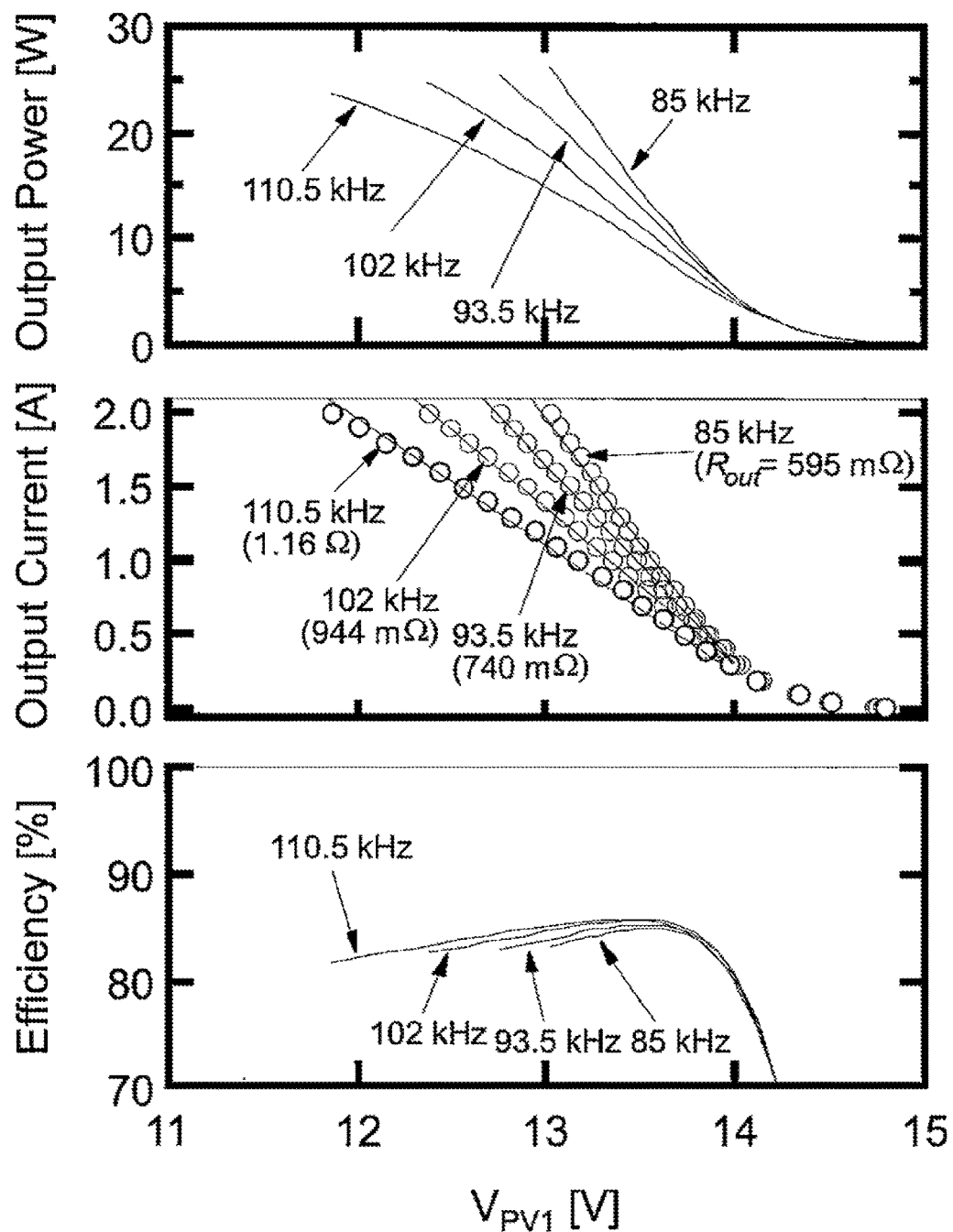
FIG. 15 is graphs depicting a result of an operation test for the solar cell adjustment system, performed using a solar cell array simulator (output characteristics of the shaded module PV1 appearing when a switching frequency is changed).

FIG. 15 depicts graphs presenting results of the measurements.

At any of the switching frequencies, an output current-output voltage relationship could be basically approximated by a straight line, and the equivalent output resistance Rout was calculated from the approximate straight line, as written in FIG. 15.

As mentioned above, an impedance in each site within the solar cell adjustment system has frequency dependence. Thus, the equivalent output resistance Rout also changed along with a change in frequency.
(Measurement of Operating Characteristics of Solar Cell Module and Solar Cell Module String)

Then, a solar cell array simulator (E4350B, produced by Agilent Technologies Inc.) was connected to a system having the same circuit configuration as that in FIG. 8 as the solar cell modules PV1 to PV4 to realize a state in which a partial shading is occurring in a pseudo manner.

Specifically, on the assumption that, among the solar cell module string consisted of four (pseudo) solar cell modules PV1 to PV4, only the solar cell module PV1 is shaded, $V_{MP}$ and $I_{MP}$ in each of the solar cell modules PV2 to PV4 were set, respectively, to 12 V and 4.0 A, and $V_{MP\text{-}shaded}$ and $I_{MP\text{-}shaded}$ in the solar cell module PV1 were set, respectively, to 9.0 V and 2.0 A.

Under the above conditions and in a state in which the switching frequency of the switches Qa and Qb was set to 85 kHz (Rout=595 mΩ), the solar cell adjustment system was drive while a voltage to be applied to the solar cell module string was variously changed.

Figure 16:
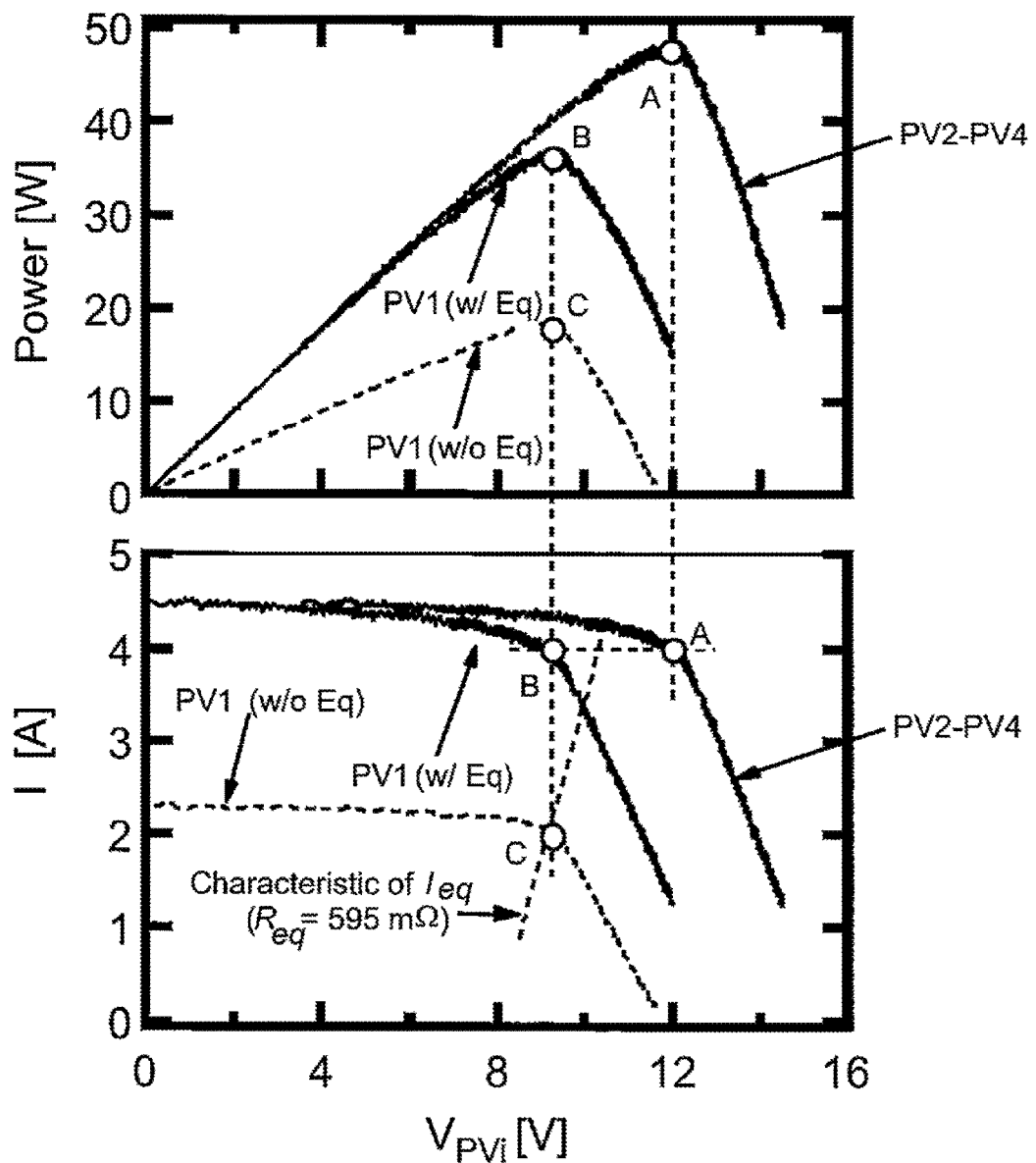
FIG. 16 is graphs depicting a result of the operation test for the solar cell adjustment system, performed using the solar cell array simulator (operating characteristics of each module).

FIG. 16 depicts respective operating characteristic curves of each of the insolated modules PV2 to PV4 and the shaded module PV1.

PV1 (w/ Eq) indicates pseudo operating characteristics of the shaded module PV1 calculated based on a current value including a compensation current, and PV1 (w/o Eq) indicates true operating characteristics of the shaded module PV1.

When the solar cell module string operates under the condition that $I_{string}=4.0$ A, an operating point of each of the solar cell modules PV2 to PV4 becomes the point A in FIG. 16.

On the other hand, the solar cell adjustment system operates to allow a sum of a generated current of the shaded module PV1 and a compensation current $I_{eq4}$ to become 4.0 A.

Thus, a pseudo operating point of the shaded module PV1 after compensation by the solar cell adjustment system lies on a straight line corresponding to $I_{string}=4.0$ A. According to the formula (16), the pseudo operating point (an operating point obtained when a current is defined as a summed current of a compensation current and an output current of the shaded module PV1, and a voltage is defined as a voltage across the shaded module PV1) and a real operating point of the shaded module PV1 become the point B and the point C in FIG. 16, respectively.

The oblique broken line represents a characteristic under the condition that $I_{string}=4.0$ A and Rout=595 mΩ, and means that the operating point of the shaded module PV1 lies on this straight line.

Figure 17:
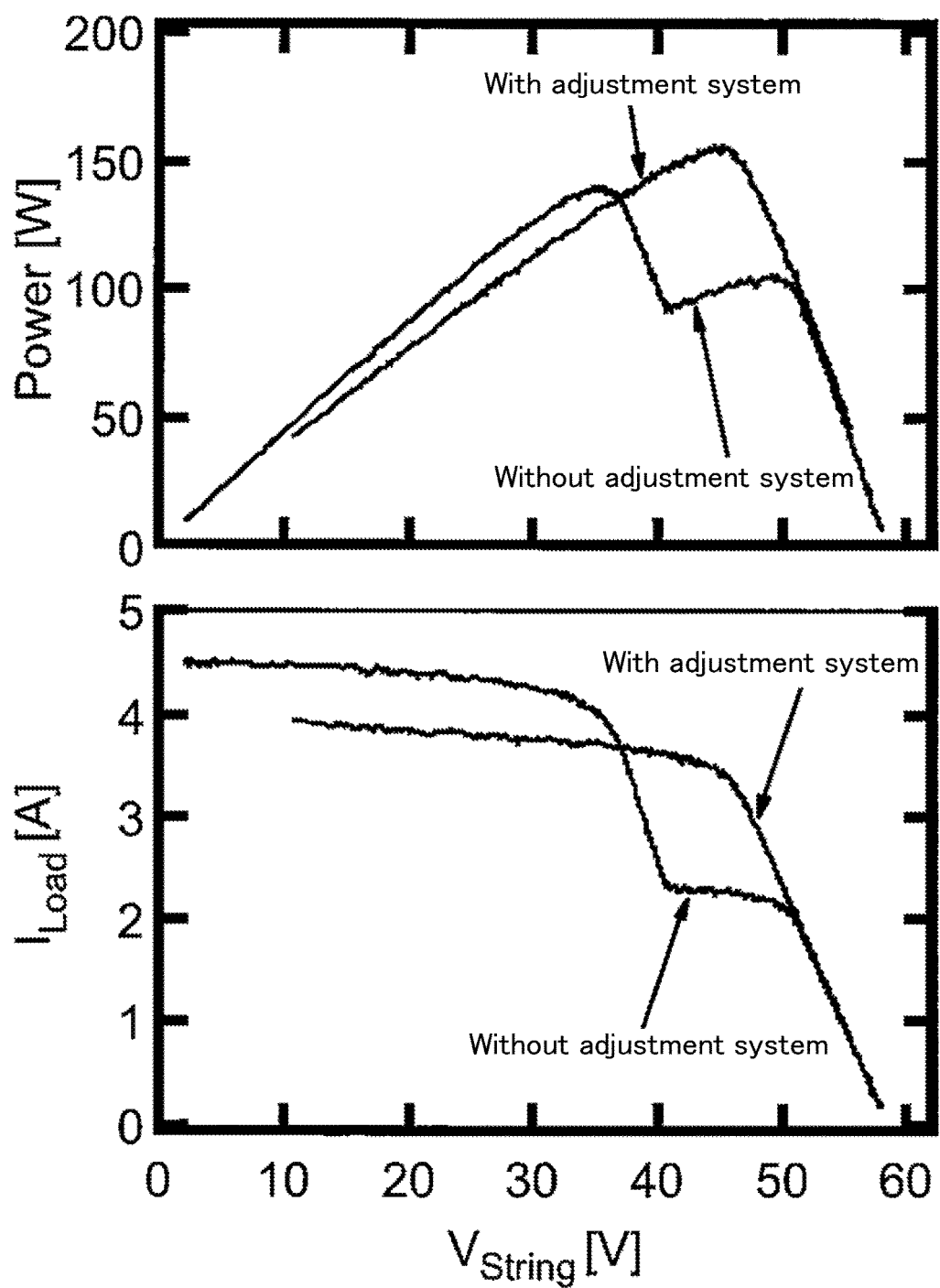
FIG. 17 is graphs depicting a result of an operation test for an entire solar cell module string, performed using the solar cell array simulator (comparison between operating characteristics in the case where the solar cell adjustment system is used, and operating characteristics in the case where the solar cell adjustment system is no used).

FIG. 17 depicts a result of a measurement of characteristics of the entire solar cell module string, wherein the measurement was performed in cases with and without the solar cell adjustment system, under the condition that the solar cell array simulator was connected to a load.

Figure 18:
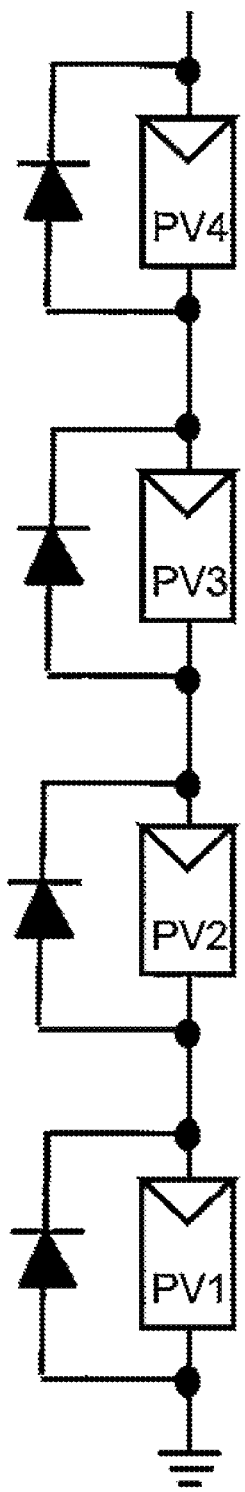
FIG. 18 is a diagram depicting a connection state of a bypass diode connected to each solar cell module in the case where the solar cell adjustment system is no used in the operation tests.

In the case without the solar cell adjustment system (in case of using a bypass diode, as depicted in FIG. 18), two maximum power points ($V_{string}$=about 35 and 50 V) appears due to influence of partial shading, whereas, in the case with the solar cell adjustment system, only one maximum power point ($V_{string}$=about 45 V) appeared.

In the case with the solar cell adjustment system, obtainable maximum electric power is about 158 W, which is improved as compared to about 140 W in the case without the solar cell adjustment system.

The above test showed that, even under the condition $V_{MP}$ of an insolated module and $V_{MP-shaded}$ of a shaded module are largely different from each other, each of the modules can operate around a maximum power point by utilizing the equivalent output resistance Rout of the solar cell adjustment system.

Operating State Control Method for Solar Cell Module String

The above description has been made about the operation of supplying a compensation current to a shaded module by utilizing an equivalent output resistance Rout at a fixed switching frequency, and relatively dropping a voltage across the shaded module as compared to a voltage across an insolated module by an effect of impedance.

However, characteristics of a solar cell are largely influenced by not only insolation but also temperature, and undergo degradation during long-term usage.

Along with such characteristic change/degradation, a value of $R_{PV}$ described in FIG. 13 also changes.

As presented by the formula (16), from a viewpoint of maximally utilizing electric power of a shaded module in the solar cell adjustment system according to the present invention, it is necessary to adequately set Rout while taking into account the value of $R_{PV}$.

However, based on the fixed switching frequency, Rout cannot be dynamically adjusted, and thus it is impossible to cope with a change in $R_{PV}$ accompanying the characteristic change/degradation.

It is possible to cope with this problem by changing the switching frequency of the series resonant inverter in response to a change in $R_{PV}$ accompanying the characteristic change/degradation of solar cell modules, to adjust the equivalent output resistance Rout whenever necessary.

Figure 19:
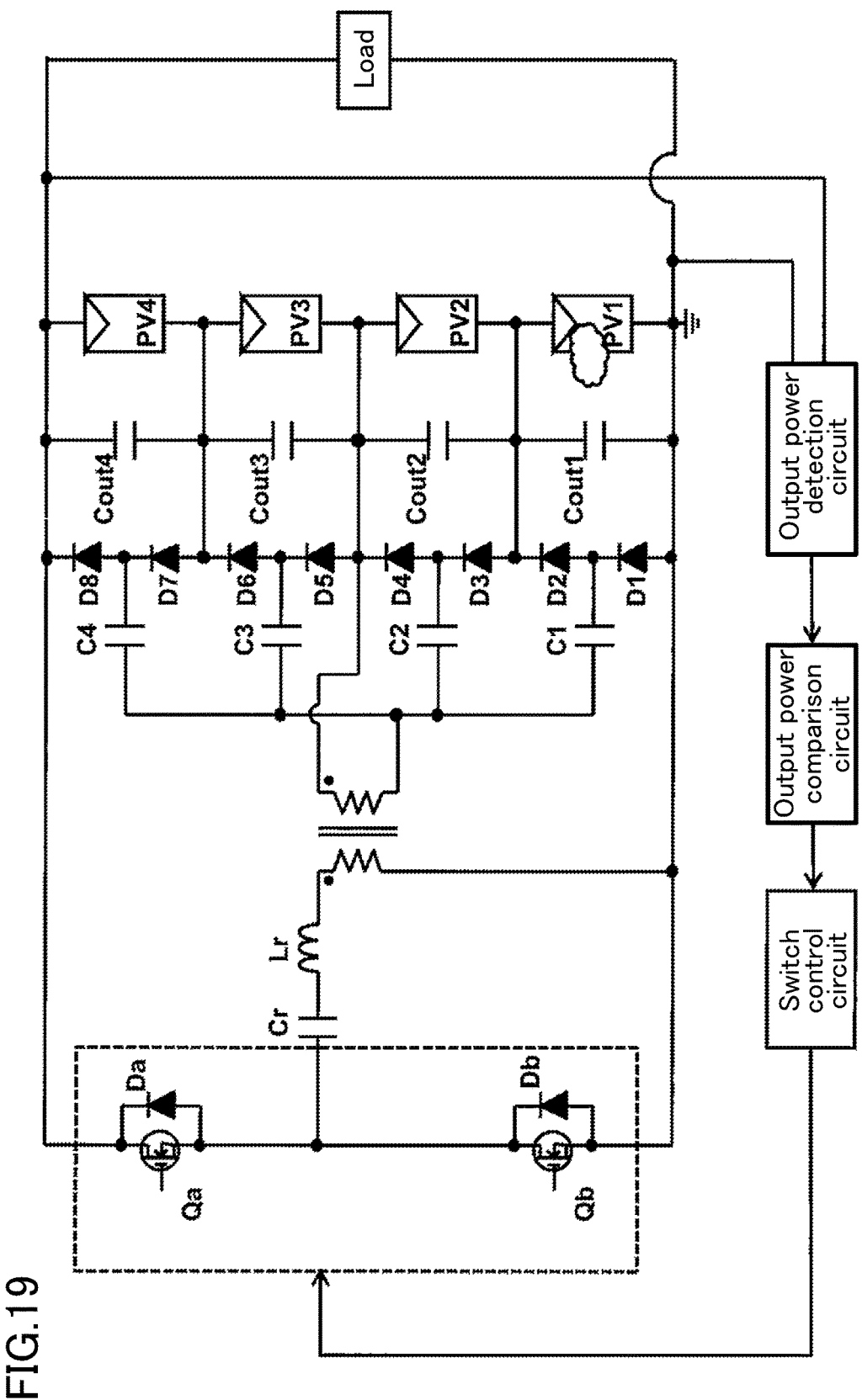
FIG. 19 is a diagram of one example of a system configuration for controlling an operating state of a solar cell module string using the solar cell adjustment system according to the present invention.
Figure 20:
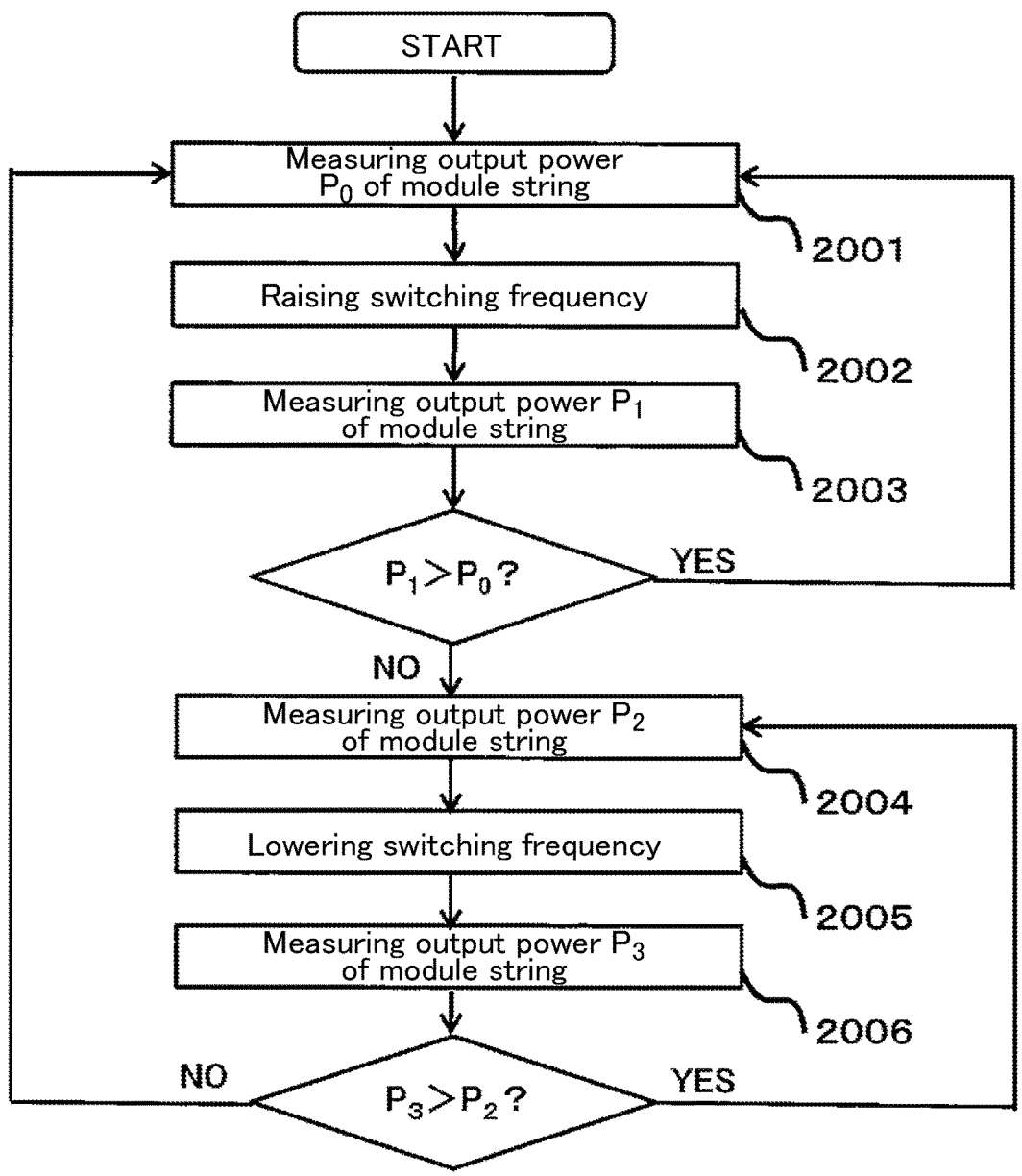
FIG. 20 is a flowchart depicting one example of a solar cell module string operating state control method according to the present invention.

FIGS. 19 and 20 depict, respectively, a system configuration and a flowchart for driving the solar cell adjustment system while changing the switching frequency to adjust the equivalent output resistance Rout.

As depicted in FIG. 19, an output electric power detection circuit for measuring a summed electric power of the solar cell modules PV1 to PV4 (electric power of the solar cell module string) is connected to solar cell adjustment system.

The summed electric power detected by the output electric power detection circuit is transmitted to an output electric power comparison circuit, and stored in the comparison circuit for at least a given period of time.

The output electric power comparison circuit is configured to perform a comparison between two output electric power values measured at different measurement timings, in the stored output electric power.

An signal indicative of a result of the comparison (indicative of which of an output electric power value measured at an earlier timing and an output electric power value measured at a later timing is larger) is transmitted to a switch control circuit.

The switch control circuit is configured to control the switches Qa and Qb in such a manner as to switch between a state in which only one of the switches Qa and Qb is turned on, and a state in which only the remaining one of the switches Qa and Qb is turned on (while optionally providing a dead time during which both of the switches are turned off) at a specific frequency, and particularly configured to have a function of raising and lowing the frequency.

A raising width and a lowering width may be preliminarily input as fixed values into the switch control circuit, or may be inputtable from an external circuit (not depicted) at any timing.

The switch control circuit is also configured to store whether a change of the frequency performed lastly is raising or lowering, at least for a given period of time. The switch control circuit is operable to receive a comparison result from the output electric power comparison circuit, wherein it is operable, when an output electric power value measured at a later timing is greater than an output electric power value measured at an earlier timing, to perform a next change of the frequency in the same manner as that in a previous change of the frequency, and, when the output electric power value measured at the earlier timing is greater than the output electric power value measured at the later timing, to perform the next change of the frequency in the opposite manner to that in the previous change of the frequency (When the two output electric power value are the same, the next change of the frequency may be performed in the same manner as or in the opposite manner to that in the previous change of the frequency. In this case, one of the two manners is to be preliminarily determined).

According to the flowchart in FIG. 20, a method for use with the system in FIG. 19 to control an operating state of the solar cell module string will be described below. The following description will be made on an assumption that an execution timing of each step is controlled using an arbitrary clock circuit (not depicted).

First of all, an initial value $P_0$ of output electric power ($I_{string}$×(multiplied by) $V_{string}$, or load current $i_{Load}$×(multiplied by) $V_{string}$) of the solar cell module string is measured by the output electric power detection circuit (Step 2001).

Then, the switch control circuit operates to raise the switching frequency (i.e., increase Rout) (Step 2002).

Subsequently, the output electric power detection circuit re-measures an output electric power value $P_1$ of the solar cell module string (Step 2003).

The output electric power comparison circuit stores therein the measured electric power values $P_0$ and $P_1$ received from the detection circuit, and compares magnitudes of the two electric power values to each other.

When $P_1$>(is greater than) $P_0$, the processing routine returns to the initial Step 2001 of the flowchart to repeat the same operation, i.e., the switch control circuit operates to further raise the switching frequency.

When $P_1$<(is less than) $P_0$, the switch control circuit operates to reduce the switching frequency to cause lowering of Rout (Step 2005).

During this operation, the output electric power detection circuit measures electric power values $P_2$ and $P_3$ of the solar cell module string before and after a change of the frequency (Steps 2004 and Step 2006), and the output electric power comparison circuit determines a magnitude relationship between $P_2$ and $P_3$.

Based on a result of the comparison, the switch control circuit operates to raise or lower the frequency, as described in the flowchart.

In the flowchart of FIG. 20, the routine is configured to re-measure the output electric power value after the comparison between $P_0$ and $P_1$ and the comparison between $P_2$ and $P_3$. However, this measurement may be omitted.

Figure 21:
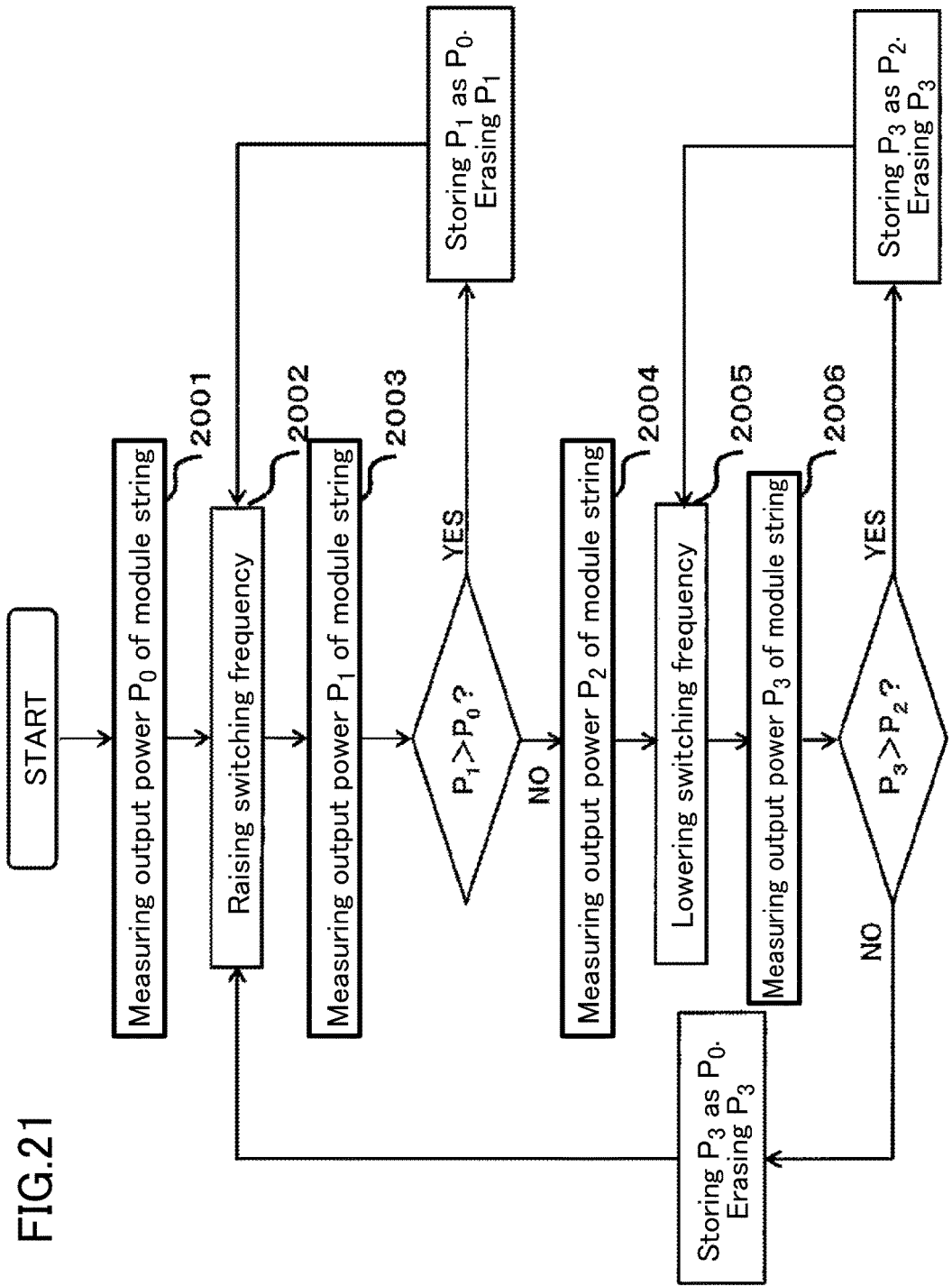
FIG. 21 is a flowchart depicting an example of the solar cell module string operating state control method according to the present invention.

That is, the flowchart of FIG. 20 may be modified as depicted in FIG. 21. When the routine is executed according to the flowchart of FIG. 21, for example, after raising the switching frequency in Step 2002 and measuring an electric power value $P_1$ in Step 2003, when it is determined that $P_1 >$(is greater than) $P_0$, the output electric power comparison circuit stores $P_1$ in a memory area of $P_0$, and the measurement value $P_1$ stored in its memory area is erased. Then, the switch control circuit operates to execute the Step 2002.

Similarly, after lowering the switching frequency in Step 2005 and measuring an electric power value $P_3$ in Step 2006, when it is determined that $P_3 >$(is greater than) $P_2$, the output electric power comparison circuit stores $P_3$ in a memory area of $P_2$, and the measurement value stored in memory area of $P_3$ is erased. Then, the switch control circuit operates to execute the Step 2005.

Similarly, after lowering the switching frequency in the Step 2005 and measuring the electric power value $P_3$ in the Step 2006, when it is determined that the relationship: $P_3 >$(is greater than) $P_2$, is not satisfied, the output electric power comparison circuit stores $P_3$ in a memory area of $P_0$, and the measurement value $P_3$ stored in its memory area is erased. Then, the switch control circuit operates to execute the Step 2002.

When, in the comparison between electric power values performed after the Step 2003, 2006, both of the electric power values are equal to each other, the routine may be terminated assuming that the maximum power point is reached, or may return to the Start to prepare for a change in operating characteristics and restart the processing.

It should be noted that the Step 2002 and the Step 2005 may be exchanged.

Figure 22:
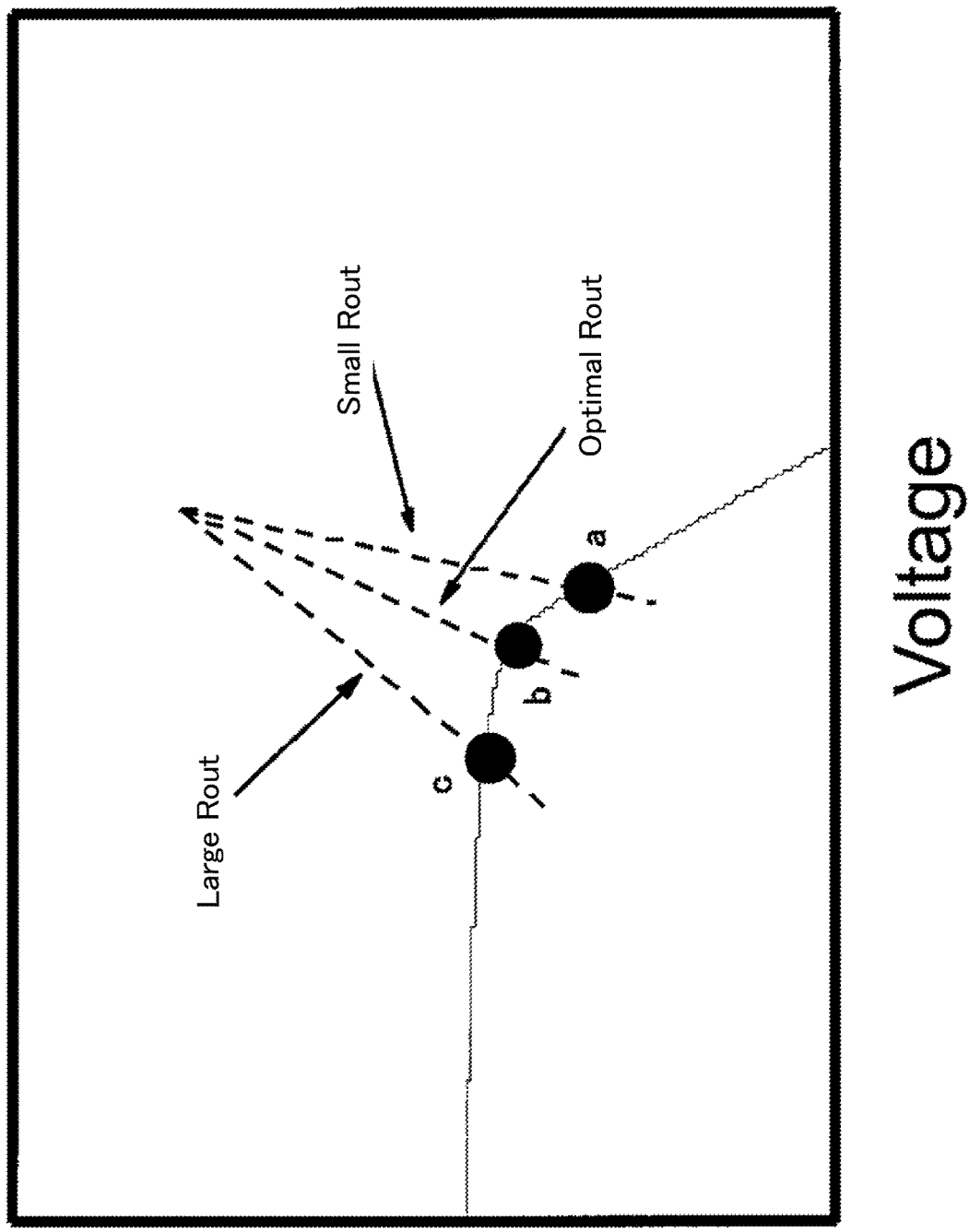
FIG. 22 is a diagram depicting one example of a state of change in an operating point of a shaded module when the switching frequency is changed (i.e., when Rout is changed).

FIG. 22 depicts one example of a state of change in an operating point of a shaded module when the switching frequency is changed (i.e., when Rout is changed). In FIG. 22, for the sake of simplicity, only a characteristic of a shaded module is depicted.

In the case where the operating point of the shaded module is initially at the point a, assume that the switching frequency is increased according to the flowchart of FIG. 20 or 21 to increase Rout.

In this case, the operating point of the shaded module is shifted to the point b, and consequently the output electric power of the solar cell module string increases. Thus, based on the flowchart, the switching frequency is further increased to further increase Rout.

As a result, the operating point of the shaded module is shifted to the point c, and consequently the output electric power of the solar cell module string decreases.

Thus, in this situation, based on the flowchart, the switching frequency is lowered to reduce Rout.

As a result, the operating point of the shaded module is returned to the point b again, and thus the output electric power of the solar cell module string rises. Thus, based on the flowchart, the switching frequency is further lowered to further reduce Rout. As a result, the operating point is shifted to the point a, and thus the output electric power of the solar cell module string decreases.

As above, along with a change of the frequency (change of Rout), the operating point of the shaded module changes in the range of the points a to c.

Although the operating point of the shaded module changes, the control based on the flowchart of FIG. 20 or 21 can be performed to allow the shaded module to operate around a maximum power point, even in a situation where characteristic change/degradation occurs in each solar cell module.

(Situation where Solar Cell Module Other than Solar Cell Module PV1 is Shaded)

The above description has been made based on the assumption that the solar cell module PV1 is mainly shaded in the circuit in FIG. 8. However, even in a situation where any other solar cell module is shaded, the solar cell adjustment system according to the present invention can operate by the same principle.

As one example, assume a situation where the solar cell module PV3 is shaded. FIGS. 23*a* to 23*d* depict pathways of currents flowing through the circuit in the four modes, when the ON/OFF states of the switches Qa and Qb are switched according to the graph of $V_{GS}$ in FIG. 9, in the above situation.

First of all, during the period of the mode 2 (FIG. 23*a*), as indicated by the graph of $V_{GS}$ in FIG. 9, the switch Qa is set in the ON state, and the switch Qb is set in the OFF state, so that a positive voltage (in FIG. 8, a voltage raising in a direction of the arrowed line indicative of $V_{DSb}$) is output to the resonant circuit comprising the capacitor Cr and the inductor Lr.

Thus, a positive current (in FIG. 8, a current flowing in a direction of the arrowed line indicative of $i_{Lr}$; a current flowing from the solar cell modules PV1 to PV4 into the capacitor Cr and the inductor Lr via the switch Qa in the ON state) flows through the capacitor Cr and the inductor Lr.

According to a resonance phenomenon caused by the capacitor Cr and the inductor Lr, $i_{Lr}$ is changed to a sinusoidal wave-shaped waveform.

An AC voltage is applied to the primary winding of the transformer, and, after being transformed, output as a secondary voltage to the multi-stage voltage multiplier rectification circuit.

The capacitor C3 is charged by the secondary voltage.

Figure 23A:
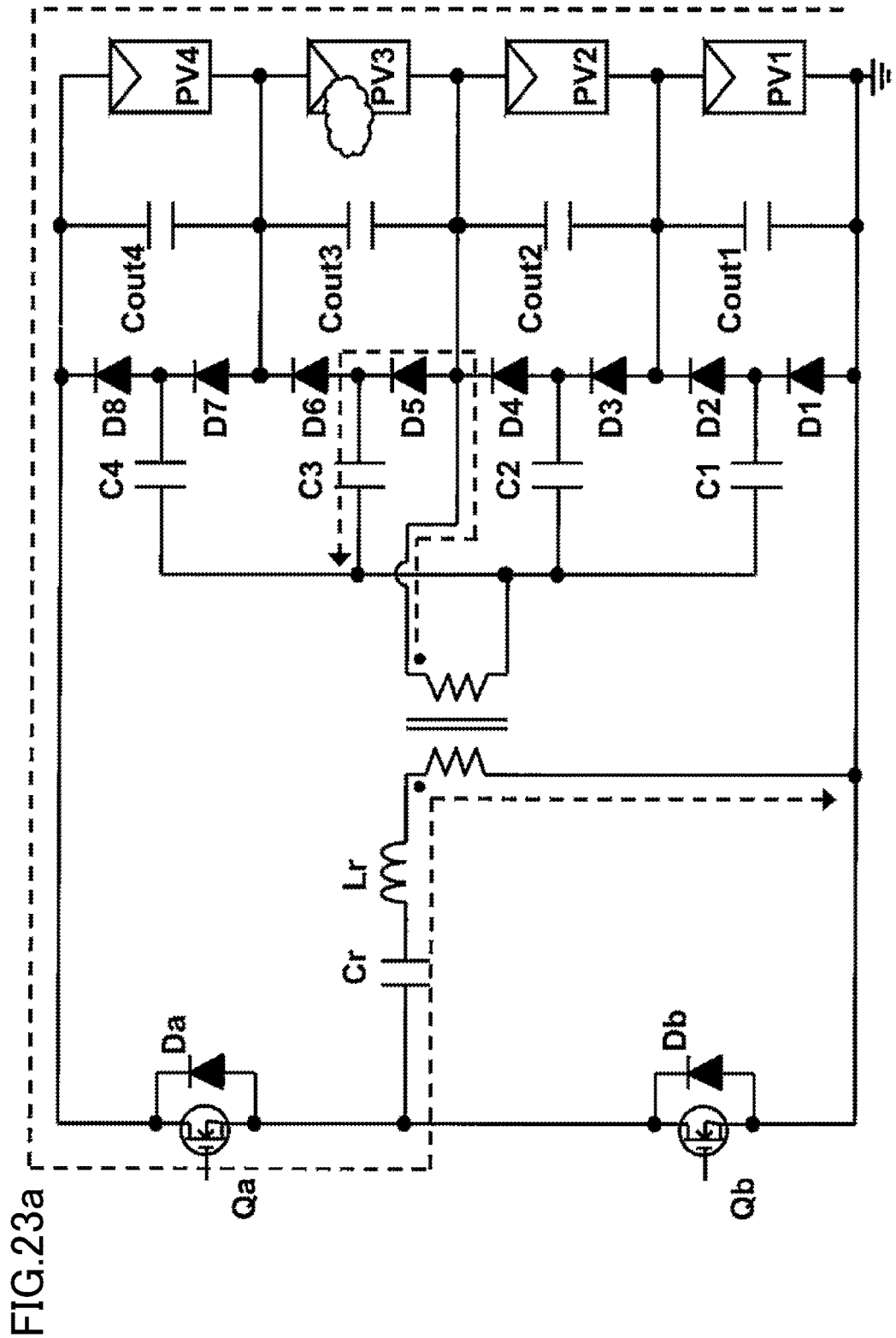
FIG. 23a is a diagram depicting a pathway of current flowing during a period of mode 2, when the solar cell adjustment system in FIG. 8 is activated in a situation where a solar cell module PV3 is shaded.
Figure 23B:
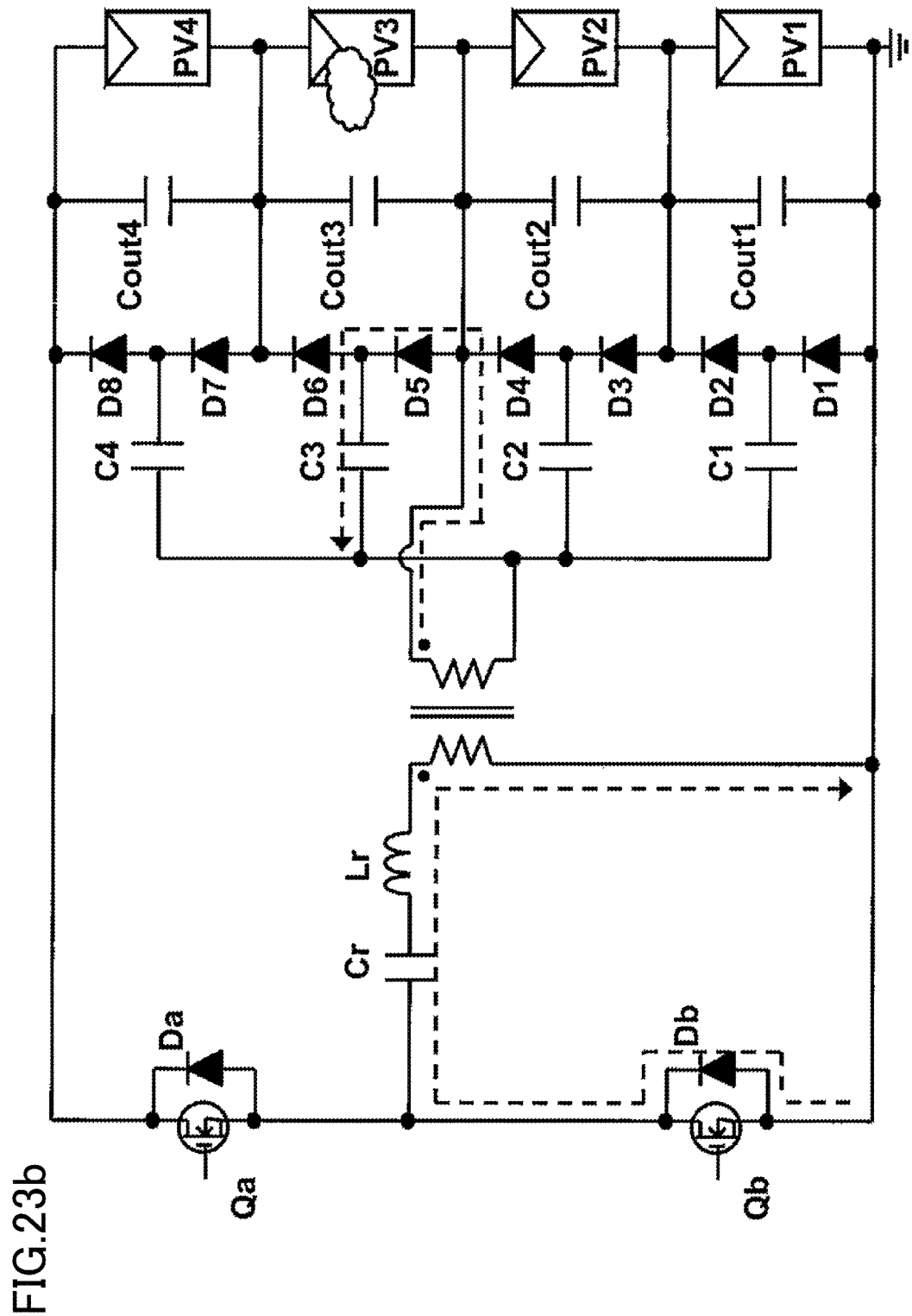
FIG. 23b is a diagram depicting a pathway of current flowing during a period of mode 3, when the solar cell adjustment system in FIG. 8 is activated in the situation where the solar cell module PV3 is shaded.

Then, when the switch Qa is turned off, the current which has been flowed through the switch Qa in the mode 2 is commutated toward the flywheel diode Db, and the operation is shifted to mode 3 (FIG. 23*b*).

In this time, although the voltage $V_{DSb}$ input into the resonance circuit becomes zero, the current $i_{Lr}$ flowing through the inductor Lr is successively changed to a sinusoidal wave-shaped waveform.

Just after shifting to the mode 3, the current $i_{Lr}$ flowing through the inductor Lr still has a positive polarity, because the switching is performed at a frequency greater than the resonant frequency.

The inductor Lr is an inductive element. Thus, the current $i_{Lr}$ is continued before and after shifting to the mode 3, whereas the current $i_{Sa}$ which has been equal to $i_{Lr}$ in the mode 2 becomes zero, simultaneously with the shifting to the mode 3.

In response to this, the current $i_{Sb}$ which has been zero in the mode 2 has a magnitude equal to $i_{Lr}$, simultaneously with the shifting to the mode 3.

A pathway of current flowing from the multi-stage voltage multiplier rectification circuit to the solar cell module string is the same as the pathway during the period of the mode 2.

In the period of the mode 3, the switch Qb is set to the ON state.

Figure 23C:
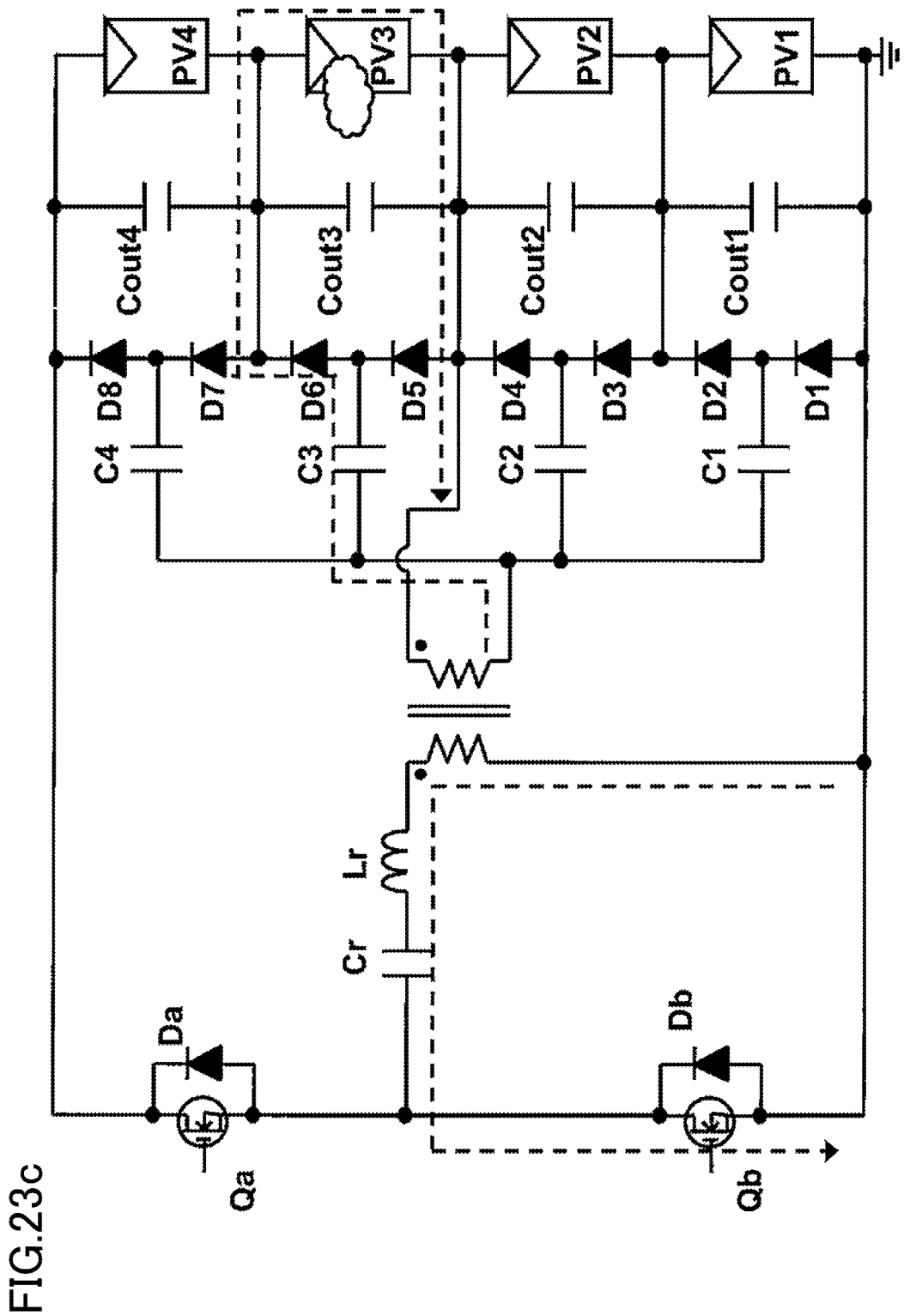
FIG. 23c is a diagram depicting a pathway of current flowing during a period of mode 4, when the solar cell adjustment system in FIG. 8 is activated in the situation where the solar cell module PV3 is shaded.

At a timing when the current $i_{Lr}$ in the inductor Lr changes to a negative polarity, the operation is shifted to mode 4 (FIG. 23c).

During a period of the mode 4, although the voltage $V_{DSb}$ input into the resonant circuit is zero as with during the period of the mode 3, the current $i_{Lr}$ flowing through the inductor Lr is successively transformed into the sinusoidal wave-shaped waveform.

In the mode 4, the polarity of $i_{Lr}$ is reverse with respect to that in the modes 2, 3, and therefore a polarity of the AC voltage to be input to the multi-stage voltage multiplier rectification circuit is also reversed.

Along with this change, the pathway of current flowing through the multi-stage voltage multiplier rectification circuit and the solar cell module string is changed as depicted in FIG. 23c.

That is, the capacitor C3 is discharged via the diode D6, and the resulting discharge current is supplied as a compensation current to the shaded module PV3.

Figure 23D:
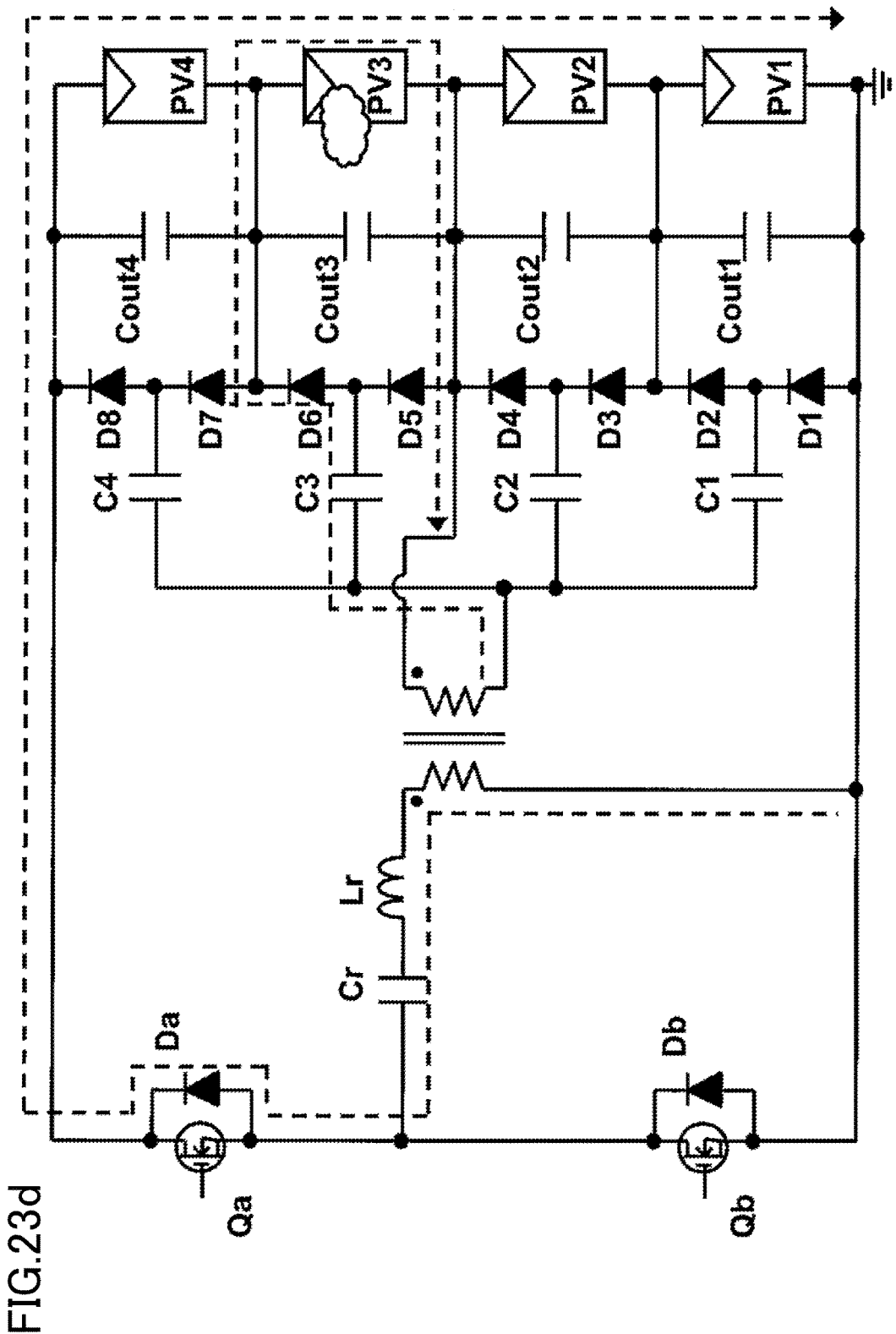
FIG. 23d is a diagram depicting a pathway of current flowing during a period of mode 1, when the solar cell adjustment system in FIG. 8 is activated in the situation where the solar cell module PV3 is shaded.

When the switch Qb is set to the OFF state, the current which has been flowing through the switch Qb in the mode 4 is commutated toward the flywheel diode Da, and the operation is shifted to mode 1 (FIG. 23d).

In this time, an approximately constant positive voltage $V_{DSb}$ is output to the resonant circuit comprising the inductor Lr.

Just after shifting to the mode 1, the current $i_{Lr}$ flowing through the inductor Lr still has a negative polarity because the switching is performed at a frequency greater than the resonant frequency. However, it gradually rises over time, in accordance with the above positive voltage $V_{DSb}$ and the resonance phenomenon.

The inductor Lr is an inductive element. Thus, the current $i_{Lr}$ is continued before and after shifting to the mode 1, whereas the current $i_{Sb}$ which has been equal to $i_{Lr}$ in the mode 4 becomes zero, simultaneously with the shifting to the mode 1.

In response to this, the current $i_{Sa}$ which has been zero in the mode 4 has a magnitude equal to $i_{Lr}$, simultaneously with the shifting to the mode 1.

The pathway of current flowing from the multi-stage voltage multiplier rectification circuit to the solar cell module string is the same as the pathway during the period of the mode 4.

In the period of the mode 1, the switch Qa is set to the ON state.

At a timing when the current $i_{Lr}$ in the inductor Lr changes to the positive polarity, the operation is shifted to the mode 2.

Subsequently, the above modes will be realized over time in the same manner as mentioned above.

As above, in the situation where the solar cell module PV3 is shaded, a compensation current can also be supplied to the shaded module PV3 having a low voltage, on a priority basis, by inputting a summed voltage of voltages across the respective solar cell modules, into the inverter and then inputting an AC voltage generated by the inverter, into the solar cell module string via the multi-stage voltage multiplier rectification circuit.

In addition, an impedance occurring on the pathway of the compensation current causes a voltage drop in a shaded module PV3. Thus, control of a value of the impedance also makes it possible to lead the shaded module PV3 toward around an MPP.

Figure 24:
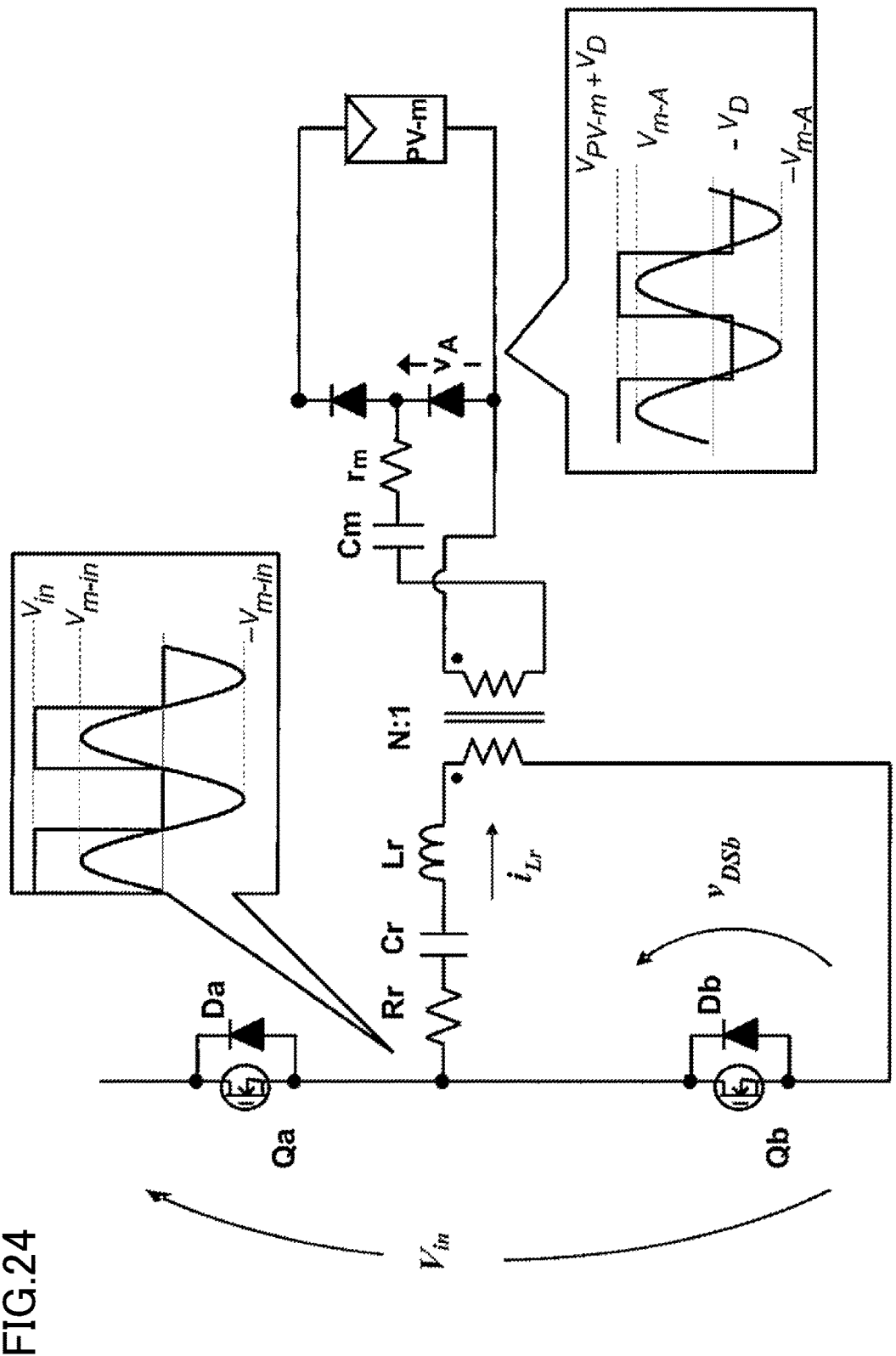
FIG. 24 is a diagram depicting rectangular wave-shaped voltage waveforms in various sites within the solar cell adjustment system in FIG. 8, in the situation where the solar cell module PV3 is shaded, and sinusoidal wave-shaped waveforms each obtained by first-order harmonic approximation based on a respective one of the rectangular wave-shaped voltage waveforms.

FIG. 24 depicts voltage waveforms in various sites related to the above operation, and corresponding sinusoidal wave-shaped approximate waveforms obtained by first-order harmonic approximation, in the situation where the solar cell module PV3 is shaded, in the same manner as that in FIG. 11.

In FIG. 24, PV-m corresponds to the shaded module PV3 in this embodiment. Further, Rr and $r_m$ denote, respectively, resistance components occurring on respective current pathways. It should be noted that the capacitors Cout 3 is omitted in FIG. 24, as in FIG. 11.

In this case, the input voltage $V_{DSb}$ and a voltage designated by $V_A$ in FIG. 24 can be approximated, respectively, by sinusoidal wave-shaped voltages each having an amplitude expressed by a respective one of the formulas (3) and (4) by first-order harmonic approximation.

Figure 25:
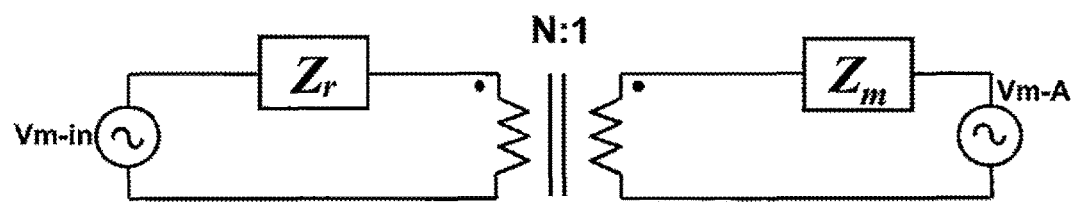
FIG. 25 is an AC equivalent circuit diagram of the circuit section depicted in FIG. 24, in the solar cell adjustment system in FIG. 8.

The solar cell adjustment system in the present invention can be substituted by an equivalent circuit depicted in FIG. 25, using virtual AC power supplies generating these sinusoidal wave-shaped voltages.

$V_{m-in}$ and $V_{m-A}$ in FIG. 25 correspond, respectively, to amplitudes of the AC voltages generated by the respective AC power supplies.

In FIG. 25, Zr and Zm denote, respectively, an impedance caused by the resistance Rr, the capacitor Cr and the inductor Lr, and an impedance caused by the resistance $r_m$ and a capacitor Cm, wherein the impedances are expressed, respectively, as the aforementioned formulas (6) and (7).

For the reason previously mentioned in connection with the formulas (9) to (16), when the equivalent output resistance Rout of the solar cell adjustment system satisfies the formula (16), it becomes possible to cause not only the isolated module but also the shaded module to operate around an MPP voltage, even in the above situation.

The adjustment of the equivalent output resistance Rout can be performed, for example, according to the flowchart of FIG. 20 or 21.

Second Embodiment

Figure 26:
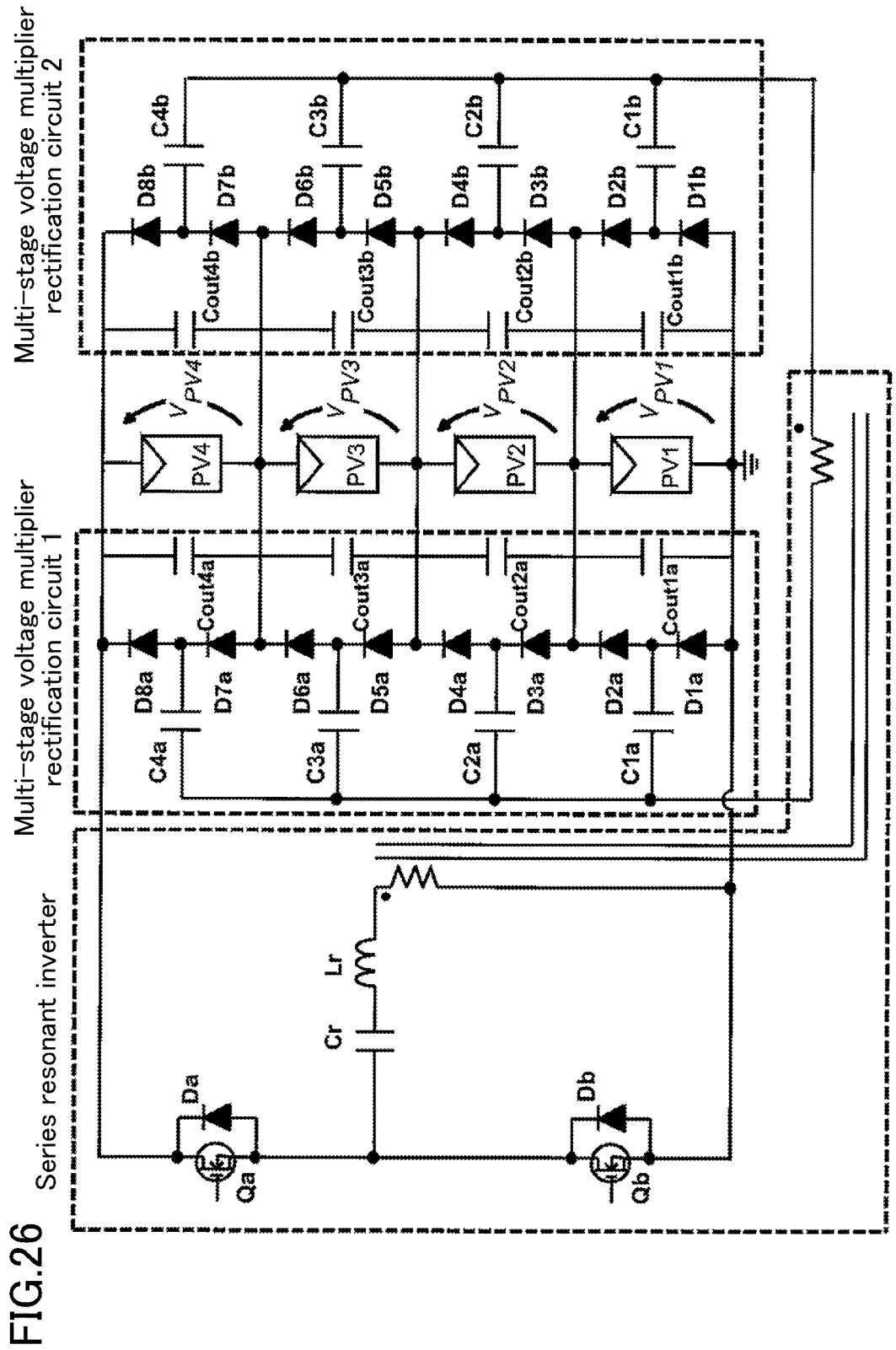
FIG. 26 is a circuit diagram of a solar cell adjustment system according to one embodiment of the present invention.

FIG. 26 depicts a solar cell adjustment system according to a second embodiment of the present invention.

In the second embodiment, a second voltage multiplier circuit is employed in combination with the first embodiment depicted in FIG. 8 to form a symmetrical circuit configuration, thereby making it possible to reduce a ripple current flowing through each module.

Assume a situation where a solar cell module PV1 is shaded in the solar cell adjustment system according to the second embodiment depicted in FIG. 26. FIGS. 27a to 27d depict pathways of currents flowing through a circuit in modes 2 to 4 and 1, when ON/OFF states of switches Qa and Qb are switched according to the graph of $V_{GS}$ in FIG. 9, in the above situation.

It should be noted that, in these figures, capacitor Cout1a to Cout4a and Cout1b to Cout4b are omitted.

Figure 27A:
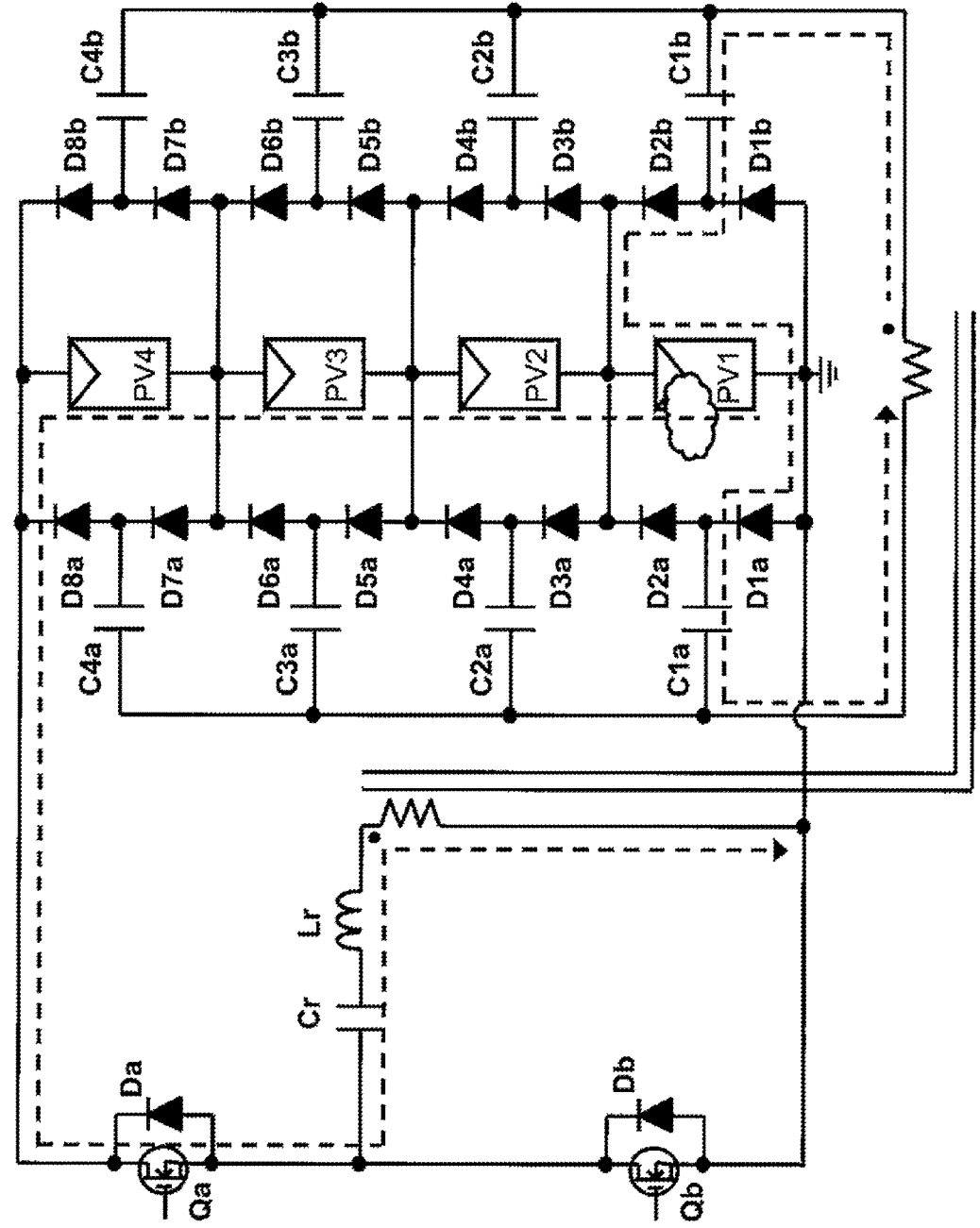
FIG. 27a is a diagram depicting a pathway of current flowing during a period of mode 2, when the solar cell adjustment system in FIG. 26 is activated in a situation where a solar cell module PV1 is shaded.
Figure 27B:
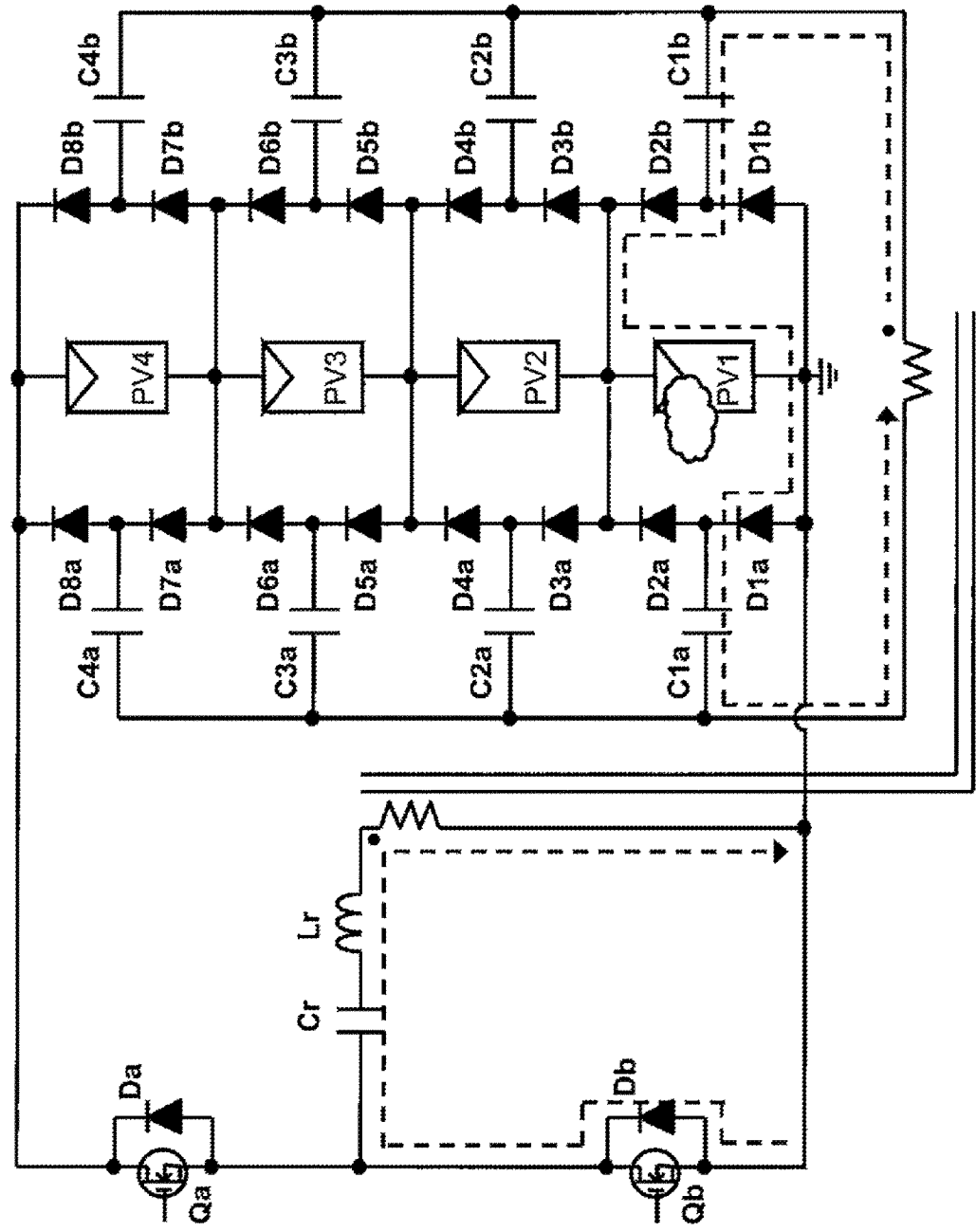
FIG. 27b is a diagram depicting a pathway of current flowing during a period of mode 3, when the solar cell adjustment system in FIG. 26 is activated in the situation where the solar cell module PV1 is shaded.
Figure 27C:
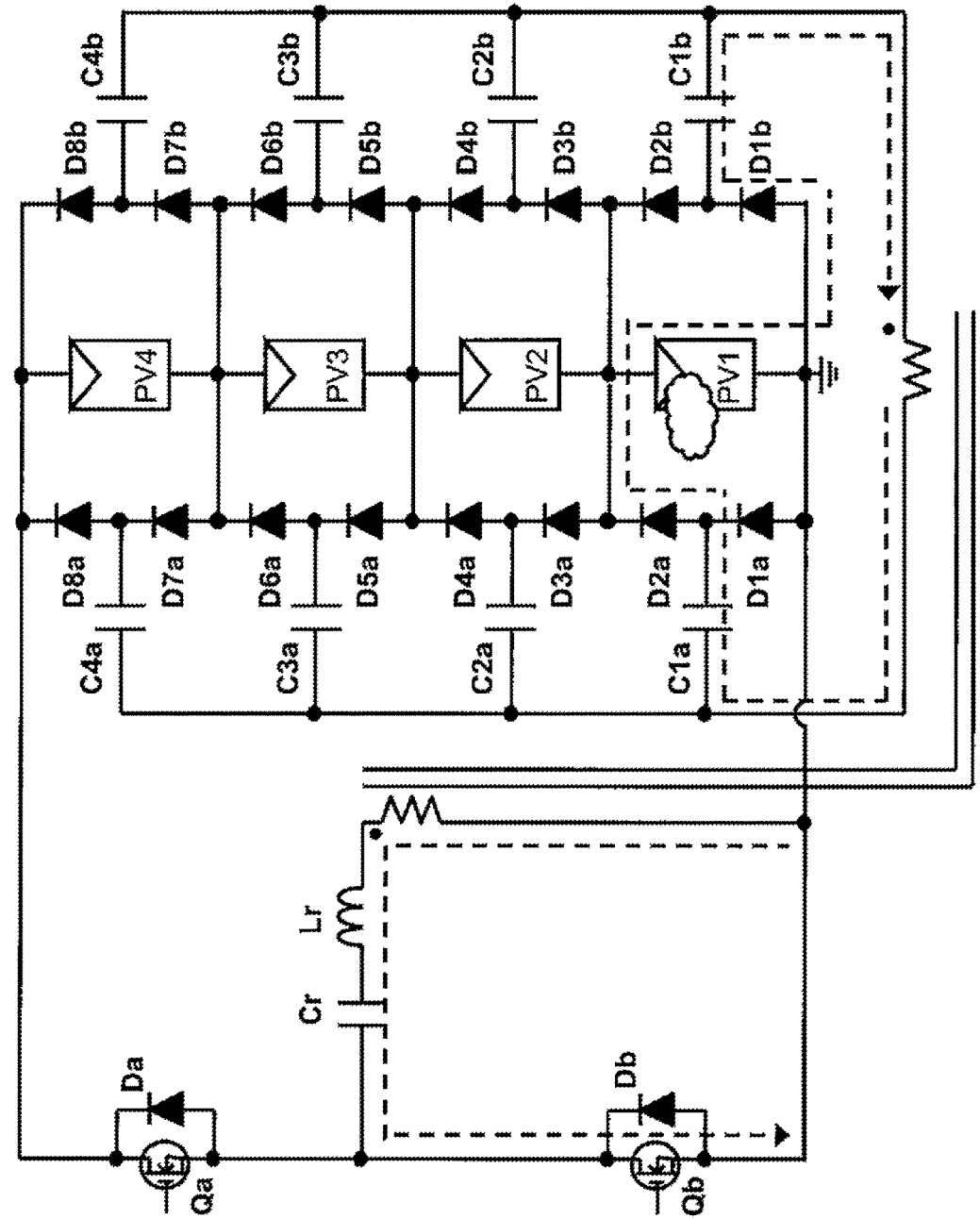
FIG. 27c is a diagram depicting a pathway of current flowing during a period of mode 4, when the solar cell adjustment system in FIG. 26 is activated in the situation where the solar cell module PV1 is shaded.
Figure 27D:
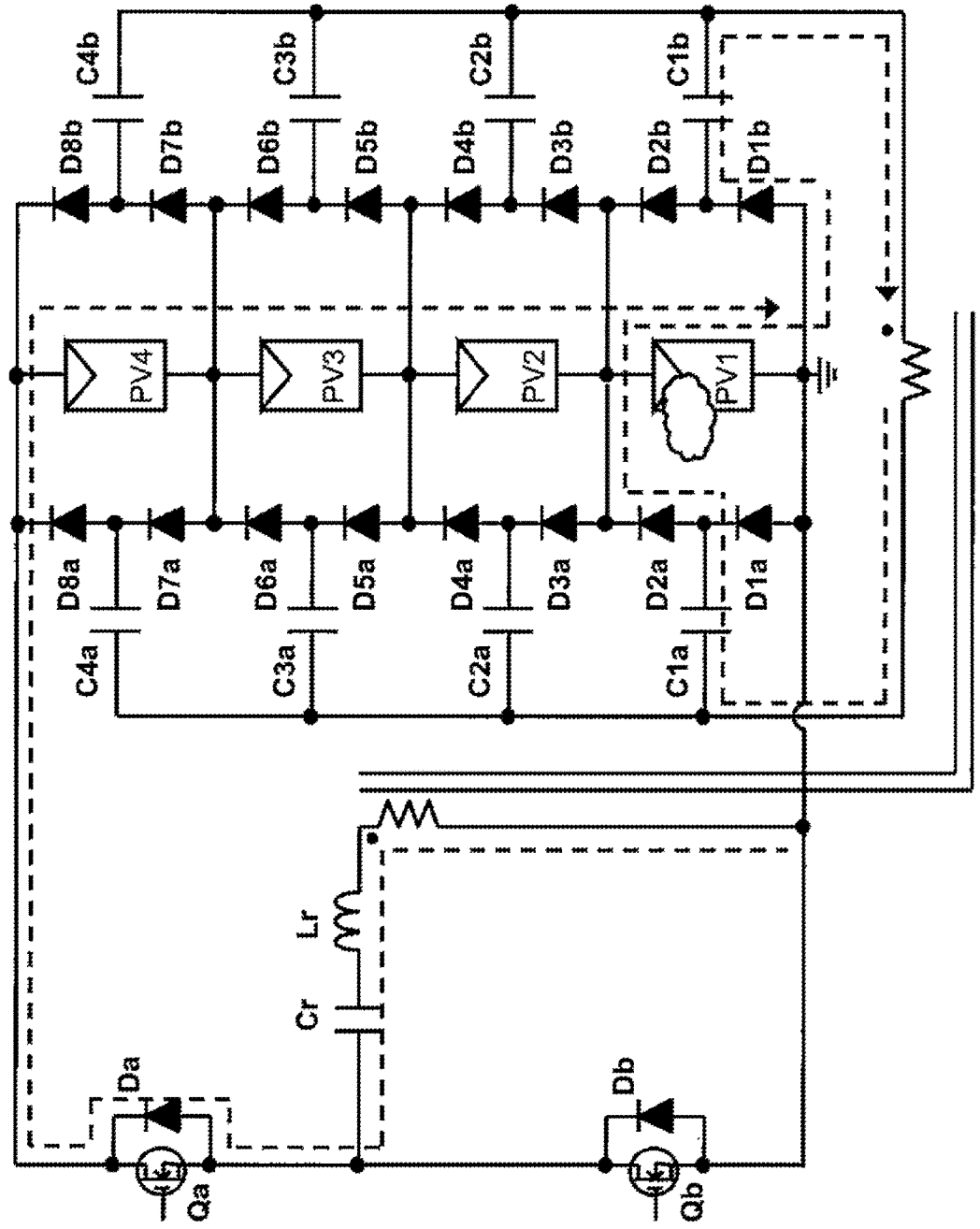
FIG. 27d is a diagram depicting a pathway of current flowing during a period of mode 1, when the solar cell adjustment system in FIG. 26 is activated in the situation where the solar cell module PV1 is shaded.

In the modes 2 and 3, a discharge current of an intermediate capacitor C1b routed through a secondary winding of a transformer flows as a compensation current into the shaded module PV1 via a diode D2b, and this current also charges an intermediate capacitor C1a after being routed through a diode D1a (FIGS. 27a and 27b). In the modes 4 and 1, a discharge current of the intermediate capacitor C1a routed through the secondary winding of the transformer flows as a compensation current into the shaded module PV1 via a diode D2a, and this current also charges the intermediate capacitor C1b after being routed through a diode D1b (FIGS. 27c and 27d).

Fundamental operating waveforms of a current flowing through each element and a voltage applied to each element are the same as those depicted in FIG. 9.

In the current pathways in the first embodiment, depicted in FIGS. 10a to 10d, when a compensation current is supplied from the multi-stage voltage multiplier rectification circuit to the shaded module PV1, the compensation current (a current supplied via the secondary winding of the transformer) also flows through the insolated module PV2.

Although substantially no compensation current is supplied to the insolated module PV2 because an average current to be supplied from the voltage multiplier circuit to the insolated module PV2 is zero, a ripple current flows as depicted in the figures.

If the ripple current component is large, the operating point of the insolated module PV2 fluctuates around $V_{MP}$, thereby possibly leading to unstable operation.

In contrast, in the current pathways depicted in FIGS. 27a to 27b, the compensation routed through the secondary winding of the transformer flows through only the shaded module PV1.

Further, assumes a situation where a solar cell module PV3 is shaded. In this situation, in the modes 2 and 3, a discharge current of an intermediate capacitor C3b routed through the secondary winding of the transformer flows as a compensation current into the shaded module PV3 via a diode D6b, and this current also charges an intermediate capacitor C3a after being routed through a diode D5a. Then, in the modes 4 and 1, a discharge current of the intermediate capacitor C3a routed through the secondary winding of the transformer flows as a compensation current into the shaded module PV3 via a diode D6a, and this current also charges the intermediate capacitor C3b after being routed through a diode D5b. Therefore, the compensation also flows through only the shaded module PV3.

As above, in the second embodiment, a current is supplied from the secondary winding of the transformer to only the shaded module, without being supplied from the secondary winding of the transformer to any other insolated module, so that it becomes possible to reduce a ripple current in the insulated module as compared to the first embodiment.

Further, in the solar cell adjustment system depicted in FIG. 26, due to an impedance generated on the pathways of the compensation current by a resistance, and a capacitor and an inductor comprised in an inverter and a multi-stage voltage multiplier rectification circuit, a voltage drop occurs in a shaded module, as with the system depicted in FIG. 8.

Thus, the shaded module is maintained at a relatively low voltage as compared to a voltage across an insolated module. Further, a value of the impedance can be controlled, for example, by the frequency control based on the flowchart of FIG. 20 or 21, to adjust a level of the voltage drop to thereby lead the shaded module toward around an MPP.

Although not described in FIG. 26, generally, a load is additionally connected to a solar cell module string via a DC-DC converter or the like (FIG. 7). In a typical usage mode, a frequency of the switched Qa and Qb in FIG. 26 is adjusted to adjust the voltage drop of the shaded module, while a voltage to be applied to the entire solar cell module string is adjusted by control of the DC-DC converter, thereby allowing all of the solar cell modules to come close to different MPP, individually.

(Variations of Specific Circuit Configuration)

A specific circuit configuration of the solar cell adjustment system according to the present invention is not limited to the configurations depicted in FIGS. 8 and 27, but may be appropriately modified within the scope of the present invention.

For example, a connection point between the inverter and the multi-stage voltage multiplier rectification circuit may be arbitrarily selected.

Figure 28:
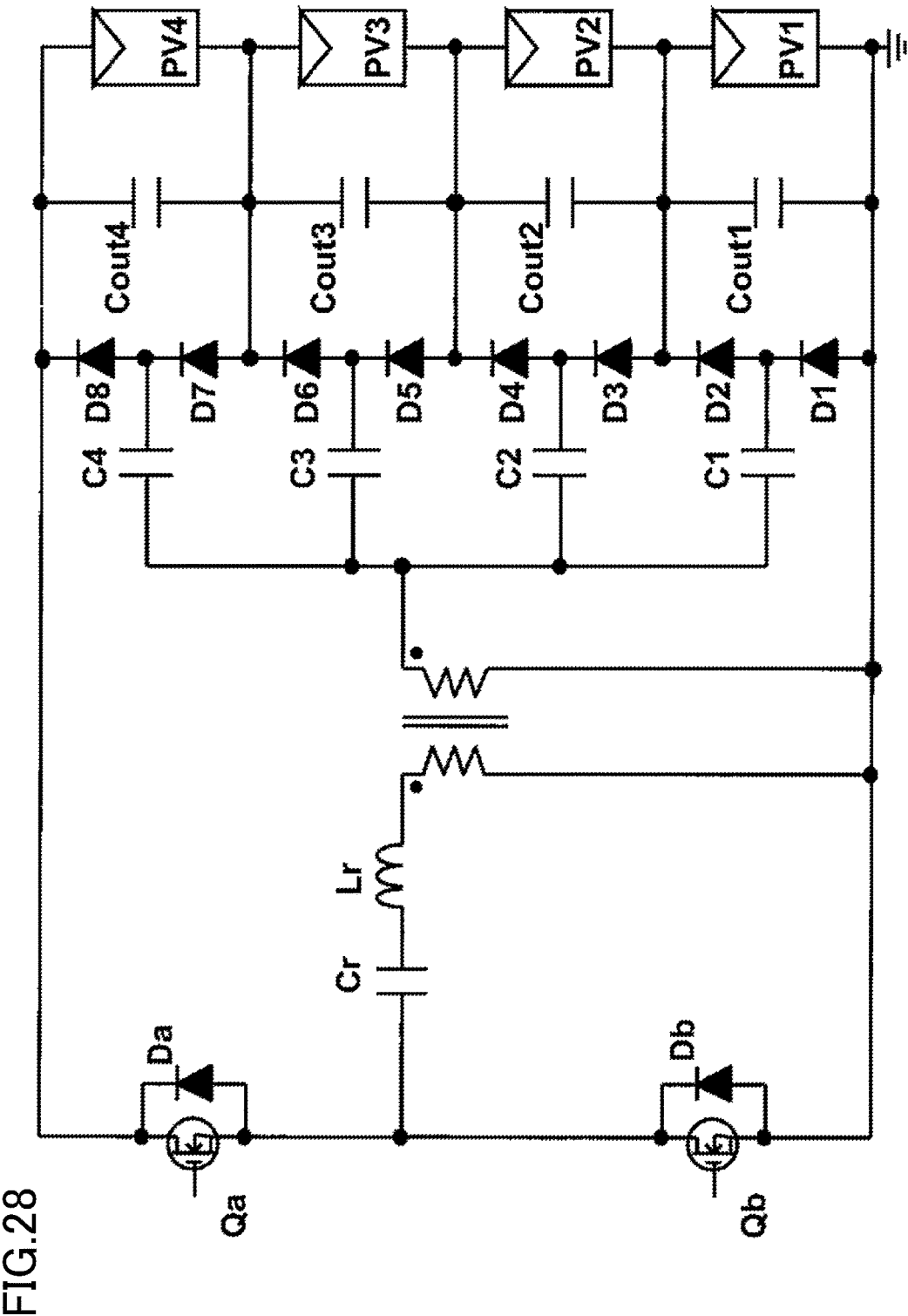
FIG. 28 is a circuit diagram of a solar cell adjustment system according to one embodiment of the present invention.

As one example, FIG. 28 depicts a circuit configuration of a solar cell adjustment system according to the present invention, wherein the connection point is changed in the circuit configuration in FIG. 8.

This system having such a circuit configuration can operate by the same principle as that in the above embodiments.

Assume a situation where the solar cell module PV1 is shaded in the solar cell adjustment system according the modified embodiment depicted in FIG. 28. FIGS. 29a to 29d depict pathways of currents flowing through the circuit in modes 2 to 4 and 1, when the ON/OFF states of the switches Qa and Qb are switched according to the graph of $V_{GS}$ in FIG. 9, in the above situation.

Figure 29A:
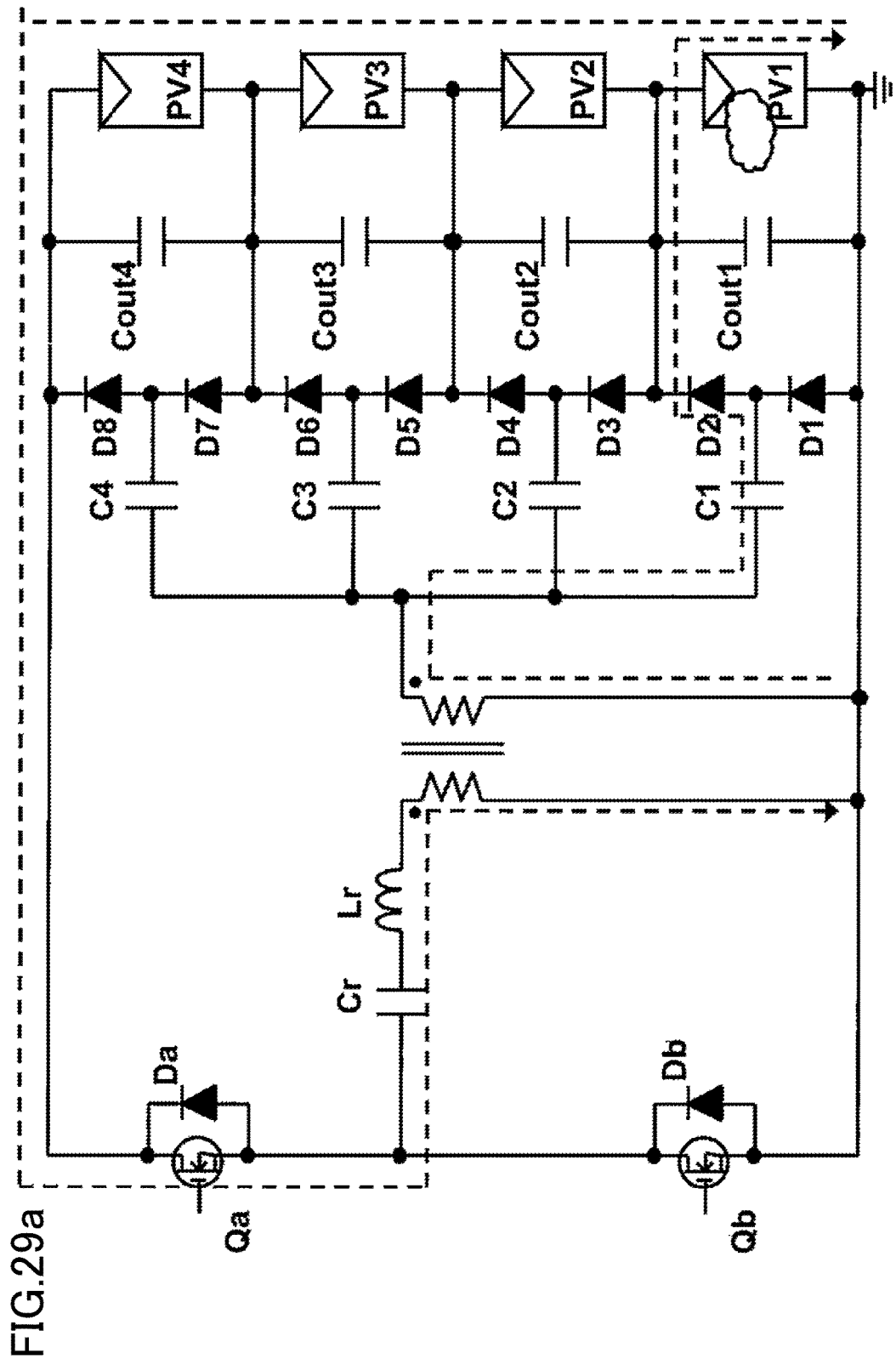
FIG. 29a is a diagram depicting a pathway of current flowing during a period of mode 2, when the solar cell adjustment system in FIG. 28 is activated in a situation where a solar cell module PV1 is shaded.
Figure 29B:
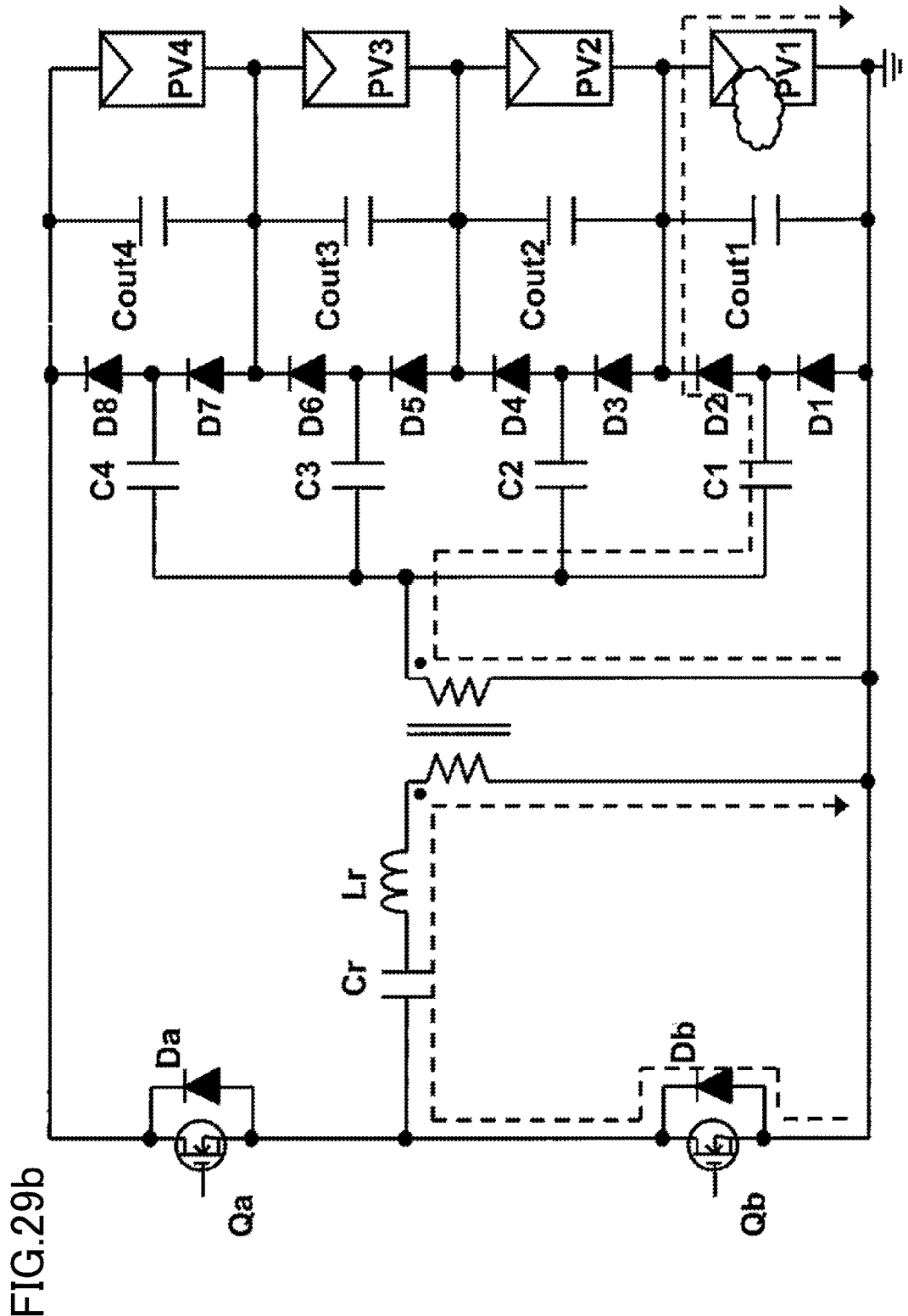
FIG. 29b is a diagram depicting a pathway of current flowing during a period of mode 3, when the solar cell adjustment system in FIG. 28 is activated in the situation where the solar cell module PV1 is shaded.

In the modes 2 and 3, a discharge current of the intermediate capacitor C1 routed through the secondary winding of the transformer flows as a compensation current into the shaded module PV1 via the diode D2 (FIGS. 29a and 29b).

Figure 29C:
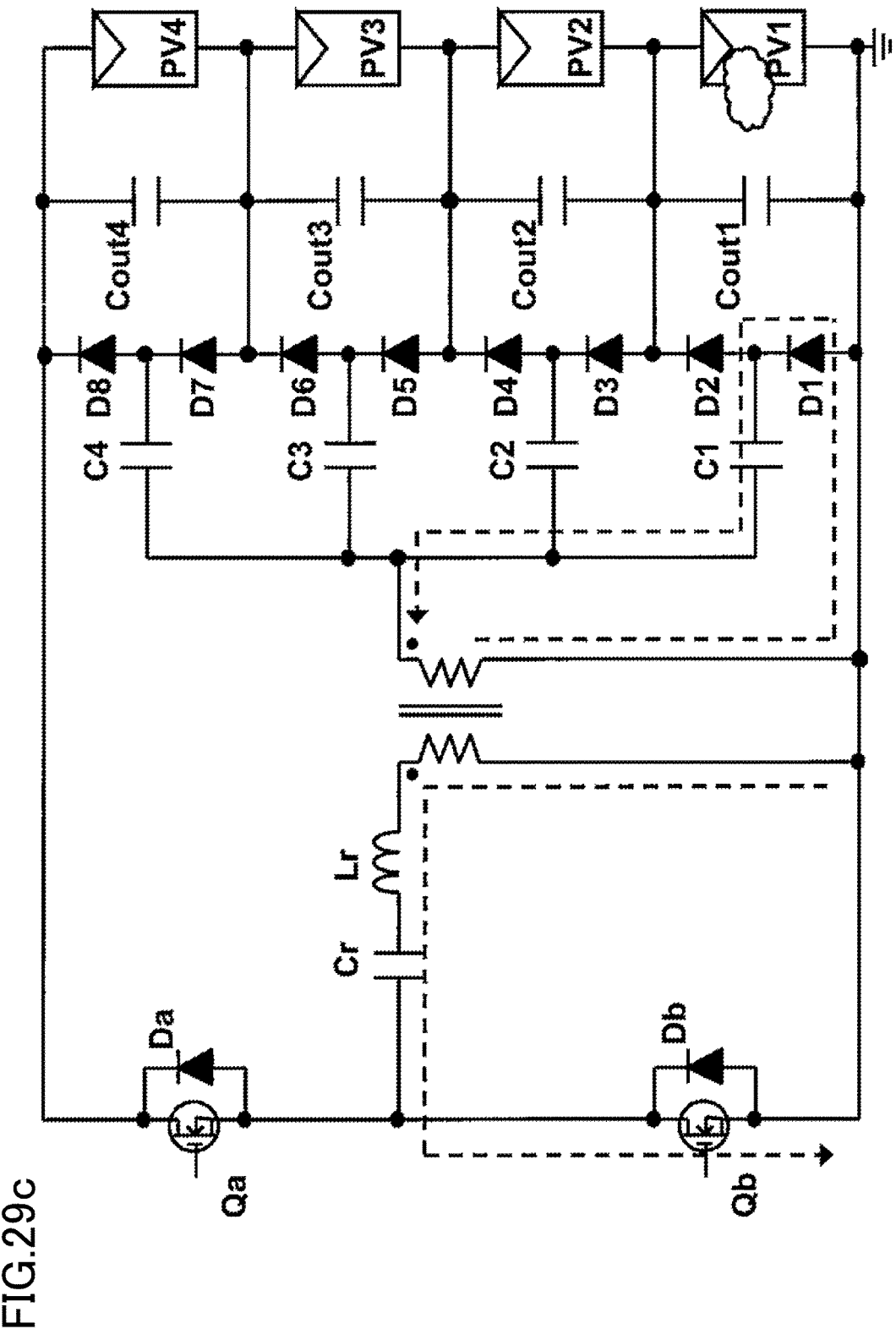
FIG. 29c is a diagram depicting a pathway of current flowing during a period of mode 4, when the solar cell adjustment system in FIG. 28 is activated in the situation where the solar cell module PV1 is shaded.
Figure 29D:
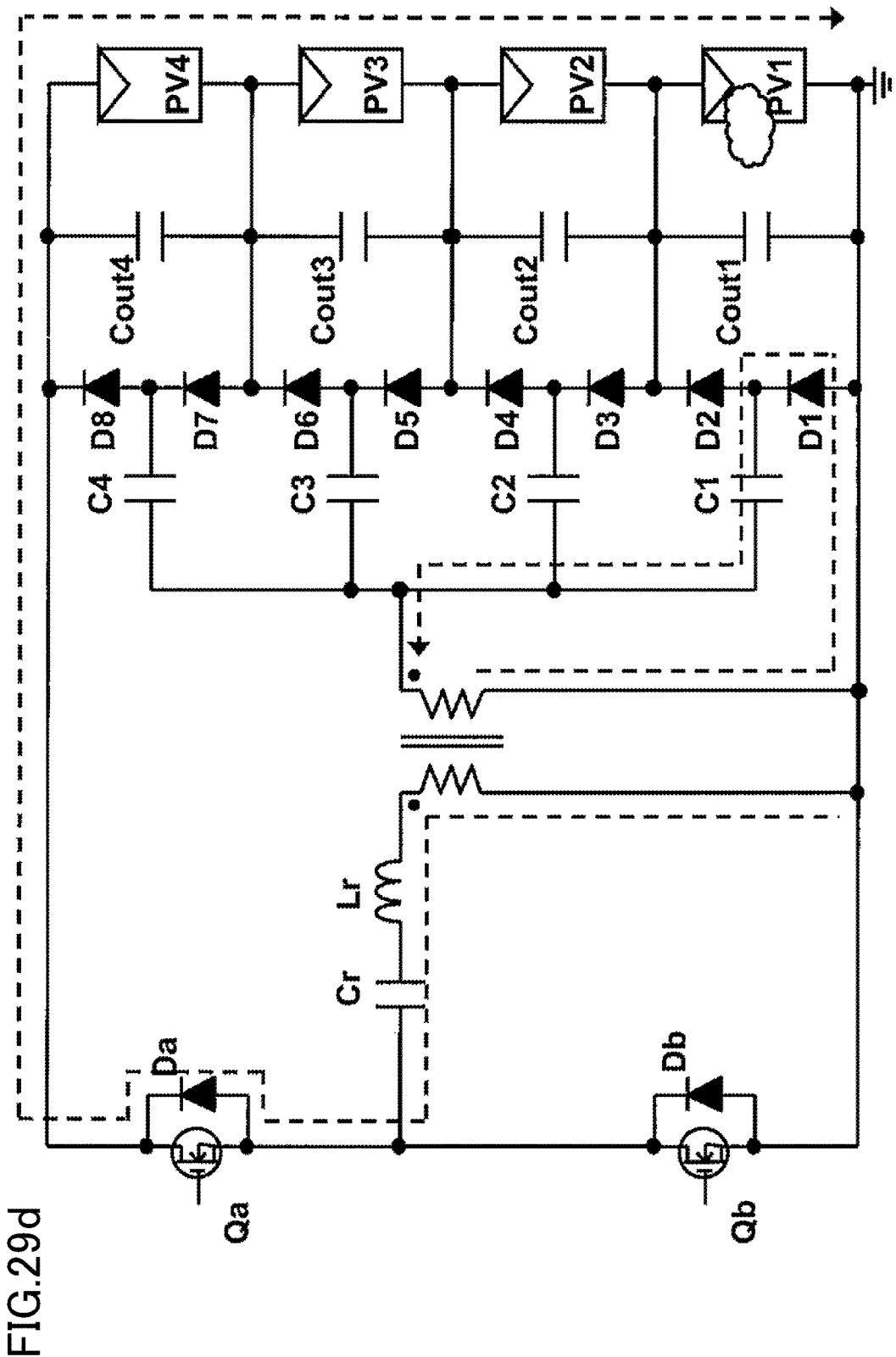
FIG. 29d is a diagram depicting a pathway of current flowing during a period of mode 1, when the solar cell adjustment system in FIG. 28 is activated in the situation where the solar cell module PV1 is shaded.

In the modes 4 and 1, a current routed through the secondary winding of the transformer charges the intermediate capacitor C1 after being routed through the diode D1 (FIGS. 29c and 29d).

Fundamental operating waveforms of a current flowing through each element and a voltage applied to each element are the same as those depicted in FIG. 9.

As another modification, the solar cell adjustment system according to the present invention may be constructed without using any transformer.

Figure 30:
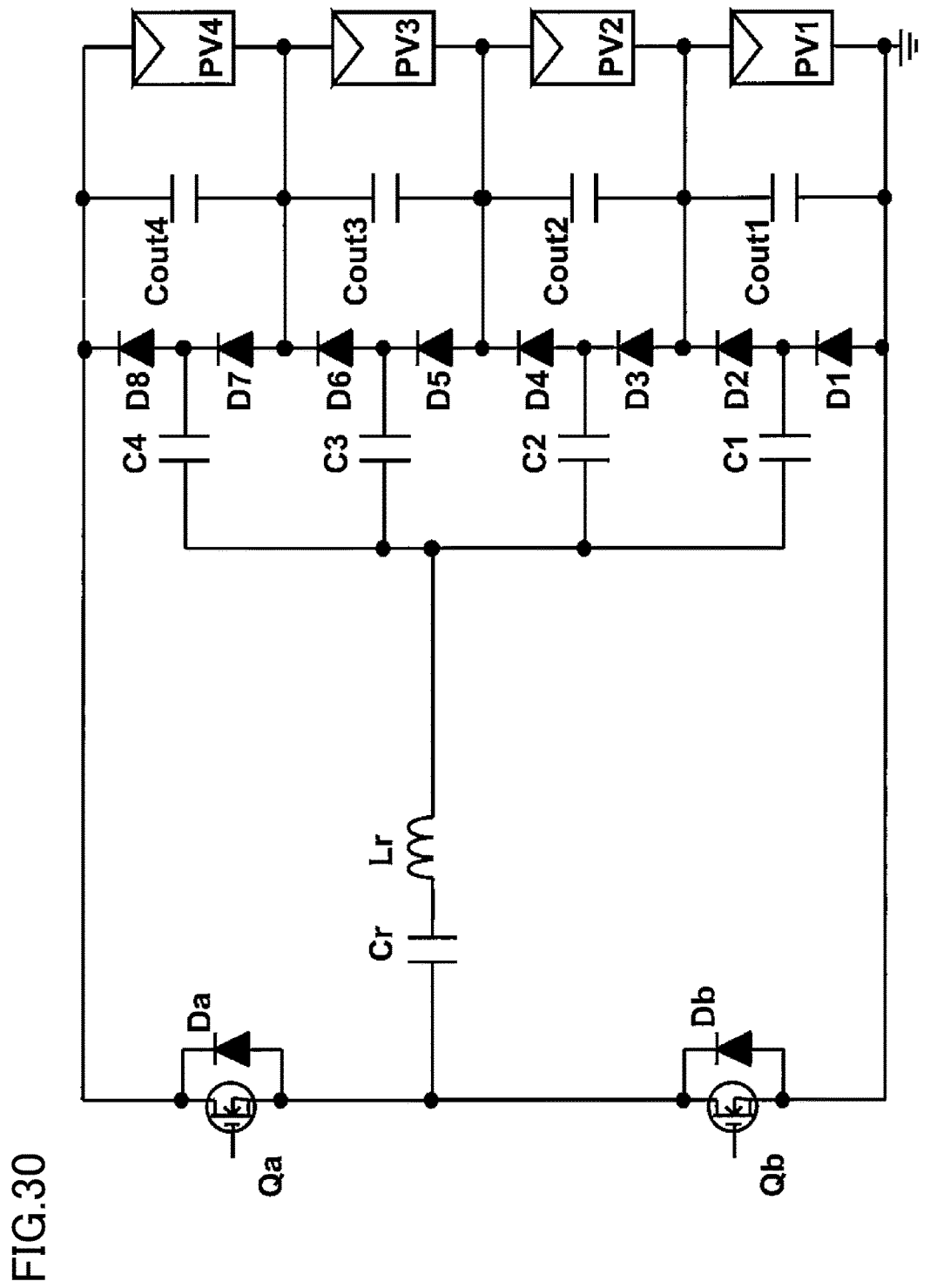
FIG. 30 is a circuit diagram of a solar cell adjustment system according to one embodiment of the present invention.
Figure 31A:
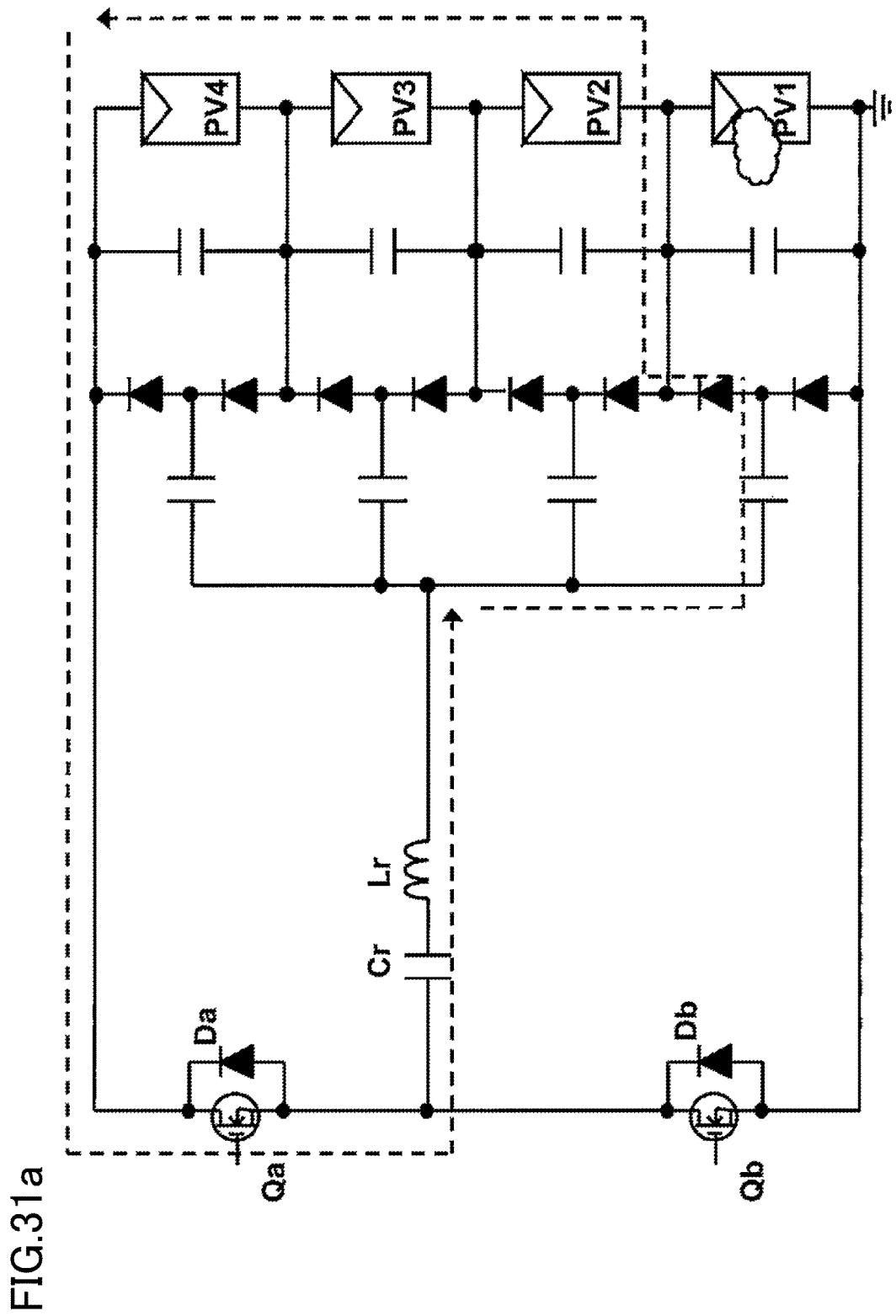
FIG. 31a is a diagram depicting a pathway of current flowing during a period of mode 2, when the solar cell adjustment system in FIG. 30 is activated in a situation where a solar cell module PV1 is shaded.
Figure 31B:
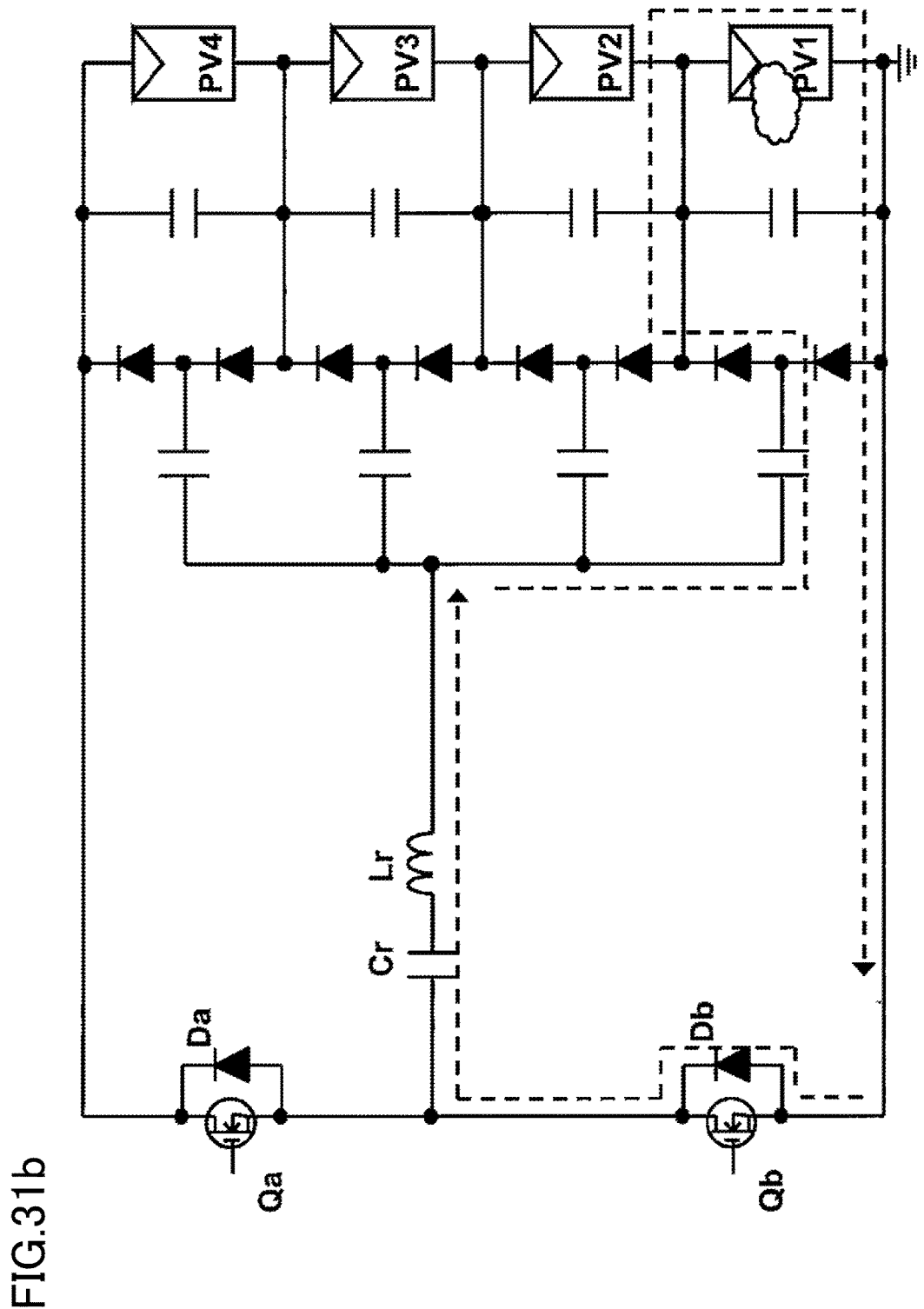
FIG. 31b is a diagram depicting a pathway of current flowing during a period of mode 3, when the solar cell adjustment system in FIG. 30 is activated in the situation where the solar cell module PV1 is shaded.
Figure 31C:
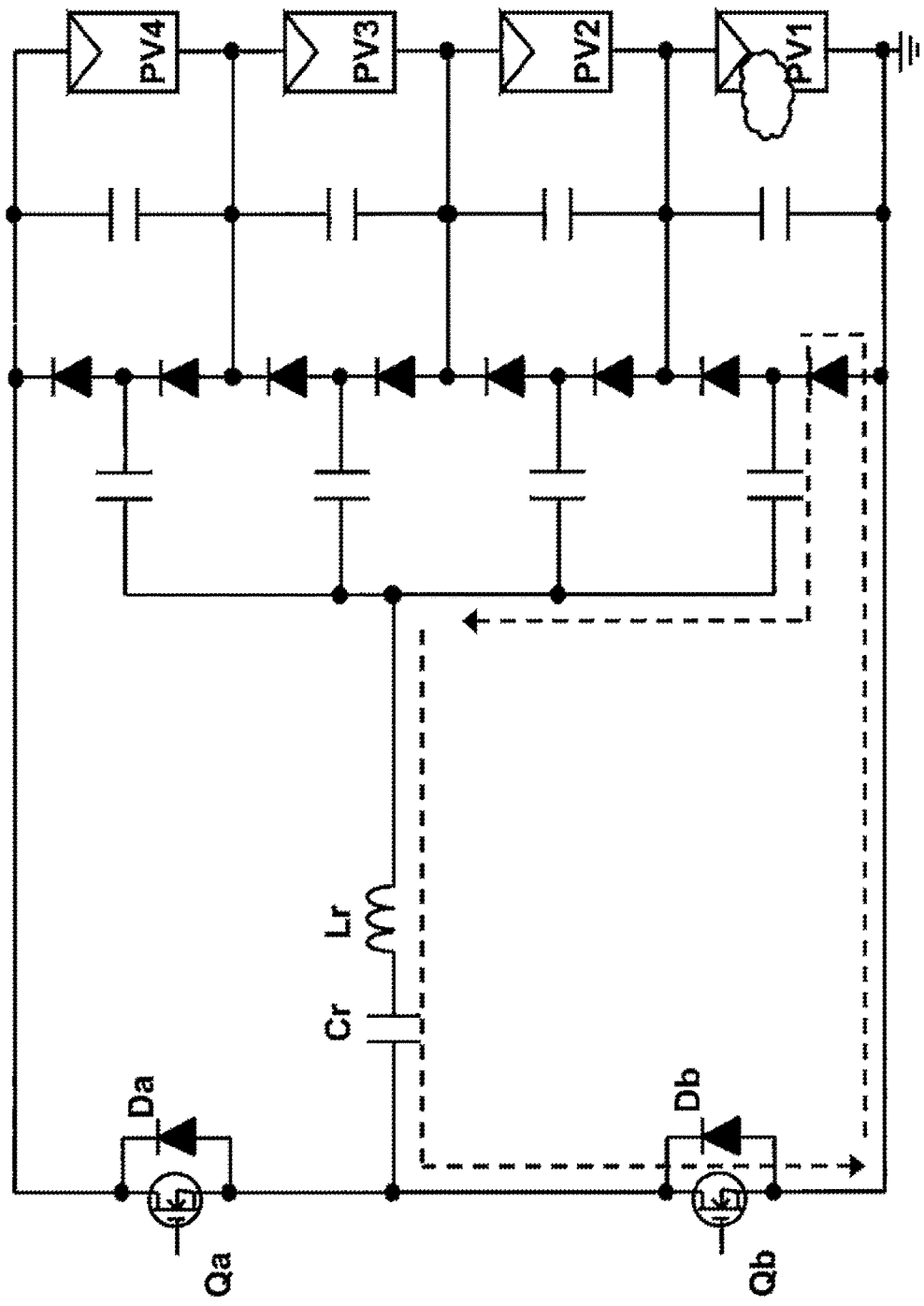
FIG. 31c is a diagram depicting a pathway of current flowing during a period of mode 4, when the solar cell adjustment system in FIG. 30 is activated in the situation where the solar cell module PV1 is shaded.
Figure 31D:
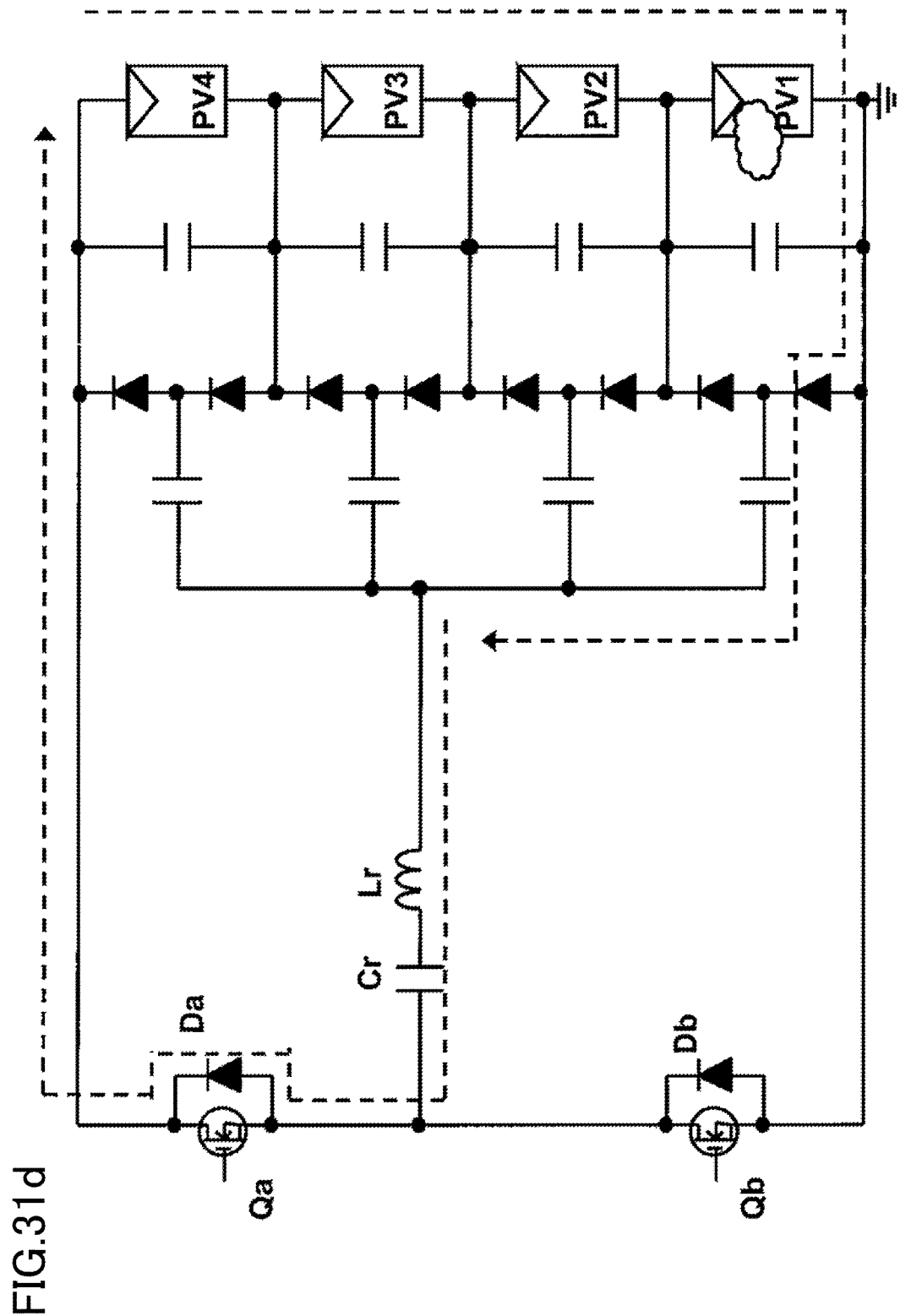
FIG. 31d is a diagram depicting a pathway of current flowing during a period of mode 1, when the solar cell adjustment system in FIG. 30 is activated in the situation where the solar cell module PV1 is shaded.

FIG. 30 depicts one example of a circuit configuration of such a system.

Assume a situation where the solar cell module PV1 is shaded in the solar cell adjustment system according the modified embodiment depicted in FIG. 30. FIGS. 31a to 31d depict pathways of currents flowing through the circuit in modes 2 to 4 and 1, when the ON/OFF states of the switches Qa and Qb are switched according to the graph of $V_{GS}$ in FIG. 9, in the above situation. A compensation current flows into the shaded module PV1 in the mode 3 (FIG. 31b) and the mode 1 (FIG. 31d), whereas compensation currents supplied to an insolated module become zero when they are averaged in the whole modes 1 to 4.

In the solar cell adjustment systems depicted in FIGS. 28 and 30, due to an impedance generated on the pathways of the compensation current by a resistance, and the capacitor and the inductor comprised in the inverter and the multi-stage voltage multiplier rectification circuit, a voltage drop occurs in a shaded module, as with the system depicted in FIG. 8.

Thus, the shaded module is maintained at a low voltage. Further, a value of the impedance can be controlled, for example, by the frequency control based on the flowchart of FIG. 20 or 21, to adjust a level of the voltage drop to thereby lead the shaded module toward around an MPP.

As a typical usage mode, a load is connected via a DC-DC converter or the like, as depicted in FIG. 7, and the frequency of the switched Qa and Qb is adjusted to adjust the voltage drop of the shaded module, while a voltage to be applied to the entire solar cell module string is adjusted by control of the DC-DC converter, thereby allowing all of the solar cell modules to come close to different MPP, individually.

In the above embodiments, the inverter is constructed by connecting a half-bridge cell, and a resonant circuit comprising a series-connection of a capacitor Cr and an inverter Lr. However, the inverter for used in the solar cell adjustment system according to the present invention is not limited thereto.

The system according to the present invention can operate by the same principle as long as the inverter is capable of converting a voltage of the solar cell module string to an AC voltage and inputting the AC voltage into the multi-stage voltage multiplier rectification circuit.

Figure 32:
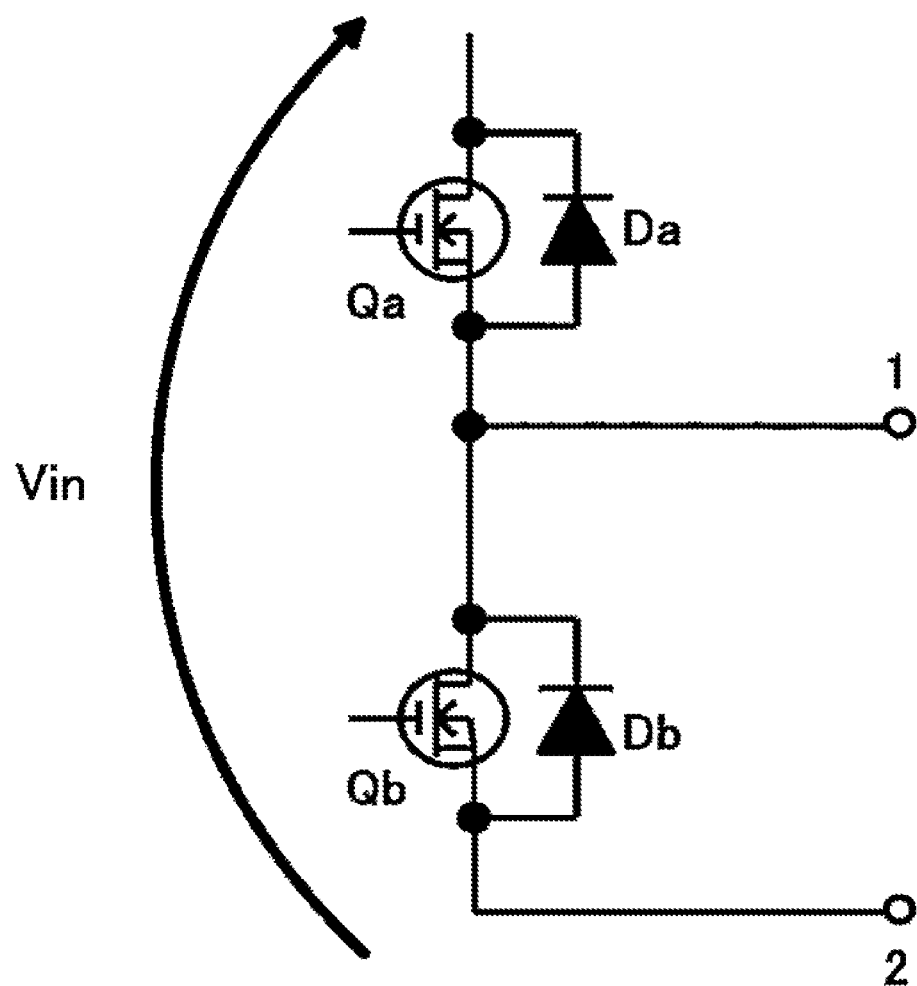
FIG. 32 is a circuit diagram of a half-bridge cell.
Figure 33:
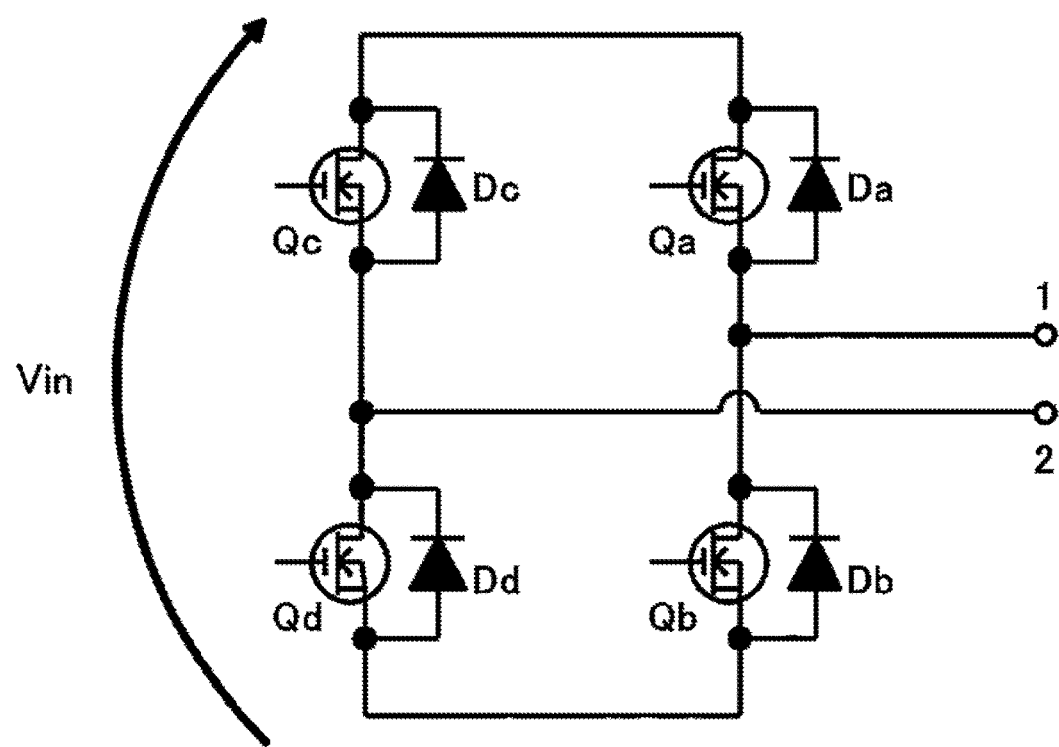
FIG. 33 is a circuit diagram of a full-bridge cell.

For example, instead of the half-bridge cell (FIG. 32), a full-bridge cell (FIG. 33) may be employed.

The full-bridge cell is constructed by connecting a switch group composed of series-connected switches Qa and Qb in parallel to a switch group composed of series-connected switches Qc and Qd, and connecting flywheel diodes Da to Dd in parallel, respectively, to the switches.

By switching a connection state between a state in which the switches Qa and Qd are turned on, and a state in which the switches Qb and Qc are turned on, over time, under a condition that a voltage Vin is input between opposite ends of the series-connected switches Qa and Qb (between opposite ends of the series-connected switches Qc and Qd), a rectangular wave-shaped voltage having a peak voltage Vin and a bottom voltage−Vin is output between terminals 1 and 2.

In the case where the full-bridge cell is used as an input circuit, it is necessary to allow voltage levels of the full-bridge circuit and the multi-stage voltage multiplier rectification circuit to become independent from each other, for example, by using a resonant circuit provided with a transformer, in a subsequent stage.

Figure 34:
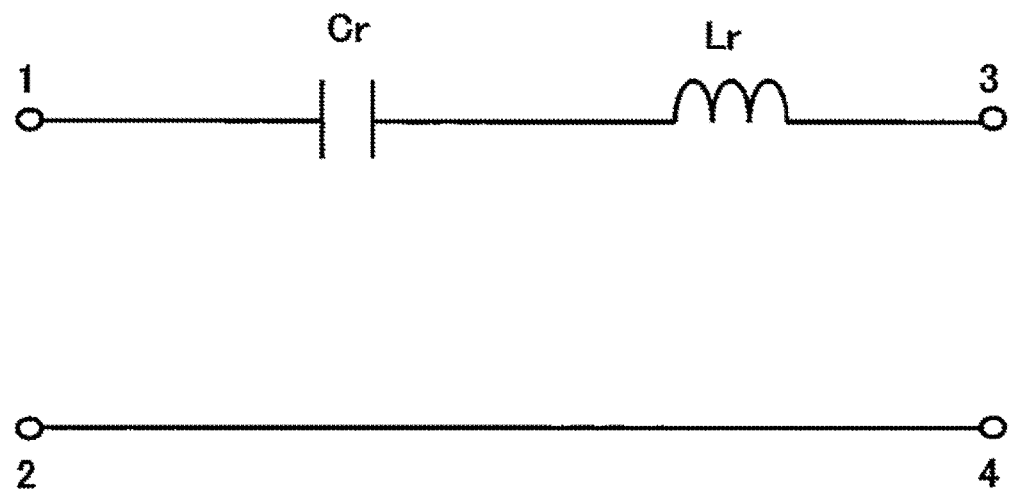
FIG. 34 is a circuit diagram of a series resonant circuit.
Figure 35:
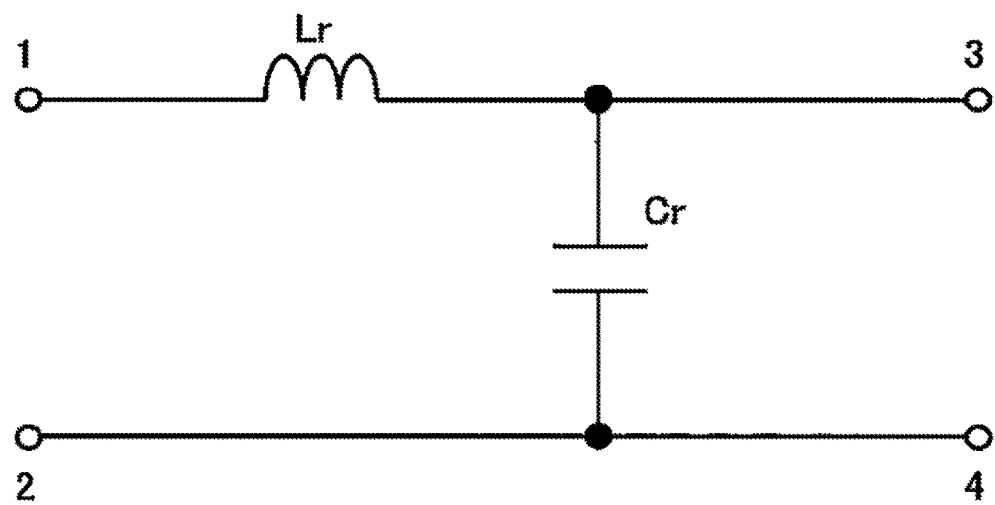
FIG. 35 is a circuit diagram of a parallel resonant circuit.
Figure 36:
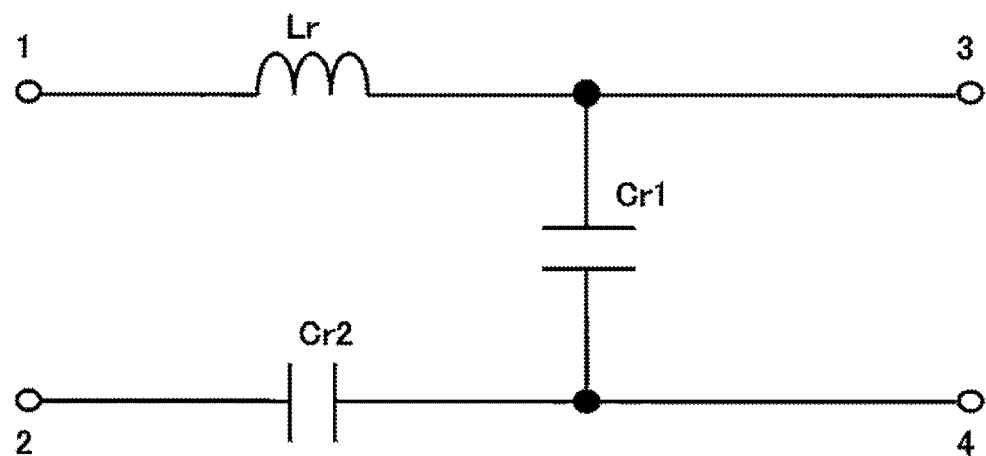
FIG. 36 is a circuit diagram of a series-parallel resonant circuit.
Figure 37:
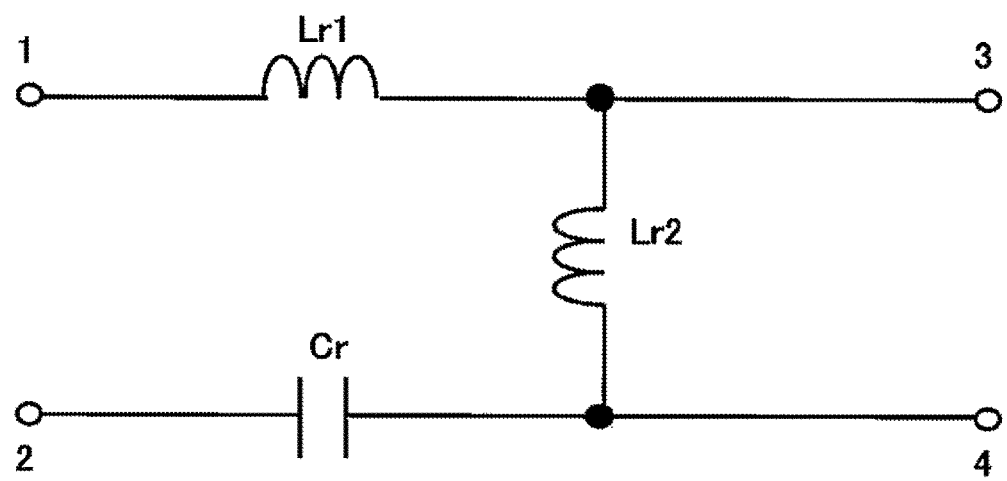
FIG. 37 is a circuit diagram of an LLC circuit.

Further, instead of the resonant circuit comprising a series-connection of a capacitor Cr and an inductor Lr (FIG. 34), a parallel resonant circuit (FIG. 35), a series-parallel resonant circuit (FIG. 36), an LLC circuit (FIG. 37) or the like may be employed. In this case, it is also possible to convert an input DC voltage to an AC voltage to allow the solar cell adjustment system according to the present invention to operate.

Even if any type of resonant circuit is employed, a conductive wire may be provided between terminals 3 and 4 in the figures and wound around a core, and a secondary winding may further be wound around the core to form a transformer. This makes it possible to transform an AC voltage applied between the terminals 3 and 4 and then output the transformed AC voltage to the multi-stage voltage multiplier rectification circuit connected to opposite ends of the secondary winding.

The above embodiments have been described based on an example where the equivalent output resistance Rout is controlled by changing the switching frequency. However, even if it is impossible to perform the frequency control, a voltage across a shaded module can be lowered as compared to a voltage across an insolated module, because a voltage drop occurs due to an impedance generated on pathways of a compensation current, and the shaded module is not "charged", so that it is possible to lead an operation point of the shaded module to come closer to an MPP than before.

Fourth to Sixth Aspects of Present Invention

With reference to the drawings, solar cell adjustment systems, a minimum current detection system and a minimum current control system according to the fourth to sixth aspects of the present invention will now be described.

However, it should be noted that configurations of the systems according to the fourth to sixth aspects of the present invention are not limited to specific embodiments depicted in figures, but may be appropriately modified within the scope of the present invention. For example, although the following description will be made mainly on an assumption that each capacitor is a single energy storage element, it may be a module composed of any type of chargeable-dischargeable element, or a plurality of chargeable-dischargeable elements, or any device constructed using such modules.

The energy storage elements may be different from each other in terms of capacitance, and other circuit elements, such as diodes or indictors, may also be different from each other in terms of characteristics.

Further, although the following embodiments will be described based on an example where a string (solar cell module string) is composed of four solar cell modules, the number of solar cell modules is not limited to four, but the solar cell module string may be composed of any number of series-connected solar cell modules.

As regards each switch, although the following description will be made on an assumption that each switch is a semiconductor switch such as MOSFET, any other electronic switch may also be used.

Concept of Solar Cell Adjustment System

Figure 38:
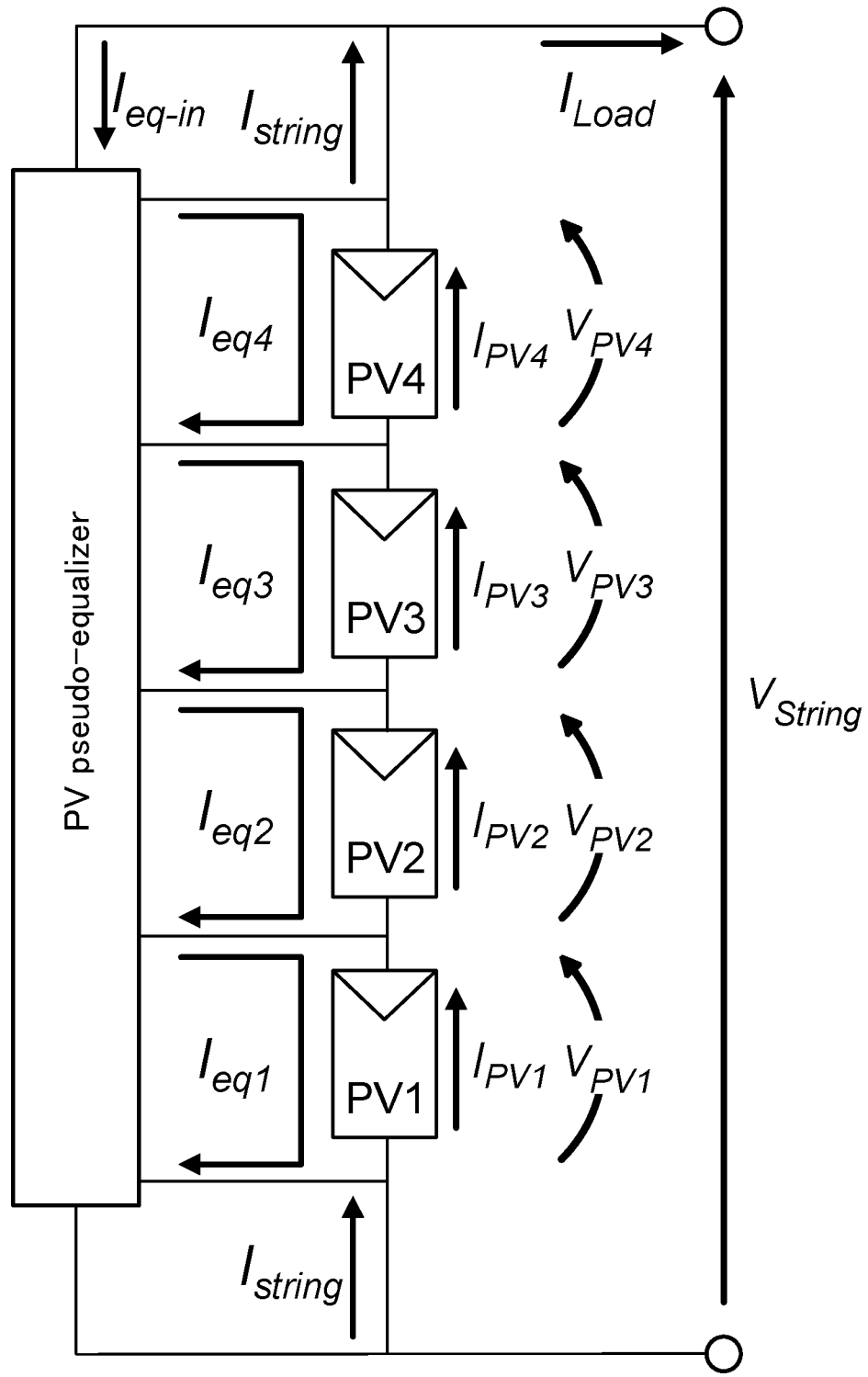
FIG. 38 is a conceptual diagram of a solar cell adjustment system according to the present invention.

FIG. 38 is a conceptual diagram of a solar cell adjustment system according to the present invention, wherein the system is constructed using four series-connected solar cell modules PV1 to PV4.

In FIG. 38, $V_{PV1}$ to $V_{PV4}$ denote, respectively, four voltages each applied to a respective one of the solar cell modules PV1 to PV4, and $I_{PV1}$ to $I_{PV4}$ denote, respectively, four currents each output from a respective one of the solar cell modules PV1 to PV4. $I_{eq1}$ to $I_{eq4}$ denote, respectively, four currents each supplied from a PV pseudo-equalizer to a respective one of the solar cell modules PV1 to PV4.

$I_{string}$ denotes a current flowing through an entire solar cell module string composed of the solar cell modules PV1 to PV4. This current contributes to a load current $i_{Load}$ which is output to a load (not depicted) connected to the solar cell module string, and an input current $I_{eq-in}$ to the PV pseudo-equalizer.

$V_{string}$ denotes a voltage applied across opposite ends of the string.

The PV pseudo-equalizer is applied with $V_{string}$, i.e., a summed voltage of $V_{PV1}$ to $V_{PV4}$, as input voltage, and supplied with the input current $I_{eq-in}$ from the solar cell modules PV1 to PV4.

Because the solar cell modules are connected in series to each other, each of the solar cell modules PV1 to PV4 operates to supply a current having the same magnitude, i.e., $I_{string}$.

However, a supplyable current of a shaded module is less than that of an insolated module. Thus, in many cases, the shaded module becomes failing to supply a current corresponding to $I_{string}$.

Figure 39:
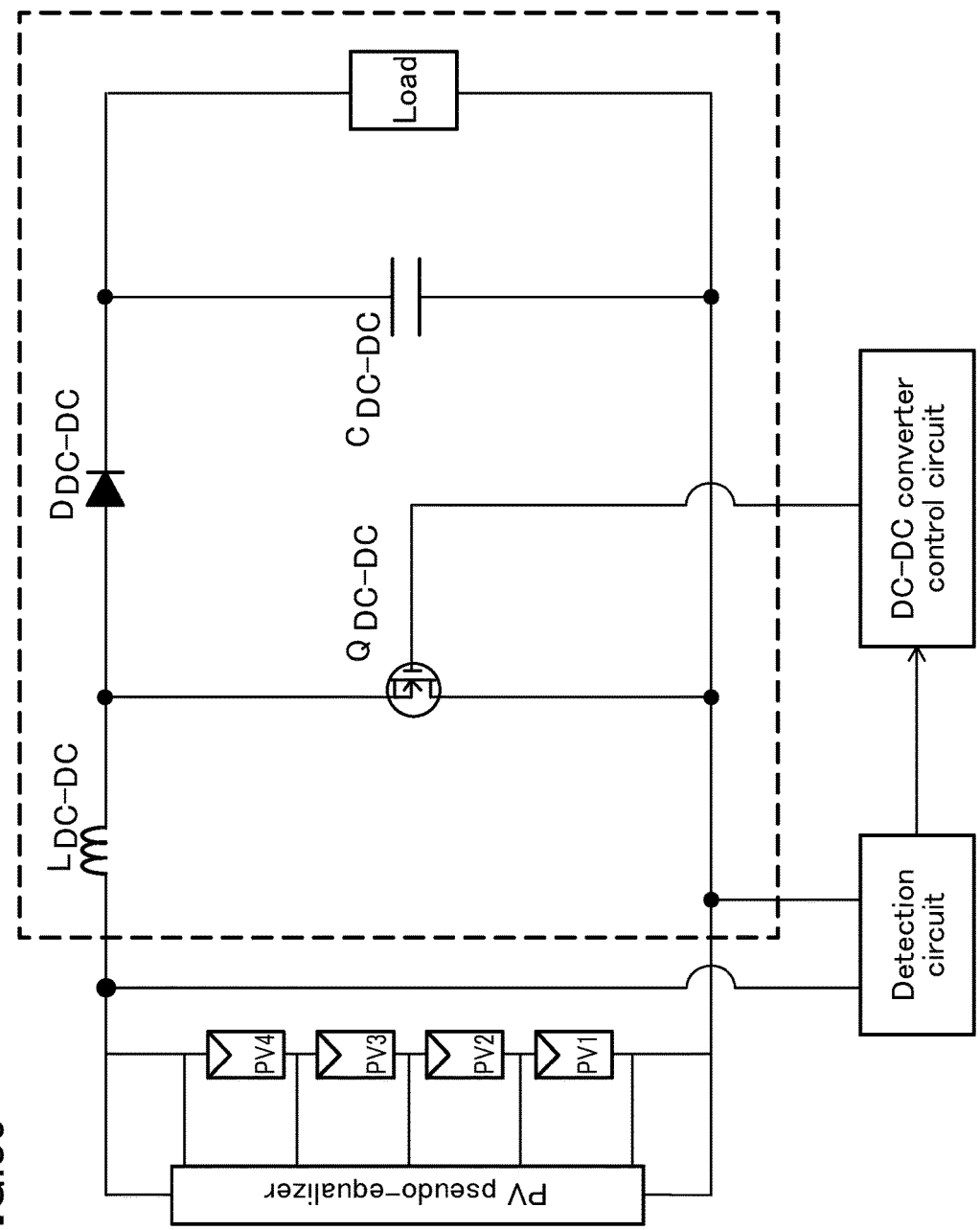
FIG. 39 is a circuit diagram of a configuration comprising a combination of the solar cell adjustment system according to the present invention and a DC-DC converter.

Examples of a usage mode of the solar cell adjustment system include a configuration in which a load is connected to the string via a DC-DC converter, as depicted in FIG. 39.

The DC-DC converter depicted in FIG. 39 is a boost converter, wherein the following relationship (17) is satisfied between the output voltage $V_{string}$ from the string and a load voltage $V_{Load}$:

$$\frac{V_{Load}}{V_{String}} = \frac{1}{1-D}, \qquad (17)$$

where D denotes a time ratio (a ratio of an ON period to an entire switching cycle) of a switch $Q_{DC\text{-}DC}$.

For example, when using a constant-voltage load, $V_{Load}$ becomes constant. Thus, by using a DC-DC converter control circuit to control the time ratio D, while using a detection circuit to detect electric power generated from the string or each of the solar cell modules, it is possible to control a voltage across each of the solar cell modules so as to obtain a maximum electric power.

Figure 1:
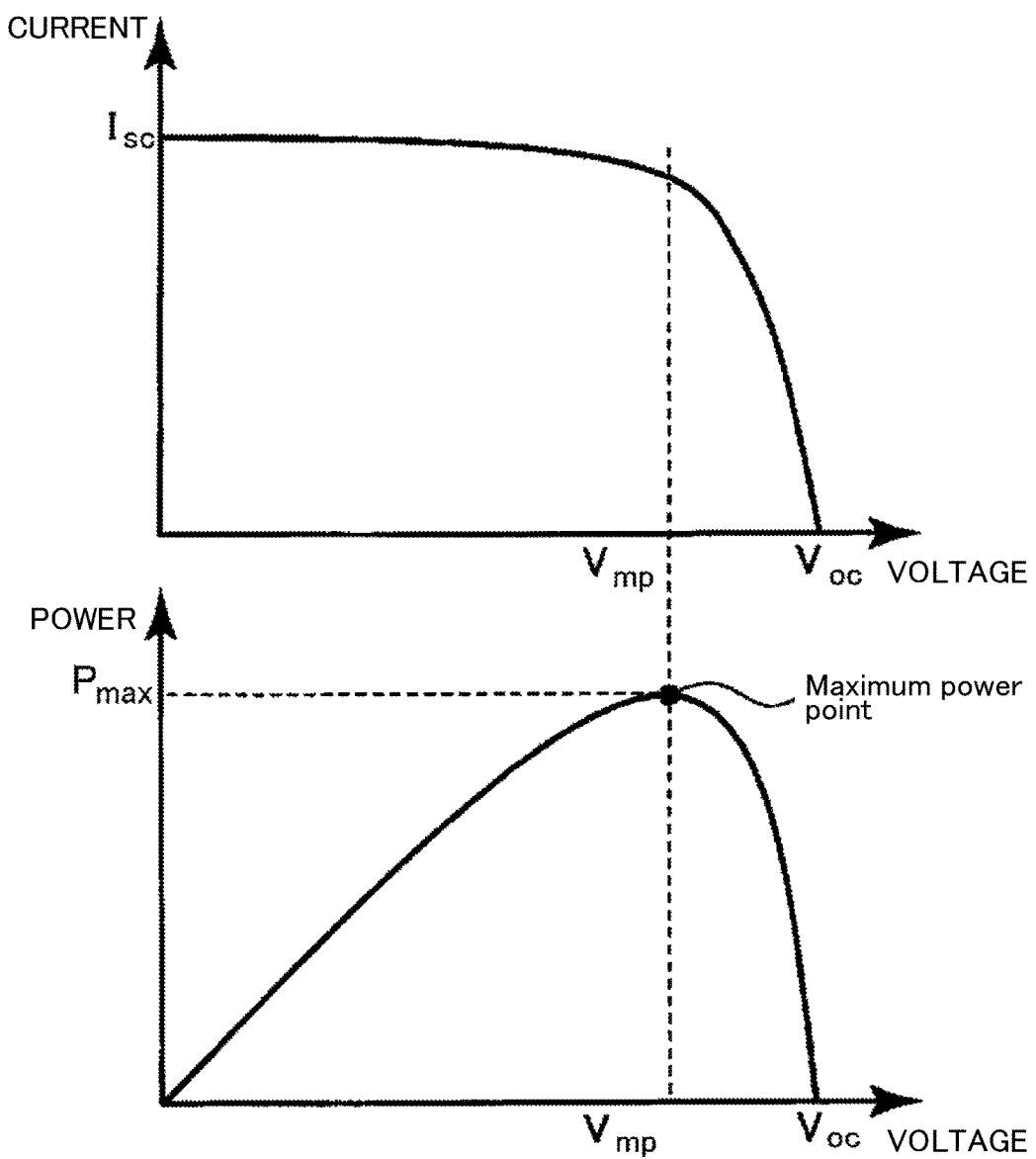
FIG. 1 is graphs depicting operating characteristics of a commonly-used solar cell.
Figure 2:
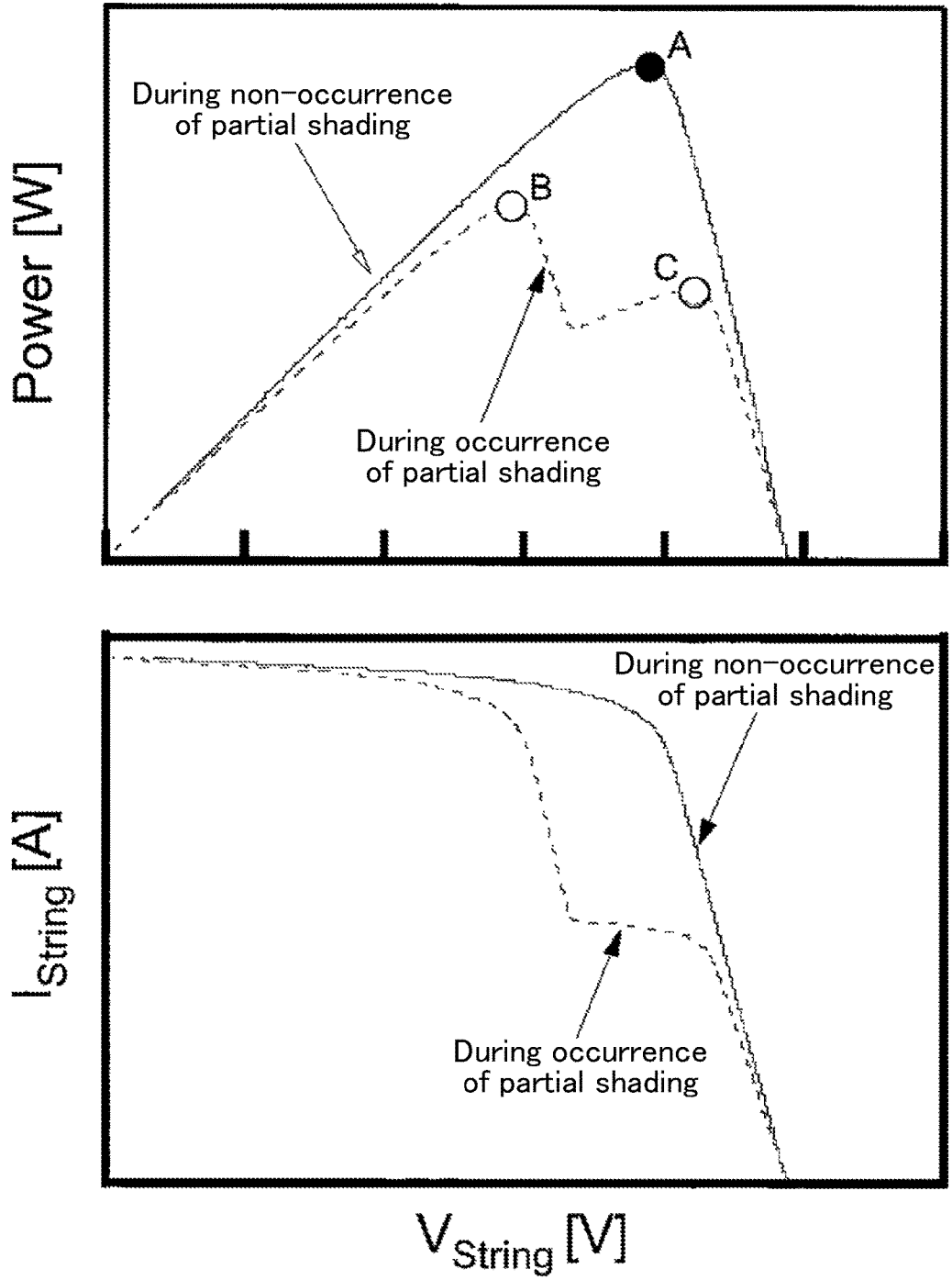
FIG. 2 is graphs depicting relationships between a voltage $V_{String}$ applied to an entire string and respective ones of a current $I_{String}$ flowing through the entire string and an output electric power Power of the entire string, in a state in which partial shading occurs and in a state in which no partial shading occurs.
Figure 3A:
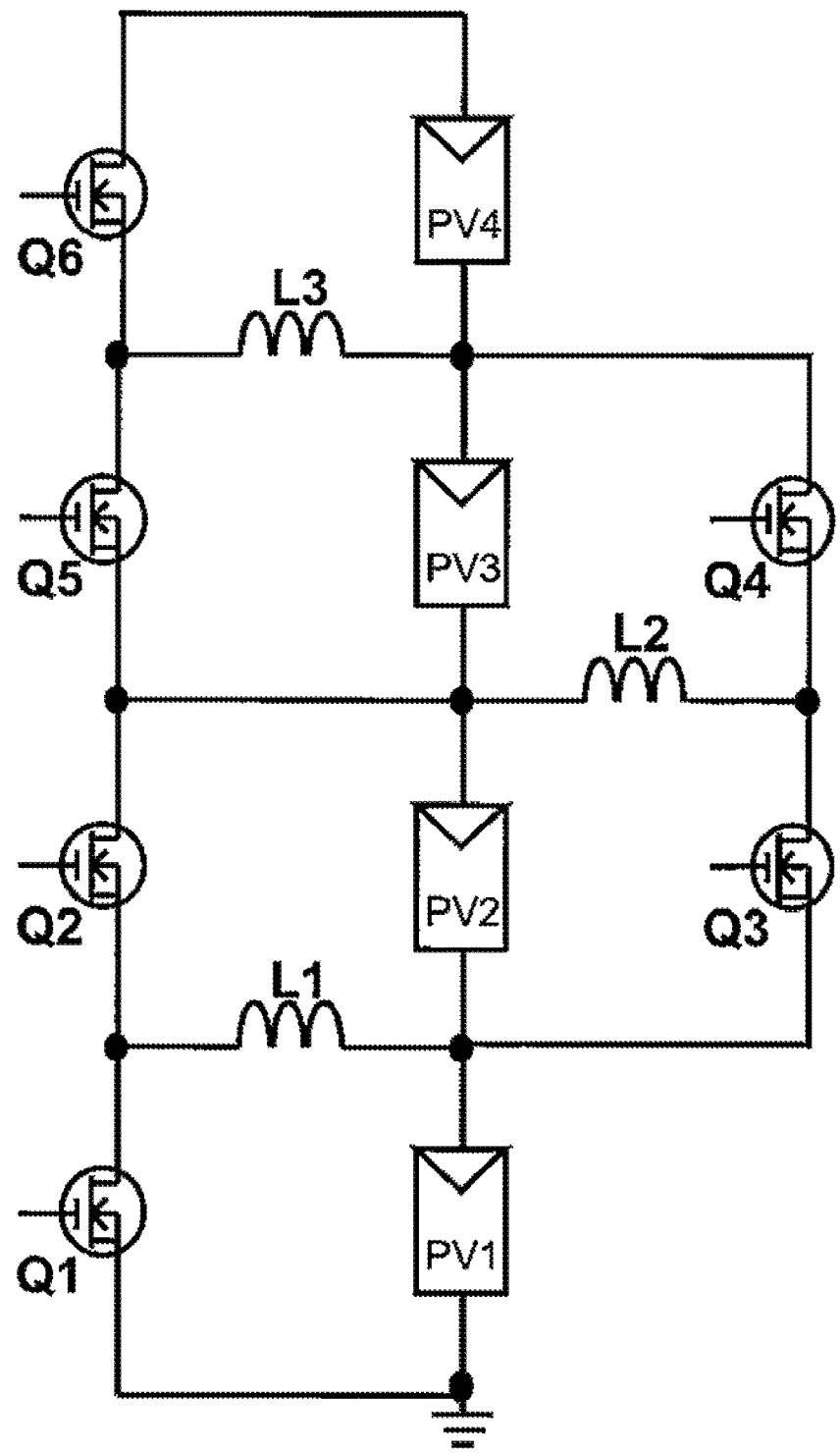
FIG. 3a is a circuit diagram of a conventional partial shading compensation device using a buck-boost converter.
Figure 3B:
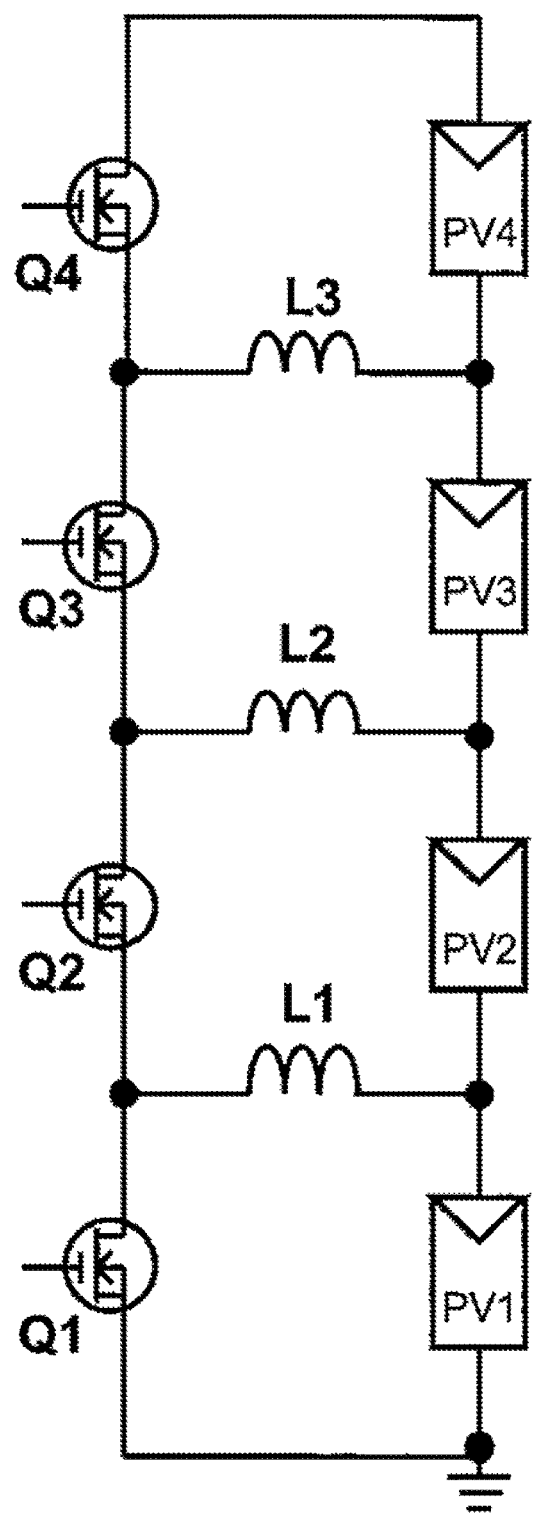
FIG. 3b is a circuit diagram of a conventional partial shading compensation device using a multistage buck-boost converter.
Figure 4:
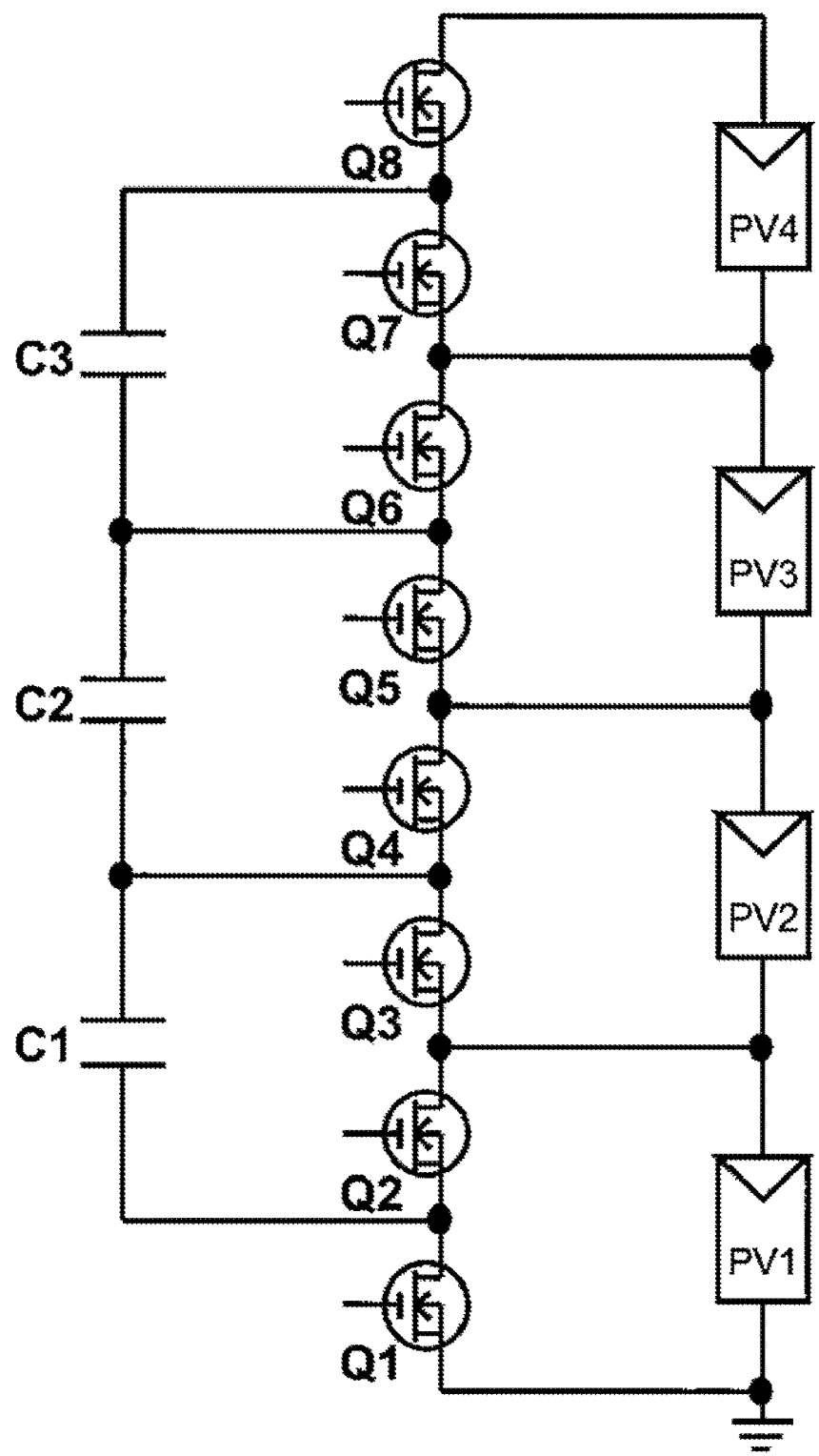
FIG. 4 is a circuit diagram of a conventional partial shading compensation device using a switched-capacitor converter.

In the case where an operating characteristic curve of an insolated module is expressed by the graph in FIG. 1, from a standpoint of obtaining a maximum electric power from the insolated module, a voltage indicated by $V_{mp}$ in FIG. 1 should be applied thereto. In this case, however, a current flowing through the insolated module exceeds a maximum current flowable (producible) by a shaded module in many cases.

Therefore, the current corresponding to the maximum electric power of the insolated module cannot flow through the shaded module, and it becomes unable to obtain the maximum electric power from the shaded module if there is not any current compensation means.

The solar cell adjustment system according to the present invention is configured to use the PV pseudo-equalizer to supply a compensation current $I_{eq}$ to a shaded module so as to allow the shaded module to supply a current corresponding to $I_{string}$ in a pseudo manner.

For example, in a situation where the solar cell module PV2 is shaded, the remaining insolated modules PV1, PV3 and PV4 satisfy the following relationship: $I_{PV1}=I_{PV3}=I_{PV4}=I_{String}$, i.e., each of them can supply a current corresponding to $I_{String}$, whereas a compensation current $I_{eq\text{-}2}$ is supplied from the PV pseudo-equalizer to the shaded module PV2.

Thus, the current $I_{PV2}$ supplied by the shaded module PV2 itself and the compensation current $I_{eq\text{-}2}$ flow through the shaded module PV2, and therefore it becomes possible to allow the string to supply a current $I_{string}$ expressed as the following formula (18):

$$I_{PV2}+I_{eq2}=I_{String} \qquad (18)$$

Third Embodiment

For example, the solar cell adjustment system according to the fourth aspect of the present invention can be obtained by multistage-connecting one buck-boost converter of a SEPIC converter, a Zeta converter and a Cuk converter depicted in FIGS. 40a to 40c, to a string, as mentioned later.

The Cuk converter is a "polarity-reversing converter" in which polarities of input and output signals are reversed. Thus, in the case where it is applied to the solar cell adjustment system according to the fourth aspect of the present invention, the system needs to be based on a configuration using a transformer as depicted in FIG. 40c.

Configuration of Solar Cell Adjustment System

Figure 40A:
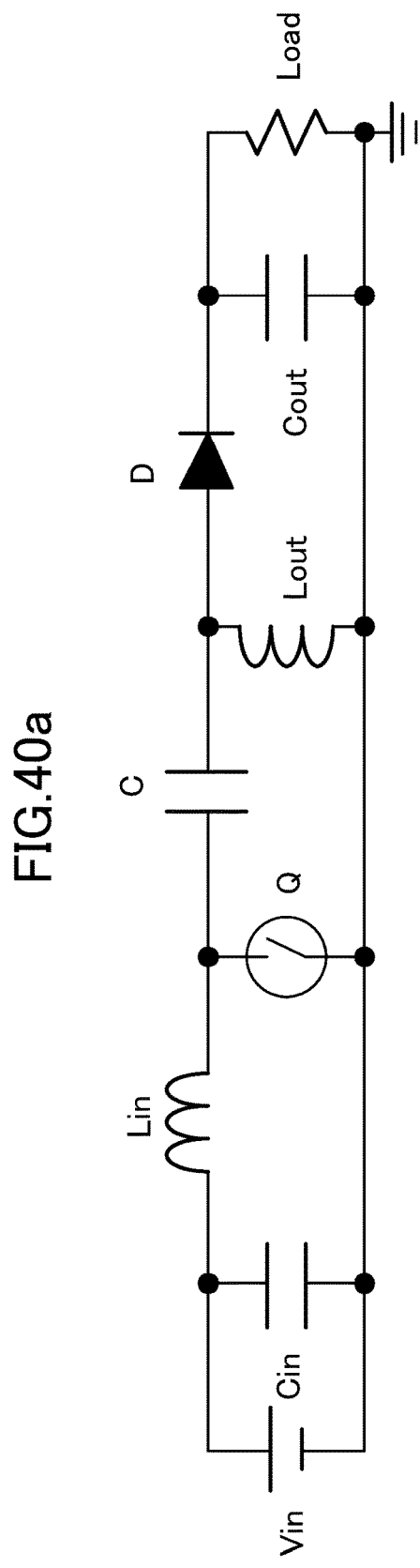
FIG. 40a is a circuit diagram of a SEPIC converter.
Figure 40B:
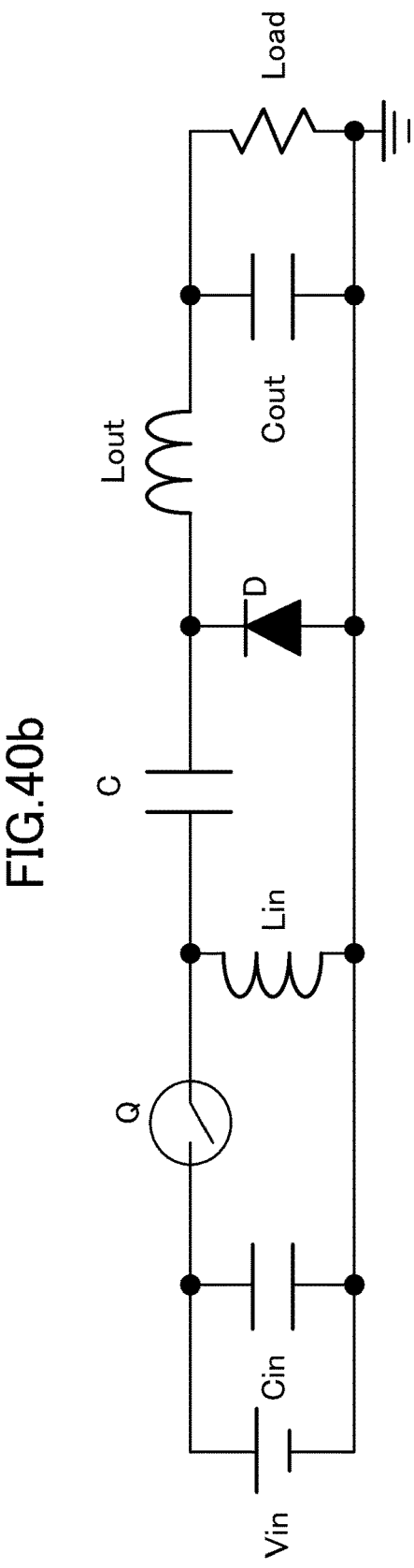
FIG. 40b is a circuit diagram of a Zeta converter.
Figure 40C:
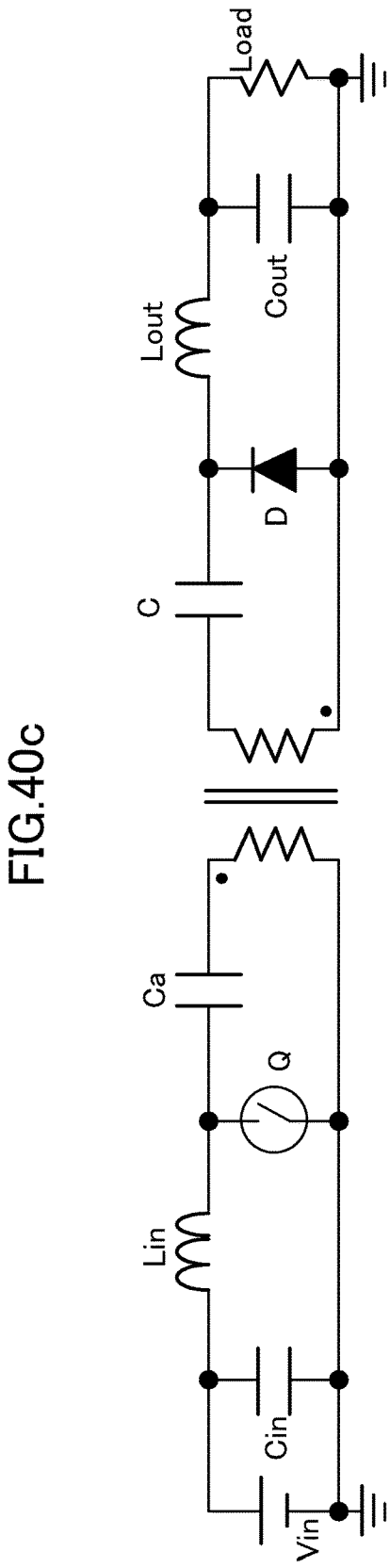
FIG. 40c is a circuit diagram of a Cuk converter.
Figure 41:
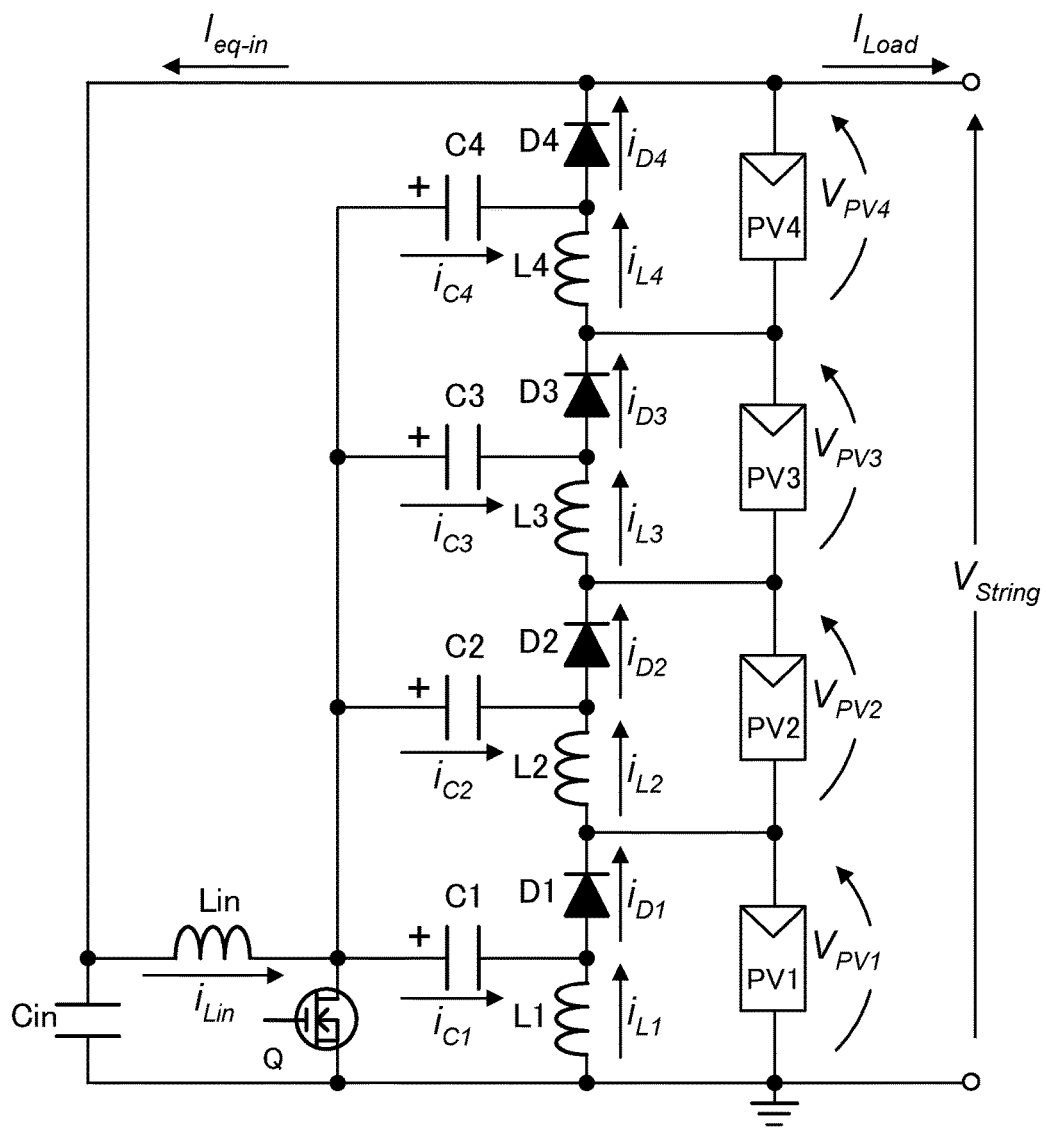
FIG. 41 is a circuit diagram of a solar cell adjustment system according to yet one embodiment of the present invention, based on the SEPIC converter.
Figure 42:
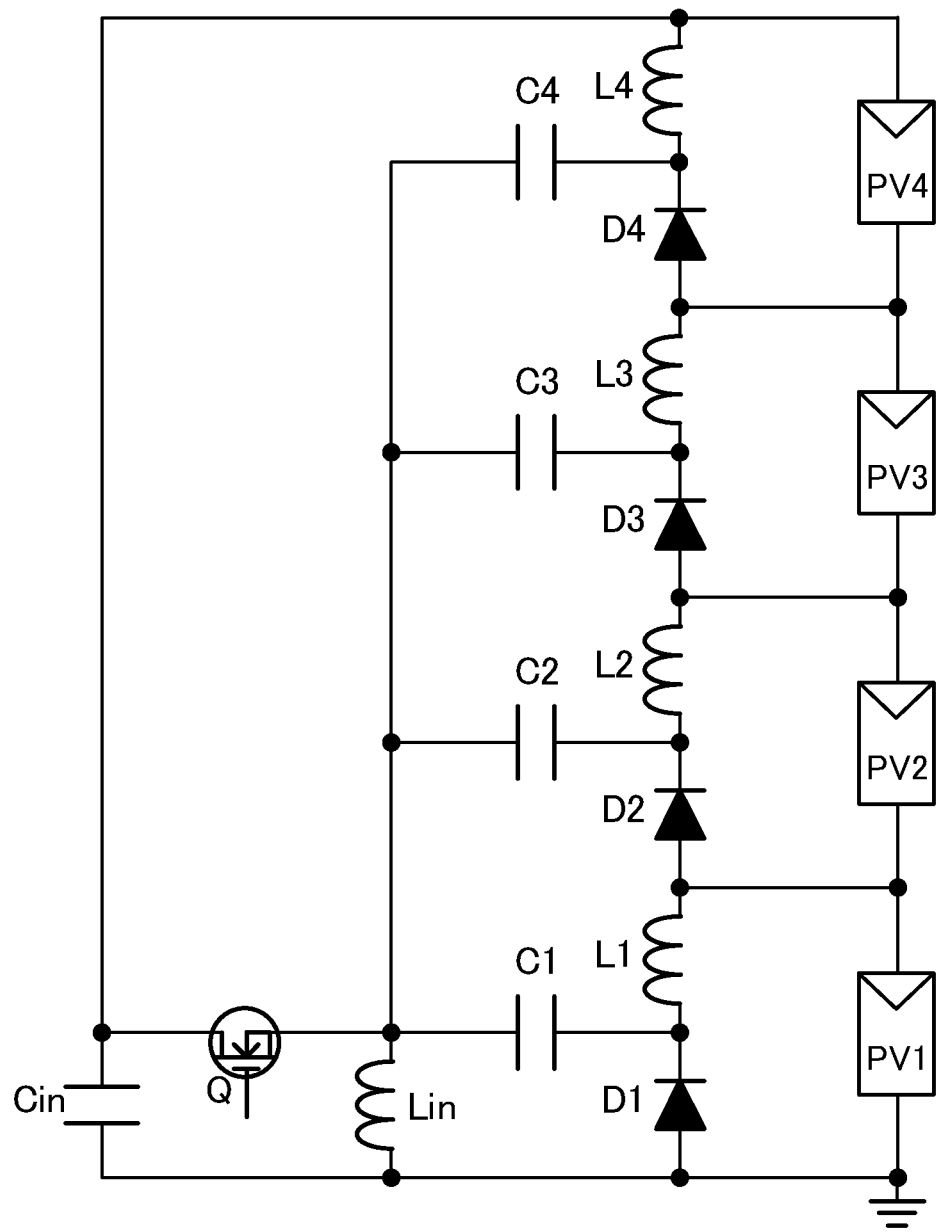
FIG. 42 is a circuit diagram of a solar cell adjustment system according to one embodiment of the present invention, based on the Zeta converter.
Figure 43:
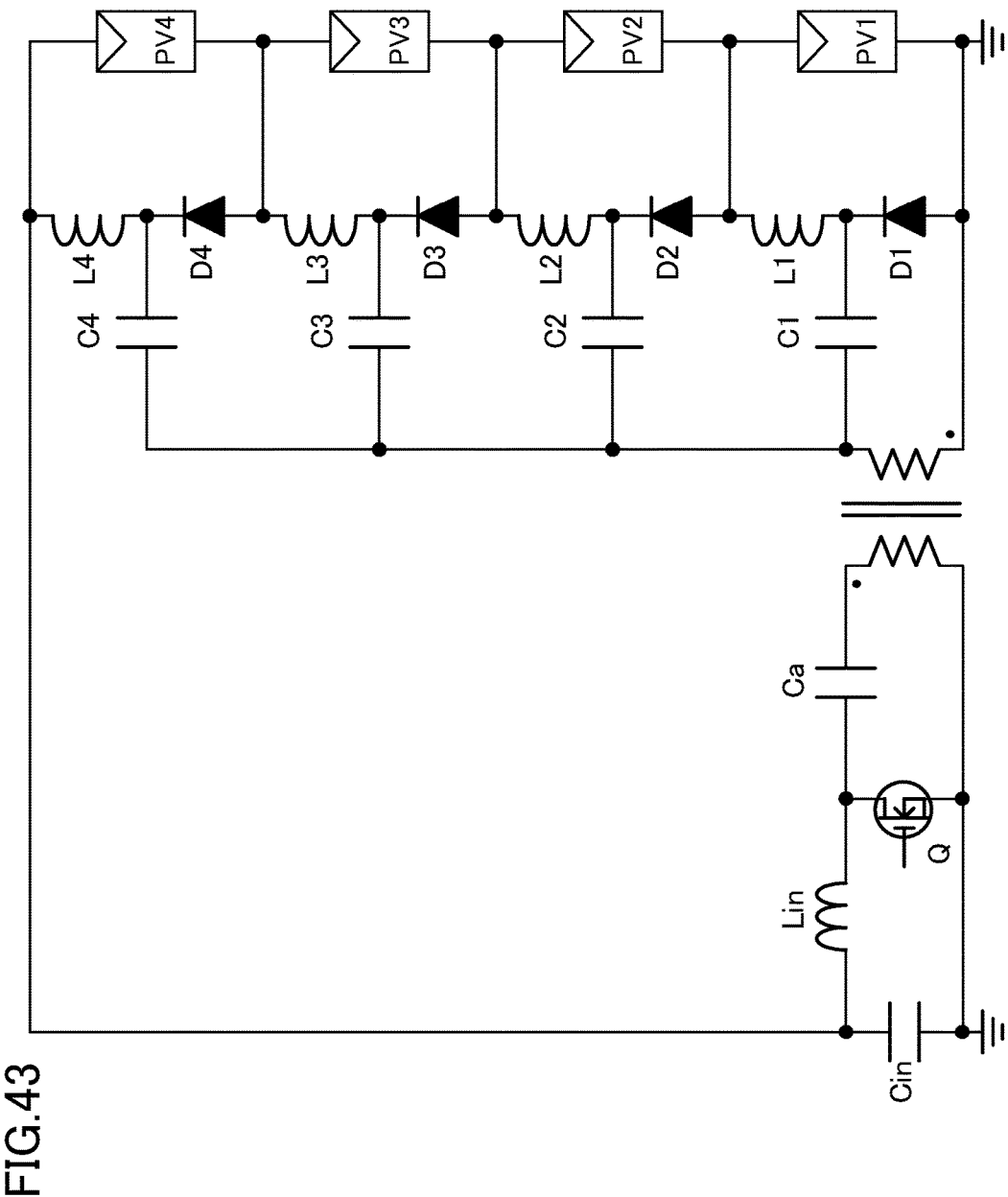
FIG. 43 is a circuit diagram of a solar cell adjustment system according to one embodiment of the present invention, based on the Cuk converter.

FIGS. 41 to 43 depict solar cell adjustment systems each obtained by multistage-connecting a respective one of the SEPIC converter, the Zeta converter and the Cuk converter depicted in FIGS. 40a to 40c, to four series-connected solar cell modules PV1 to PV4, according to first to third embodiments of the present invention. The PV pseudo-equalizer in FIGS. 38 and 39 is composed of a circuit element other than the solar cell modules PV1 to PV4 in FIGS. 41 to 43.

Each of C1 to C4 denotes a capacitor, and each of D1 to D4 denotes a diode. Each of L1 to L4 denotes an inductor, and Cin denotes an input capacitor. Q denotes a switch, and Lin denotes an inductor.

In FIG. 43, Ca denotes an energy transmission capacitor.

In FIG. 41, $i_{L1n}$ denotes a current flowing through the inductor Lin, and $i_{L1}$ to $i_{L4}$ devote, respectively, currents flowing through the indictor L1 to L4. $i_{D1}$ to $i_{D4}$ devote, respectively, currents flowing through the diodes D1 to D4, and $i_{C1}$ to $i_{C4}$ devote, respectively, currents flowing through the capacitors C1 to C4.

In each of the circuits depicted in FIGS. 42 and 43, currents flowing through respective elements are denoted by the same reference signs.

The solar cell adjustment systems in FIGS. 41 to 43 correspond, respectively, to configurations each obtained by multistage-connecting a circuit section composed of a capacitor C-diode D-inductor Lout to the solar cell modules PV1 to PV4, wherein in the circuit of a SEPIC converter depicted in FIG. 40a, a Zeta converter depicted in FIG. 40b and a Cuk converter depicted in FIG. 40c, the input source Vin is made as the string.

The input capacitor Cin is connected to the solar cell modules PV1 to PV4 to supply a compensation current to a solar cell module having a low voltage among the solar cell modules PV1 to PV4, on a priority basis.

Generally, in the case where solar cell modules are used in the form of a string constructed by connecting them in series, a voltage across a shaded module becomes lower than that of the remaining insolated modules. Thus, the use of the solar cell adjustment system according to the present invention makes it possible to redistribute electric power from all of the modules (including the shaded module) to the shaded module to thereby compensate for a deficiency of electric power in the shaded module.

Specifically, a voltage input from the solar cell modules PV1 to PV4 into the input capacitors Cin is converted by repeatedly switching an ON/OFF state of the switch Q, and the converted voltage is output to a solar cell module having a lowest voltage among the solar cell modules PV1 to PV4, as mentioned later.

In the following description, a circuit composed of the input capacitor Cin, the switch Q and the indictor Lin, in the configurations depicted in FIGS. 41 and 42, will be referred to as "input circuit", and a circuit composed of the input capacitor Cin, the switch Q, the indictor Lin, the energy transmission capacitor Ca and a primary winding connected in series to the energy transmission capacitor Ca, in the configuration depicted in FIG. 43, will be referred to as "input circuit".

Further, a circuit composed of the capacitor C1 to C4, the diode D1 to D4, and the inductor L1 to L4 in the configurations depicted in FIGS. 41 and 42, will be referred to as "output circuit", and a circuit composed of the capacitor C1 to C4, the diode D1 to D4, the inductor L1 to L4 and a secondary winding, in the configurations depicted in FIG. 43, will be referred to as "output circuit".

Details of the principle of operation of each of the solar cell adjustment systems depicted in FIGS. 41 to 43 will be described below.

Operation of Each Solar Cell Adjustment System

First of all, an operation of the solar cell adjustment system depicted in FIG. 41 will be described.

Assume that a voltage is applied to the entire solar cell module string, for example, by connecting a load thereto via a DC-DC converter as depicted in FIG. 39, and only the solar cell module PV2 is shaded.

The solar cell adjustment system is driven by repeatedly switching the ON/OFF state of the switch Q.

Figure 44:
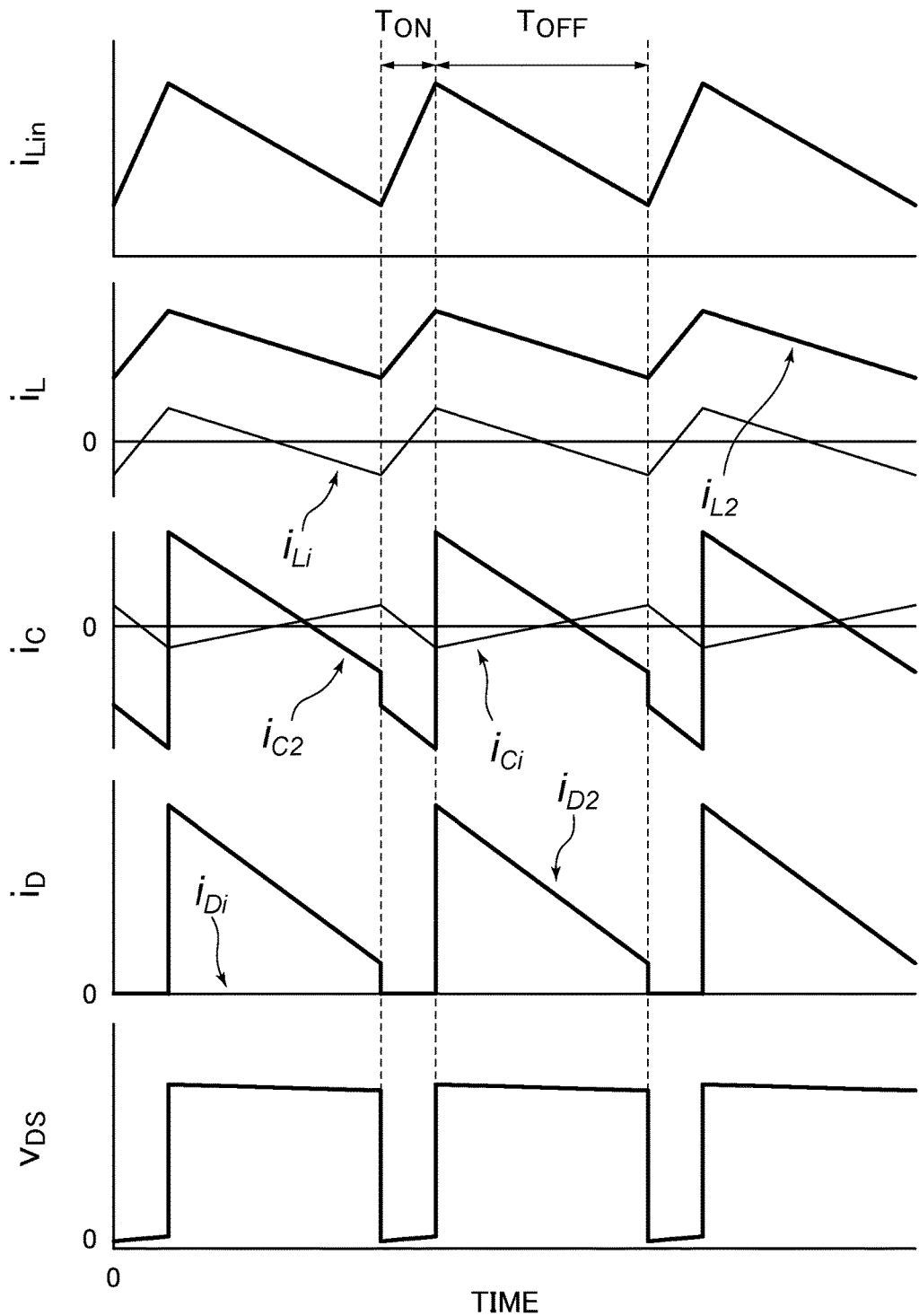
FIG. 44 is a waveform chart depicting temporal changes in current flowing through each element and voltage applied to each element, when the solar cell adjustment system in FIG. 41 is activated.
Figure 45A:
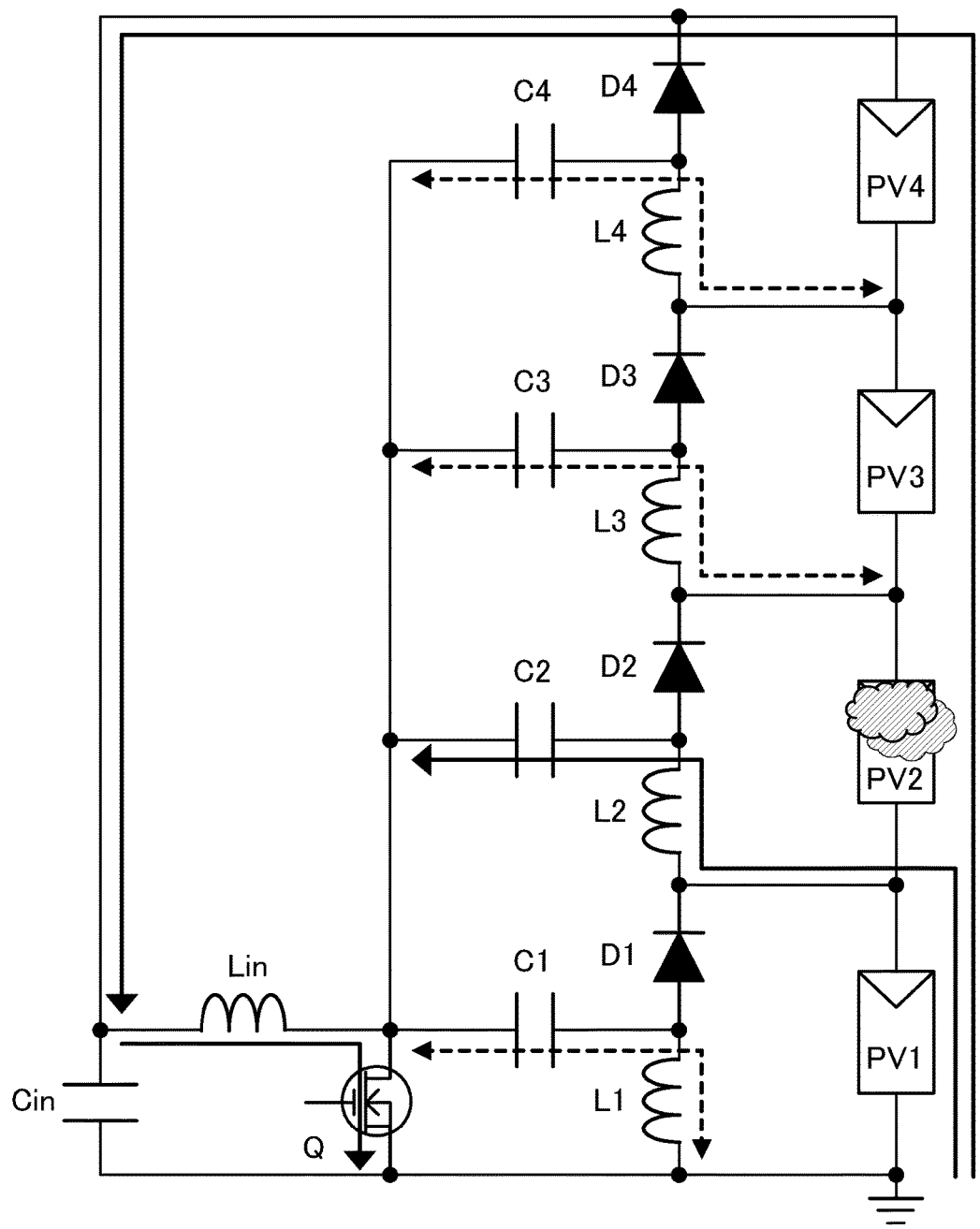
FIG. 45a is a diagram depicting a pathway of current flowing during an ON period of a switch, when the solar cell adjustment system in FIG. 41 is activated in a situation where a solar cell module PV2 is shaded.
Figure 45B:
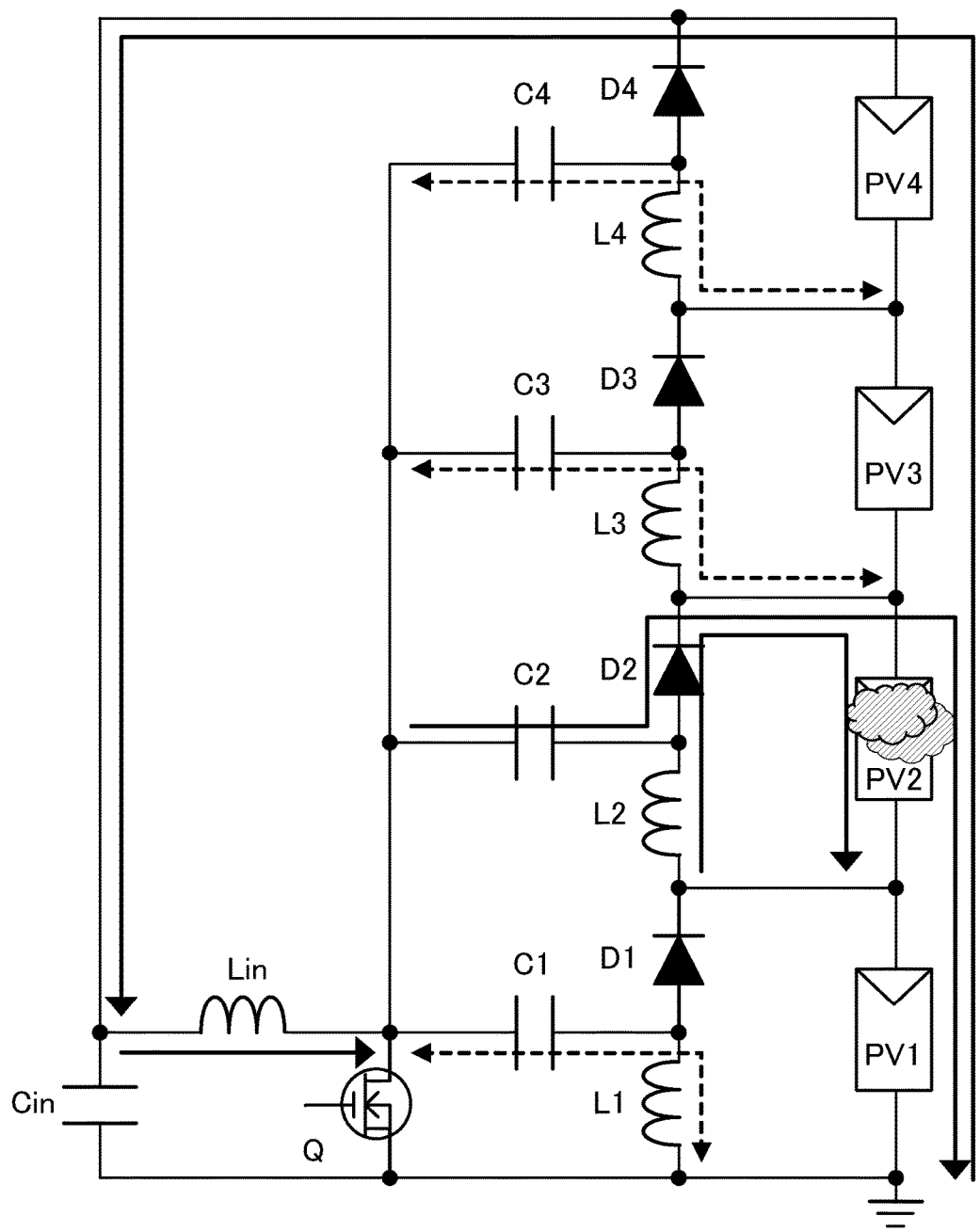
FIG. 45b is a diagram depicting a pathway of current flowing during an OFF period of the switch, when the solar cell adjustment system in FIG. 41 is activated in the situation where the solar cell module PV2 is shaded.

FIG. 44 depicts waveforms of a current flowing through each element and a voltage applied to each element during the above state, and FIGS. 45a and 45b depict, respectively, pathways of current each flowing in the system during a respective one of an ON period and an OFF period of the switch Q.

In the graph of FIG. 44, $v_{DS}$ denotes a voltage applied to the switch Q.

With reference to FIG. 45a, a current during the ON period of the switch Q will be described below.

In FIG. 45a, a pathway and a polarity (direction) of current flowing through the circuit via each element are indicated by arrowed solid and broken lines.

While the broken line in FIG. 45a indicate a ripple current flowing through corresponding ones of the inductor L1, L3 and L4 and the capacitor C1, C3 and C4, a direction thereof is changed between the ON period and the OFF period of the switch Q (see the graphs of $i_{Li}$ and $i_{Ci}$ in FIG. 44, where they denote a current flowing through the inductor Li and the capacitor Ci other than i=2), and therefore arrows are put, respectively, on opposite ends of the broken line.

As depicted in FIG. 45a, a current flowing out from the solar cell modules PV1 to PV4 is input into the input capacitor Cin.

Concurrently, the input capacitor Cin discharges to the inductor Lin, so that energy is stored in Lin, and the current $i_{Lin}$ linearly increases (see the graph of $i_{Lin}$ in FIG. 44).

The capacitor C2 discharges a current to the inductor L2, so that energy is stored in the inductor L2, and the current $i_{L2}$ linearly increases (see the graphs of $i_{L2}$ and $i_{C2}$ in FIG. 44).

Next, with reference to FIG. 45b, a current during the OFF period of the switch Q will be described.

As depicted in FIG. 45b, during the OFF period of the switch Q, only the diode D2 corresponding to the shaded module PV2 having a lowest voltage is in a conduction state.

That is, energy stored in the inductor Lin during the ON period of the switch Q is discharged during the OFF period of the switch Q, and an output current carrying this energy flows into the shaded module PV2 having the lowest voltage, via the capacitor C2 and the diode D2, on a priority basis.

This current linearly decreases as the inductor Lin gradually loses energy (see the graphs of $i_{Lin}$, $i_{C2}$ and $i_{D2}$ in FIG. 44).

Further, a current flows from the inductor L2 into the shaded module PV2 via the diode D2, so that energy stored in the inductor L2 during the ON period of the switch Q is discharged to the shaded module PV2.

This current also linearly decreases as the inductor L2 gradually loses energy (see the graphs of $i_{L2}$ in FIG. 44).

Even during the OFF period of the switch Q, a current flowing out from the solar cell modules PV1 to PV4 is input into the input capacitor Cin, and concurrently a ripple current flows through the inductor L1, L3 and L4 and the capacitor C1, C3 and C4 (see the graphs of $i_{Li}$ and $i_{Ci}$ in FIG. 44).

By repeatedly switching the ON/OFF state of the switch Q, the above current is supplied as a compensation current from the solar cell modules PV1 to PV4 to the shaded module PV2 to thereby allow the string to achieve a high output as a whole.

As mentioned above, during one cycle of the switching, charge and discharge currents flow through each capacitor.

While a current flowing through each of the capacitors C1, C3 and C4 is sufficiently small because it consists only of a ripple current component, a relatively large charge and discharge currents flow through the capacitor C2.

During the ON period of the switch Q, the current of the capacitor C2 flows via the solar cell module PV1, whereas, during the OFF period of the switch Q, the current of the capacitor C2 flows through the solar cell modules PV1 and PV2.

As above, along with operation, a current across each module (in the examples in FIGS. 45a and 45b, the solar cell modules PV1 and PV2) largely changes, i.e., a large ripple current flows.

Generally, an operating voltage of a solar cell largely depends on a current (FIG. 1), and therefore, if a relatively large current flows through a module, the operating voltage becomes unstable.

This problem can be solved by a system described in an aftermentioned fourth embodiment.

Here, a time ratio D is defined as a ratio of the ON period to the switching cycle of the switch Q (as is apparent from this definition, 0<D<1 (D is between 0 and 1)).

A voltage to be output to the shaded module PV2 in a steady state of the solar cell adjustment system is determined according to the voltage $V_{string}$ applied to the input capacitor Cin, and the time ratio D.

An output voltage to the shaded module PV2 will be specifically derived below.

Voltages $V_{PV1}$ to $V_{PV4}$ across the solar cell modules PV1 to PV4 are deemed to be constant over one switching cycle.

In this situation, Vstring is expressed as follows:

$$V_{String} = V_{PV1} + V_{PV2} + V_{PV3} + V_{PV4} \quad (19)$$

Further, a time averages of voltage across the capacitors C1 to C4 for the switching period are defined as $V_{C1}$ to $V_{C4}$.

In the steady state, a time average of voltage across each of the inductors Lin and L1 to L4 becomes zero. Thus, the following relational formulas are formed between $V_{string}$, $V_{PV1}$ to $V_{PV4}$ and $V_{C1}$ to $V_{C4}$:

$$\begin{cases} V_{C1} = V_{String} \\ V_{C2} = V_{String} - V_{PV1} \\ V_{C3} = V_{String} - (V_{PV1} + V_{PV2}) \\ V_{C4} = V_{String} - (V_{PV1} + V_{PV2} + V_{PV3}) \end{cases} \quad (20)$$

Further, in the steady state, a sum of products of voltage applied to each of the inductors and time over the switching cycle becomes zero, and therefore the following relational formulas are formed:

$$\begin{cases} DV_{C1} = (1-D)(V_{PV1} + V_{PV2} - V_{C1} + V_{C2} + V_D) \\ D(V_{C2} + V_{PV1}) = (1-D)(V_{PV2} + V_D) \\ D(V_{C3} + V_{PV1} + V_{PV2}) = (1-D)(V_{C2} - V_{C3} + V_D) \\ D(V_{C4} + V_{PV1} + V_{PV2} + V_{PV3}) = (1-D)(V_{C2} - V_{C4} - V_{PV3} + V_D) \end{cases} \quad (21)$$

where $V_D$ denotes a forward voltage drop of the diode.

The output voltage $V_{PV2}$ to the shaded module PV2 having the lowest voltage can be expressed as follows using the formulas (20) and (21):

$$V_{PV2} = \frac{D}{1-D} V_{String} - V_D \qquad (22)$$

As shown in the formula (22), in the steady state of the solar cell adjustment system, an output voltage obtained by converting a sum voltage $V_{String}$ of voltages across the solar cell modules PV1 to PV4, according to the time ratio D is output to the shaded module PV2, and a current is output to the shaded module PV2 on a priority basis.

The formula (22) includes the voltage $V_{String}$ across the entire string, and the voltage $V_{PV2}$ across the shaded module PV2, but does not include any voltage across other individual insolated module. This suggests that the operation of the solar cell adjustment system according to the present invention is mainly determined by the entire string and the shaded module.

Each of the system based on the Zeta converter depicted in FIG. 42 and the system based on the Cuk converter depicted in FIG. 43 also operates by the same principle to output a current to a shaded module on a priority basis, while converting the summed voltage $V_{String}$ across the solar cell modules PV1 to PV4 according to the time ratio D, and outputting the converted voltage to the shaded module.

Figure 46A:
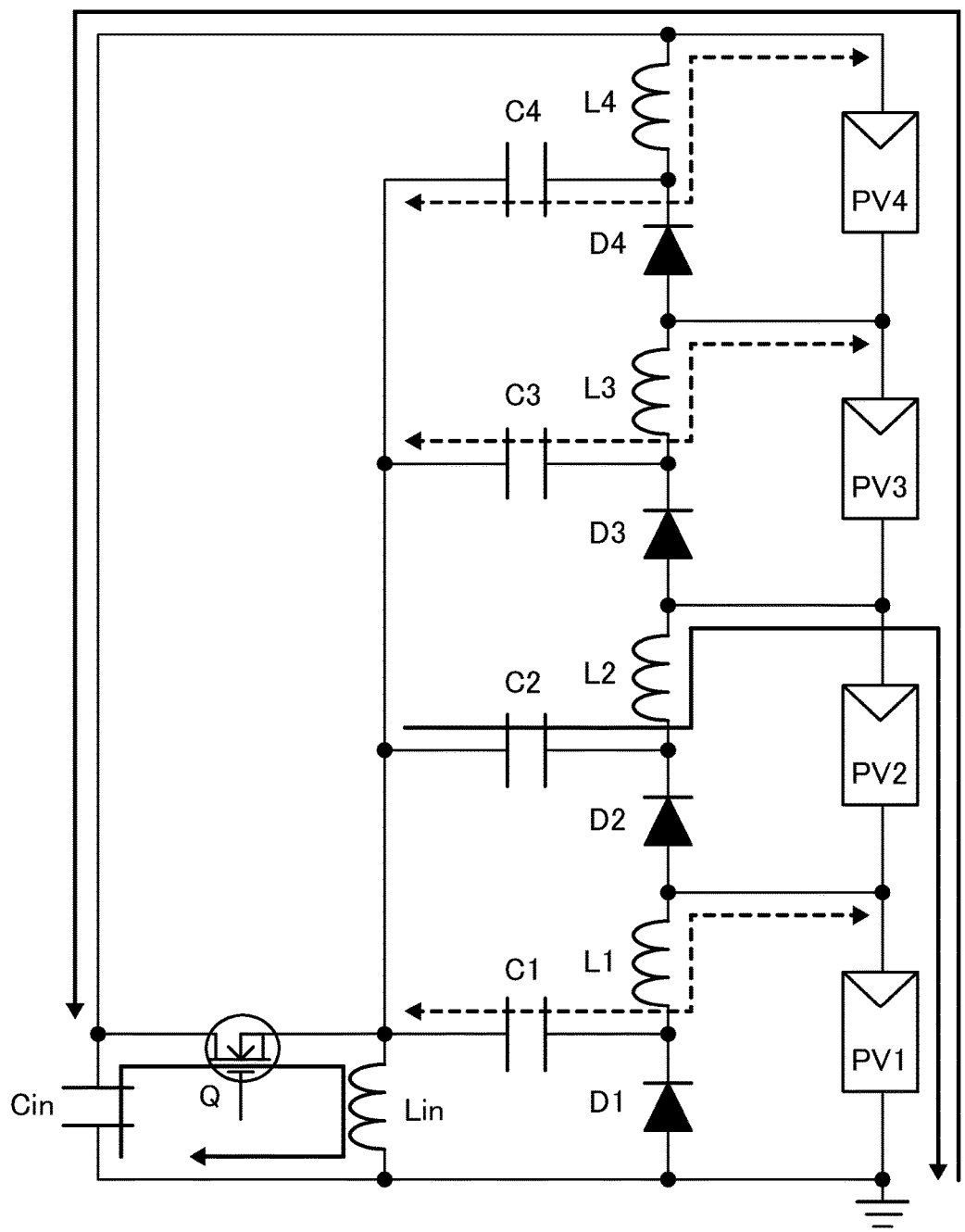
FIG. 46a is a diagram depicting a pathway of current flowing during an ON period of a switch, when the solar cell adjustment system in FIG. 42 is activated in a situation where a solar cell module PV2 is shaded.
Figure 46B:
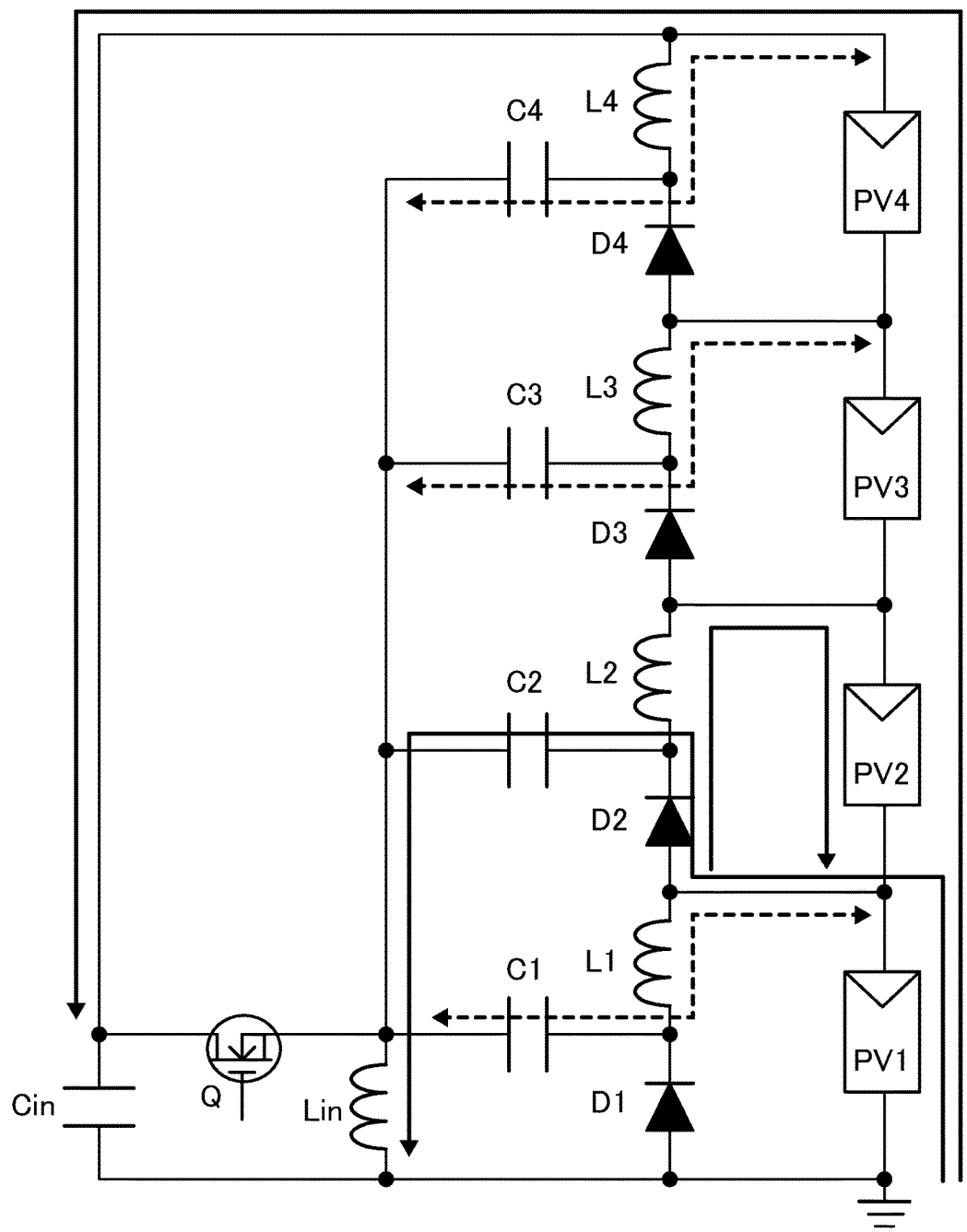
FIG. 46b is a diagram depicting a pathway of current flowing during an OFF period of the switch, when the solar cell adjustment system in FIG. 42 is activated in the situation where the solar cell module PV2 is shaded.

FIGS. 46a and 46b depict, respectively, current pathways realized in the ON period and in the OFF period of the switch Q when the system in FIG. 42 is driven.

During the ON period of the switch Q (FIG. 46a), a current flowing out from the solar cell modules PV1 to PV4 is input into the input capacitor Cin.

Concurrently, the input capacitor Cin discharges a current to the inductor Lin, so that energy is stored in Lin, and the current $i_{Lin}$ linearly increases.

The capacitor C2 discharges to the inductor L2, so that energy is stored in the inductor L2, and the current $i_{L2}$ linearly increases.

Next, during the OFF period of the switch Q (FIG. 46b), only the diode D2 corresponding to the shaded module PV2 having a lowest voltage is in a conduction state.

Energy stored in the inductor Lin during the ON period of the switch Q is discharged during the OFF period of the switch Q, and an output current carrying this energy charges the capacitor C2.

This current linearly decreases as the inductor Lin gradually energy.

Further, a current flows from the inductor L2 into the shaded module PV2 via the diode D2, so that energy stored in the inductor L2 during the ON period of the switch Q is discharged to the shaded module PV2.

This current also linearly decreases as the inductor L2 loses energy.

Even during the OFF period of the switch Q, a current flowing out from the solar cell modules PV1 to PV4 is input into the input capacitor Cin, and concurrently a ripple current flows through corresponding ones of the inductor L1, L3 and L4 and the capacitor C1, C3 and C4.

In the steady state, a time average of voltage across each of the inductors becomes zero, and a sum of products of voltage applied to each of the inductors and time over the switching cycle becomes zero. By utilizing the facts, the following formulas (23) and (24) are obtained in the same manner as the formulas (20) and (21):

$$\begin{cases} V_{C1} = -V_{PV1} \\ V_{C2} = -V_{PV1} - V_{PV2} \\ V_{C3} = -V_{PV1} - V_{PV2} - V_{PV3} \\ V_{C4} = -V_{String} \end{cases} \qquad (23)$$

$$\begin{cases} D(V_{String} - V_{C1} - V_D) = (1-D)(V_{C1} - V_{C2} + V_D) \\ D(V_{String} - V_{C2} - V_1 - V_2) = (1-D)(V_{PV2} + V_D) \\ D(V_{String} - V_{C2} - V_1 - V_2 - V_3) = (1-D)(V_{PV2} + V_{PV3} + V_D - V_{C2} + V_{C3}) \\ D(-V_{C4}) = (1-D)(V_{PV2} + V_{PV3} + V_{PV4} + V_D - V_{C2} + V_{C4}) \end{cases} \qquad (24)$$

The output voltage $V_{PV2}$ to the shaded module PV2 having the lowest voltage can be expressed as follows using the formulas (23) and (24):

$$V_{PV2} = \frac{D}{1-D} V_{String} - V_D \qquad (25)$$

Figure 47A:
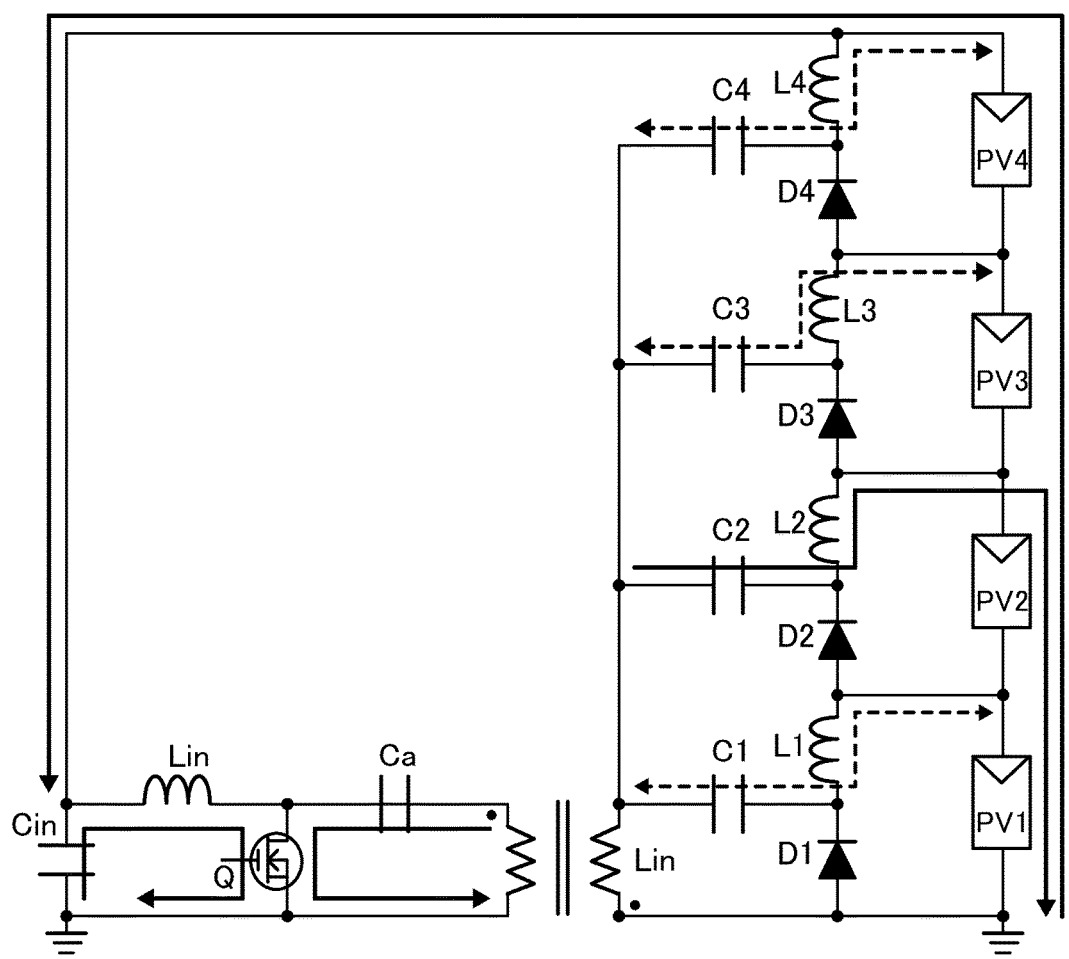
FIG. 47a is a diagram depicting a pathway of current flowing during an ON period of a switch, when the solar cell adjustment system in FIG. 43 is activated in a situation where a solar cell module PV2 is shaded.
Figure 47B:
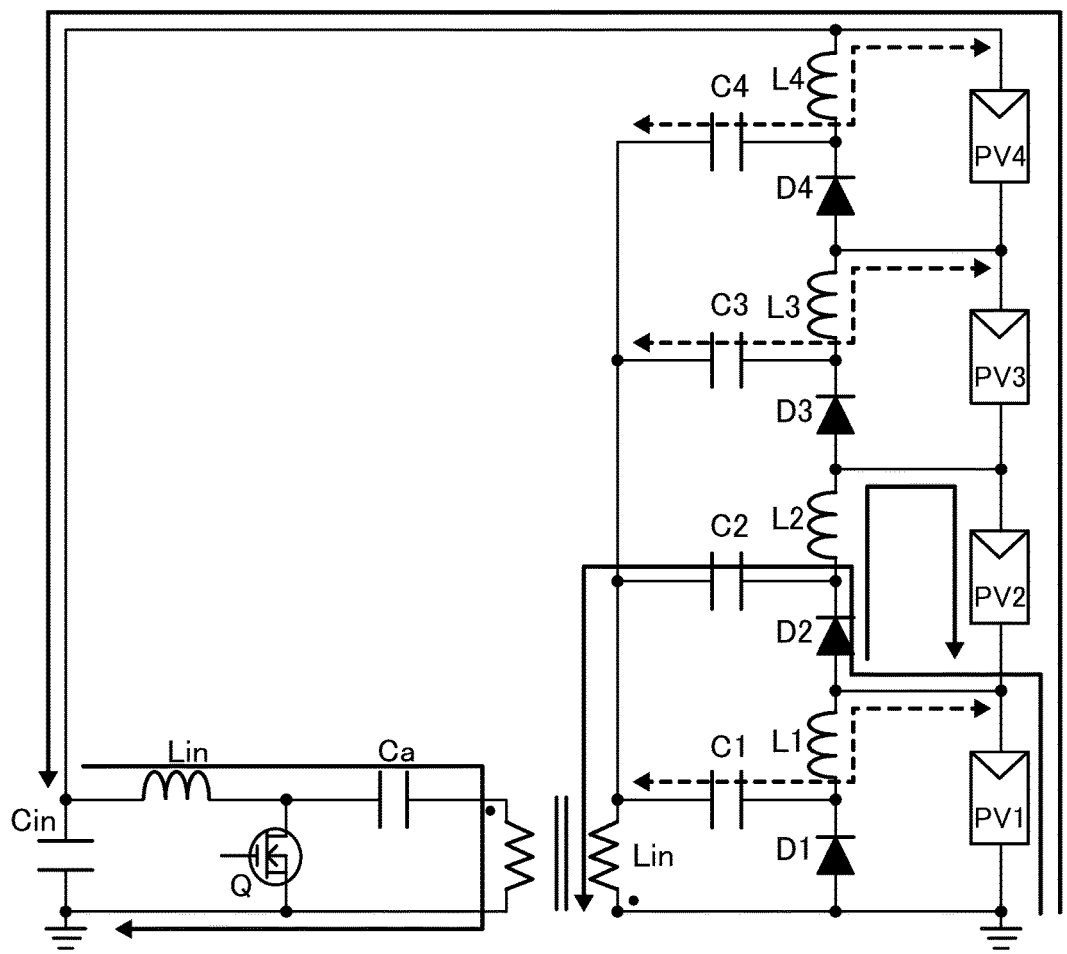
FIG. 47b is a diagram depicting a pathway of current flowing during an OFF period of the switch, when the solar cell adjustment system in FIG. 43 is activated in the situation where the solar cell module PV2 is shaded.

FIGS. 47a and 47b depict, respectively, current pathways realized in the ON period and in the OFF period of the switch Q when the system in FIG. 43 is driven.

During the ON period of the switch Q (FIG. 47a), a current flowing out from the solar cell modules PV1 to PV4 is input into the input capacitor Cin.

Concurrently, the input capacitor Cin discharges to the inductor Lin, so that energy is stored in Lin, and the current $i_{Lin}$ linearly increases.

Further, the capacitor Ca outputs a voltage to the primary winding. Then, this voltage is transformed through the transformer, and the transformed voltage is output to the output circuit.

In the output circuit, the capacitor C2 discharges to the inductor L2, so that energy is stored in the inductor L2, and the current $i_{L2}$ linearly increases.

Next, during the OFF period of the switch Q (FIG. 47b), the diode D2 corresponding to the shaded module PV2 having a lowest voltage is in a conduction state.

Energy stored in the inductor Lin during the ON period of the switch Q is discharged during the OFF period of the switch Q, and an output current carrying this energy charges the capacitor Ca.

This current linearly decreases as the inductor Lin loses energy.

Further, a current flows from the inductor L2 into the shaded module PV2 via the diode D2, so that energy stored in the inductor L2 during the ON period of the switch Q is discharged to the shaded module PV2.

Further, the capacitor C2 is charged by a current from the secondary winding of the transformer.

Even during the OFF period of the switch Q, a current flowing out from the solar cell modules PV1 to PV4 is input into the input capacitor Cin, and concurrently a ripple current flows through corresponding ones of the inductor L1, L3 and L4 and the capacitor C1, C3 and C4.

In the steady state, a time average of voltage across each of the inductors becomes zero, and a sum of products of voltage applied to each of the inductors and time over the switching cycle becomes zero. By utilizing the facts, the following formulas (26) and (27) are obtained in the same manner as the formulas (20) and (21):

$$\begin{cases} V_{Ca} = V_{String} \\ V_{C1} = -V_{PV1} \\ V_{C2} = -V_{PV1} - V_{PV2} \\ V_{C3} = -V_{PV1} - V_{PV2} - V_{PV3} \\ V_{C4} = -V_{String} \end{cases} \quad (26)$$

$$\begin{cases} D(V_{Ca}/N - V_{C1} - V_{PV1}) = (1-D)(V_{C1} - V_{C2} + V_D) \\ D(V_{Ca}/N - V_{C2} - V_{PV1} - V_{PV2}) = (1-D)(V_{PV2} + V_D) \\ D(V_{Ca}/N - V_{C3} - V_{PV1} - V_{PV2} - V_{PV3}) = (1-D)\begin{pmatrix} V_{PV2} + V_{PV3} + \\ V_D - V_{C2} + V_{C3} \end{pmatrix} \\ D(V_{Ca}/N - V_{C4} - V_{String}) = (1-D)\begin{pmatrix} V_{PV2} + V_{PV3} + V_{PV4} + \\ V_D - V_{C2} + V_{C4} \end{pmatrix} \end{cases} \quad (27)$$

where N is a turn ratio of the primary winding and the secondary winding of the transformer.

The output voltage $V_{PV2}$ to the shaded module PV2 having the lowest voltage can be expressed as follows using the formulas (26) and (27):

$$V_{PV2} = \frac{D}{1-D}\frac{V_{String}}{N} - V_D \quad (28)$$

As above, the operation of each of the solar cell adjustment systems based on the SEPIC converter, the Zeta converter and the Cuk converter, in the situation where, one, particularly PV2, of the solar cell modules PV1 to PV4 is shaded, has been described.

However, even in a situation where a shaded module is one of PV1, PV3 and PV4, it is possible to supply a compensation current to the shaded module by the same principle. Further, even in a situation where there occurs a plurality of shaded modules, it is possible to supply a compensation current by the same principle.

As one example, the operation of the solar cell adjustment system depicted in FIG. 41, in a situation where: the solar cell modules PV1, PV2 are shaded, wherein they have the same voltage; and a voltage of each of the insolated modules PV3 and PV4 is higher than that of the shaded modules, will be described.

Figure 48A:
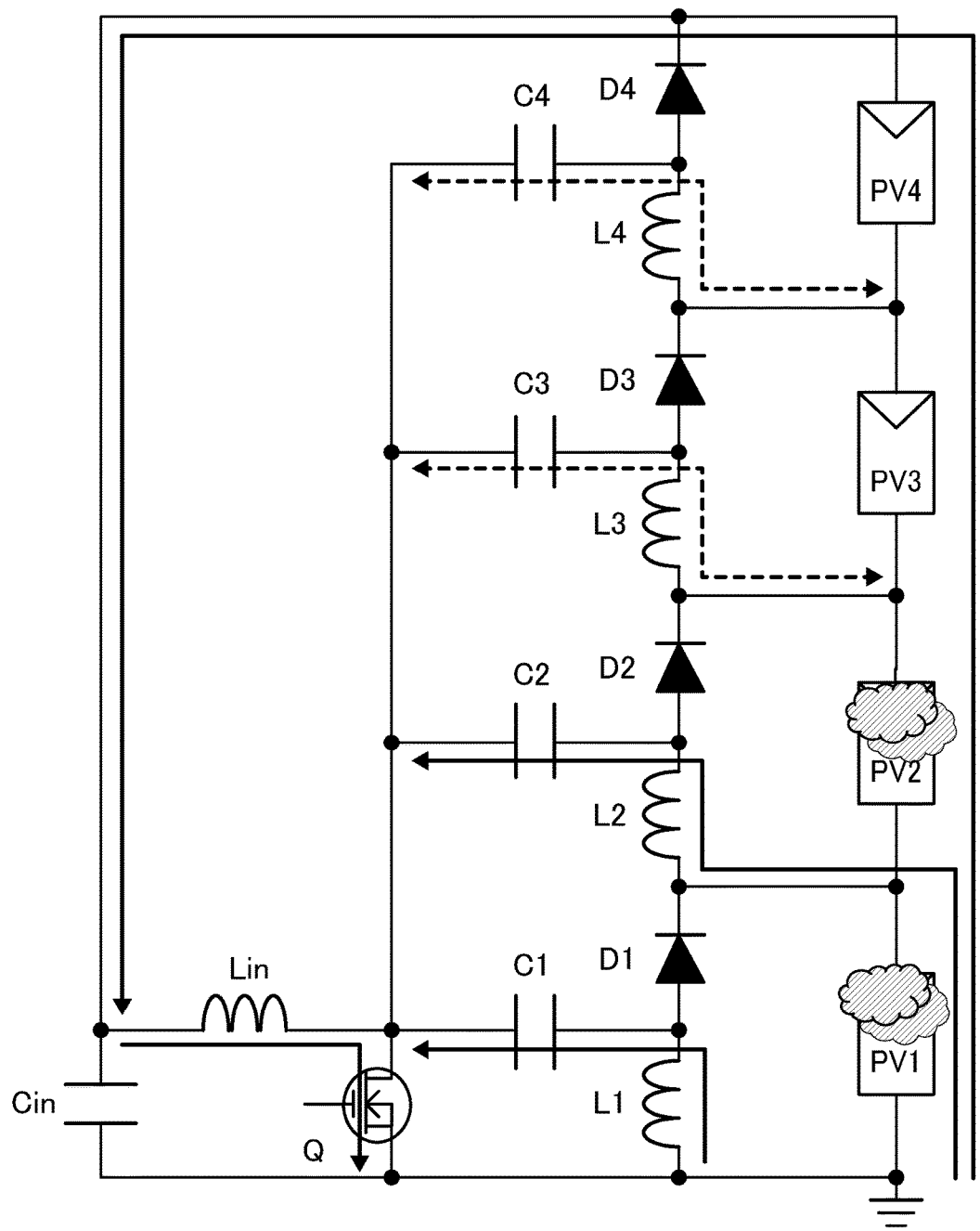
FIG. 48a is a diagram depicting a pathway of current flowing during the ON period of the switch, when the solar cell adjustment system in FIG. 41 is activated in a situation where solar cell modules PV1, PV2 are shaded.

During the ON period of the switch Q (FIG. 48*a*), a current flowing out from the solar cell modules PV1 to PV4 is input into the input capacitor Cin.

Concurrently, the input capacitor Cin discharges to the inductor Lin, so that energy is stored in Lin, and the current $i_{Lin}$ linearly increases.

Each of the capacitors C1 and C2 discharges to a corresponding one of the inductors L1 and L2, so that energy is stored in the inductors L1 and L2, and the currents $i_{L1}$ and $i_{L2}$ linearly increase.

Figure 48B:
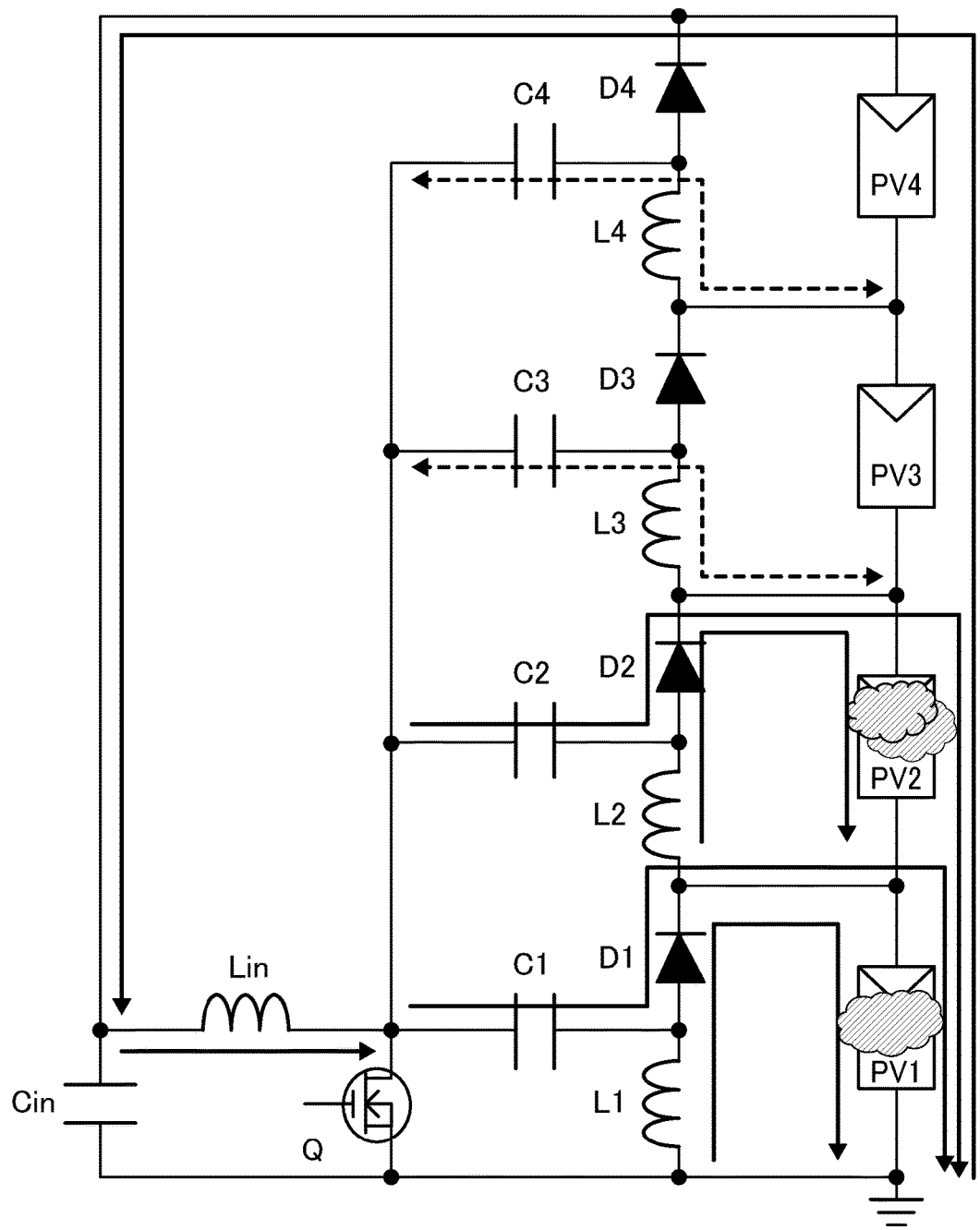
FIG. 48b is a diagram depicting a pathway of current flowing during the OFF period of the switch, when the solar cell adjustment system in FIG. 41 is activated in the situation where the solar cell modules PV1, PV2 are shaded.

Next, during the OFF period of the switch Q (FIG. 48*b*), each of the diodes D1 and D2 corresponding to the shaded module PV1 and PV2 each having a lowest voltage is in a conduction state.

That is, energy stored in the inductor Lin during the ON period of the switch Q is discharged during the OFF period of the switch Q, and an output current carrying this energy flows into the shaded module PV1 having the lowest voltage, via the capacitor C1 and the diode D1, and into the shaded module PV2 having the lowest voltage, via the capacitor C2 and the diode D2, on a priority basis.

This current linearly decreases as the inductor Lin loses energy.

Further, a current flows from each of the inductors L1 and L2 into a corresponding one of the shaded modules PV1 and PV2 via a corresponding one of the diodes D1 and D2, so that energy stored in the inductors L1 and L2 during the ON period of the switch Q is discharged to a corresponding one of the shaded modules PV1 and PV2.

This current also linearly decreases as each of the inductors L1 and L2 loses energy.

In this case, a relationship between voltages across the elements in the steady state is expressed as the above formulas (19) and (20) and the following formula (29):

$$\begin{cases} DV_{C1} = (1-D)(V_{PV1} + V_D) \\ D(V_{C2} + V_{PV1}) = (1-D)(V_{PV2} + V_D) \\ D(V_{C3} + V_{PV1} + V_{PV2}) = (1-D)(V_{C2} - V_{C3} + V_D) \\ D(V_{C4} + V_{PV1} + V_{PV2} + V_{PV3}) = (1-D)(V_{C2} - V_{C4} - V_{PV3} + V_D) \end{cases} \quad (29)$$

The following formula (30) is obtained by solving the above formulas:

$$V_{PV1} = V_{PV2} = \frac{D}{1-D}V_{String} - V_D \quad (30)$$

That is, as with the situation where only the solar cell adjustment system is shaded, an output voltage $\{D/(1-D)\}V_{String}-V_D$ obtained by converting $V_{String}$ is output to each of the shaded modules PV1 and PV2, and, in this state, a compensation current is supplied to each of the shaded modules PV1 and PV2 on a priority basis.

This feature capable of supplying a compensation current to a plurality of shaded modules also applies to the solar cell adjustment systems depicted in FIGS. 42 and 43.

Further, the description here was based on the SEPIC converter-based configuration, the Zeta converter-based configuration and the Cuk converter-based configuration. However, the solar cell adjustment system according to the present invention is not limited to such configurations, but may be constructed by multistage-connecting an output circuit section composed of any other type of converter.

Minimum Current Detection and Control System

The operation of the solar cell adjustment system according the fourth aspect of the present invention has been theoretically described.

The above description has been made on the assumption that a compensation current is supplied to only a shaded module having a lowest voltage, on a priority basis. However, in some cases, a compensation current supplied to other modules is not Zero. A magnitude of a compensation current to be supplied to the solar cell modules PV1 to PV4 can be totally adjusted by controlling a time ratio of a switch. A system for detecting a compensation current to adjust a magnitude thereof will be described below.

Figure 49A:
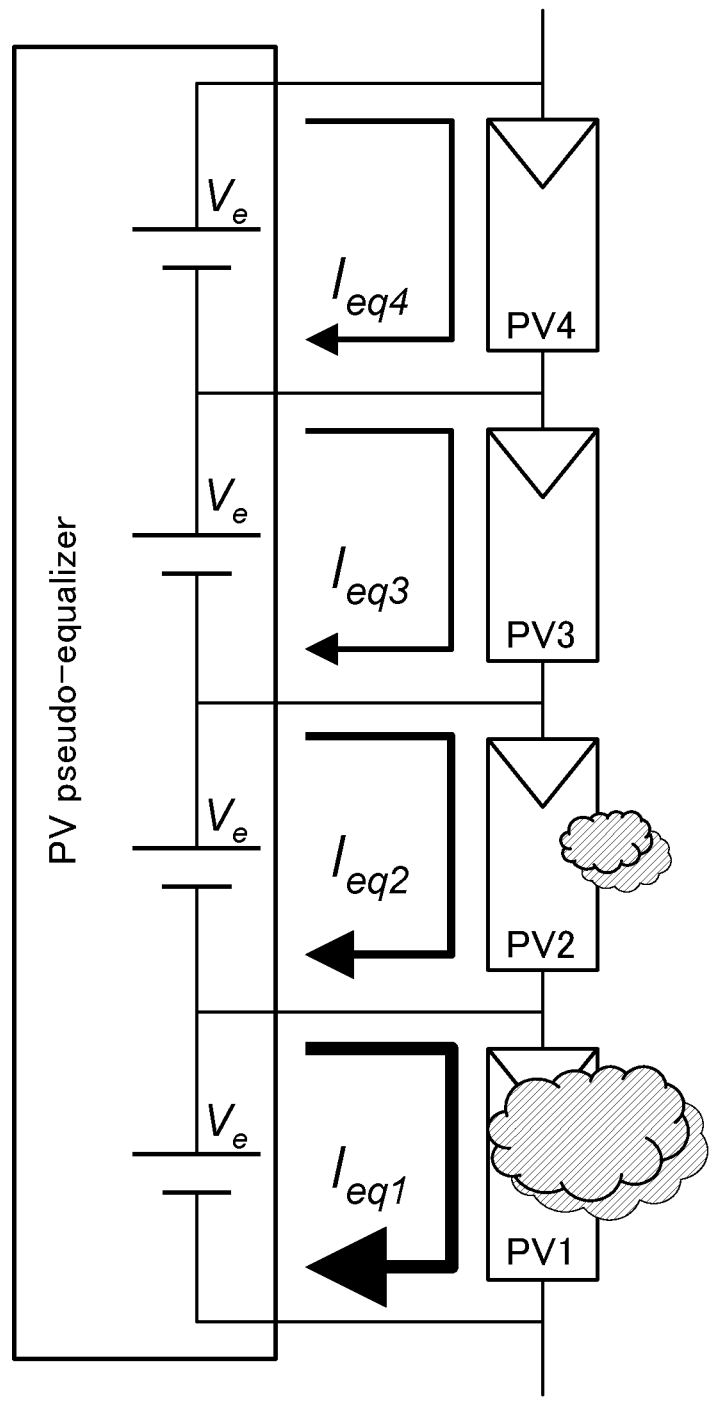
FIG. 49a is a conceptual diagram of current supply during partial shading compensation (during excessive compensation).
Figure 49B:
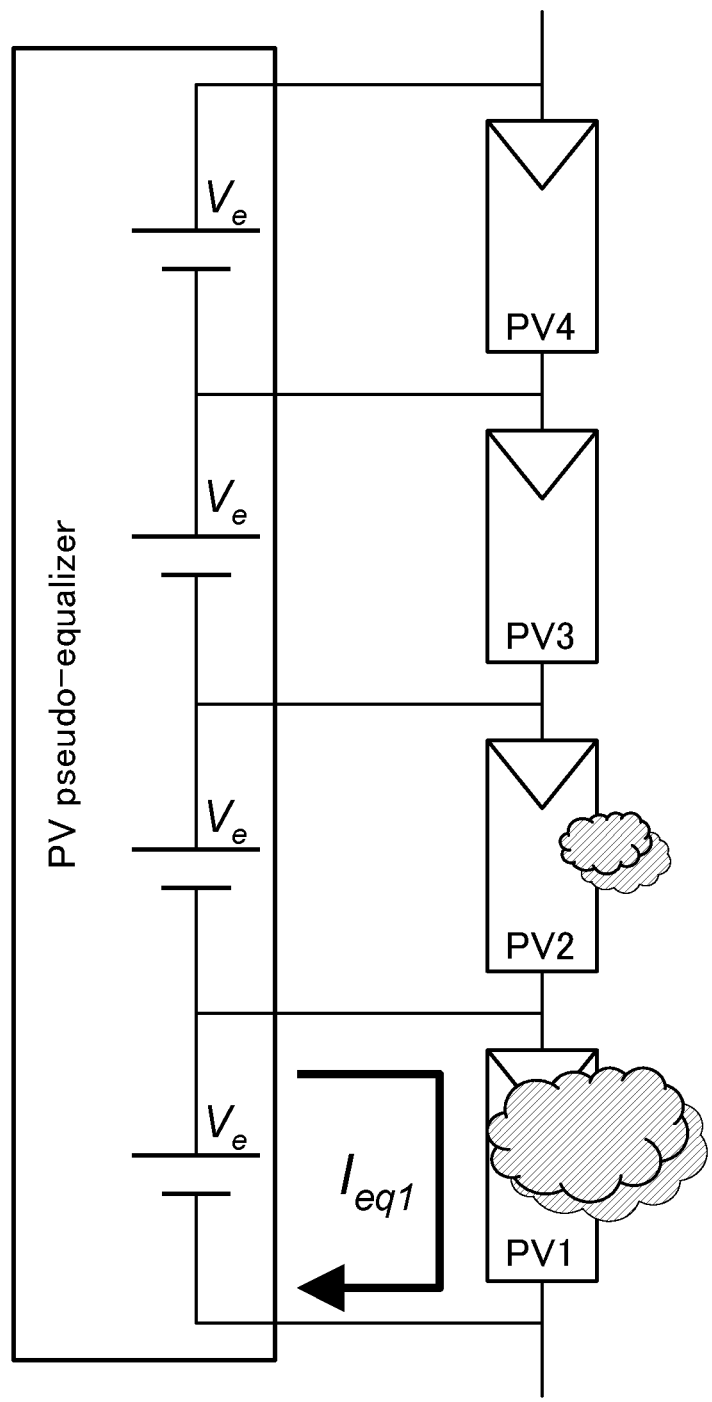
FIG. 49b is a conceptual diagram of current supply during partial shading compensation (during insufficient compensation).
Figure 49C:
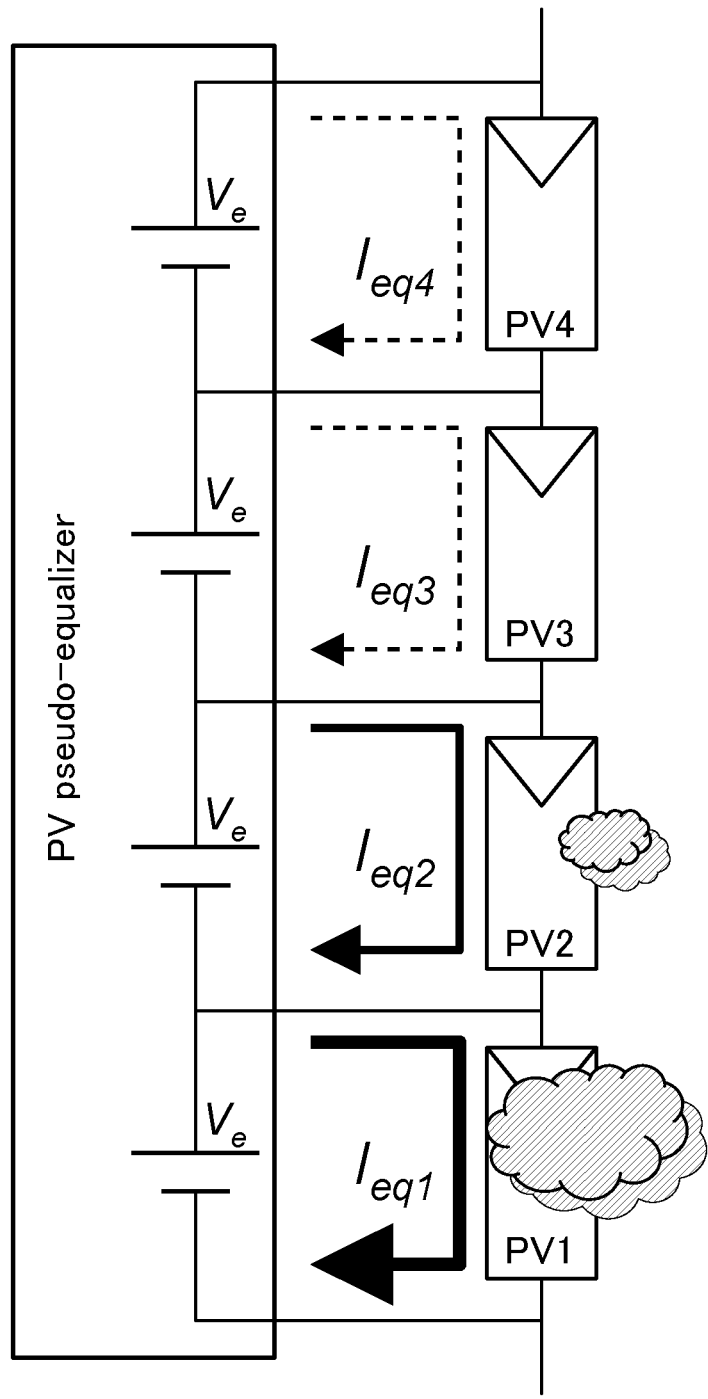
FIG. 49c is a conceptual diagram of current supply during partial shading compensation (during optimal compensation).

FIGS. 49*a* to 49*c* conceptually depict a compensation current supply in the solar cell adjustment system according to the present invention (including a system according to an aftermentioned fourth embodiment). In this example, assume that two (PV1 and PV2) of the four-series solar cell modules PV1 to PV4 are shaded, wherein PV1 is shaded to a greater extent. Further, in this example, the solar cell adjustment system is depicted equivalently as outputting a same voltage Ve to each of the solar cell modules.

FIG. 49*a* is a conceptual diagram depicting the compensation current supply during excessive compensation. A compensation current $I_{eq4}$ and a compensation current $I_{eq2}$ are supplied, respectively, to PV1 and PV2, according to a level of shading, and relatively large compensation currents $I_{eq3}$ and $I_{eq4}$ are also supplied, respectively, to PV3 and PV4 as insolated modules. The companion current is supplied to PV3 and PV4 although they need not be subjected to the compensation, so that an unwanted electric power conversion loss internally occurs in the partial shading compensation device due to the companion current.

On the other hand, FIG. 49b is a conceptual diagram depicting the compensation current supply during insufficient compensation.

No compensation current is supplied to PV3 and PV4 as insolated modules, and therefore the unwanted electric power loss as in the excessive compensation in FIG. 49a never occurs.

However, no compensation current is supplied to PV2 which essentially requires the compensation, and a compensation current for PV1 is insufficient, so that it is impossible to fully compensate for an influence of partial shading.

FIG. 49c is a conceptual diagram depicting the compensation current supply during optimal compensation.

A compensation current $I_{eq4}$ and a compensation current $I_{eq2}$ are supplied, respectively, to PV1 and PV2, according to a level of shading, and only very small compensation currents $I_{eq3}$ and $I_{eq4}$ are supplied, respectively, to PV3 and PV4 as insolated modules. During the optimal compensation, a compensation current is also slightly supplied to each of the insolating modules having a high voltage, and this means that a sufficient compensation current will be always supplied to shaded modules having a low voltage. In addition, the compensation current to be supplied to each of the insolating modules is very small, so that it becomes possible to minimally suppress an unwanted electric power conversion loss cause by a compensation current.

Figure 50:
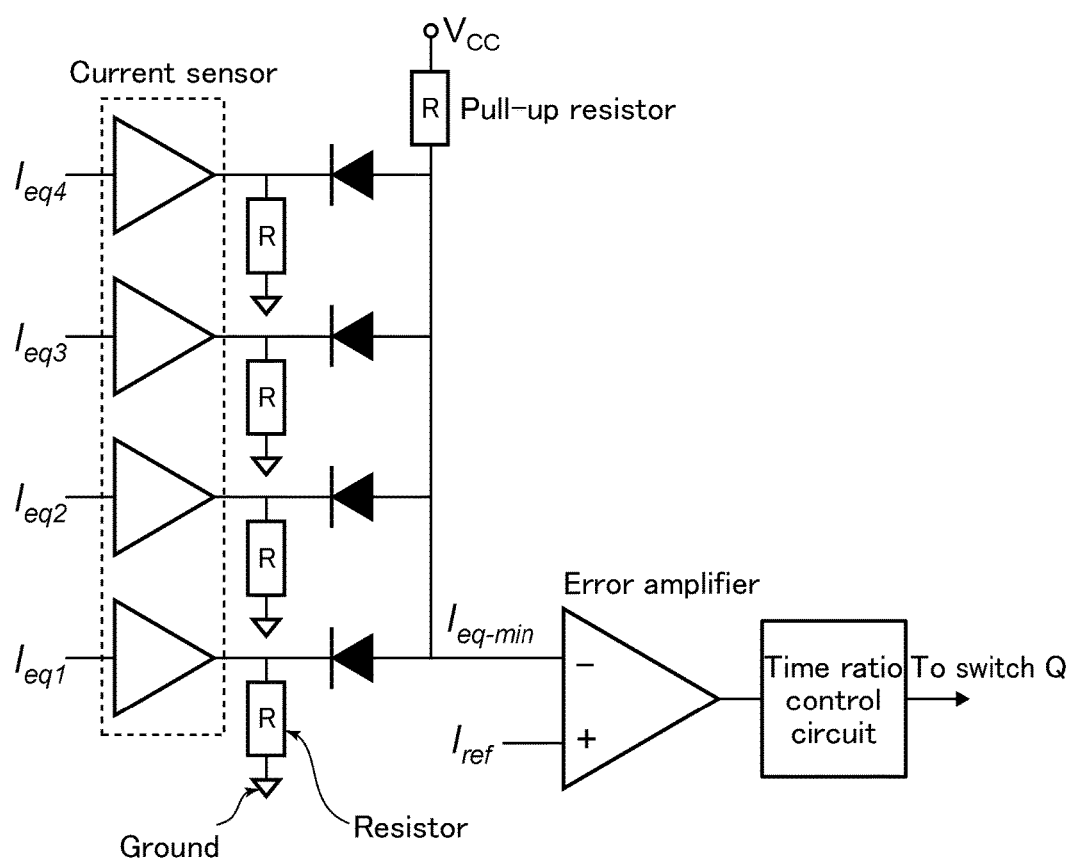
FIG. 50 is a configuration diagram of a minimum current control system for realizing the optimal compensation depicted in FIG. 49c.

FIG. 50 depicts one example of a minimum current control system usable for realizing the optimal compensation of FIG. 49c.

The minimum current detection system comprises: a pull-up resistor connected to a power supply Vcc; 1st to 4th current sensors configured to detect compensation currents flowing, respectively, through the solar cell modules PV1 to PV4; 1st to 4th diodes each connected between the pull-up resistor and a respective one of the 1st to 4th current sensors in such a manner as to be kept from blocking a current flowing from the pull-up resistor to the current sensor; an error amplifier (comparator) connected to the pull-up resistor; and a time ratio control circuit (current control means) configured to control a compensation current flowing each of the solar cell modules PV1 to PV4 by controlling the time ratio of the switch Q of the solar cell adjustment system.

An operation of the minimum current control system will be described below.

By taking the solar cell adjustment system in FIG. 41 as an example, the 1st to 4th current sensors are connected, for example, to the diodes D1 to D4, respectively, to detect compensation currents $I_{eq4}$ to $I_{eq4}$ flowing, respectively, through the solar cell modules PV1 to PV4.

Each of the current sensors is configured to convert the detected current to a voltage (e.g., convert 1 A to 1 V) and output the voltage.

Assuming that the compensation currents flowing through the solar cell modules PV1 to PV4 are, respectively, 1.3 A, 0.6 A, 0.1 A and 0.1 A, the 1st to 4th current sensors output respective voltages of 1.3 V, 0.6 V, 0.1 V and 0.1 V.

At this time, the 3rd and 4th diodes connected, respectively, to the 3rd and 4th current sensors each outputting a lowest voltage are brought into conduction.

A current flowing from the power supply Vcc into the conducted diodes via the pull-up resistor flows into a resistor connected between the current sensor and the diode.

It should be understood that, in the case where the 1st to 4th current sensors operates as a sink, these resistors are not necessary.

By the 3rd and 4th current sensors each detecting a minimum compensation current of 0.1 A and outputting a voltage of 0.1 V, a bias of 0.1 V is applied on a current path extending from the power supply Vcc to the error amplifier via the pull-up resistor. Thus, assuming that a voltage of the power supply is 5.0 V, a voltage drop in the pull-up resistor is 4.9 V. A signal corresponding to this voltage drop (i.e., a signal indicative of a minimum correction current value $I_{eq\text{-}min}$=0.1 A among the compensation currents $I_{eq1}$ to $I_{eq4}$) is input into the error amplifier.

Based on comparison of the minimum compensation current value $I_{eq\text{-}min}$ and a reference current $I_{ref}$ input from the outside, the error amplifier outputs an error signal, and the error signal is input into the time ratio control circuit. The time ratio control circuit is operable, when the error expressed as $I_{ref}$-$I_{eq\text{-}min}$ has a negative value, to lower the time ratio of the switch Q in FIGS. 41 to 43 (generate a pulse-width modulated wave with smaller ratio of the ON period) so as to totally reduce the compensation currents, and when the error has a positive value, to raise the time ratio of the switch Q (generate a pulse-width modulated wave with a larger ratio of the ON period) so as to totally increase the compensation currents, to cause the error to come close to zero.

By repeatedly performing the above operation, the operating state of the solar cell adjustment system can be adjusted to come close to the optimal compensation state in FIG. 49c.

From a viewpoint of minimally suppressing an unwanted electric power conversion loss in the solar cell adjustment system as described above, it is desirable to set as $$I_{ref} \approx 0$$

($I_{ref}$ is almost equal to Zero), because when the solar cell adjustment system of the present invention is operated using this minimum current control system, it operates so as to meet $I_{eq\text{-}min}$=$I_{ref}$.

In this regard, although the explanation was made based on an circuit where an analog circuit is used to detect the minimum compensation current $I_{eq\text{-}min}$ and the control is performed, digital control may be employed so as to easily realize the same control. For example, it may be configured to convert voltage signals from the 1st to 4th current sensors, to a digital signals through an A/D converter (not depicted); input the digital signals into a second comparator (not depicted) to perform comparison of current values in the second comparator to thereby identify the minimum compensation current $I_{eq\text{-}min}$; and input a signal indicative of the minimum compensation current $I_{eq\text{-}min}$ into the error amplifier.

The above minimum current control system can be applied to not only the solar cell adjustment system according to the present invention but also any circuit having a plurality of circuit element.

The same system as that in FIG. 50 or a system using the above digital control may be connected to each of a plurality of any circuit elements not limited to a solar cell module (In FIG. 50, the current sensors are connected to any circuit elements not limited to the solar cell modules PV1 to PV4. It should be noted that the number of circuit elements may be any number other than four, and the plurality of circuit elements are not necessarily the same type of elements). In this case, a minimum current among currents flowing, respectively, through the circuit elements can be identified and compared to a reference current, and the currents flowing through the circuit elements can be controlled based on a result of the comparison.

In the above description, "control the currents flowing through the circuit elements" may be the time ratio control of the switch comprised in the circuit as in the aforementioned embodiments, or may be, in the case where variable resistors are connected, respectively, to the circuit elements, changing of resistance values of them via an arbitrary control circuit (not depicted; one example of "current control means"). Further, a system obtained by removing a current control device such as the time ratio control circuit, from the minimum current control system according to the present invention, can operate independently, as a minimum current detection system of the present invention.

Test Using Solar Cell Adjustment System According to Present Invention

FIG. 51 and FIGS. 52a to 52d depict examples of a result of a test using a solar cell adjustment system according to present invention, depicted in FIG. 41. In a system used in this test, the input capacitor Cin had a capacitance of 20 μF (micro F); the inductor Lin had an inductance of 100 μH (micro H); each of the inductors L1 to L4 had an inductance of 33 μH (micro H), each of the capacitors C1 to C4 had a capacitor of 20 μF (micro F); Switch Q had On-state resistance of 39 mΩ (milli ohm); each of the diodes D1 to D4 had a forward voltage drop of 0.65 V; and the switching frequency of the switch Q was set to 100 kHz. Further, the minimum current control system in FIG. 50 is activated, wherein the reference current $I_{ref}$ was set to 100 mA.

Figure 51:
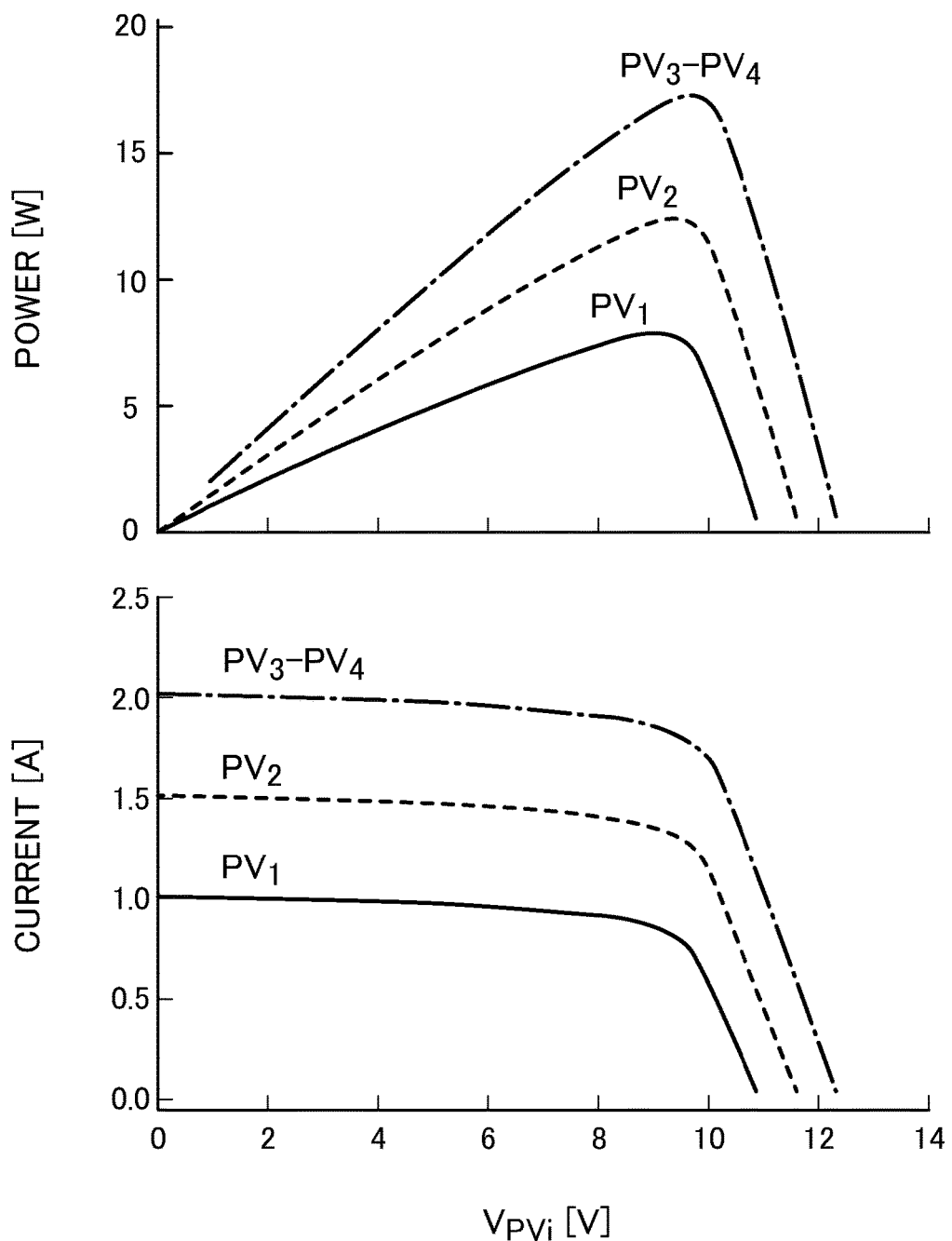
FIG. 51 depicts characteristics of each solar cell module used in tests.
Figure 52A:
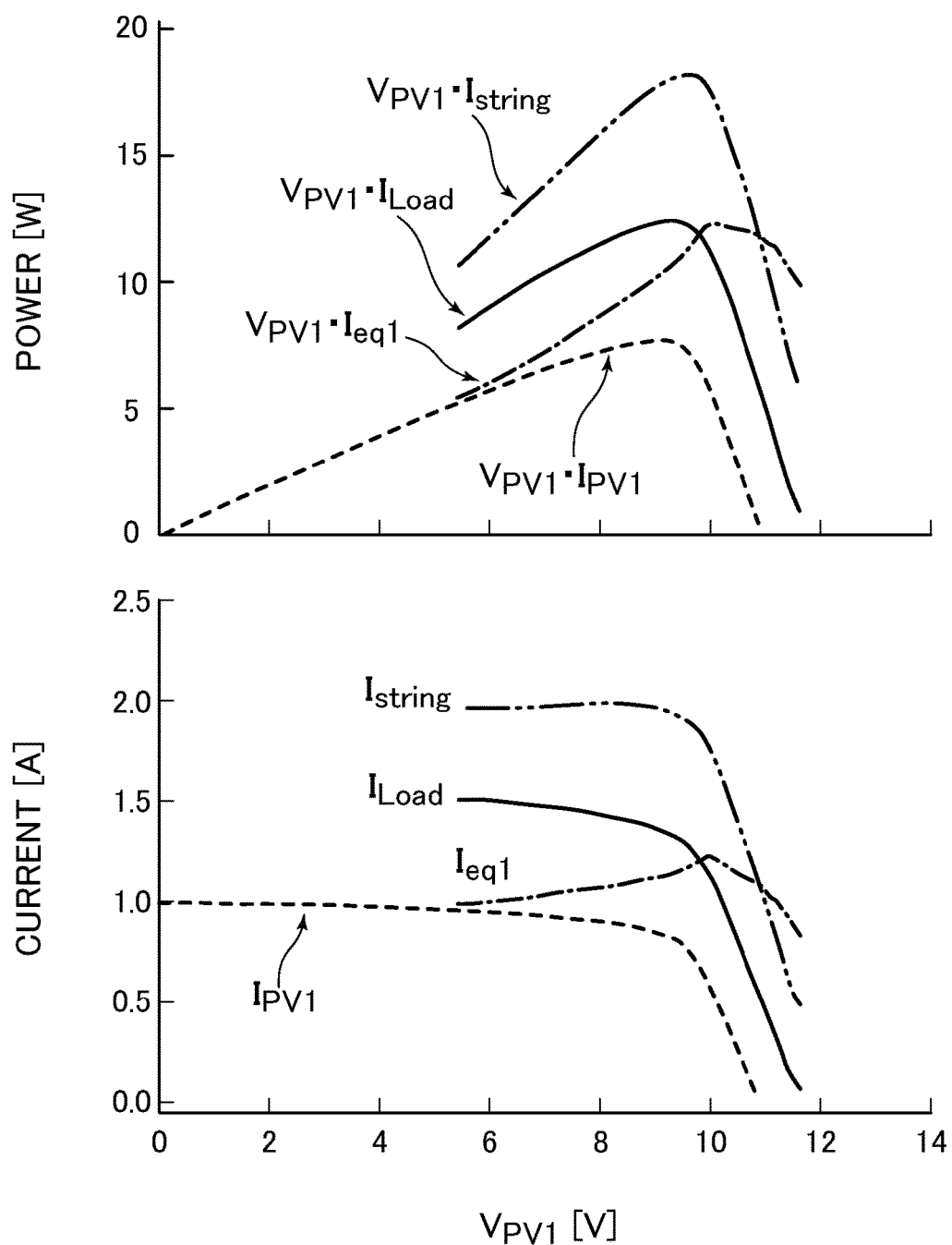
FIG. 52a depicts a test result regarding operating characteristics of a solar cell module PV1, when the solar cell adjustment system according to the present invention is activated.
Figure 52B:
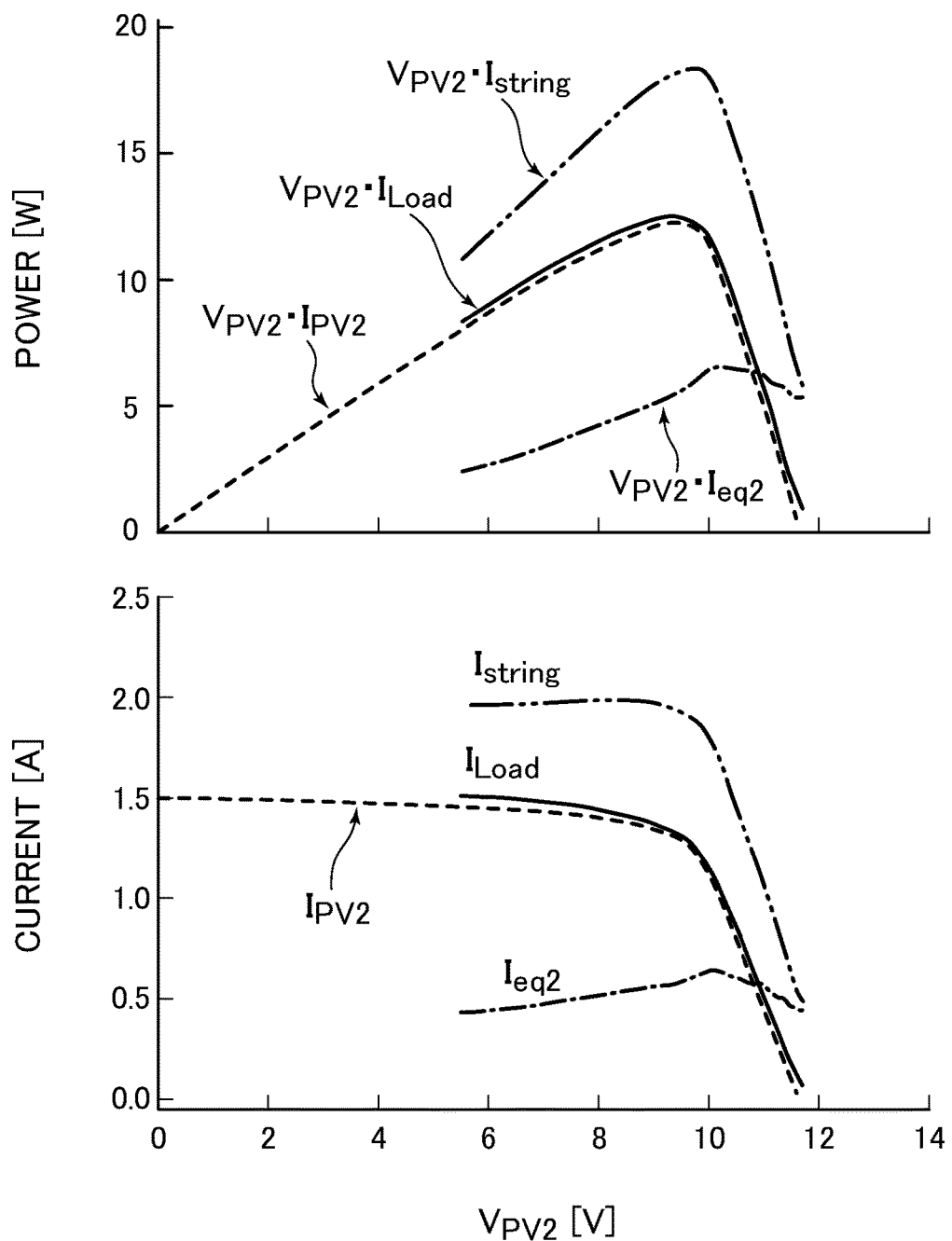
FIG. 52b depicts a test result regarding operating characteristics of a solar cell module PV2, when the solar cell adjustment system according to the present invention is activated.
Figure 52C:
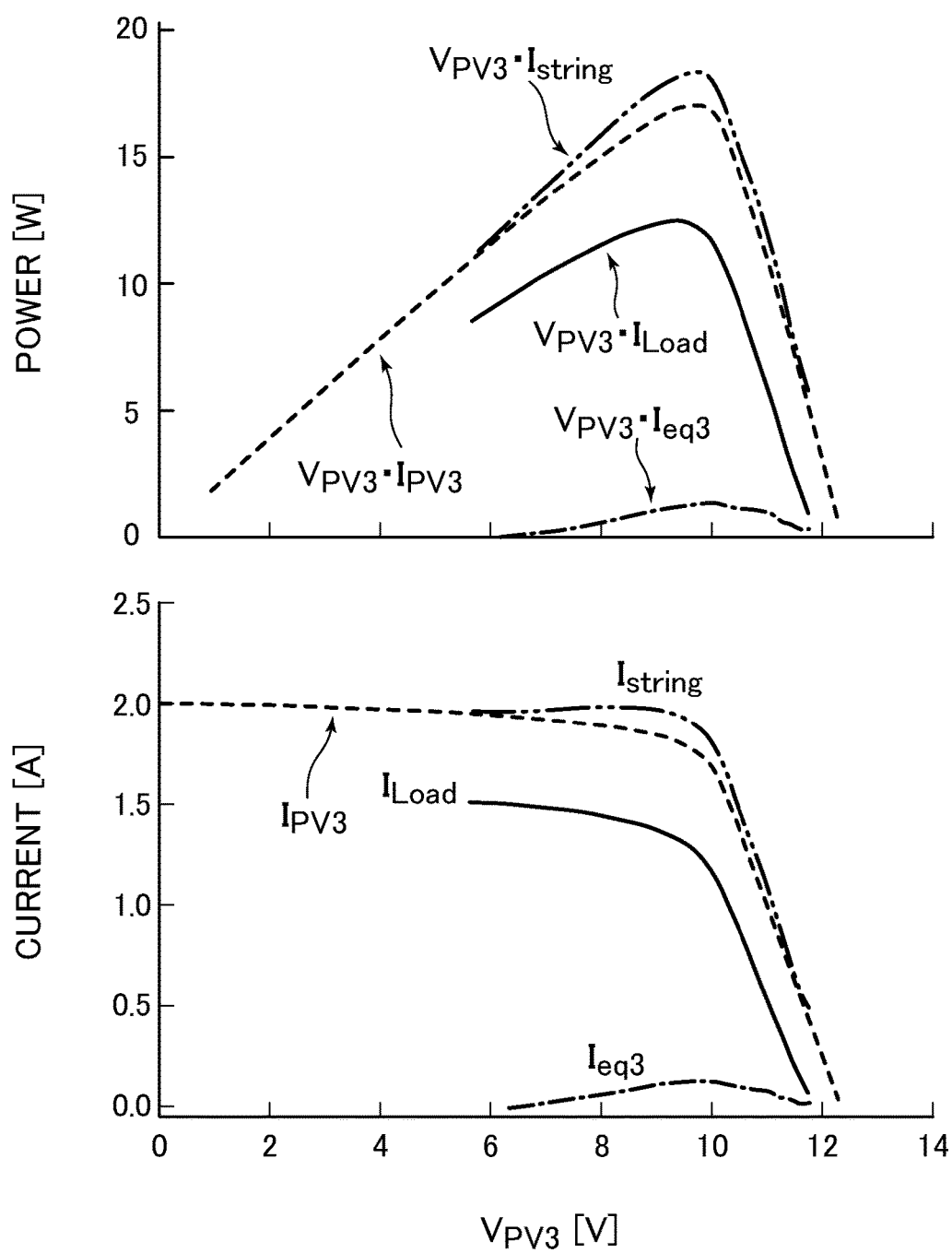
FIG. 52c depicts a test result regarding operating characteristics of a solar cell module PV3, when the solar cell adjustment system according to the present invention is activated.
Figure 52D:
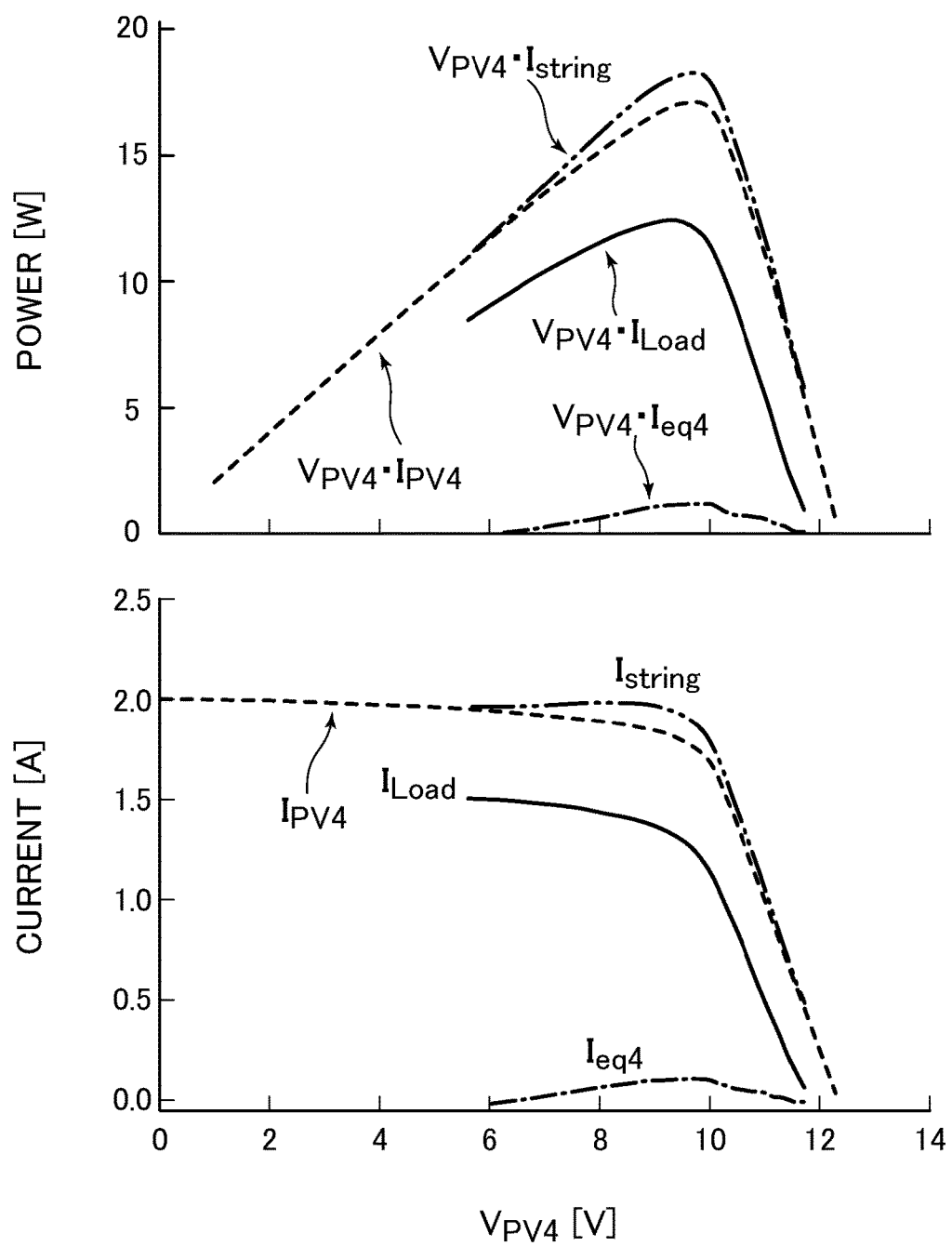
FIG. 52d depicts a test result regarding operating characteristics of a solar cell module PV4, when the solar cell adjustment system according to the present invention is activated.

The test was performed under the condition that characteristics of each module were set as depicted in FIG. 51, assuming that, during the test, the solar cell modules PV1 and PV2 were shaded, as with the situation in FIGS. 49a to 49c. As the solar cell modules PV1 and PV4, a solar cell array simulator (E4350B, produced by Agilent Technologies Inc.) was used. FIGS. 52a to 52d depict individual characteristics of each module during compensation. A very small compensation current ($I_{eq3}$, $I_{eq4}$) of about 100 mA flows through each of the insolated modules PV3 and PV4 (FIGS. 52c and 52d), whereas a fairly large amount of compensation current ($I_{eq4}$=about 1.2 A, $I_{eq2}$=about 0.5 A) flows through each of the shaded modules PV1 and PV2 (FIGS. 52a and 52b) corresponding to the characteristics. This shows that the optimal compensation described in FIG. 49c is realized. The modules are largely different from each other in terms of characteristics of itself, (characteristics in FIG. 51, and the broken lines in FIGS. 52a to 52d), whereas the modules are approximately the same in terms of the $V_{PV1}$-to-$I_{Load}$ characteristic during compensation equivalently.

Figure 53:
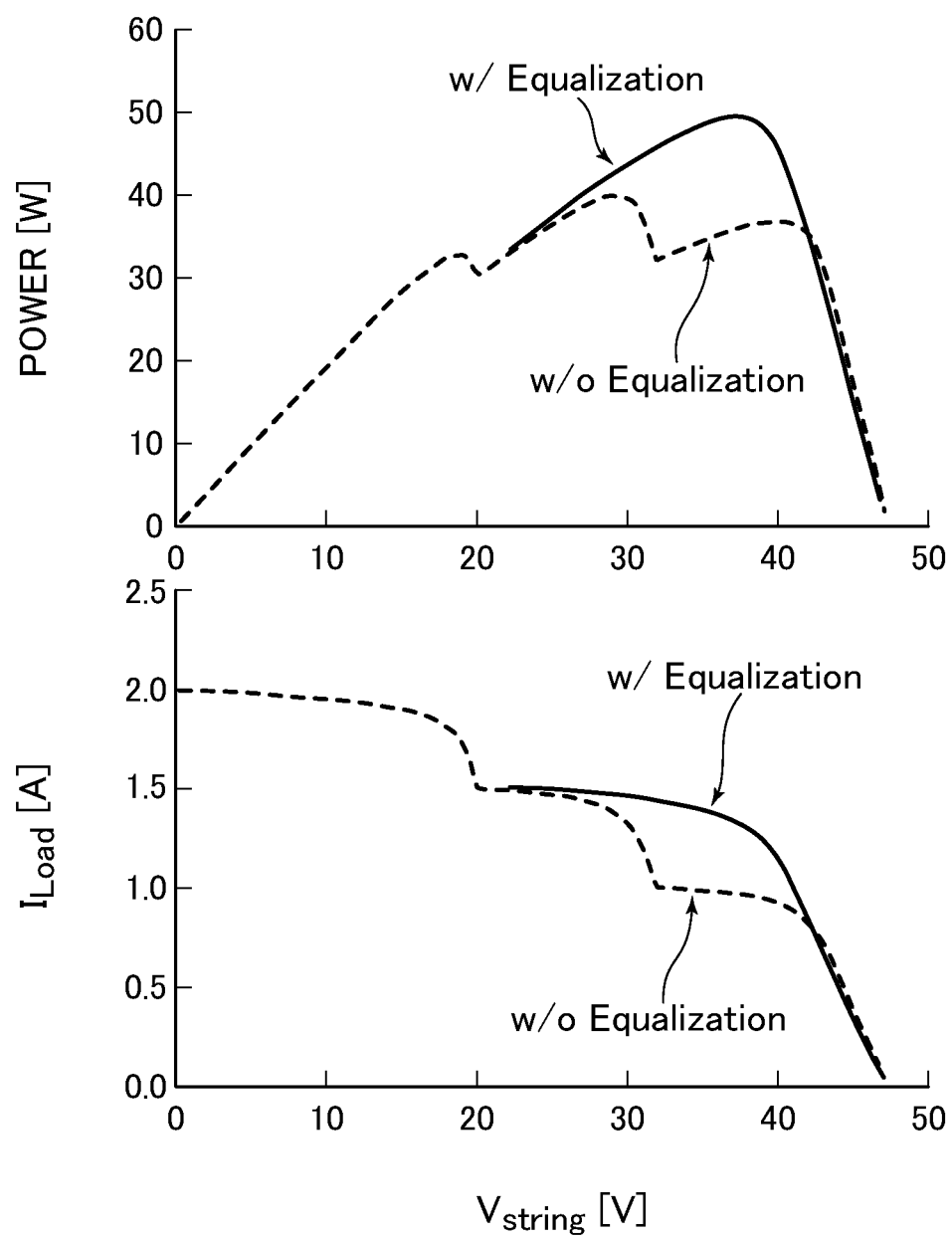
FIG. 53 depicts test results indicative of operation characteristics of a string in the case where the solar cell adjustment system according to the present invention is used, and in the case where the solar cell adjustment system according to the present invention is not used.

FIG. 53 depicts comparison between string characteristics in two states with and without the solar cell adjustment system according to the present invention. In the case where the solar cell adjustment system is not used (the dashed curves graph; the case where a bypass diode is connected in parallel, respectively, to the solar cell modules PV1 to PV4), three MPPs appear, and an extractable maximum electric power is about 40 W, where:

$$at\ V_{String} \approx 30\ V\ (V_{string}\ is\ almost\ equal\ to\ 30\ V).$$

On the other hand, in the case where the solar cell adjustment system is used (solid curves), the number of MPP is only one, and the maximum electric power is about 50 W, where:

$$at\ V_{String} \approx 38\ V\ (V_{string}\ is\ almost\ equal\ to\ 38\ V).$$

i.e., it is significantly improved. Thus, the use of the solar cell adjustment system according to the present invention makes it possible to significantly improve the extractable maximum electric power while preventing the occurrence of a plurality of MPPs.

Fourth Embodiment

Configuration of Solar Cell Adjustment System

As mentioned in connection with the third embodiment, in the solar cell adjustment systems depicted in FIGS. 41 to 43, due to a relatively large ripple current flowing thorough the solar cell modules during operation, the operating voltage of the solar cell is likely to become unstable. As measures against this, a solar cell adjustment system having a circuit configuration depicted in FIG. 54 can be used to significantly reduce a ripple current flowing through each solar cell module while compensating for partial shading.

Figure 54:
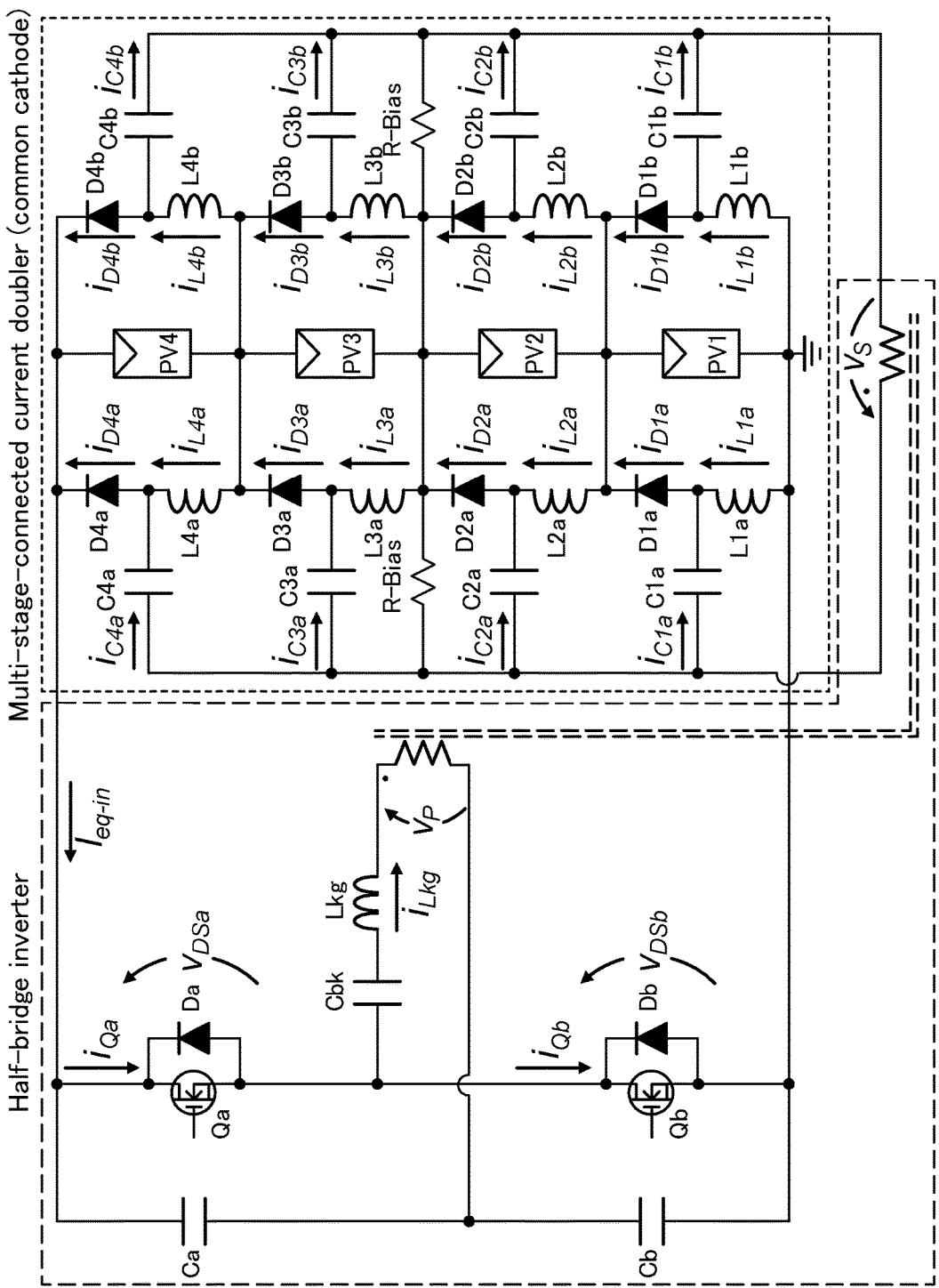
FIG. 54 is a circuit diagram of a solar cell adjustment system according to one embodiment of the present invention, using a half-bridge inverter and a common cathode, multistage-connected current doubler.

In the solar cell adjustment system depicted in FIG. 54, each of C1a to C4a and C1b to C4b denotes a capacitor, each of L1a to L4a and L1b to L4b denotes an inductor, and each of D1a to D4a and D1b to D4b denotes a diode, respectively, wherein a multistage-connected current doubler composed of the above elements and connected to a second winding of a transformer is connected to the solar cell modules PV1 to PV4. The multistage-connected current doubler is equivalent to a configuration obtained by disposing the multistage-connected C-D-L circuit depicted in FIG. 41 in a symmetrical arrangement with respect to each of the modules. Further, R-Bias denotes a bias resistance for preventing a voltage value of each capacitor from becoming indefinite. The solar cell adjustment system in FIG. 54 also comprises a half-bridge inverter equipped with: two switches Qa and Qb; two diodes Da and Db; three capacitors Ca, Cb and Cbk; and an inductor Lkg (which denotes a leakage inductance of the transformer), and connected to a primary winding of the transformer. The half-bridge inverter is operable to: receive an input of a summed voltage across the solar cell modules PV1 to PV4; alternately switch ON/OFF states of the switches Qa and Qb to generate a rectangular wave-shaped AC voltage; and output the transformed AC voltage which was transformed through the transformer to the multistage-connected current doubler. In this regard, $i_{L1a}$ to $i_{L4a}$ and $i_{L1b}$ to $i_{L4b}$ denote, respectively, eight currents each flowing through a respective one of the inductors L1a to L4a and L1b to L4b; $i_{D1a}$ to $i_{D4a}$ and $i_{D1b}$ to $i_{D4b}$ denote, respectively, eight currents each flowing through a respective one of the diodes D1a to D4a and D1b to D4b; $i_{C1a}$ to $i_{C4a}$ and $i_{C1b}$ to $i_{C4b}$ denote, respectively, eight currents each flowing through a respective one of the capacitors C1a to C4a and C1b to C4b; $I_{eq-in}$ denotes a current input from the string into the half-bridge inverter; $i_{Qa}$ and $i_{Qb}$ denote, respectively, two currents each flowing through a respective one of the switches Qa and Qb; $v_{DSa}$ and $v_{DSb}$ denote, respectively, voltages each applied to a respective one of the switches Qa and Qb; $i_{Lkg}$ denotes a current flowing through the inductor Lkg; and $v_P$ denotes a voltage applied to the primary winding. Although FIG. 54 denotes a common cathode-type configuration in which cathodes of corresponding ones of the diodes D in the symmetrically-arranged C-D-L circuits are common-connected (i.e., each of a pair of cathodes of the diodes D1a and D1b, a pair of cathodes of the diodes D2a and D2b, a pair of cathodes of the diodes D3a and D3b and a pair of cathodes of the diodes D4a and D4b are common-connected), an aftermentioned common anode-type configuration (FIG. 57) can operate in the same manner.

Operation of Solar Cell Adjustment System

Figure 55:
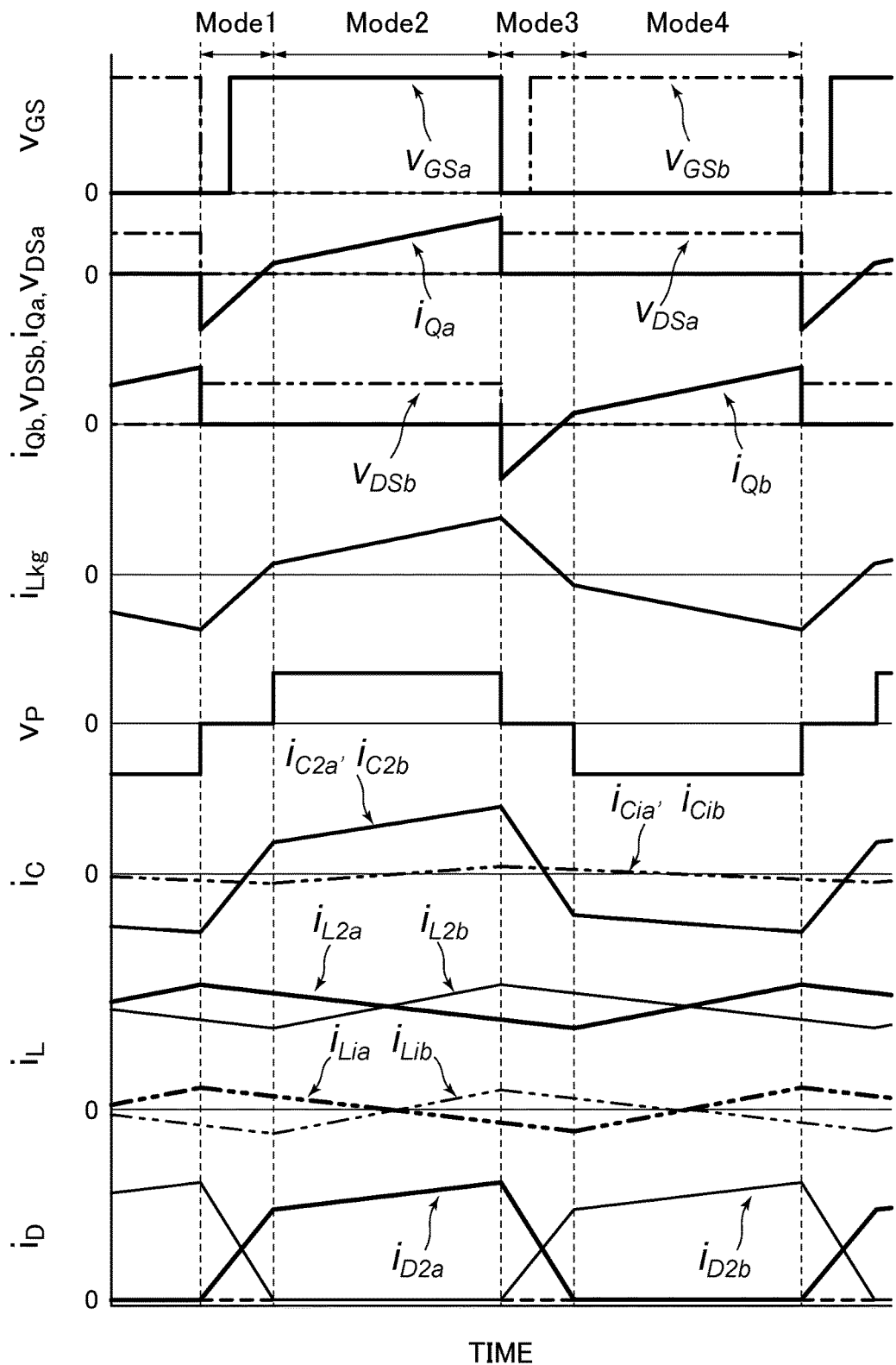
FIG. 55 is a waveform chart depicting temporal changes in current flowing through each element and voltage applied to each element, when the solar cell adjustment system in FIG. 54 is activated.

FIG. 55 depicts waveforms of current flowing through each element and voltage applied to each element when the solar cell adjustment system in FIG. 54 is driven by alternately switching the ON/OFF states of the switches Qa and Qb in a situation where the solar cell module PV2 is shaded, and FIGS. 56a to 56d depict pathways of current flowing through the system during respective periods of modes 1 to 4 realized during operation. In the graphs in FIG. 55, $v_{GSa}$ and $v_{GSb}$ denote, respectively, gate voltages of the switches Qa and Qb.

Figure 56A:
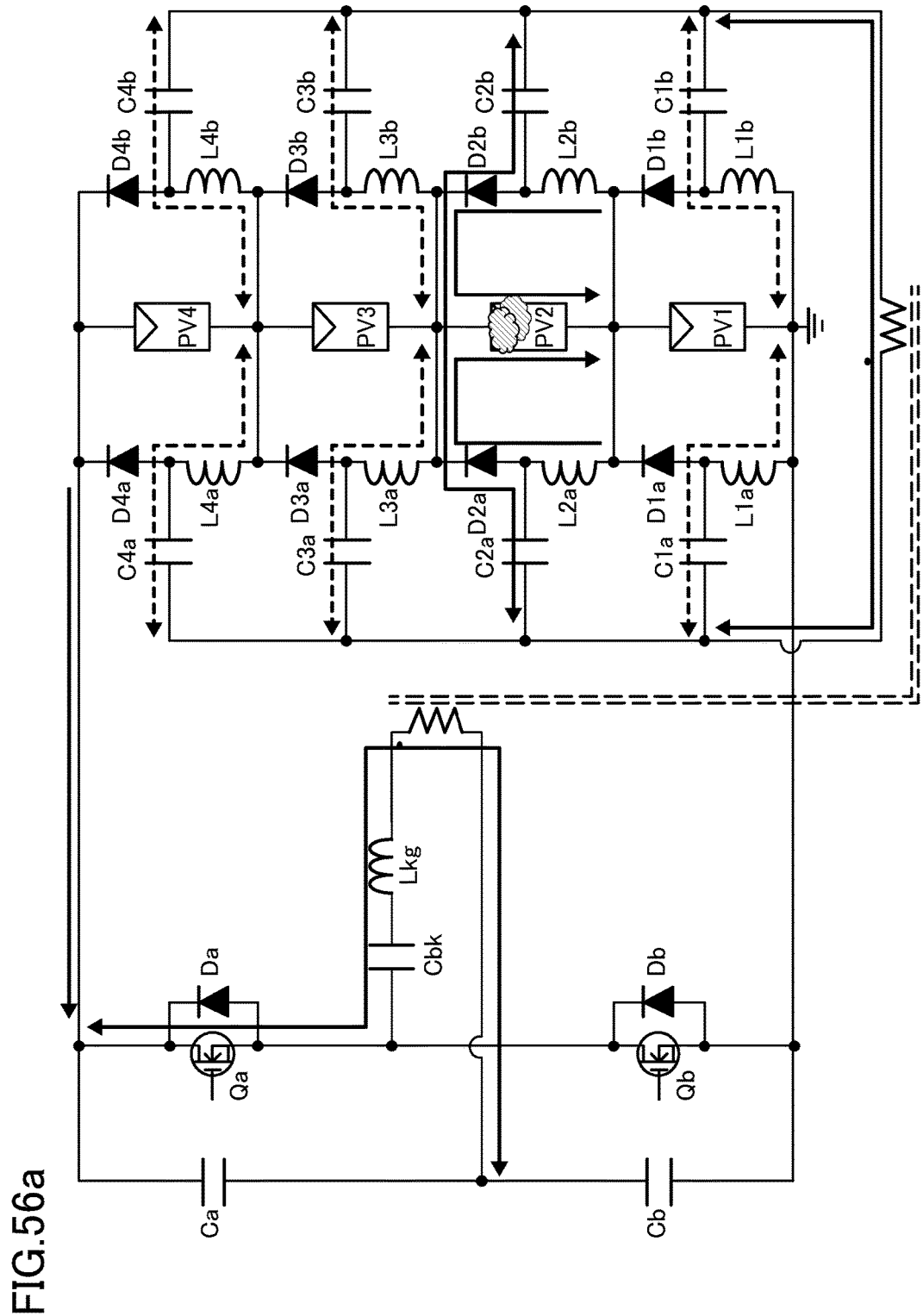
FIG. 56a is a diagram depicting a pathway of current flowing during a period of mode 1, when the solar cell adjustment system in FIG. 54 is activated in a situation where a solar cell module PV2 is shaded.

In the half-bridge inverter, by alternately bringing the switches Qa and Qb in conduction, as indicated by the graph of $v_{GS}$ in FIG. 55, a rectangular wave-shaped AC voltage is applied to the primary winding of the transform, as indicated by the graph of $v_P$. A voltage across the secondary voltage of the transformer changes according to four operation modes indicated in the graph of $v_{GS}$. The multistage-connected current doubler circuit is driven by the voltage, and a current flows through the circuit as depicted in FIG. 56a (mode 1) to FIG. 56d (mode 4). In FIGS. 56a to 56d, each current pathway along which only a ripple current component flows is indicated by the broken line. Further, two arrows are put, respectively, on opposite ends of each current pathway in which a current direction is reversed in the period of the same mode.

Figure 56B:
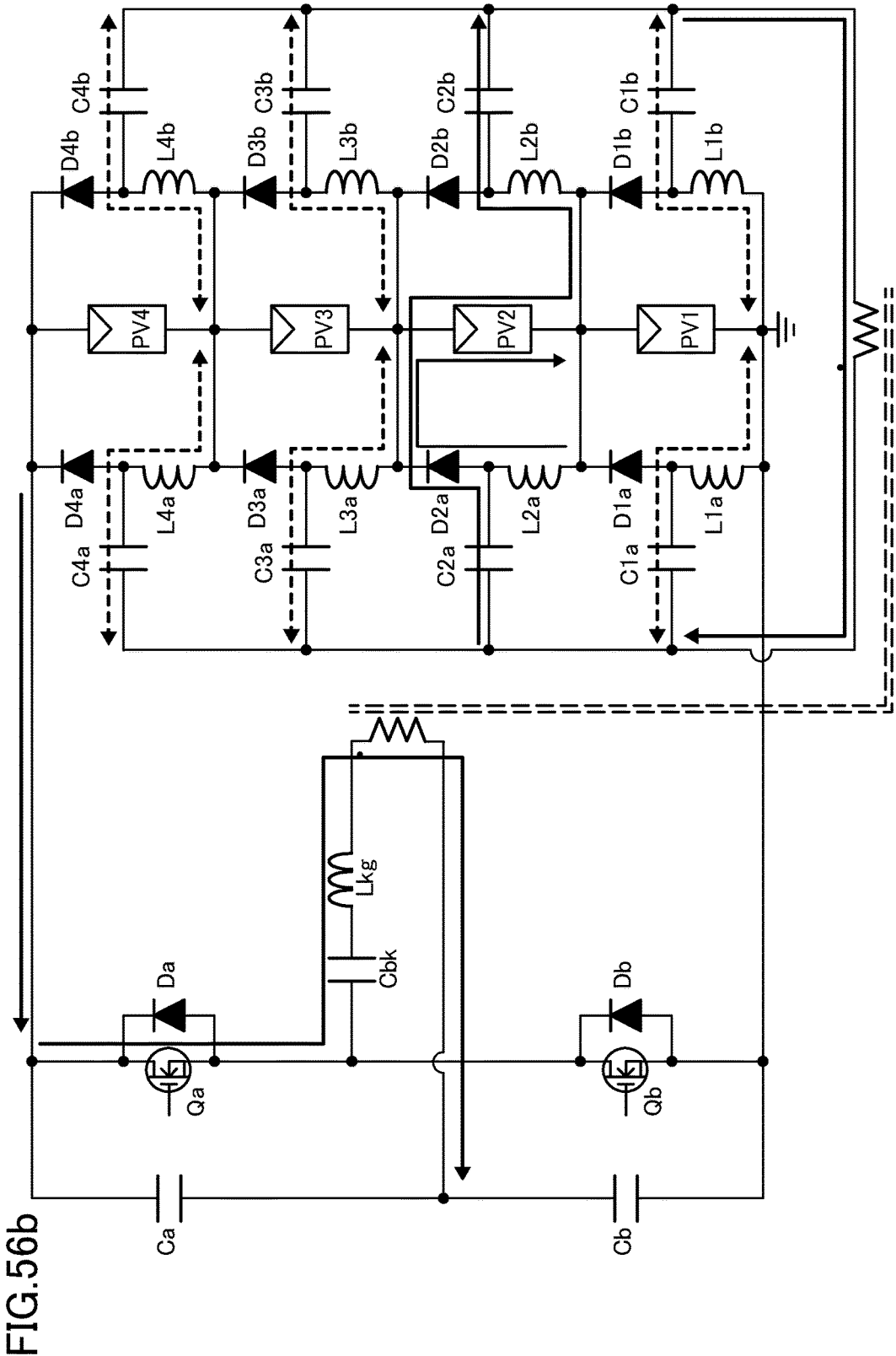
FIG. 56b is a diagram depicting a pathway of current flowing during a period of mode 2, when the solar cell adjustment system in FIG. 54 is activated in the situation where the solar cell module PV2 is shaded.

For convenience sake, first of all, an operation in mode 2 will be described (FIG. 56b). During the period of the mode 2, the switch Qa is set in an ON state, and the switch Qb is set in an OFF state, so that a certain level of positive voltage (which is a voltage rising in a direction of the arrowed line indicative of $v_P$ in FIG. 54; see the graph of $v_P$ in FIG. 55) is output to the capacitor Cbk, the inductor Lkg and the primary winding. Thus, a current flowing through the inductor Lkg linearly increases (see the graph of $i_{Lkg}$ in FIG. 55). The voltage applied to the primary winding is transformed by the transformer, to drive the multistage-connected current doubler circuit. Based on the voltage applied through the transformer, a compensation current flows into the shaded module PV2 via the capacitor C2a and the diode D2a, whereafter this current flows toward the inductor L2b and the capacitor C2b. According to the aforementioned positive voltage, these currents also linearly increase (see the corresponding graphs in FIG. 55). And, a compensation current due to discharge of energy by the inductor L2a is supplied to the shaded module PV2. This current will decrease as the inductor L2a loses energy (see the graph of $i_{L2a}$ in FIG. 55). A current flowing through the shaded module PV2 during the period of the mode 2 according to the operation of the solar cell adjustment system is equal to a sum of $i_{L2a}$ and $i_{L2b}$. A current flowing through any remaining inductor other than the inductors L2a and L2b corresponding to the shaded module PV2 in the multistage-connected current doubler consists only of a ripple current component.

Figure 56C:
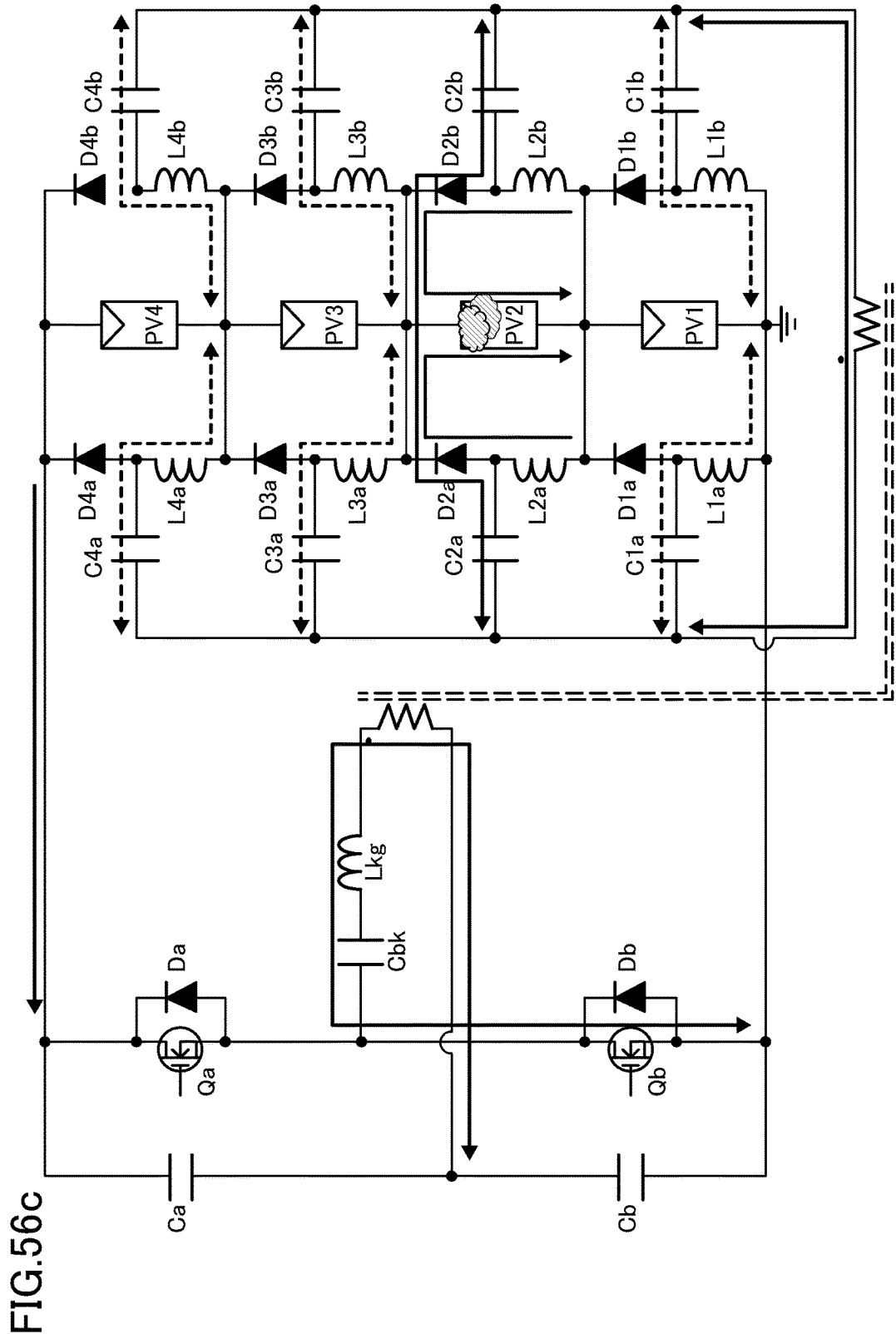
FIG. 56c is a diagram depicting a pathway of current flowing during a period of mode 3, when the solar cell adjustment system in FIG. 54 is activated in the situation where the solar cell module PV2 is shaded.
Figure 56D:
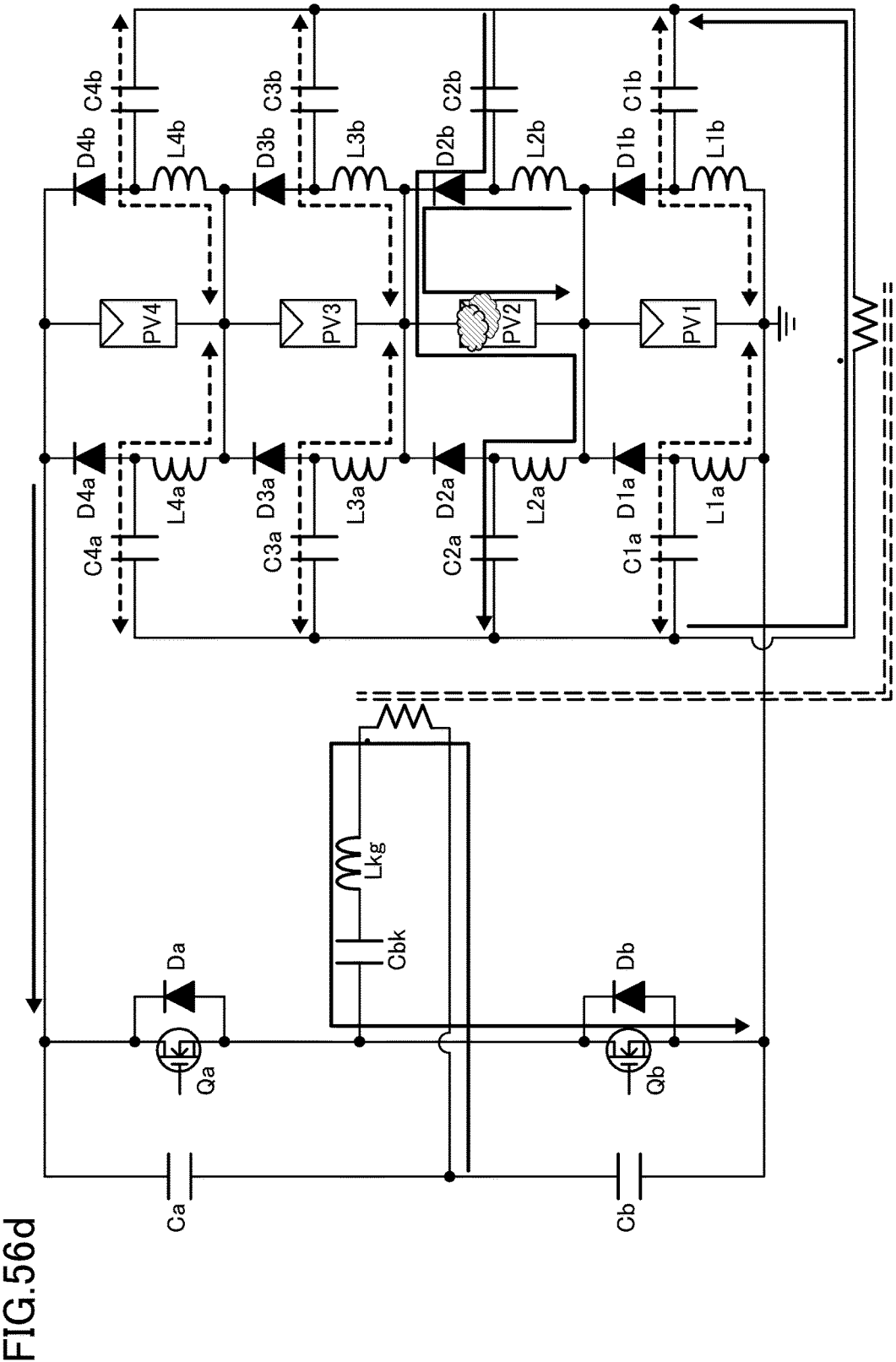
FIG. 56d is a diagram depicting a pathway of current flowing during a period of mode 4, when the solar cell adjustment system in FIG. 54 is activated in the situation where the solar cell module PV2 is shaded.

Then, just after the switch Qa is turned off, the current which has flowed through the switch Qa is commutated toward the diode Db as an antiparallel diode of the switch Qb, and the operation is shifted to the mode 3 (FIG. 56c). At start of the mode 3, although a forward current flows through the diode Db, and each current flowing through the capacitor Cbk, the inductor Lkg and the primary winding is directed in the same direction as that during the period of the mode 2, these currents will linearly decrease due to a voltage from the capacitor Cb. By applying the gate voltage $v_{GSb}$ to Qb before a polarity of $i_{Lkg}$ is reversed (see the graph of $v_{GSb}$ in FIG. 55), just after reversing of the polarity of $i_{Lkg}$, the switch Qb is turned on at zero voltage. In the mode 3, a winding voltage of the transformer is 0. Thus, in the multistage-connected current doubler, each of the inductors L2a and L2b supplies a compensation current to the shaded module PV2, and accordingly each of the diodes D2a and D2b is brought into conduction. As the inductors L2a and L2b discharge energy therefrom, $i_{L2a}$ and $i_{L2b}$ decreases (see the graphs of $i_{L2a}$ and $i_{L2b}$ in FIG. 55). A compensation current supplied from the solar cell adjustment system to the shaded module PV2 during the period of the mode 3 corresponds to a sum of $i_{L2a}$ and $i_{L2b}$, as with that during the period of the mode 2. Just after the current $i_{D2a}$ through the diode D2a becomes 0, the operation is shifted to the next mode 4.

During the period of the mode 4 (FIG. 56d), the switch Qa is set in an OFF state, and the switch Qb is set in an ON state, so that a certain level of negative voltage (the voltage rising in the direction of the arrowed line indicative of $v_P$ in FIG. 54 is defined as a positive voltage; see the graph of $v_P$ in FIG. 55) is output to the capacitor Cbk, the inductor Lkg and the primary winding. Thus, a current flowing through the inductor Lkg linearly decreases (the absolute value thereof increases; see the graph of $i_{Lkg}$ in FIG. 55). The voltage applied to the primary winding is transformed by the transformer, to drive the multistage-connected current doubler circuit. Based on the voltage applied through the transformer, a compensation current flows into the shaded module PV2 via the capacitor C2b and the diode D2b, whereafter this current flows toward the inductor L2a and the capacitor C2a. The absolute values of these currents also linearly increase based on the above-mentioned negative voltage (see the corresponding graphs in FIG. 55). And, a compensation current due to discharge of energy from the inductor L2b is supplied to the shaded module PV2. This current will decrease as the inductor L2b loses energy (see the graph of $i_{L2b}$ in FIG. 55). A current flowing through the shaded module PV2 during the period of the mode 4 according to the operation of the solar cell adjustment system corresponds to a sum of $i_{L2a}$ and $i_{L2b}$. A current flowing through any remaining inductor other than the inductors L2a and L2b corresponding to the shaded module PV2 in the multistage-connected current doubler consists only of a ripple current component.

Then, when the switch Qb is turned off, the current which has flowed through the switch Qb is concurrently commutated toward the diode Da as an antiparallel diode of the switch Qa, and the operation is shifted to the mode 1 (FIG. 56a). At start of the mode 1, although a forward current flows through the diode Da, and each current flowing through the capacitor Cbk, the inductor Lkg and the primary winding is directed in the same direction as that during the period of the mode 4, these currents will linearly increase (the absolute values thereof decrease) due to a voltage from the capacitor Ca. By applying a gate voltage $v_{GSa}$ to Qa before the polarity of $i_{Lkg}$ is reversed (see the graph of $v_{GSa}$ in FIG. 55), concurrently with reversing of the polarity of $i_{Lkg}$, the switch Qa is turned on at zero voltage. In the mode 1, the winding voltage of the transformer is 0. Thus, in the multistage-connected current doubler, each of the inductors L2a and L2b supplies a compensation current to the shaded module PV2, and accordingly each of the diodes D2a and D2b is brought into conduction. As the inductors L2a and L2b discharge energy therefrom, $i_{L2a}$ and $i_{L2b}$ decreases (see the graphs of $i_{L2a}$ and $i_{L2b}$ in FIG. 55). A compensation current supplied from the solar cell adjustment system to the shaded module PV2 during the period of the mode 1 corresponds to a sum of $i_{L2a}$ and $i_{L2b}$, as with that during the period of the mode 4. When the current $i_{D2b}$ through the diode D2b becomes 0, the operation is concurrently shifted to the next mode 2. Subsequently, the above modes will be realized over time in the same manner as mentioned above.

As mentioned above, in the circuit configurations depicted in FIGS. 41 to 43, because charge and discharge currents of capacitors flow through the solar cell modules along different pathways depending on the operation modes, each module is exposed to a relatively large ripple current, and the operating voltage thereof may become unstable. In this regard, when the circuit configuration in FIG. 54 is used, a current flowing through the shaded module PV2 is always equal to a sum of currents across the inductors L2a and L2b, and charge and discharge currents to the capacitors C2a and C2b never flow through any remaining module other than PV2, as can be understood from current pathways of FIGS. 56a to 56d. Thus, it becomes possible to significantly reduce a ripple current flowing through each module, as compared to the embodiment depicted in FIGS. 41 to 43.

Figure 57:
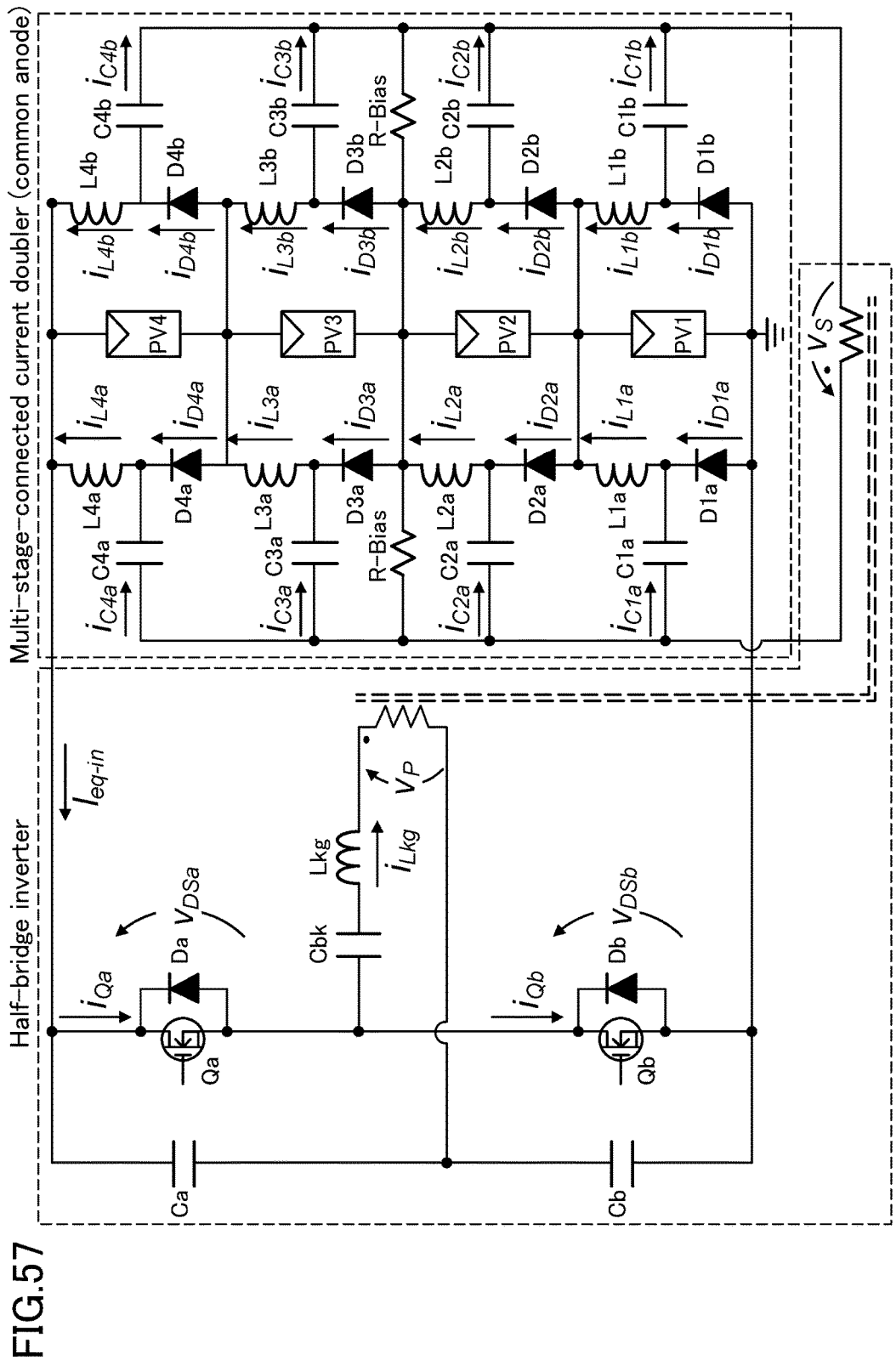
FIG. 57 is a circuit diagram of a solar cell adjustment system according to one embodiment of the present invention, using a half-bridge inverter and a common anode, multistage-connected current doubler.
Figure 58A:
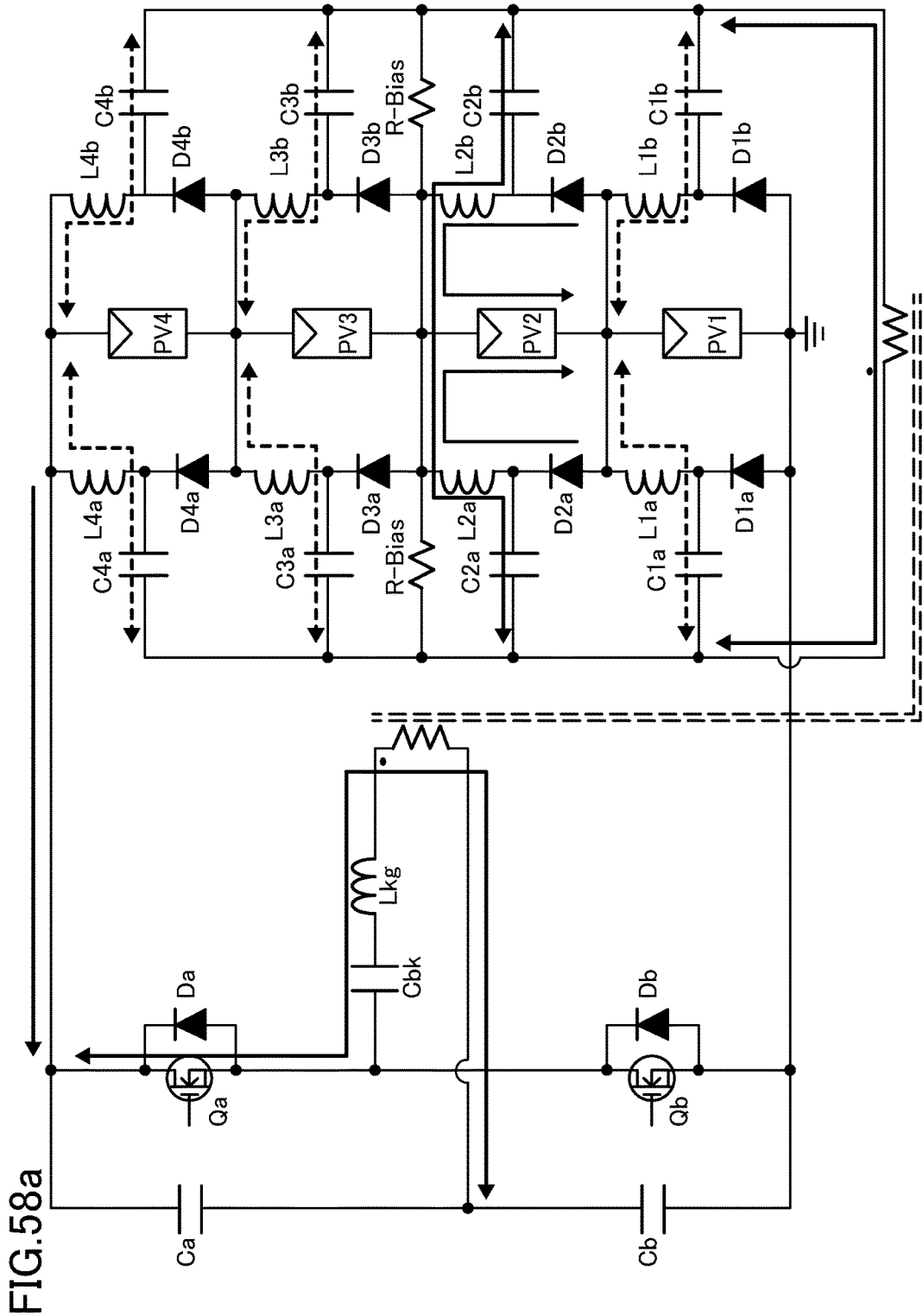
FIG. 58a is a diagram depicting a pathway of current flowing during a period of mode 1, when the solar cell adjustment system in FIG. 57 is activated in a situation where a solar cell module PV2 is shaded.

Although the circuit configuration has been described in FIG. 54 where a common cathode-type multistage-connected current doubler circuit is driven by using a half-bridge inverter, a common anode-type multistage-connected current doubler circuit may also be used to allow a compensation current to be supplied to a shaded module, while reducing a ripple current, wherein the common anode-type multistage-connected current doubler circuit is configured such that each of a pair of anodes of diodes D1a and D1b, a pair of anodes of diodes D2a and D2b, a pair of anodes of diodes D3a and D3b and a pair of anodes of diodes D4a and D4b are common-connected, as depicted in FIG. 57. When the system in FIG. 57 is driven by alternately switching two switches Qa and Qb as indicated by the graph of $v_{GS}$ in FIG. 55, a current pathway along which a current flows during the period of each mode is shown in FIG. 58a (mode 1) to FIG. 58d (mode 4), similarly to the system of FIG. 54.

Figure 58B:
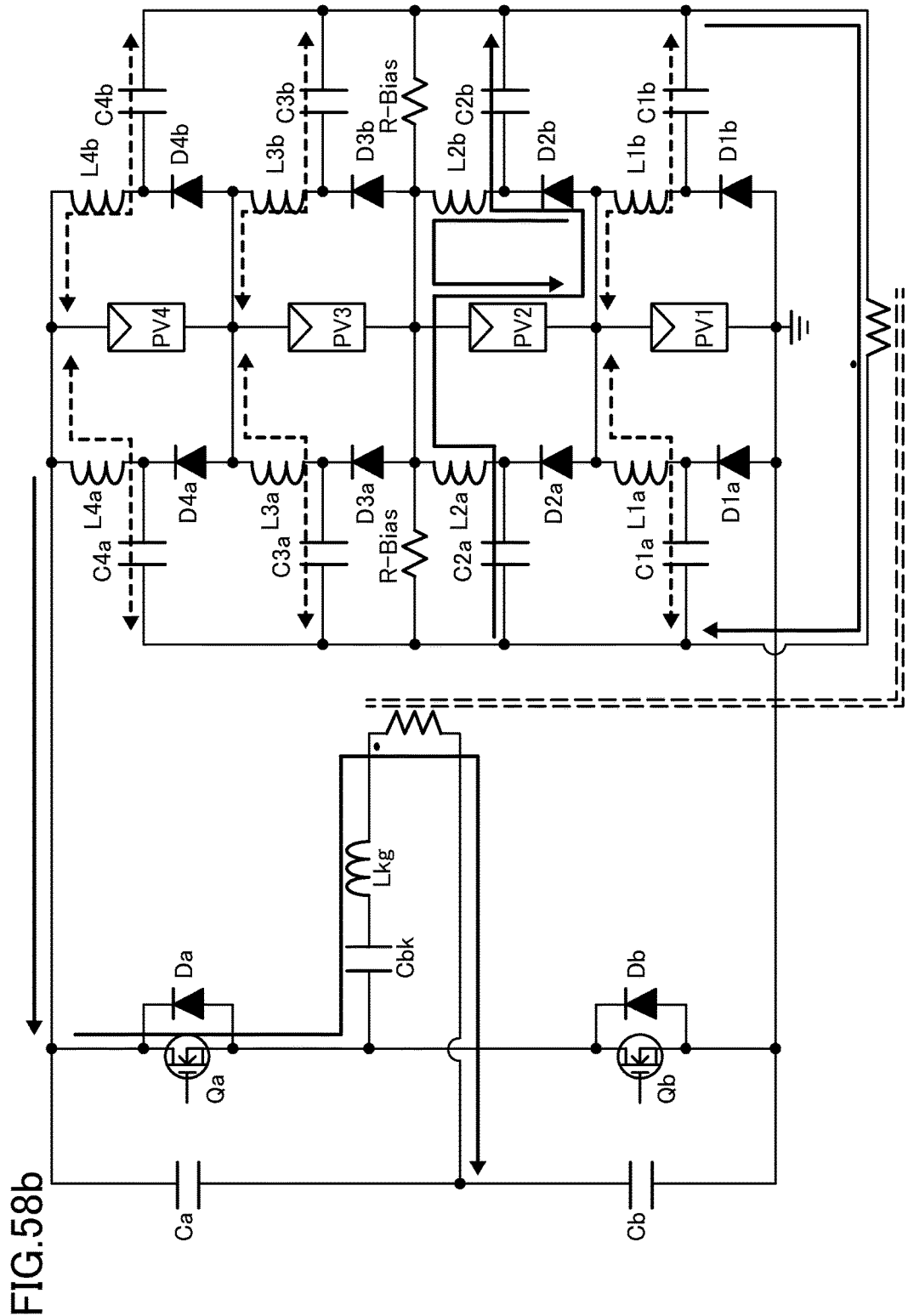
FIG. 58b is a diagram depicting a pathway of current flowing during a period of mode 2, when the solar cell adjustment system in FIG. 57 is activated in the situation where the solar cell module PV2 is shaded.

For convenience sake, first of all, an operation in mode 2 will be described (FIG. 58b). During the period of the mode 2, the switch Qa is set in an ON state, and the switch Qb is set in an OFF state, so that a certain level of positive voltage (which is a voltage rising in a direction of the arrowed line indicative of $v_P$ in FIG. 57) is output to the capacitor Cbk, the inductor Lkg and the primary winding. Thus, a current flowing through the inductor Lkg linearly increases. The voltage applied to the primary winding is transformed by the transformer, to drive the multistage-connected current doubler circuit. Based on the voltage applied through the transformer, a compensation current flows into the shaded module PV2 via the capacitor C2a and the inductor L2a, whereafter this current flows toward the diode D2b and the capacitor C2b. According to the aforementioned positive voltage, the absolute values of these currents also linearly increase. And, the inductor L2b discharges energy therefrom, and a compensation current is also supplied to the shaded module PV2. This current will decrease as the inductor L2a loses energy. A current flowing through the shaded module PV2 during the period of the mode 2 according to the operation of the solar cell adjustment system corresponds to a sum of $i_{L2a}$ and $i_{L2b}$. A current flowing through any remaining inductor other than the inductors L2a and L2b corresponding to the shaded module PV2 in the multistage-connected current doubler consists only of a ripple current component.

Figure 58C:
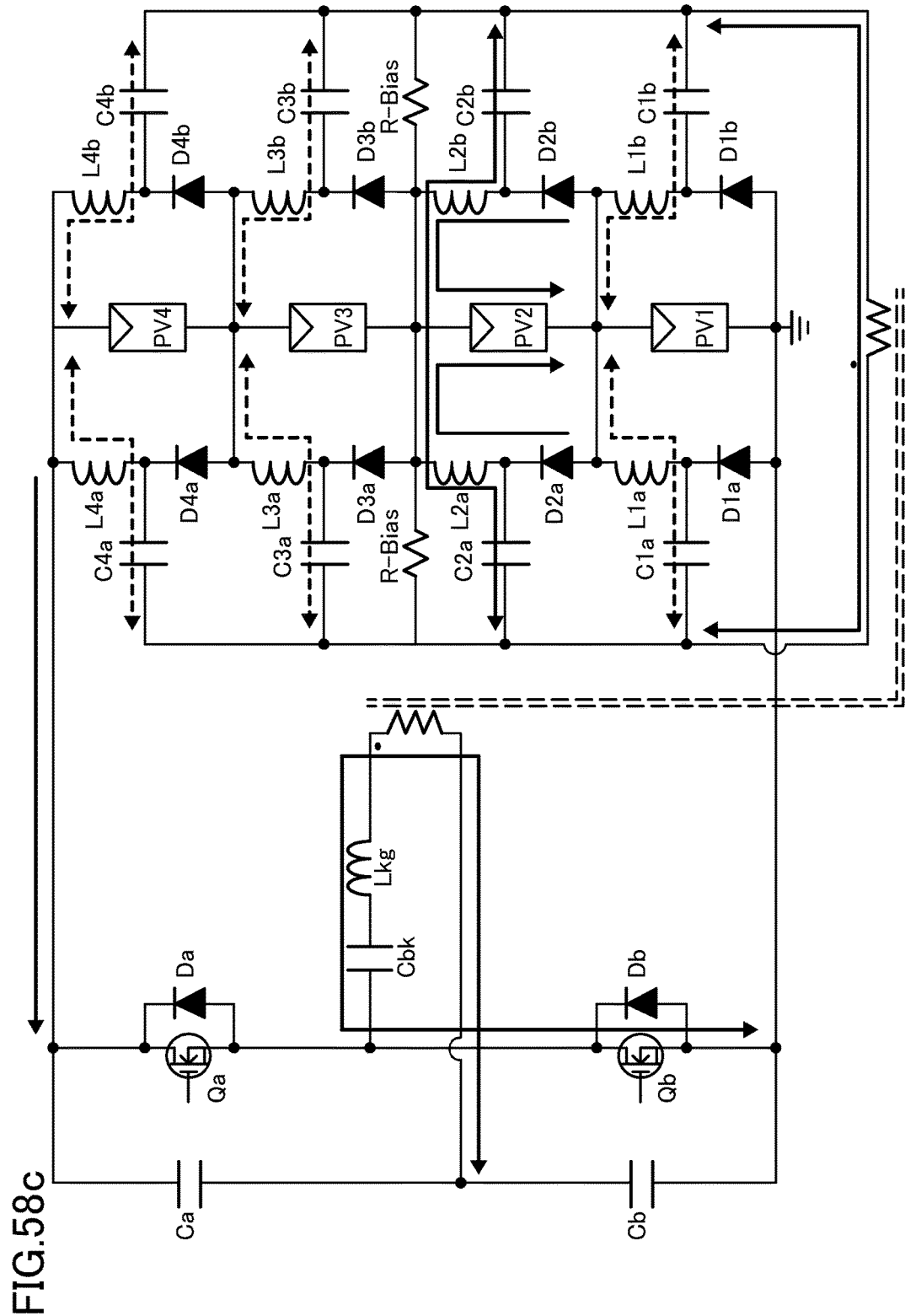
FIG. 58c is a diagram depicting a pathway of current flowing during a period of mode 3, when the solar cell adjustment system in FIG. 57 is activated in the situation where the solar cell module PV2 is shaded.
Figure 58D:
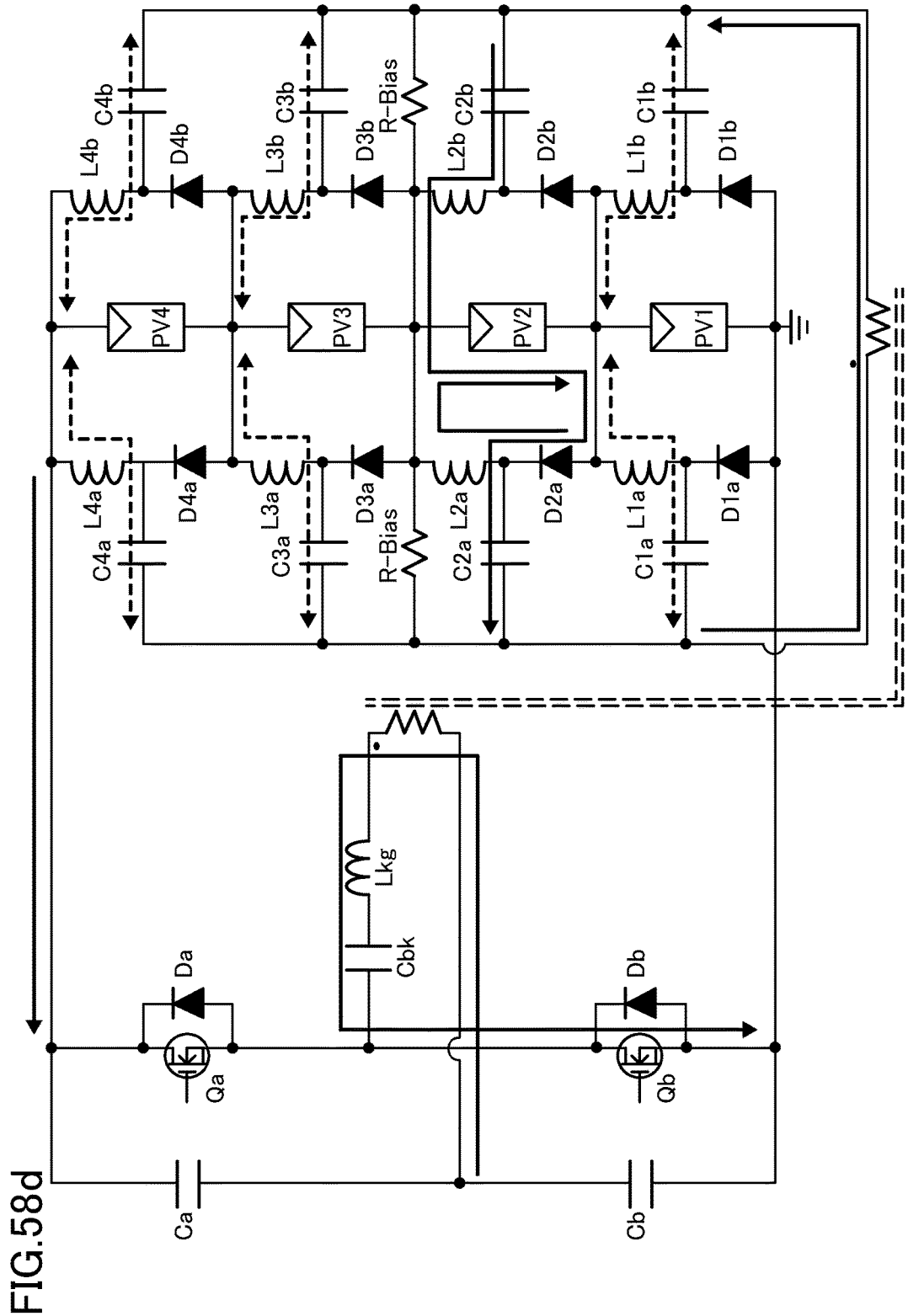
FIG. 58d is a diagram depicting a pathway of current flowing during a period of mode 4, when the solar cell adjustment system in FIG. 57 is activated in the situation where the solar cell module PV2 is shaded.

When the switch Qa is turned off, the current which has flowed through the switch Qa is concurrently commutated toward the diode Db as an antiparallel diode of the switch Qb, and the operation is shifted to the mode 3 (FIG. 58c). At start of the mode 3, although a forward current flows through the diode Db, and each current flowing through the capacitor Cbk, the inductor Lkg and the primary winding is directed in the same direction as that during the period of the mode 2, these currents will linearly decrease due to a voltage from the capacitor Cb. The gate voltage $v_{GSb}$ is applied to Qb before a polarity of $i_{Lkg}$ is reversed. Thus, concurrently with reversing of the polarity of $i_{Lkg}$, the switch Qb is turned on at zero voltage. In the mode 3, a winding voltage of the transformer is 0. Thus, in the multistage-connected current doubler, each of the inductors L2a and L2b supplies a compensation current to the shaded module PV2, and accordingly each of the diodes D2a and D2b is brought into conduction. As the inductors L2a and L2b discharge energy therefrom, $i_{L2a}$ and $i_{L2b}$ decreases. A compensation current supplied from the solar cell adjustment system to the shaded module PV2 during the period of the mode 3 corresponds to a sum of $i_{L2a}$ and $i_{L2b}$, as with that during the period of the mode 2. When the current $i_{D2b}$ through the diode D2b becomes 0, the operation is concurrently shifted to the next mode 4.

During the period of the mode 4 (FIG. 58d), the switch Qa is set in an OFF state, and the switch Qb is set in an ON state, so that a certain level of negative voltage (the voltage rising in the direction of the arrowed line indicative of $v_P$ in FIG. 57 is defined as a positive voltage) is output to the capacitor Cbk, the inductor Lkg and the primary winding. Thus, a current flowing through the inductor Lkg linearly decreases (the absolute value thereof increases). The voltage applied to the primary winding is transformed by the transformer, to drive the multistage-connected current doubler circuit. Based on the voltage applied through the transformer, a compensation current flows into the shaded module PV2 via the capacitor C2b and the inductor L2b, whereafter this current flows toward the diode D2a and the capacitor C2a. The absolute values of these currents also linearly increase based on the above-mentioned negative voltage. And, a compensation current due to discharge of energy from the inductor L2a is also supplied to the shaded module PV2. This current will decrease as the inductor L2a loses energy. A current flowing through the shaded module PV2 during the period of the mode 4 according to the operation of the solar cell adjustment system corresponds to a sum of $i_{L2a}$ and $i_{L2b}$. A current flowing through any remaining inductor other than the inductors L2a and L2b corresponding to the shaded module PV2 in the multistage-connected current doubler consists only of a ripple current component.

When the switch Qb is turned off, the current which has flowed through the switch Qb is concurrently commutated toward the diode Da as an antiparallel diode of the switch Qa, and the operation is shifted to the mode 1 (FIG. 58a). At start of the mode 1, although a forward current flows through the diode Da, and each current flowing through the capacitor Cbk, the inductor Lkg and the primary winding is directed in the same direction as that during the period of the mode 4, these currents will linearly increase (the absolute value thereof decreases) due to a voltage from the capacitor Ca. When gate voltage $v_{GSa}$ is applied to Qa before the polarity of $i_{Lkg}$ is reversed, concurrently with reversing of the polarity of $i_{Lkg}$, the switch Qa is turned on at zero voltage. In the mode 1, the winding voltage of the transformer is 0. Thus, in the multistage-connected current doubler, each of the inductors L2a and L2b supplies a compensation current to the shaded module PV2, and accordingly each of the diodes D2a and D2b is brought into conduction. As the inductors L2a and L2b discharge energy therefrom, $i_{L2a}$ and $i_{L2b}$ decrease. A compensation current supplied from the solar cell adjustment system to the shaded module PV2 during the period of the mode 1 corresponds to a sum of $i_{L2a}$ and $i_{L2b}$, as with that during the period of the mode 4. When the current $i_{D2a}$ through the diode D2a becomes 0, the operation is concurrently shifted to the next mode 2. Subsequently, the above modes will be realized over time in the same manner as mentioned above.

Figure 59:
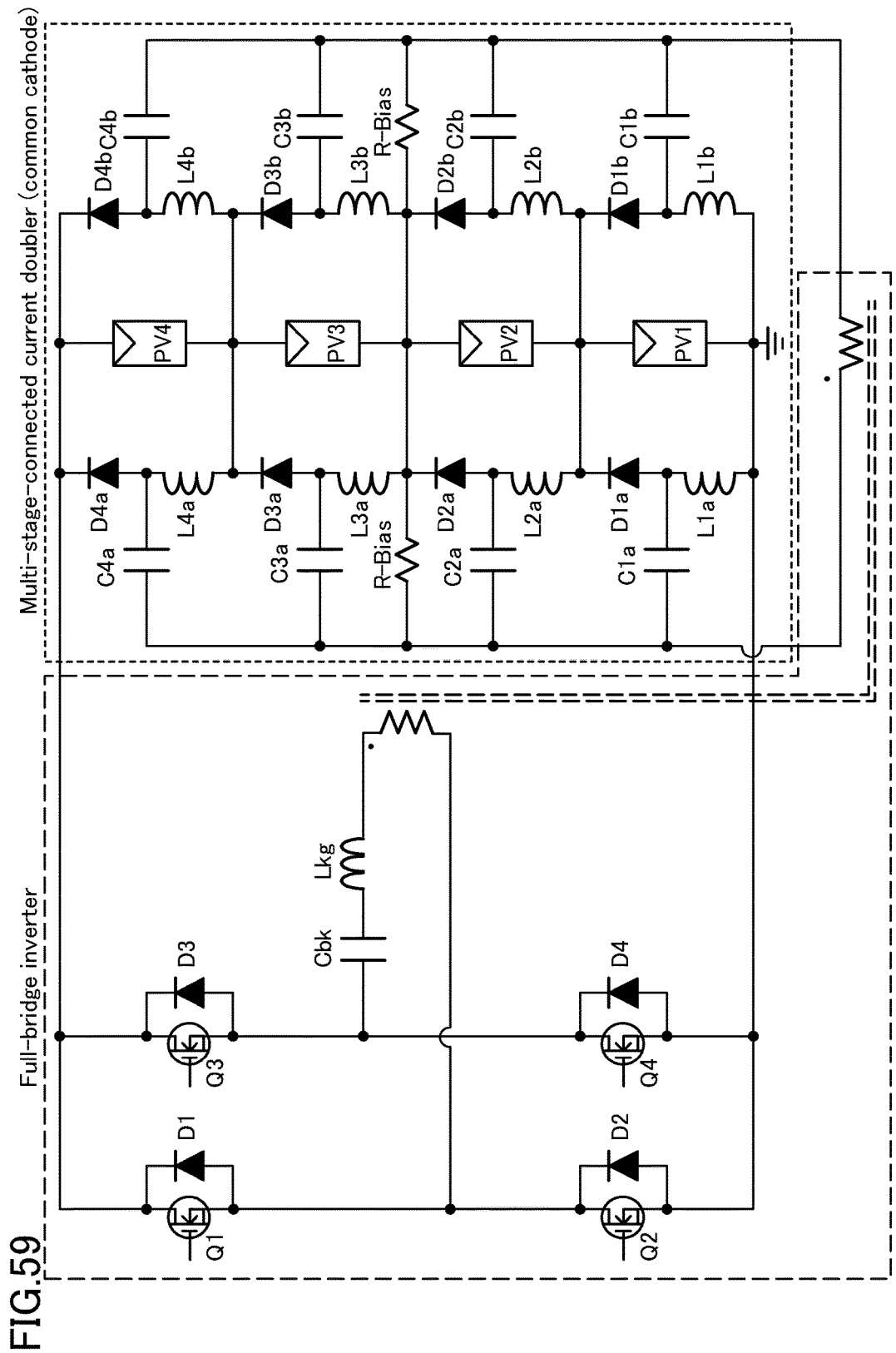
FIG. 59 is a circuit diagram of a solar cell adjustment system according to one embodiment of the present invention, using a full-bridge inverter and a common cathode, multistage-connected current doubler.
Figure 60:
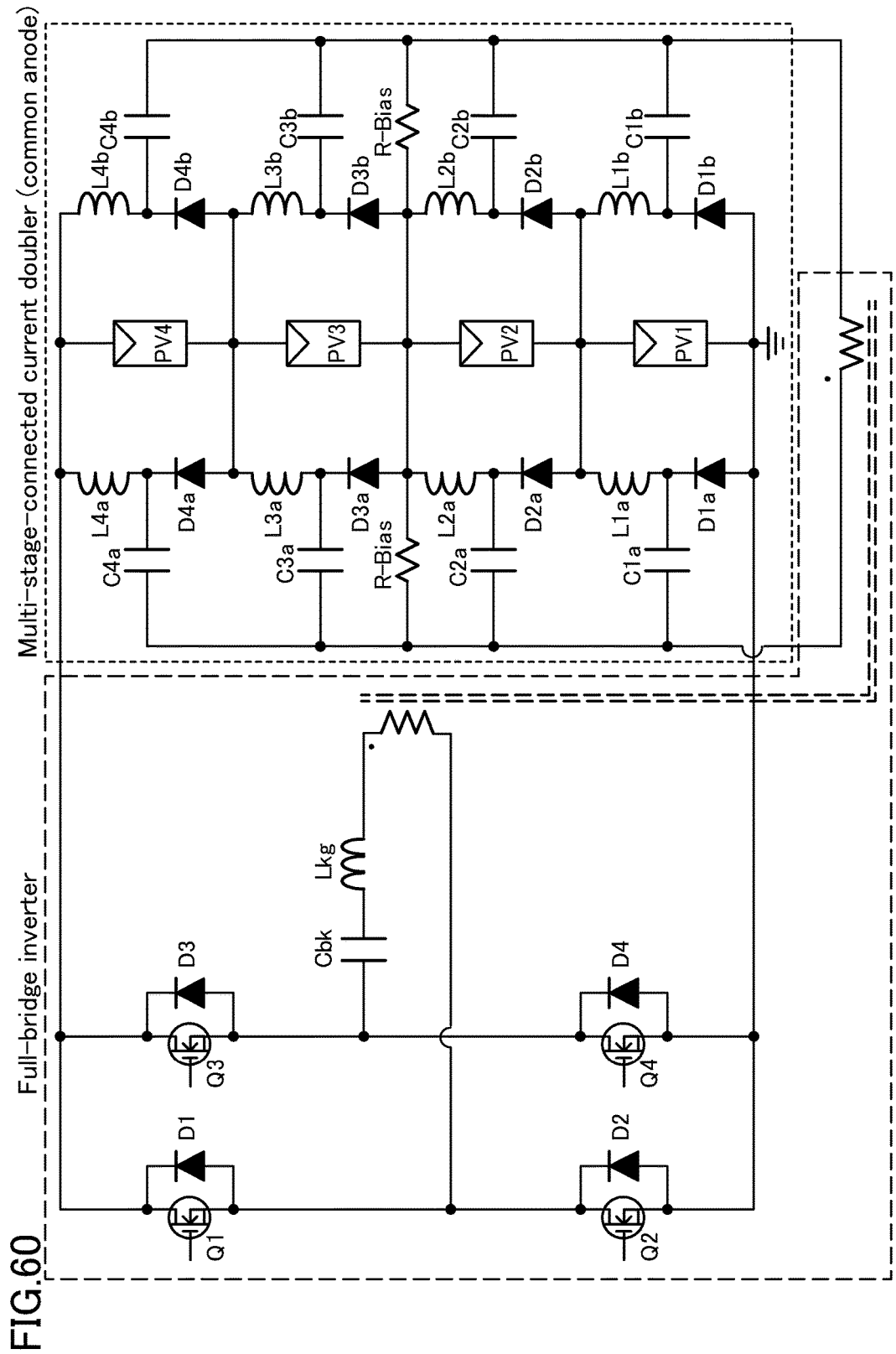
FIG. 60 is a circuit diagram of a solar cell adjustment system according to one embodiment of the present invention, using a full-bridge inverter and a common anode, multistage-connected current doubler.

Although a half-bridge inverter has been used as an inverter in each of the circuit configurations in FIGS. 54 and 57, the inverter is not limited to thereto, but may be any other type of inverter capable of converting a summed voltage across the solar cell modules PV1 to PV4 to an AC voltage, such as a full-bridge inverter or asymmetrical half-bridge inverter. FIGS. 59 and 60 depict two types of circuit configurations of the solar cell adjustment system according to the present invention, each using a full-bridge inverter. Even using a full-bridge inverter, it is possible to alternately switch between a state in which two switches Q1 and Q4 are set in an ON state, and a state in which two switches Q2 and Q3 are set in an ON state, to thereby output an AC voltage similar to $v_P$ in FIG. 55. Thus, it becomes possible to cause a multistage-connected current doubler to operate by the same principle as that of the circuits in FIGS. 54 and 57 to reduce a ripple current while supplying a compensation current to a shaded module.

It should be understood that, with a view to realizing the optimal compensation in FIG. 49c, the minimum current control system in FIG. 50 may be applied to each of the solar cell adjustment systems in FIGS. 54, 57, 59 and 60. As mentioned with reference to FIG. 50, by detecting a compensation current in the solar cell modules PV1 to PV4, and then using the time ratio control circuit in FIG. 50 to control a length of an ON period of each of the switch Qa and the switch Qb in the systems depicted in FIGS. 54 and 57, or a length of an ON period of each of the set of switches Q1 and Q4 and a length of an ON period of each of the set of switches Q2 and Q3 in the systems depicted in FIGS. 59 and 60, an output current of the inverter can be controlled to adjust a compensation current to flow through each of the solar cell modules. For example, in the circuits depicted in FIGS. 54 and 57, when a time ratio of each of the switches Qa and Qb is made larger (the dead time thereof is shortened), the output current of the inverter is increased (the compensation current is also increased), and in the circuits depicted in FIGS. 59 and 60, when a time ratio of the ON period of each of the set of switches Q1 and Q4 and the ON period of the set of switches Q2 and Q3 is made larger (the dead time thereof is shortened), the output current of the inverter is increased (the compensation current is also increased).

INDUSTRIAL APPLICABILITY

The present invention can be widely applied to a power supply constituting a solar cell string constructed by series-connecting solar cell modules.

LIST OF REFERENCE SIGNS

First to Third Aspects of Present Invention

PV1 to PV4: solar cell module
Q1 to Q8, $Q_{DC-DC}$, Qa to Qd: switch
L1 to L3, Lr, Lr1, Lr2, $L_{DC-DC}$: inductor
D1 to D8, D1a to D8a, D1b to D8b, Da to Dd, $D_{DC-DC}$: diode
C1 to C4, C1a to C4a, C1b to C4b, Cr, Cr1, Cr2, Cm, Cn, $D_{DC-DC}$: capacitor
Cout1 to Cout4, Cout1a to Cout4a, Cout1b to Cout4b: smoothing capacitor
Rr, rm, rn, Rout1: resistance component Fourth to Sixth Aspects of Present Invention PV1 to PV4: solar cell module
Q, Qt to Q8, $Q_{DC-DC}$, Qa, Qb: switch
L1 to L4, L1a to L4a, L1b to L4b, $L_{DC-DC}$, Lin, Lout, Lkg: inductor
D, D1 to D4, D1a to D4a, D1b to D4b, $D_{DC-DC}$, Da, Db: diode
C, C1 to C4, C1a to C4a, C1b to C4b, $C_{DC-DC}$, Cin, Cout, Ca, Cb, Cbk: capacitor
Vin, Vcc: power supply
Load: load
R-bias: bias resistance

The invention claimed is:

1. A solar cell adjustment system comprising:
a multi-stage voltage multiplier rectification circuit constructed such that two series-connected diodes are connected in parallel, respectively, to each of series-connected 1st to n-th (where n is an integer of two or more) capacitors, and an intermediate capacitor is connected to each intermediate point of respective two series-connected diodes;
a solar cell module string constructed by series-connecting 1st to n-th solar cell modules each defined as a k-th (where k=1, 2, - - - , n) solar cell module connected in parallel to a k-th one of the capacitors; and
an inverter comprising a capacitive element and an inductive element, the inverter being configured to receive an input of a summed voltage of voltages applied, respectively, to the 1st to n-th solar cell modules, convert the input summed voltage into an AC (Alternating Current) voltage, and output the AC voltage to the multi-stage voltage multiplier rectification circuit.

2. The solar cell adjustment system as recited in claim 1, wherein the inverter comprises a device for changing a frequency of the AC voltage.

3. The solar cell adjustment system as recited in claim 2, wherein the inverter comprises:
an input circuit comprising a switch, the input circuit being configured to receive the input of the summed voltage of voltages applied, respectively, to the 1st to n-th solar cell modules, and output a voltage depending on a switched state of the switch; and
a resonant circuit comprising the capacitive element and the inductive element, the resonant circuit being configured to convert the voltage output from the input circuit, into an AC voltage, and output the AC voltage to the multi-stage voltage multiplier rectification circuit.

4. The solar cell adjustment system as recited in claim 3, wherein the resonant circuit is configured to transform the AC voltage by a transformer and then output the transformed AC voltage to the multi-stage voltage multiplier rectification circuit.

5. The solar cell adjustment system as recited in claim 4, wherein
the input circuit is constructed such that two flywheel diodes are connected in parallel, respectively, to series-connected first and second switches, and configured to select one of the first and second switches as a switch to be turned on, over time, and thereby, when a DC (Direct current) voltage is input between both ends of the series-connected first and second switches, output a rectangular wave-shaped voltage between a first terminal located at an intermediate point of the first and second switches, and a second terminal located at one of opposite ends of the second switch on a side different from the first terminal; and the resonant circuit comprises an inductor and an in-resonant circuit capacitor which are series-connected between the first terminal and a third terminal, wherein the resonant circuit is configured to, in response to receiving an input of the rectangular wave-shaped voltage from the input circuit, output an AC voltage to a point between the third terminal and a fourth terminal connected to the second terminal, and then, after transforming the AC voltage by the transformer, output the transformed AC voltage to the multi-stage voltage multiplier rectification circuit.

6. A solar cell adjustment system comprising:
a solar cell module string constructed by series-connecting 1st to n-th (where n is an integer of two or more) solar cell modules;
a first multi-stage voltage multiplier rectification circuit comprising 1st to n-th capacitors each defined as a k-th (k=1, 2, - - - , n) capacitor connected in parallel to a k-th one of the solar cell modules, 1st to n-th diode pairs each composed of two series-connected diodes and each defined as a k-th (k=1, 2, - - - , n) diode pair connected in parallel to a k-th one of the capacitors, and 1st to n-th intermediate capacitors each connected to an intermediate point of the two series-connected diodes in each of the 1st to n-th diode pairs;
a second multi-stage voltage multiplier rectification circuit comprising (n+1)-th to 2n-th capacitors each defined as an (n+k)-th (k=1, 2, - - - , n) capacitor connected in parallel to a k-th one of the solar cell modules, (n+1)-th to 2n-th diode pairs each composed of two series-connected diodes and each defined as an (n+k)-th diode pair connected in parallel to an (n+k)-th one of the capacitors, and (n+1)-th to 2n-th intermediate capacitors each connected to an intermediate point of the two series-connected diodes in each of the (n+1)-th to 2n-th diode pairs;
an inverter comprising a capacitive element and an inductive element, the inverter being configured to receive an input of a summed voltage of voltages applied, respectively, to the 1st to n-th solar cell modules, and, after converting the input summed voltage into an AC voltage and transforming the AC voltage by a transformer, output the transformed AC voltage,
wherein one end of a secondary winding of the transformer is connected to the first multi-stage voltage multiplier rectification circuit, and the other end of the secondary winding is connected to the second multi-stage voltage multiplier rectification circuit.

7. The solar cell adjustment system as recited in claim 6, wherein the inverter comprises means for changing a frequency of the AC voltage.

8. The solar cell adjustment system as recited in claim 7, wherein the inverter comprises:
an input circuit comprising a switch, the input circuit being configured to receive the input of the summed voltage of voltages applied, respectively, to the 1st to n-th solar cell modules, and output a voltage depending on a switched state of the switch; and
a resonant circuit comprising a capacitive element and an inductive element, the resonant circuit being configured to convert the voltage output from the input circuit, into an AC voltage, and, after transforming the AC voltage by a transformer, output the transformed AC voltage.

9. The solar cell adjustment system as recited in claim 8, wherein
the input circuit is constructed such that two flywheel diodes are connected in parallel, respectively, to series-connected first and second switches, and configured to alternately select one of the first and second switches as a switch to be turned on, over time, and thereby, when a DC voltage is input between opposite end of the series-connected first and second switches, output a rectangular wave-shaped voltage between a first terminal located at an intermediate point of the first and second switches, and a second terminal located at one of opposite ends of the second switch on a side different from that of the first terminal; and the resonant circuit comprises an inductor and an in-resonant circuit capacitor which are series-connected between the first terminal and a third terminal, wherein the resonant circuit is configured to, in response to receiving an input of the rectangular wave-shaped voltage from the input circuit, output an AC voltage between the third terminal and a fourth terminal connected to the second terminal, and then, after transforming the AC voltage by the transformer, output the transformed AC voltage.

10. A method for use with a solar cell adjustment system comprising:
a multi-stage voltage multiplier rectification circuit constructed such that two series-connected diodes are connected in parallel, respectively, to each of series-connected 1st to n-th (where n is an integer of two or more) capacitors, and an intermediate capacitor is connected to each intermediate point of respective two series-connected diodes;
a solar cell module string constructed by series-connecting 1st to n-th solar cell modules each defined as a k-th (where k=1, 2, - - - , n) solar cell module connected in parallel to a k-th one of the capacitors; and
an inverter comprising a capacitive element and an inductive element, the inverter being configured to receive an input of a summed voltage of voltages applied, respectively, to the 1st to n-th solar cell modules, convert the input summed voltage into an AC (Alternating Current) voltage, and output the AC voltage to the multi-stage voltage multiplier rectification circuit, wherein the inverter comprises a device for changing a frequency of the AC voltage:
wherein the method is to control an operating state of the solar cell module string, the method comprising the steps of:
measuring an output electric power from the solar cell module string;
changing a frequency of an AC voltage to be output from the inverter;
after the change of the frequency, measuring an output electric power from the solar cell module string;
in a situation where the output electric power measured after the change of the frequency is greater than the output electric power measured before the change of the frequency, when the change has been raising of the frequency, further raising the frequency, and, when the change has been lowering of the frequency, further lowering the frequency; and in a situation where the output electric power measured after the change of the frequency is less than the output electric power measured before the change of the frequency, when the change has been raising of the frequency, lowering the frequency, and, when the change has been lowering of the frequency, raising the frequency, wherein the measurement of the output electric power from the solar cell module string and the change of the frequency of the AC voltage output from the inverter are repeated to thereby control the operating state of the solar cell module string.

\* \* \* \* \*